United States Patent
Block et al.

(10) Patent No.: US 10,802,703 B2
(45) Date of Patent: Oct. 13, 2020

(54) SHARING USER-CONFIGURABLE GRAPHICAL CONSTRUCTS

(71) Applicant: Apple Inc., Cupertino, CA (US)

(72) Inventors: Eliza Block, San Francisco, CA (US); Giovanni M. Agnoli, San Mateo, CA (US); Aurelio Guzman, San Jose, CA (US); Kevin Lynch, Woodside, CA (US); Christopher Wilson, San Francisco, CA (US); Eric Lance Wilson, San Jose, CA (US); Paul W. Salzman, Cupertino, CA (US); Vera Carr, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/554,204

(22) PCT Filed: Mar. 8, 2016

(86) PCT No.: PCT/US2016/021403
§ 371 (c)(1),
(2) Date: Aug. 28, 2017

(87) PCT Pub. No.: WO2016/144977
PCT Pub. Date: Sep. 15, 2016

(65) Prior Publication Data
US 2018/0081515 A1 Mar. 22, 2018

Related U.S. Application Data

(63) Continuation-in-part of application No. PCT/US2015/053353, filed on Sep. 30, 2015.
(Continued)

(51) Int. Cl.
*G06F 3/048* (2013.01)
*G06F 3/0488* (2013.01)
(Continued)

(52) U.S. Cl.
CPC .......... *G06F 3/04883* (2013.01); *G06F 1/163* (2013.01); *G06F 3/03547* (2013.01);
(Continued)

(58) Field of Classification Search
None
See application file for complete search history.

(56) References Cited

U.S. PATENT DOCUMENTS

| 3,148,500 A | 9/1964 | Thomas |
| 4,205,628 A | 6/1980 | Null |

(Continued)

FOREIGN PATENT DOCUMENTS

| AU | 2010249319 A1 | 6/2012 |
| AU | 2015101019 A4 | 9/2015 |

(Continued)

OTHER PUBLICATIONS

"Mugs", Online Availbale at <https://web.archive.org/web/20151029034349/http://le-mugs.com/>, Oct. 29, 2015.
(Continued)

*Primary Examiner* — Hua Lu
(74) *Attorney, Agent, or Firm* — Dentons US LLP

(57) ABSTRACT

Methods for sharing user-configurable graphical constructs, e.g., for use with a portable multifunction device, are disclosed. The methods described herein allow for sharing user-configurable graphical constructs that contain independently configurable graphical elements and graphical assets. Further disclosed are non-transitory computer-readable storage media, systems, and devices configured to perform the methods described herein.

42 Claims, 63 Drawing Sheets

Related U.S. Application Data

(60) Provisional application No. 62/129,919, filed on Mar. 8, 2015.

(51) Int. Cl.

| | | |
|---|---|---|
| *G06F 3/0484* | (2013.01) | |
| *H04N 1/00* | (2006.01) | |
| *G06F 9/451* | (2018.01) | |
| *G06F 9/00* | (2006.01) | |
| *G06F 3/0481* | (2013.01) | |
| *G06F 3/0486* | (2013.01) | |
| *G06F 1/16* | (2006.01) | |
| *G06F 3/0482* | (2013.01) | |
| *H04W 4/21* | (2018.01) | |
| *G06F 3/0354* | (2013.01) | |
| *H04W 4/08* | (2009.01) | |
| *H04W 4/18* | (2009.01) | |
| *H04W 4/50* | (2018.01) | |
| *H04W 4/80* | (2018.01) | |
| *H04L 12/18* | (2006.01) | |

(52) U.S. Cl.
CPC .......... *G06F 3/0481* (2013.01); *G06F 3/0482* (2013.01); *G06F 3/0484* (2013.01); *G06F 3/0486* (2013.01); *G06F 3/04817* (2013.01); *G06F 3/04842* (2013.01); *G06F 9/00* (2013.01); *G06F 9/451* (2018.02); *H04N 1/00095* (2013.01); *H04W 4/08* (2013.01); *H04W 4/18* (2013.01); *H04W 4/21* (2018.02); *G06F 2203/04105* (2013.01); *H04L 12/1827* (2013.01); *H04W 4/50* (2018.02); *H04W 4/80* (2018.02)

(56) References Cited

U.S. PATENT DOCUMENTS

| | | |
|---|---|---|
| 5,124,959 A | 6/1992 | Yamazaki et al. |
| 5,208,790 A | 5/1993 | Sato |
| 5,455,808 A | 10/1995 | Grupp et al. |
| 5,508,979 A | 4/1996 | Eisenegger |
| 5,659,693 A | 8/1997 | Hansen et al. |
| 5,815,657 A | 9/1998 | Williams et al. |
| 5,825,353 A | 10/1998 | Will |
| 5,845,257 A | 12/1998 | Fu et al. |
| 5,892,519 A | 4/1999 | Hirai |
| 5,986,655 A | 11/1999 | Chiu et al. |
| 5,999,195 A | 12/1999 | Santangeli |
| 6,043,818 A | 3/2000 | Nakano et al. |
| 6,097,371 A | 8/2000 | Siddiqui et al. |
| 6,128,012 A | 10/2000 | Seidensticker et al. |
| 6,160,767 A | 12/2000 | Ho |
| 6,279,018 B1 | 8/2001 | Kudrolli et al. |
| 6,359,839 B1 | 3/2002 | Schenk et al. |
| 6,416,471 B1 | 7/2002 | Kumar et al. |
| 6,441,824 B2 | 8/2002 | Hertzfeld |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,662,023 B1 | 12/2003 | Helle |
| 6,690,623 B1 | 2/2004 | Maano |
| 6,728,533 B2 | 4/2004 | Ishii |
| 6,809,724 B1 | 10/2004 | Shiraishi et al. |
| 6,871,076 B2 | 3/2005 | Samn |
| 6,912,694 B1 | 6/2005 | Harrison et al. |
| 7,203,380 B2 | 4/2007 | Chiu et al. |
| 7,257,254 B2 | 8/2007 | Tunney |
| 7,302,650 B1 | 11/2007 | Allyn et al. |
| 7,305,350 B1 | 12/2007 | Bruecken |
| 7,378,954 B2 | 5/2008 | Wendt |
| 7,479,949 B2 | 1/2009 | Jobs et al. |
| 7,515,509 B2 | 4/2009 | Klein |
| 7,515,903 B1 | 4/2009 | Cast |
| 7,619,615 B1 | 11/2009 | Donoghue |
| 7,751,285 B1 | 7/2010 | Cain |
| 7,773,460 B2 * | 8/2010 | Holt .................. A61J 7/04 368/10 |
| 7,843,769 B2 | 11/2010 | Ishida et al. |
| 7,898,542 B1 | 3/2011 | Yu et al. |
| 7,907,476 B2 | 3/2011 | Lee |
| 7,970,827 B1 | 6/2011 | Cumberbatch et al. |
| 8,105,208 B2 | 1/2012 | Oleson et al. |
| 8,121,945 B2 | 2/2012 | Rackley et al. |
| 8,238,876 B2 | 8/2012 | Teng et al. |
| 8,245,143 B2 | 8/2012 | Yach et al. |
| 8,453,940 B2 | 6/2013 | Diamond |
| 8,462,997 B2 | 6/2013 | Soldan et al. |
| 8,467,770 B1 | 6/2013 | Ben |
| 8,543,081 B2 | 9/2013 | Scott et al. |
| 8,554,694 B1 | 10/2013 | Ward et al. |
| 8,566,403 B2 | 10/2013 | Pascal et al. |
| 8,595,649 B2 | 11/2013 | Warfel et al. |
| 8,595,798 B2 | 11/2013 | Anand et al. |
| 8,624,836 B1 | 1/2014 | Miller et al. |
| 8,666,361 B2 | 3/2014 | Chu et al. |
| 8,700,158 B2 | 4/2014 | Mass et al. |
| 8,706,628 B2 | 4/2014 | Phillips |
| 8,725,842 B1 | 5/2014 | Al-nasser |
| 8,825,445 B2 | 9/2014 | Hoffman et al. |
| 8,847,903 B2 | 9/2014 | Stokes et al. |
| 8,854,925 B1 | 10/2014 | Lee et al. |
| 8,931,703 B1 | 1/2015 | Mullen et al. |
| 8,938,394 B1 | 1/2015 | Faaborg et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,173,052 B2 | 10/2015 | Hauser et al. |
| 9,197,738 B2 | 11/2015 | Peev et al. |
| 9,239,605 B1 | 1/2016 | Nanda et al. |
| 9,338,242 B1 | 5/2016 | Suchland et al. |
| 9,459,781 B2 | 10/2016 | Kocienda et al. |
| 9,547,425 B2 | 1/2017 | Kocienda et al. |
| 9,568,891 B2 | 2/2017 | Adams et al. |
| 9,582,165 B2 | 2/2017 | Kocienda et al. |
| 9,753,436 B2 | 9/2017 | Ely et al. |
| 9,794,397 B2 | 10/2017 | Min et al. |
| 9,904,906 B2 | 2/2018 | Kim et al. |
| 10,051,103 B1 | 8/2018 | Gordon et al. |
| 10,304,347 B2 | 5/2019 | Wilson et al. |
| 10,425,284 B2 | 9/2019 | Dellinger et al. |
| 10,620,590 B1 | 4/2020 | Guzman et al. |
| 2001/0031622 A1 | 10/2001 | Kivela et al. |
| 2002/0029169 A1 | 3/2002 | Oki et al. |
| 2002/0054066 A1 | 5/2002 | Kikinis et al. |
| 2002/0054541 A1 | 5/2002 | Hall |
| 2002/0059623 A1 | 5/2002 | Rodriguez et al. |
| 2002/0068600 A1 | 6/2002 | Chihara et al. |
| 2002/0131331 A1 | 9/2002 | Molander |
| 2002/0142734 A1 | 10/2002 | Wickstead |
| 2003/0002391 A1 * | 1/2003 | Biggs ............... G04G 9/00 368/82 |
| 2003/0027621 A1 | 2/2003 | Libby et al. |
| 2003/0067497 A1 | 4/2003 | Pichon |
| 2003/0164847 A1 | 9/2003 | Zaima et al. |
| 2003/0182628 A1 | 9/2003 | Lira |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0021699 A1 | 2/2004 | Fildebrandt |
| 2004/0047244 A1 | 3/2004 | Lino et al. |
| 2004/0066710 A1 | 4/2004 | Yuen et al. |
| 2004/0077462 A1 | 4/2004 | Brown et al. |
| 2004/0168107 A1 | 8/2004 | Sharp et al. |

(56) References Cited

U.S. PATENT DOCUMENTS

| | | |
|---|---|---|
| 2004/0192332 A1 | 9/2004 | Samn |
| 2004/0218472 A1* | 11/2004 | Narayanaswami .. G04G 9/0082 368/10 |
| 2004/0225966 A1* | 11/2004 | Besharat ............. G06Q 10/109 715/705 |
| 2004/0243547 A1 | 12/2004 | Chhatrapati et al. |
| 2004/0246607 A1 | 12/2004 | Watson et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear |
| 2005/0139852 A1 | 6/2005 | Chen et al. |
| 2005/0156873 A1 | 7/2005 | Walter et al. |
| 2005/0197063 A1 | 9/2005 | White |
| 2005/0200611 A1 | 9/2005 | Goto et al. |
| 2005/0202846 A1 | 9/2005 | Glass et al. |
| 2005/0278757 A1 | 12/2005 | Grossman et al. |
| 2006/0000900 A1 | 1/2006 | Fernandes et al. |
| 2006/0007785 A1 | 1/2006 | Fernandez et al. |
| 2006/0035628 A1 | 2/2006 | Miller et al. |
| 2006/0085765 A1 | 4/2006 | Peterson et al. |
| 2006/0092770 A1 | 5/2006 | Demas |
| 2006/0122748 A1 | 6/2006 | Nou |
| 2006/0155578 A1 | 7/2006 | Eisenberger et al. |
| 2006/0173749 A1 | 8/2006 | Ward et al. |
| 2006/0214935 A1 | 9/2006 | Boyd et al. |
| 2006/0217104 A1 | 9/2006 | Cho |
| 2006/0271605 A1 | 11/2006 | Petruzzo |
| 2007/0004451 A1 | 1/2007 | Anderson |
| 2007/0006096 A1 | 1/2007 | Kim et al. |
| 2007/0055947 A1 | 3/2007 | Ostojic et al. |
| 2007/0057775 A1 | 3/2007 | O'Reilly et al. |
| 2007/0067733 A1 | 3/2007 | Moore et al. |
| 2007/0094330 A1 | 4/2007 | Russell |
| 2007/0096765 A1 | 5/2007 | Kagan |
| 2007/0101279 A1 | 5/2007 | Chaudhri et al. |
| 2007/0135043 A1 | 6/2007 | Hayes et al. |
| 2007/0194110 A1 | 8/2007 | Esplin et al. |
| 2007/0194113 A1 | 8/2007 | Esplin et al. |
| 2007/0211042 A1 | 9/2007 | Kim et al. |
| 2007/0236475 A1 | 10/2007 | Wherry |
| 2007/0239754 A1 | 10/2007 | Schnitman |
| 2007/0254712 A1 | 11/2007 | Chitti |
| 2007/0261537 A1* | 11/2007 | Eronen .................... G10H 1/40 84/611 |
| 2007/0271340 A1 | 11/2007 | Goodman et al. |
| 2007/0279190 A1 | 12/2007 | Lugt et al. |
| 2007/0287140 A1 | 12/2007 | Liebowitz |
| 2008/0040265 A1 | 2/2008 | Rackley, III et al. |
| 2008/0076637 A1 | 3/2008 | Gilley et al. |
| 2008/0077936 A1 | 3/2008 | Goel et al. |
| 2008/0082930 A1 | 4/2008 | Omernick et al. |
| 2008/0127268 A1 | 5/2008 | Bergeron et al. |
| 2008/0130421 A1 | 6/2008 | Akaiwa et al. |
| 2008/0150959 A1 | 6/2008 | Marui |
| 2008/0167834 A1 | 7/2008 | Herz et al. |
| 2008/0168396 A1 | 7/2008 | Matas et al. |
| 2008/0183909 A1 | 7/2008 | Lim et al. |
| 2008/0186808 A1 | 8/2008 | Lee |
| 2008/0192021 A1 | 8/2008 | Lim et al. |
| 2008/0215240 A1 | 9/2008 | Howard et al. |
| 2008/0246778 A1 | 10/2008 | Ham et al. |
| 2008/0259829 A1 | 10/2008 | Rosenblatt |
| 2008/0270934 A1 | 10/2008 | Firebaugh et al. |
| 2009/0012988 A1 | 1/2009 | Brown |
| 2009/0037326 A1 | 2/2009 | Chitti et al. |
| 2009/0051327 A1 | 2/2009 | Bohne |
| 2009/0057396 A1 | 3/2009 | Barbour et al. |
| 2009/0058821 A1 | 3/2009 | Chaudhri et al. |
| 2009/0059730 A1 | 3/2009 | Lyons et al. |
| 2009/0060170 A1 | 3/2009 | Coughlan et al. |
| 2009/0113315 A1 | 4/2009 | Fisher et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi |
| 2009/0178007 A1 | 7/2009 | Matas et al. |
| 2009/0178008 A1 | 7/2009 | Herz et al. |
| 2009/0195497 A1 | 8/2009 | Fitzgerald et al. |
| 2009/0199130 A1 | 8/2009 | Tsern et al. |
| 2009/0205041 A1 | 8/2009 | Michalske |
| 2009/0216556 A1 | 8/2009 | Martin et al. |
| 2009/0231960 A1 | 9/2009 | Hutcheson |
| 2009/0249247 A1 | 10/2009 | Tseng et al. |
| 2009/0259958 A1 | 10/2009 | Ban |
| 2009/0264116 A1 | 10/2009 | Thompson |
| 2009/0276463 A1 | 11/2009 | Miller |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0305732 A1 | 12/2009 | Marcellino et al. |
| 2009/0311993 A1 | 12/2009 | Horodezky |
| 2009/0312059 A1 | 12/2009 | Pratt et al. |
| 2009/0313579 A1 | 12/2009 | Poulson |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0054519 A1 | 3/2010 | Mulvey et al. |
| 2010/0060586 A1 | 3/2010 | Pisula et al. |
| 2010/0064255 A1* | 3/2010 | Rottler .................. G06F 3/0482 715/821 |
| 2010/0069035 A1 | 3/2010 | Johnson |
| 2010/0081473 A1 | 4/2010 | Chatterjee et al. |
| 2010/0082481 A1 | 4/2010 | Lin et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0151908 A1 | 6/2010 | Skarby et al. |
| 2010/0151918 A1 | 6/2010 | Annambhotla et al. |
| 2010/0156833 A1 | 6/2010 | Kim et al. |
| 2010/0157742 A1* | 6/2010 | Relyea ................... G04G 11/00 368/28 |
| 2010/0167712 A1 | 7/2010 | Stallings et al. |
| 2010/0190468 A1 | 7/2010 | Scott et al. |
| 2010/0198453 A1 | 8/2010 | Dorogusker et al. |
| 2010/0202368 A1 | 8/2010 | Hans |
| 2010/0205563 A1 | 8/2010 | Haapsaari et al. |
| 2010/0211685 A1 | 8/2010 | McDowall et al. |
| 2010/0217657 A1 | 8/2010 | Gazdzinski |
| 2010/0223145 A1 | 9/2010 | Dragt |
| 2010/0223563 A1* | 9/2010 | Green ................... G06F 3/0484 715/762 |
| 2010/0225495 A1 | 9/2010 | Marui |
| 2010/0225962 A1 | 9/2010 | Okigami et al. |
| 2010/0226213 A1* | 9/2010 | Drugge ................ G04G 9/0082 368/14 |
| 2010/0235726 A1 | 9/2010 | Ording et al. |
| 2010/0243516 A1 | 9/2010 | Martin et al. |
| 2010/0281374 A1 | 11/2010 | Schulz et al. |
| 2010/0299601 A1 | 11/2010 | Kaplan et al. |
| 2011/0003665 A1 | 1/2011 | Burton et al. |
| 2011/0004835 A1* | 1/2011 | Yanchar ............. G06F 3/04817 715/763 |
| 2011/0010195 A1 | 1/2011 | Cohn |
| 2011/0025719 A1 | 2/2011 | Yanase |
| 2011/0029870 A1 | 2/2011 | May et al. |
| 2011/0059769 A1 | 3/2011 | Brunolli |
| 2011/0061010 A1* | 3/2011 | Wasko .................. G06F 3/0482 715/769 |
| 2011/0070924 A1 | 3/2011 | Kim |
| 2011/0074699 A1 | 3/2011 | Marr et al. |
| 2011/0076992 A1 | 3/2011 | Chou et al. |
| 2011/0078025 A1 | 3/2011 | Shrivastav |
| 2011/0078624 A1 | 3/2011 | Missig et al. |
| 2011/0083111 A1* | 4/2011 | Forutanpour ........... G06F 3/017 715/863 |
| 2011/0088086 A1 | 4/2011 | Swink et al. |
| 2011/0098928 A1 | 4/2011 | Hoffman et al. |
| 2011/0106954 A1 | 5/2011 | Chatterjee et al. |
| 2011/0109540 A1 | 5/2011 | Milne et al. |
| 2011/0137678 A1 | 6/2011 | Williams |
| 2011/0138329 A1 | 6/2011 | Wells et al. |

(56) References Cited

U.S. PATENT DOCUMENTS

| | | |
|---|---|---|
| 2011/0151415 A1 | 6/2011 | Darling |
| 2011/0157046 A1 | 6/2011 | Lee et al. |
| 2011/0159959 A1 | 6/2011 | Mallinson et al. |
| 2011/0166777 A1 | 7/2011 | Chavakula |
| 2011/0167369 A1 | 7/2011 | Van Os |
| 2011/0173221 A1 | 7/2011 | Ahiakpor et al. |
| 2011/0179372 A1 | 7/2011 | Moore et al. |
| 2011/0182151 A1 | 7/2011 | Geyer et al. |
| 2011/0191661 A1 | 8/2011 | Phillips et al. |
| 2011/0193878 A1* | 8/2011 | Seo .............. G06F 1/14 345/619 |
| 2011/0197165 A1* | 8/2011 | Filippov .......... G06F 3/0482 715/841 |
| 2011/0202883 A1* | 8/2011 | Oh .............. G06F 3/0481 715/846 |
| 2011/0205851 A1* | 8/2011 | Harris ............ G04G 9/0064 368/14 |
| 2011/0218765 A1* | 9/2011 | Rogers ............ G04F 10/00 702/176 |
| 2011/0230986 A1 | 9/2011 | Lafortune et al. |
| 2011/0234152 A1* | 9/2011 | Frossen .......... H04M 1/72569 320/107 |
| 2011/0251892 A1 | 10/2011 | Laracey |
| 2011/0261079 A1 | 10/2011 | Ingrassia et al. |
| 2011/0271223 A1 | 11/2011 | Moreno et al. |
| 2011/0281342 A1 | 11/2011 | Porsch et al. |
| 2011/0296324 A1* | 12/2011 | Goossens .......... G06F 3/04883 715/763 |
| 2011/0304685 A1 | 12/2011 | Khedouri et al. |
| 2011/0306421 A1 | 12/2011 | Nishimoto et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0015779 A1 | 1/2012 | Powch et al. |
| 2012/0028707 A1 | 2/2012 | Raitt et al. |
| 2012/0036029 A1 | 2/2012 | Esplin et al. |
| 2012/0044062 A1 | 2/2012 | Jersa et al. |
| 2012/0059787 A1* | 3/2012 | Brown ............ H04M 1/72544 706/52 |
| 2012/0060092 A1 | 3/2012 | Hill et al. |
| 2012/0062470 A1 | 3/2012 | Chang |
| 2012/0066628 A1 | 3/2012 | Ens et al. |
| 2012/0079122 A1 | 3/2012 | Brown et al. |
| 2012/0079375 A1 | 3/2012 | Ogino et al. |
| 2012/0083258 A1 | 4/2012 | Rabii |
| 2012/0084210 A1 | 4/2012 | Farahmand |
| 2012/0084729 A1 | 4/2012 | Lin |
| 2012/0092383 A1 | 4/2012 | Hysek et al. |
| 2012/0101887 A1 | 4/2012 | Harvey et al. |
| 2012/0110438 A1 | 5/2012 | Peraza et al. |
| 2012/0116550 A1 | 5/2012 | Hoffman et al. |
| 2012/0117507 A1* | 5/2012 | Tseng ............. G06F 3/0481 715/774 |
| 2012/0124499 A1 | 5/2012 | Tsai |
| 2012/0131441 A1 | 5/2012 | Jitkoff et al. |
| 2012/0136780 A1 | 5/2012 | El-Awady et al. |
| 2012/0154156 A1 | 6/2012 | Kuntzel |
| 2012/0182226 A1 | 7/2012 | Tuli |
| 2012/0191603 A1 | 7/2012 | Nuzzi |
| 2012/0197523 A1* | 8/2012 | Kirsch ............ H04M 1/6083 701/426 |
| 2012/0209829 A1 | 8/2012 | Thomas et al. |
| 2012/0231849 A1 | 9/2012 | Yamashita |
| 2012/0243735 A1 | 9/2012 | Wu |
| 2012/0254804 A1 | 10/2012 | Sheha et al. |
| 2012/0254810 A1 | 10/2012 | Heck et al. |
| 2012/0258684 A1 | 10/2012 | Franz et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0310674 A1 | 12/2012 | Faulkner et al. |
| 2012/0310760 A1 | 12/2012 | Phillips et al. |
| 2012/0319984 A1 | 12/2012 | Borovsky et al. |
| 2012/0324390 A1 | 12/2012 | Tao et al. |
| 2013/0007665 A1 | 1/2013 | Chaudhri et al. |
| 2013/0021236 A1 | 1/2013 | Bender |
| 2013/0027341 A1 | 1/2013 | Mastandrea |
| 2013/0030892 A1 | 1/2013 | Liu et al. |
| 2013/0031490 A1 | 1/2013 | Joo et al. |
| 2013/0044072 A1* | 2/2013 | Kobayashi ........ G06F 3/04883 345/173 |
| 2013/0047034 A1 | 2/2013 | Salomon et al. |
| 2013/0050263 A1* | 2/2013 | Khoe .............. G06F 3/04883 345/634 |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1* | 3/2013 | Anderssonreimer ....... G06F 3/04883 345/173 |
| 2013/0069893 A1* | 3/2013 | Brinda ............ G06F 3/04886 345/173 |
| 2013/0076757 A1 | 3/2013 | Pritting |
| 2013/0082965 A1 | 4/2013 | Wada et al. |
| 2013/0103814 A1 | 4/2013 | Carrasco et al. |
| 2013/0107674 A1 | 5/2013 | Gossweiler, III et al. |
| 2013/0111579 A1* | 5/2013 | Newman .......... G06F 1/1643 726/17 |
| 2013/0116967 A1 | 5/2013 | Akcasu et al. |
| 2013/0117696 A1 | 5/2013 | Robertson et al. |
| 2013/0132888 A1 | 5/2013 | Tijssen |
| 2013/0137073 A1 | 5/2013 | Nacey et al. |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0185813 A1 | 7/2013 | Shim et al. |
| 2013/0190083 A1 | 7/2013 | Toy et al. |
| 2013/0191785 A1 | 7/2013 | Wu et al. |
| 2013/0205194 A1 | 8/2013 | Decker et al. |
| 2013/0205210 A1 | 8/2013 | Jeon et al. |
| 2013/0215044 A1 | 8/2013 | Ahn et al. |
| 2013/0222270 A1 | 8/2013 | Winkler et al. |
| 2013/0222271 A1 | 8/2013 | Alberth et al. |
| 2013/0225118 A1 | 8/2013 | Jang et al. |
| 2013/0232443 A1 | 9/2013 | Ryu et al. |
| 2013/0239060 A1 | 9/2013 | Kang et al. |
| 2013/0246202 A1 | 9/2013 | Tobin |
| 2013/0254685 A1 | 9/2013 | Batraski et al. |
| 2013/0254705 A1* | 9/2013 | Mooring .......... G06F 3/0482 715/784 |
| 2013/0260896 A1 | 10/2013 | Miura et al. |
| 2013/0262155 A1 | 10/2013 | Hinkamp |
| 2013/0290013 A1 | 10/2013 | Forrester |
| 2013/0295872 A1 | 11/2013 | Guday et al. |
| 2013/0304276 A1 | 11/2013 | Flies |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0320080 A1 | 12/2013 | Olson et al. |
| 2013/0326418 A1 | 12/2013 | Utsuki et al. |
| 2013/0345980 A1 | 12/2013 | Van Os et al. |
| 2014/0013414 A1 | 1/2014 | Bruck |
| 2014/0022183 A1 | 1/2014 | Ayoub et al. |
| 2014/0025737 A1 | 1/2014 | Kruglick |
| 2014/0037109 A1 | 2/2014 | Ban |
| 2014/0047525 A1 | 2/2014 | Bonhoff |
| 2014/0055495 A1 | 2/2014 | Kim et al. |
| 2014/0058860 A1 | 2/2014 | Roh et al. |
| 2014/0058935 A1 | 2/2014 | Mijares |
| 2014/0059493 A1* | 2/2014 | Kim .............. G06F 3/04817 715/835 |
| 2014/0068520 A1 | 3/2014 | Missig et al. |
| 2014/0073298 A1 | 3/2014 | Rossmann |
| 2014/0074407 A1 | 3/2014 | Hernandez-Silveira et al. |
| 2014/0074570 A1 | 3/2014 | Hope et al. |
| 2014/0074717 A1 | 3/2014 | Evans |
| 2014/0081854 A1 | 3/2014 | Sanchez et al. |
| 2014/0082533 A1 | 3/2014 | Kelley |
| 2014/0094124 A1 | 4/2014 | Dave et al. |
| 2014/0094224 A1 | 4/2014 | Lozovoy |
| 2014/0101169 A1 | 4/2014 | Kurata et al. |
| 2014/0126336 A1 | 5/2014 | Goeller et al. |

(56) References Cited

U.S. PATENT DOCUMENTS

| | | | |
|---|---|---|---|
| 2014/0129959 A1 | 5/2014 | Battles et al. | |
| 2014/0134947 A1 | 5/2014 | Stouder-Studenmund | |
| 2014/0139454 A1 | 5/2014 | Mistry et al. | |
| 2014/0139637 A1 | 5/2014 | Mistry et al. | |
| 2014/0143145 A1 | 5/2014 | Kortina et al. | |
| 2014/0143678 A1* | 5/2014 | Mistry | G06F 1/1694 715/746 |
| 2014/0143737 A1 | 5/2014 | Mistry et al. | |
| 2014/0149198 A1 | 5/2014 | Kim et al. | |
| 2014/0157189 A1 | 6/2014 | Morita | |
| 2014/0157321 A1 | 6/2014 | Kurita | |
| 2014/0164241 A1 | 6/2014 | Neuwirth | |
| 2014/0173439 A1 | 6/2014 | Gutierrez et al. | |
| 2014/0176475 A1 | 6/2014 | Myers et al. | |
| 2014/0181205 A1 | 6/2014 | Sherrets et al. | |
| 2014/0187323 A1 | 7/2014 | Perry | |
| 2014/0189578 A1 | 7/2014 | Shuttleworth et al. | |
| 2014/0189584 A1* | 7/2014 | Weng | G06F 3/04883 715/808 |
| 2014/0200691 A1 | 7/2014 | Lee et al. | |
| 2014/0201655 A1 | 7/2014 | Mahaffey et al. | |
| 2014/0229752 A1 | 8/2014 | Lee | |
| 2014/0244165 A1 | 8/2014 | Bells | |
| 2014/0244495 A1 | 8/2014 | Davis et al. | |
| 2014/0245161 A1 | 8/2014 | Yuen et al. | |
| 2014/0245177 A1* | 8/2014 | Maklouf | G06F 3/0237 715/752 |
| 2014/0250374 A1 | 9/2014 | Ohki et al. | |
| 2014/0250391 A1* | 9/2014 | Jong | G06F 3/0485 715/763 |
| 2014/0253487 A1 | 9/2014 | Bezinge et al. | |
| 2014/0258935 A1 | 9/2014 | Nishida et al. | |
| 2014/0267303 A1 | 9/2014 | Larkin et al. | |
| 2014/0276244 A1 | 9/2014 | Kamyar | |
| 2014/0282103 A1 | 9/2014 | Crandall et al. | |
| 2014/0282153 A1 | 9/2014 | Christiansen et al. | |
| 2014/0282254 A1 | 9/2014 | Feiereisen et al. | |
| 2014/0287821 A1 | 9/2014 | Barclay et al. | |
| 2014/0289660 A1* | 9/2014 | Min | G06F 3/04842 715/765 |
| 2014/0293755 A1* | 10/2014 | Geiser | G04B 19/24 368/12 |
| 2014/0304664 A1 | 10/2014 | Lee et al. | |
| 2014/0304738 A1 | 10/2014 | Nakaoka et al. | |
| 2014/0310618 A1* | 10/2014 | Venkatesh | H04L 67/42 715/760 |
| 2014/0317543 A1* | 10/2014 | Kim | G06F 3/0484 715/765 |
| 2014/0325384 A1 | 10/2014 | Kobayashi | |
| 2014/0325408 A1 | 10/2014 | Leppanen et al. | |
| 2014/0328151 A1 | 11/2014 | Serber | |
| 2014/0337207 A1 | 11/2014 | Ye et al. | |
| 2014/0337450 A1 | 11/2014 | Choudhary et al. | |
| 2014/0344723 A1 | 11/2014 | Malik et al. | |
| 2014/0347275 A1 | 11/2014 | Jung et al. | |
| 2014/0359477 A1 | 12/2014 | Chen | |
| 2014/0362105 A1 | 12/2014 | Kocienda et al. | |
| 2014/0380229 A1 | 12/2014 | Volodin et al. | |
| 2015/0006376 A1 | 1/2015 | Paulson et al. | |
| 2015/0012425 A1 | 1/2015 | Mathew | |
| 2015/0022438 A1 | 1/2015 | Hong | |
| 2015/0039494 A1 | 2/2015 | Sinton et al. | |
| 2015/0055197 A1 | 2/2015 | Romanoff et al. | |
| 2015/0058651 A1 | 2/2015 | Choi et al. | |
| 2015/0062130 A1 | 3/2015 | Ho | |
| 2015/0066758 A1 | 3/2015 | DeNardis et al. | |
| 2015/0067513 A1 | 3/2015 | Zambetti et al. | |
| 2015/0083970 A1 | 3/2015 | Koh et al. | |
| 2015/0098309 A1 | 4/2015 | Adams et al. | |
| 2015/0100621 A1 | 4/2015 | Pan | |
| 2015/0100982 A1 | 4/2015 | Sirpal et al. | |
| 2015/0105125 A1 | 4/2015 | Min et al. | |
| 2015/0106752 A1 | 4/2015 | Yang | |
| 2015/0111558 A1 | 4/2015 | Yang | |
| 2015/0113468 A1 | 4/2015 | Clark | |
| 2015/0117162 A1 | 4/2015 | Tsai | |
| 2015/0121405 A1 | 4/2015 | Ates et al. | |
| 2015/0130830 A1 | 5/2015 | Nagasaki et al. | |
| 2015/0143234 A1 | 5/2015 | Norris, III | |
| 2015/0160806 A1 | 6/2015 | Fey et al. | |
| 2015/0160812 A1 | 6/2015 | Yuan et al. | |
| 2015/0160856 A1* | 6/2015 | Jang | G06F 3/04842 715/773 |
| 2015/0172438 A1 | 6/2015 | Yang | |
| 2015/0180980 A1 | 6/2015 | Welinder et al. | |
| 2015/0185703 A1 | 7/2015 | Tanaka | |
| 2015/0185995 A1* | 7/2015 | Shoemaker | G06F 3/0484 715/708 |
| 2015/0194137 A1 | 7/2015 | Wyatt | |
| 2015/0205509 A1* | 7/2015 | Scriven | G06Q 10/1093 715/834 |
| 2015/0207922 A1 | 7/2015 | Kobayashi et al. | |
| 2015/0217163 A1* | 8/2015 | Amis | G16H 20/30 700/91 |
| 2015/0248235 A1 | 9/2015 | Offenberg et al. | |
| 2015/0256491 A1 | 9/2015 | Eatough et al. | |
| 2015/0269848 A1 | 9/2015 | Yuen et al. | |
| 2015/0277545 A1 | 10/2015 | Flowers et al. | |
| 2015/0286372 A1 | 10/2015 | Swindell et al. | |
| 2015/0286391 A1* | 10/2015 | Jacobs | G06F 3/04883 715/771 |
| 2015/0295901 A1 | 10/2015 | Woodward et al. | |
| 2015/0301506 A1* | 10/2015 | Koumaiha | G04G 9/0064 368/10 |
| 2015/0301608 A1 | 10/2015 | Nagaraju et al. | |
| 2015/0334546 A1 | 11/2015 | Diamond | |
| 2015/0346694 A1 | 12/2015 | Hoobler et al. | |
| 2015/0347711 A1 | 12/2015 | Soli et al. | |
| 2015/0348009 A1 | 12/2015 | Rosen et al. | |
| 2015/0350861 A1 | 12/2015 | Soli et al. | |
| 2015/0355830 A1 | 12/2015 | Chaudhri et al. | |
| 2015/0365892 A1 | 12/2015 | Ma et al. | |
| 2015/0379476 A1 | 12/2015 | Chaudhri et al. | |
| 2016/0004393 A1* | 1/2016 | Faaborg | G06F 3/0482 715/765 |
| 2016/0014266 A1 | 1/2016 | Bhatt | |
| 2016/0022202 A1* | 1/2016 | Peterson | G04G 13/026 368/251 |
| 2016/0027420 A1* | 1/2016 | Eronen | G10H 1/383 84/611 |
| 2016/0028869 A1 | 1/2016 | Bhatt | |
| 2016/0034133 A1 | 2/2016 | Wilson et al. | |
| 2016/0034148 A1 | 2/2016 | Wilson et al. | |
| 2016/0034152 A1 | 2/2016 | Wilson et al. | |
| 2016/0034166 A1 | 2/2016 | Wilson et al. | |
| 2016/0034167 A1 | 2/2016 | Wilson et al. | |
| 2016/0044091 A1 | 2/2016 | Doumet | |
| 2016/0044269 A1 | 2/2016 | Kang | |
| 2016/0048283 A1 | 2/2016 | Yang et al. | |
| 2016/0054892 A1 | 2/2016 | Kim et al. | |
| 2016/0058336 A1 | 3/2016 | Blahnik et al. | |
| 2016/0062450 A1 | 3/2016 | Han et al. | |
| 2016/0062540 A1 | 3/2016 | Yang et al. | |
| 2016/0062570 A1 | 3/2016 | Dascola et al. | |
| 2016/0065505 A1 | 3/2016 | Iskander | |
| 2016/0066005 A1 | 3/2016 | Davis et al. | |
| 2016/0085397 A1 | 3/2016 | Jain | |
| 2016/0091867 A1 | 3/2016 | Mansour et al. | |
| 2016/0098137 A1* | 4/2016 | Kim | H04M 1/72583 345/173 |
| 2016/0150063 A1 | 5/2016 | Choi et al. | |
| 2016/0188179 A1 | 6/2016 | Roh | |
| 2016/0188181 A1* | 6/2016 | Smith | G06F 3/04817 715/765 |
| 2016/0202889 A1 | 7/2016 | Shin et al. | |
| 2016/0226713 A1 | 8/2016 | Pitschel et al. | |
| 2016/0239724 A1 | 8/2016 | Arfvidsson et al. | |
| 2016/0062589 A1 | 9/2016 | Wan et al. | |
| 2016/0253864 A1 | 9/2016 | Weber et al. | |
| 2016/0261675 A1 | 9/2016 | Block et al. | |
| 2016/0266548 A1 | 9/2016 | Akiyama | |
| 2016/0283094 A1 | 9/2016 | Choi | |

(56) References Cited

U.S. PATENT DOCUMENTS

| | | | |
|---|---|---|---|
| 2016/0327911 A1* | 11/2016 | Eim | G06F 3/0362 |
| 2016/0327915 A1 | 11/2016 | Katzer et al. | |
| 2016/0342327 A1 | 11/2016 | Chi et al. | |
| 2016/0357354 A1 | 12/2016 | Chen et al. | |
| 2016/0357363 A1 | 12/2016 | Decker et al. | |
| 2016/0358133 A1 | 12/2016 | Van Os et al. | |
| 2016/0358134 A1 | 12/2016 | Van Os et al. | |
| 2016/0358180 A1 | 12/2016 | Van Os et al. | |
| 2016/0358311 A1 | 12/2016 | Chen et al. | |
| 2017/0004507 A1 | 1/2017 | Henderson et al. | |
| 2017/0046024 A1 | 2/2017 | Dascola et al. | |
| 2017/0053542 A1 | 2/2017 | Wilson et al. | |
| 2017/0061934 A1 | 3/2017 | Shin | |
| 2017/0063753 A1 | 3/2017 | Probasco et al. | |
| 2017/0068407 A1 | 3/2017 | Wilson et al. | |
| 2017/0093780 A1 | 3/2017 | Lieb et al. | |
| 2017/0109011 A1 | 4/2017 | Jiang | |
| 2017/0123571 A1 | 5/2017 | Huang et al. | |
| 2017/0123640 A1 | 5/2017 | Wilson et al. | |
| 2017/0134321 A1* | 5/2017 | Ushio | H04L 51/04 |
| 2017/0160898 A1 | 6/2017 | Lee et al. | |
| 2017/0269715 A1 | 9/2017 | Kim et al. | |
| 2017/0269792 A1* | 9/2017 | Xu | G06F 3/048 |
| 2017/0277136 A1 | 9/2017 | Minami et al. | |
| 2017/0287312 A1 | 10/2017 | Schofield et al. | |
| 2017/0322658 A1 | 11/2017 | Lee et al. | |
| 2017/0325196 A1 | 11/2017 | Cho et al. | |
| 2017/0344257 A1 | 11/2017 | Gnedin et al. | |
| 2017/0354845 A1 | 12/2017 | Williams et al. | |
| 2017/0357329 A1 | 12/2017 | Park et al. | |
| 2017/0357358 A1 | 12/2017 | Teutschler et al. | |
| 2017/0357426 A1 | 12/2017 | Wilson et al. | |
| 2017/0357427 A1 | 12/2017 | Wilson et al. | |
| 2017/0359623 A1 | 12/2017 | Folse et al. | |
| 2018/0011450 A1 | 1/2018 | Stackowski | |
| 2018/0024619 A1 | 1/2018 | Kasuo et al. | |
| 2018/0033311 A1 | 2/2018 | Berggren | |
| 2018/0034765 A1 | 2/2018 | Keszler et al. | |
| 2018/0039406 A1 | 2/2018 | Kong et al. | |
| 2018/0052428 A1 | 2/2018 | Abramov | |
| 2018/0067633 A1 | 3/2018 | Wilson et al. | |
| 2018/0088797 A1 | 3/2018 | Mcatee et al. | |
| 2018/0136810 A1 | 5/2018 | Martin et al. | |
| 2018/0143761 A1 | 5/2018 | Choi et al. | |
| 2018/0150212 A1 | 5/2018 | Chen et al. | |
| 2018/0275739 A1 | 9/2018 | Minami et al. | |
| 2018/0329587 A1 | 11/2018 | Ko et al. | |
| 2018/0343023 A1 | 11/2018 | Park et al. | |
| 2018/0374429 A1 | 12/2018 | Nakamura | |
| 2019/0069244 A1 | 2/2019 | Jeon et al. | |
| 2019/0212707 A1 | 7/2019 | Minami et al. | |
| 2019/0213037 A1 | 7/2019 | Kim et al. | |
| 2019/0220243 A1 | 7/2019 | Decker et al. | |
| 2019/0232110 A1 | 8/2019 | Williams et al. | |
| 2019/0232111 A1 | 8/2019 | Williams et al. | |
| 2019/0250813 A1 | 8/2019 | Block et al. | |
| 2019/0279520 A1 | 9/2019 | Wilson et al. | |
| 2019/0281154 A1 | 9/2019 | Choi et al. | |
| 2019/0334782 A1 | 10/2019 | Dellinger et al. | |
| 2019/0339822 A1 | 11/2019 | Devine et al. | |
| 2019/0339860 A1 | 11/2019 | Chen et al. | |
| 2019/0349463 A1 | 11/2019 | Soli et al. | |
| 2020/0050332 A1 | 2/2020 | Yang et al. | |

FOREIGN PATENT DOCUMENTS

| | | |
|---|---|---|
| AU | 2016100796 A4 | 6/2016 |
| CA | 2781636 A1 | 7/2010 |
| CA | 2986980 A1 | 5/2019 |
| CH | 707412 A2 | 6/2014 |
| CN | 1337638 A | 2/2002 |
| CN | 1397904 A | 2/2003 |
| CN | 1443427 A | 9/2003 |
| CN | 1536511 A | 10/2004 |
| CN | 1782685 A | 6/2006 |
| CN | 1997050 A | 7/2007 |
| CN | 1997957 A | 7/2007 |
| CN | 101061484 A | 10/2007 |
| CN | 101382438 A | 3/2009 |
| CN | 101505320 A | 8/2009 |
| CN | 101627349 A | 1/2010 |
| CN | 101702112 A | 5/2010 |
| CN | 101819486 A | 9/2010 |
| CN | 101822020 A | 9/2010 |
| CN | 101827363 A | 9/2010 |
| CN | 101828411 A | 9/2010 |
| CN | 101981987 A | 2/2011 |
| CN | 102646081 A | 8/2012 |
| CN | 102687176 A | 9/2012 |
| CN | 102763066 A | 10/2012 |
| CN | 102989159 A | 3/2013 |
| CN | 103154954 A | 6/2013 |
| CN | 103297610 A | 9/2013 |
| CN | 103399480 A | 11/2013 |
| CN | 103562832 A | 2/2014 |
| CN | 103581456 A | 2/2014 |
| CN | 103607660 A | 2/2014 |
| CN | 103902165 A | 7/2014 |
| CN | 104288983 A | 1/2015 |
| CN | 104501043 A | 4/2015 |
| CN | 105260049 A | 1/2016 |
| CN | 105389107 A | 3/2016 |
| CN | 205608658 U | 9/2016 |
| CN | 106056848 A | 10/2016 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1705883 A1 | 9/2006 |
| EP | 1750242 A2 | 2/2007 |
| EP | 1832969 A2 | 9/2007 |
| EP | 1855170 A2 | 11/2007 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2413577 A2 | 2/2012 |
| EP | 2423810 A1 | 2/2012 |
| EP | 2426902 A1 | 3/2012 |
| EP | 2632139 A2 | 8/2013 |
| EP | 2738640 A2 | 6/2014 |
| EP | 2942932 A1 | 11/2015 |
| EP | 3056949 A1 | 8/2016 |
| EP | 3376342 A1 | 9/2018 |
| GB | 2475669 A | 6/2011 |
| GB | 2550639 A | 11/2017 |
| JP | 08-110955 A | 4/1996 |
| JP | 9-251084 A | 9/1997 |
| JP | 11-232013 A | 8/1999 |
| JP | 2002-507718 A | 3/2002 |
| JP | 2002-271451 A | 9/2002 |
| JP | 2003-296246 A | 10/2003 |
| JP | 2004-258738 A | 9/2004 |
| JP | 2005-339017 A | 12/2005 |
| JP | 2008-272301 A | 11/2008 |
| JP | 2009-147889 A | 7/2009 |
| JP | 2010-12335 A | 1/2010 |
| JP | 2010-124181 A | 6/2010 |
| JP | 2010-257051 A | 11/2010 |
| JP | 3168099 U | 5/2011 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2012-533117 A | 12/2012 |
| JP | 2014-44724 A | 3/2014 |
| JP | 2014-123197 A | 7/2014 |
| JP | 2014-519126 A | 8/2014 |
| JP | 2014-216868 A | 11/2014 |
| JP | 2015-210587 A | 11/2015 |
| JP | 2015-531916 A | 11/2015 |

(56) References Cited

FOREIGN PATENT DOCUMENTS

| | | |
|---|---|---|
| KR | 10-2004-0067514 A | 7/2004 |
| KR | 10-2014-0064687 A | 5/2014 |
| KR | 10-2014-0105309 A | 9/2014 |
| KR | 10-2015-0038711 A | 4/2015 |
| KR | 10-2015-0081140 A | 7/2015 |
| KR | 10-2017-0076452 A | 7/2017 |
| KR | 10-2017-0082698 A | 7/2017 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201210368 A | 3/2012 |
| TW | 201232486 A | 8/2012 |
| TW | 201240499 A | 10/2012 |
| TW | 201419115 A | 5/2014 |
| WO | 2001/71433 A1 | 9/2001 |
| WO | 2002/054157 A1 | 7/2002 |
| WO | 2006/012343 A2 | 2/2006 |
| WO | 2006/112641 A1 | 10/2006 |
| WO | 2007/000012 A1 | 1/2007 |
| WO | 2007/018881 A2 | 2/2007 |
| WO | 2007/142703 A1 | 12/2007 |
| WO | 2007/149731 A1 | 12/2007 |
| WO | 2009/146857 A2 | 12/2009 |
| WO | 2010/017627 A1 | 2/2010 |
| WO | 2011/000893 A1 | 1/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169849 A2 | 11/2013 |
| WO | 2013/169875 A2 | 11/2013 |
| WO | 2013/169882 A2 | 11/2013 |
| WO | 2014/002711 A1 | 1/2014 |
| WO | 2014/022711 A1 | 2/2014 |
| WO | 2014/074407 A1 | 5/2014 |
| WO | 2014/078114 A1 | 5/2014 |
| WO | 2014/105278 A1 | 7/2014 |
| WO | 2014/189197 A1 | 11/2014 |
| WO | 2015/163536 A1 | 10/2015 |
| WO | 2016/022203 A1 | 2/2016 |
| WO | 2016/022205 A1 | 2/2016 |
| WO | 2016/022496 A2 | 2/2016 |
| WO | 2016/036427 A1 | 3/2016 |
| WO | 2016/099097 A1 | 6/2016 |
| WO | 2016/126733 A1 | 8/2016 |
| WO | 2016/144563 A1 | 9/2016 |

OTHER PUBLICATIONS

Codrington, Simon, "Intuitive Scrolling Interfaces with CSS Scroll Snap Points", Online Available at <https://www.sitepoint.com/intuitive-scrolling-interfaces-with-css-scroll-snap-points/>, Dec. 8, 2015, 14 pages.

Examiner's Answer to Appeal Brief received for U.S. Appl. No. 14/870,793, dated Apr. 16, 2018, 15 pages.

Final Office Action received for U.S. Appl. No. 14/821,667, dated Apr. 26, 2018, 13 pages.

Final Office Action received for U.S. Appl. No. 14/869,877, dated Apr. 26, 2018, 18 pages.

Notice of Acceptance received for Australian Patent Application No. 2015267240, dated Apr. 10, 2018, 3 pages.

Notice of Allowance received for Korean Patent Application No. 10-2017-7005939, dated Mar. 30, 2018, 5 pages (2 pages of English Translation and 3 pages of Official Copy).

Office Action received for Australian Patent Application No. 2018100158, dated Apr. 23, 2018, 5 pages.

Office Action received for Chinese Patent Application No. 201510479088.4, dated Mar. 12, 2018, 20 pages (6 pages of English Translation and 14 pages of Official Copy).

Office Action received for European Patent Application No. 15730925.3, dated Apr. 12, 2018, 8 pages.

Office Action received for German Patent Application No. 112015003083.2, dated Mar. 9, 2018, 12 pages (5 pages of English Translation and 7 pages of Official Copy).

Office Action received for Taiwanese Patent Application No. 104126627, dated Oct. 16, 2017, 7 pages (3 pages of English Translation and 4 pages of Official Copy).

International Preliminary Report on Patentability received for PCT Patent Application No. PCT/US2017/036608, dated Dec. 27, 2018, 12 pages.

Notice of Allowance received for Chinese Patent Application No. 201510483305.7, dated Jan. 8, 2019, 3 pages (1 page of English Translation and 2 pages of Official Copy).

Notice of Allowance received for U.S. Appl. No. 15/183,663, dated Jan. 17, 2019, 6 pages.

Notice of Allowance received for U.S. Appl. No. 15/616,480, dated Jan. 3, 2019, 8 pages.

Office Action received for Chinese Patent Application No. 201510484514.3, dated Dec. 24, 2018, 10 pages (5 pages of English Translation and 5 pages of Official Copy).

Office Action received for Chinese Patent Application No. 201810037665.8, dated Dec. 7, 2018, 10 pages (5 pages of English Translation and 5 pages of Official Copy).

Office Action received for Taiwanese Patent Application No. 104132636, dated Dec. 13, 2018, 26 pages (9 pages of English Translation and 17 pages of Official Copy).

Decision to Grant received for European Patent Application No. 16706081.3, dated Nov. 29, 2018, 2 pages.

International Preliminary Report on Patentability received for PCT Patent Application No. PCT/US2017/034834, dated Dec. 20, 2018, 9 pages.

International Preliminary Report on Patentability received for PCT Patent Application No. PCT/US2017/035554, dated Dec. 20, 2018, 39 pages.

Non-Final Office Action received for U.S. Appl. No. 14/815,890, dated Dec. 18, 2018, 21 pages.

Non-Final Office Action received for U.S. Appl. No. 15/614,121, dated Nov. 30, 2018, 28 pages.

Non-Final Office Action received for U.S. Appl. No. 14/846,511, dated Nov. 30, 2018, 22 Pages.

Notice of Allowance received for U.S. Appl. No. 14/599,424, dated Dec. 13, 2018, 6 pages.

Notice of Allowance received for U.S. Appl. No. 14/599,425, dated Dec. 19, 2018, 9 pages.

Notice of Allowance received for U.S. Appl. No. 14/864,759, dated Dec. 14, 2018, 10 pages.

Office Action received for Australian Patent Application No. 2016270323, dated Nov. 26, 2018, 4 pages.

Office Action received for Chinese Patent Application No. 201510483268.X, dated Oct. 19, 2018, 10 pages (5 pages of English Translation and 5 pages of Official Copy).

Certification of Examination received for Australian Patent Application No. 2018100158, dated Oct. 23, 2018, 2 pages.

International Search Report and Written Opinion received for PCT Patent Application No. PCT/US2018/032164, dated Oct. 18, 2018, 16 Pages.

Office Action received for Chinese Patent Application No. 201510481525.6, dated Aug. 29, 2018, 10 pages (5 pages of English Translation and 5 pages of Official copy).

Office action received for Chinese Patent Application No. 201510483305.7, dated Aug. 31, 2018, 10 pages (5 pages of English Translation and 5 pages of Official copy).

Office Action received for Japanese Patent Application No. 2017-545918, dated Sep. 14, 2018, 12 pages (7 pages of English Translation and 5 pages Official copy).

Office Action received for Korean Patent Application No. 10-2017-7024570, dated Sep. 28, 2018, 14 pages (6 pages of English Translation and 8 pages of Official copy).

(56) References Cited

OTHER PUBLICATIONS

"Adyclock—Night Alarm Clock", App for android, Google play store page: <https://web.archive.org/web/20130924223153/https://play.google.com/store/apps/details?id=com.adyclock&hl=en>, Sep. 24, 2013, 2 pages.
"Deluxe Moon—guide", available online at:-<https://web.archive.org/web/20130520161057/http://www.lifewaresolutions.com/deluxe_moon_guide_ip.html>, May 20, 2013, 5 pages.
"Digital Alarm Clock App for Android", Goggle play store digital alarm clock description page, Mar. 25, 2015, 3 pages.
"Fitbit Surge Fitness Watch", Manual version 1.0, May 7, 2015, 48 pages.
"Google Earth 7.0.1.8244", retrieved from the Internet: <http://dl.google.com/dl/earth/client/ge7/release_7_0_1/googleearth-win-bundle-7.0.1.8244.exe>, Oct. 29, 2012, 1 page.
"Google Earth on Android—Androidcentral.com", Available online at:- <https://www.youtube.com/watch?v=1WxN1RunrE4>, Feb 22, 2010, 1 page.
"Ios Security", White Paper, Available online at <https://web.archive.org/web/20150526223200/http://www.apple.com/business/docs/iOS_Security_Guide.pdf>, Apr. 2015, 55 pages.
"Iphone USer Guide for Ios 7.1 Software", available online at <https://manuals.info.apple.com/MANUALS/1000/MA1681/en_US/iphone_ios7_user_guide.pdf>, Mar. 10, 2014, pp. 1-162.
"Kidizoom Smartwatch", Available online at URL:<https://www.vtechnl.com/media/downloads/Kidizoom-Smart-Watch.pdf>, Jun. 24, 2014, 23 pages.
"Link to Wayback Machine with Link to Google Play Showing Different Layouts of Complications Associated with a Clock Face", available online at <https://play.google.com/store/apps/details?id=com.levelup.beautifulwidgets.free&hl=da>, Sep. 9, 2013, 6 pages.
"Living Earth", available at : <http;//www.livingearthapp.com/>, 2014, 6 pages.
"Ms Excel 2013", Jan. 29, 2013, 2 pages.
"New, but Unsigned—Easy Stopwatch for Symbian", Available online at <http://www.allaboutsymbian.com/flow/item/19490_New_but_unsigned-Easy_StopWatc.php>, Mar. 15, 2014, 15 pages.
"Night Display (alarm Clock) App", Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
"Online Alarm Clock", <https://web.archive.org/web/20150505081746/http://www.online-stopwatch.com/online-alarm-clock>, May 5, 2015, 2 pages.
"Pentax K20d Operating Manual", <http://www.ricoh-imaging.eu/en/operating-manuals-download.html>, 2008, pp. 173-174.
"Solar Walk Free", Vito Technology, Jun. 19, 2014, 9 pages.
"The Simply Alarm App for Pebble", available online at <https://web.archive.org/web/20150517070400/http://www.rebootsramblings.ca/n/sa hhelp/https://www.youtube.com/watch?v=IVp1scQPw08>, May 17, 2015, 1 page.
"Uikit User Interface Catalog: Page Controls", Available online at <https://web.archive.org/web/20140703123442/https://developer.apple.com/library/ios/documentation/userexperience/conceptual/UIKitUICatalog/UIPageControl.html>, Dec. 16, 2013, 4 pages.
Advisory Action received for U.S. Appl. No. 14/815,898, dated Aug. 30, 2016, 3 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Airshow, "Airshow App for Mobile Devices", 2012, 4 pages.
Apk Root, "Butterfly 3d Live Wallpaper 1.0 Apk", Available at <http://apk-root.blogspot.in/2015/09/download-butterfly-3d-live-wallpaper-10.html/>, Feb. 26, 2013, 7 pages.
Avdonin, Nikita, "Astroviewer 3d", Available at <https://www.youtube.com/watch?v=zY0tslx3JHY/>, Nov. 5, 2013, 2 pages.
Bogdanov, Alexei, "Skmei 1016", Available online at <URL:https://www.youtube.com/watch?v=E4q4Fug05Fw>, Jun. 21, 2014, 2 pages.

Castellini, Rick, "Google Earth", Retrieved from <https://www.youtube.com/watch?v=bgjMSBXsFZQ>, Feb. 12, 2013, 3 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Cyr, Jim, "Apple Watch—Customize Modular Watch Face", available online at: https://www.youtube.com/watch?v=02W93HbKIK8, May 13, 2015, 2 pages.
Evgenyevich, Sergey, "Earth & Moon in HD Gyro 3d", Available at <https://www.youtube.com/watch?v=1RwNcaSYrIs/>, Dec. 1, 2013, 2 pages.
Final Office Action received for U.S. Appl. No. 14/599,425, dated May 19, 2017, 24 pages.
Final Office Action received for U.S. Appl. No. 14/599,425, dated Oct. 8, 2015, 20 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Gottabemobile, "How to Change Watch Faces on Android Wear", available online at URL:https://www.youtube.com/watch?v=B8iRGkGq6a8, Jul. 9, 2014, 4 pages.
Intention to Grant received for Danish Patent Application No. PA201570496, dated Feb. 17, 2016, 6 pages.
Intention to Grant received for Danish Patent Application No. PA201770397, dated Aug. 18, 2017, 7 pages.
International Preliminary Report on Patentability received for PCT Patent Application No. PCT/US2015/032474, dated Dec. 15, 2016, 7 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/016216, dated May 4, 2017, 14 pages.

(56) References Cited

OTHER PUBLICATIONS

International Preliminary Report on Patentability received for PCT Patent Application No. PCT/US2016/021403, dated Sep. 21, 2017, 21 pages.
International Search Report and Written Opinion received for PCT Patent Application No. PCT/US2016/014997, dated Aug. 31, 2016, 21 pages.
International Search Report and Written Opinion received for PCT Patent Application No. PCT/US2015/034604, dated Nov. 9, 2015, 30 pages.
International Search Report and Written Opinion received for PCT Patent Application No. PCT/US16/34175, dated Oct. 7, 2016, 17 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/016216, dated Jun. 27, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/036608, dated Oct. 20, 2017, 15 pages.
International Search Report and Written Opinion received for PCT Patent Application No. PCT/US2015/034607, dated Dec. 1, 2015, 23 pages.
Invitation to Pay Additional Fees and Partial International Search Report received for PCT Patent Application No. PCT/US2015/034604, dated Sep. 4, 2015, 6 pages.
Invitation to Pay Additional Fees and Partial International Search Report received for PCT Patent Application No. PCT/US2015/034606, dated Sep. 9, 2015, 6 pages.
Invitation to Pay Addition Fees and Partial International Search Report received for PCT Patent Application No. PCT/US2016/014997, dated May 2, 2016, 5 pages.
Invitation to Pay Addition Fees and Partial International Search Report received for PCT Patent Application No. PCT/US2016/016216, dated Apr. 20, 2016, 6 pages.
Invitation to Pay Addition Fees received for PCT Patent Application No. PCT/US2017/036608, dated Aug. 14, 2017, 2 pages.
Invitation to Pay Additional Fees received for PCT Patent Application No. PCT/US16/34175, dated Aug. 11, 2016, 3 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, Nov. 3, 2015, 5 pages.
Invitation to Pay Additional Fees received for PCT Patent Application No. PCT/US2015/044485, dated Nov. 3, 2015, Nov. 3, 2015, 7 pages.
Invitation to Pay Additional Fees received for PCT Patent Application No. PCT/US2015/053353, dated Jan. 21, 2016, 7 pages.
Invitation to Pay Additional Fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2017/035554, dated Jul. 20, 2017, 2 pages.
Invitation to Restrict or Pay Additional Fees received for PCT Patent Application No. PCT/US2016/016216, dated Dec. 19, 2016, 9 pages.
ISO 9241-13:1998, "Ergonomic Requirements for Office Work with Visual Display Terminals (vdts)", Part 13: User guidance, International Standard ISO, Zuerich, CH, vol. 9241-13, Jul. 15, 1998, 40 pages.
Nerdtalk, "The Best Android Clock Widgets", available at: https://www.youtube.com/watch?v=E1bAprWByfU, Apr. 25, 2011, 1 page.
Non-Final Office Action received for U.S. Appl. No. 14/503,372, dated Dec. 5, 2014, 11 pages.
Non-Final Office Action received for U.S. Appl. No. 14/599,425, dated Mar. 17, 2015, 16 pages.
Non-Final Office Action received for U.S. Appl. No. 14/599,425, dated Oct. 26, 2016, 22 pages.
Non-Final Office Action received for U.S. Appl. No. 14/815,879, dated Dec. 15, 2016, 33 pages.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/846,511 dated Oct. 27, 2017, 15 pages.
Non-Final Office Action received for U.S. Appl. No. 14/863,069, dated Oct. 5, 2017, 19 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Allowance received for Chinese Patent Application No. 201520358505.5, dated Jan. 13, 2016, 3 pages (2 pages of English Translation and 1 page of Official copy).
Notice of Allowance received for Chinese Patent Application No. 201520594249.x, dated Jul. 12, 2016, 4 pages (2 pages of English Translation and 2 pages of Official copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Taiwanese Patent Application No. 104117509, dated Mar. 31, 2017, 3 pages (Official copy only). {See Communication under 37 CFR § 1.98(a) (3)}.
Notice of Allowance received for Taiwanese Patent Application No. 104124962, dated Jul. 27, 2017, 3 pages. (Official copy only). {See Communication under 37 CFR § 1.98(a) (3)}.

(56) References Cited

OTHER PUBLICATIONS

Notice of Allowance received for Taiwanese Patent Application No. 104124963, dated Sep. 28, 2017, 5 pages (1 page of English Translation of Search report and 4 pages of Official copy).
Notice of Allowance received for Taiwanese Patent Application No. 104124995, dated Jul. 27, 2017, 3 pages. (Official copy only). {See Communication under 37 CFR § 1.98(a) (3)}.
Notice of Allowance received for Taiwanese Patent Application No. 104124997, dated Jun. 16, 2017, 5 pages (1 page of English Translation of Search report and 4 pages of Official copy).
Notice of Allowance received for Taiwanese Patent Application No. 104124998, dated Mar. 31, 2017, 3 pages (Official copy only). {See communication under{See Communication under 37 CFR § 1.98(a) (3)}.
Notice of Allowance received for Taiwanese Patent Application No. 104134740, dated Dec. 8, 2016, 5 pages (1 page of English Translation of Search Report and 4 pages of Official copy).
Notice of Allowance received for U.S. Appl. No. 14/815,879, dated Jun. 26, 2017, 8 pages
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/839,889, dated Oct. 30, 2017, 16 pages.
Nova, "Tour of the Solar System", Retrieved from <http://www.pbs.org/wgbh/nova/space/tour-solar-system.html>, May 24, 2013, 14 pages.
Office Action received for Australian Patent Application No. 2015101019, dated Oct. 14, 2015, 3 pages.
Office Action received for Australian Patent Application No. 2015100734, dated Jul. 29, 2015, 5 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015267240, dated Apr. 10, 2017, 5 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2017100231, dated Apr. 13, 2017, 3 pages.
Office Action received for Australian Patent Application No. 2017100667, dated Aug. 3, 2017, 9 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages (1 page of English Translation and 2 pages of Official copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595384.6, dated Dec. 30, 2016, 2 pages (Official copy only). {See Communication under 37 CFR § 1.98(a) (3)}.
Office Action received for Chinese Patent Application No. 201520595384.6, dated Jul. 22, 2016, 3 pages (1 page of English Translation and 2 pages of Official copy).
Office Action received for Chinese Patent Application No. 201520595385.0, dated Dec. 30, 2016, 2 pages (Official copy only). {See Communication under 37 CFR § 1.98(a) (3)}.
Office Action received for Chinese Patent Application No. 201520595385.0, dated Jul. 22, 2016, 3 pages (1 page of English Translation and 2 pages of Official copy).
Office Action received for Chinese Patent Application No. 201520595385.0, dated Mar. 25, 2016, 3 pages (1 page of English Translation and 2 pages of Official copy).
Office Action received for Chinese Patent Application No. 201520595408.8, dated Dec. 9, 2015, 4 pages. (2 pages of English Translation and 2 pages of Official copy).
Office Action received for Chinese Patent Application No. 201520595408.8, dated Dec. 30, 2016, 2 pages (Official copy only). {See Communication under 37 CFR § 1.98(a) (3)}.
Office Action received for Chinese Patent Application No. 201520595408.8, dated Jul. 25, 2016, 3 pages (1 page of English Translation and 2 pages of Official copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Dec. 30, 2016, 2 pages (Official copy only). {See Communication under 37 CFR § 1.98(a) (3)}.
Office Action received for Chinese Patent Application No. 201520595538.1, dated Jul. 22, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Office Action received for Chinese Patent Application No. 201620509515.9, dated Nov. 9, 2016, 2 pages (1 page of English Translation and 1 page of Official copy).
Office Action received for Chinese Patent Application No. 201520594249.x, dated Dec. 9, 2015, 4 pages (2 pages of English Translation and 2 pages of Official copy).
Office Action received for Chinese Patent Application No. 201520595384.6, dated Dec. 9, 2015, 4 pages. (2 pages of English Translation and 2 pages of Official copy).
Office Action received for Chinese Patent Application No. 201520595385.0, dated Dec. 9, 2015, 4 pages (2 pages of English Translation and 2 pages of Official copy).
Office Action received for Chinese Patent Application No. 201520595538.1, dated Dec. 9, 2015, 4 pages (2 pages of English Translation and 2 pages of Official copy).
Office Action received for Danish Patent Application No. PA201570495, dated Dec. 9, 2016, 2 pages.
Office Action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.

(56) References Cited

OTHER PUBLICATIONS

Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 paegs.
Office Action received for Danish Patent Application No. PA201570499, dated Jun. 16, 2016, 8 pages.
Office Action received for Danish Patent Application No. PA201570499, dated Nov. 1, 2017, 6 pages.
Office Action received for Danish Patent Application No. PA201570499, dated Nov. 3, 2015, 7 pages.
Office Action received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15730890.9, dated Aug. 3, 2017, 4 pages.
Office Action received for Japanese Patent Application No. 2017-505450, dated Jun. 20, 2017, 8 pages (4 pages of English Translation and 4 pages of Official copy).
Office Action received for Korean Patent Application No. 10-2017-7005939, dated Jun. 30, 2017, 6 pages (2 pages of English Translation and 4 pages of Official copy).
Office Action received for Netherland Patent Application No. 2015245, dated Jan. 24, 2017, 11 pages (1 page of English Translation and 10 pages of Official copy).
Office Action received for Netherlands Patent Application No. 2015239, dated Oct. 28, 2016, 13 pages (5 pages of English Translation and 8 pages of Official copy).
Office Action received for Taiwanese Patent Application No. 104117509, dated Aug. 22, 2016, 6 pages (3 pages of English Translation and 3 pages of Official copy).
Office Action received for Taiwanese Patent Application No. 104124962, dated Nov. 29, 2016, 6 pages (3 pages of English Translation and 3 pages of Official copy).
Office Action received for Taiwanese Patent Application No. 104124963, dated Jan. 5, 2017, 11 pages (5 pages of English Translation and 6 pages of Official copy).
Office Action received for Taiwanese Patent Application No. 104124995, dated Dec. 1, 2016, 6 pages (3 pages of English Translation and 3 pages of Official copy).
Office Action received for Taiwanese Patent Application No. 104124997, dated Dec. 8, 2016, 12 pages (5 pages of English Translation and 7 pages of Official copy).
Office Action received for Taiwanese Patent Application No. 104124998, dated Nov. 29, 2016, 6 pages (3 pages of English Translation and 3 pages of Official copy).
Office Action received for Taiwanese Patent Application No. 104126627, dated Nov. 29, 2016, 9 pages (4 pages of English Translation and 5 pages of Official copy).
Office Action received for Taiwanese Patent Application No. 104132636, dated Mar. 23, 2017, 25 pages (10 pages of English Translation and 15 pages of Official copy).
Pre-interview First Office Action received for U.S. Appl. No. 14/815,890, dated May 26, 2016, 4 pages.
Razykdreviews, "In Depth Review of Apple Watch Activity and Workout App", available at <URL: https://www.youtube.com/watch?v=GkKI3qlK0ow>, May 11, 2015, 1 page.
Rehman, A, "Install Android 4.2 Gesture-based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 pages.
Rizknows, "Garmin Connect Mobile App—Review #2", https://www.youtube.com/watch?v=7my3wMpeRbE, Oct. 22, 2015, 1 page.
Search Report and Opinion received for Danish Patent Application No. PA201770423, dated Oct. 4, 2017, 10 pages.
Search Report and Opinion received for Netherland Patent Application No. 2015232, dated Jan. 25, 2017, 9 pages (1 page of English Translation and 8 pages of Official copy).
Search Report and Opinion received for Netherlands Patent Application No. 2015242, dated Jul. 4, 2017, 20 pages (10 pages of English Translation of Search Opinion and 10 pages of Official copy).
Search Report and Opinion received for Netherlands Patent Application No. 2018531, dated Jul. 27, 2017, 14 pages (6 pages Of English Translation and 8 pages of Official copy).
Search Report received for Danish Patent Application No. 201570768, dated Mar. 17, 2016, 11 pages.
Smartwatch, "App Earth Space HD Live Wallpaper APK for Smart Watch", Version 1.7, Android version 2.2, Aug. 27, 2013, 1 page.
Sony, "Live View™ Micro Display", Extended User Guide, Aug. 2010, 27 pages.
Sony, "Sony Smartwatch", User Guide, Dec. 2011, 18 pages.
Sun Set, "Sun Set Solar Image Clock", Available at <https://web.archive.orgjweb/20140719005410/http://www.sunsetclock.com/>, 2013, 5 pages.
Talkandroid, "Android Wear Walkthrough", Available online at: https://www.youtube.com/watch?v=4xntpZac4sw, Jun. 30, 2014, 1 page.
Viticci, Frederico, "Checking Time Zones with Living Earth—Macstories", Available at <https://www.macstories.net/reviews/checking-time-zones-with-living-earth/>, Dec. 11, 2013, pp. 1-5.
Written Opinion issued from International Preliminary Examining Authority for PCT Patent Application No. PCT/US2016/016216, dated Feb. 20, 2017, 12 pages.
Zukerman, Erez, "6 Beautiful, Interesting & Versatile Timer Apps [android]", available at: http://www.makeuseof.com/tag/beautiful-interesting-versatile-timer-apps-android/, May 18, 2012, 5 pages.
Decision on Opposition received for Australian Patent Application No. 2015298710, dated Aug. 20, 2018, 20 pages.
Final Office Action received for U.S. Appl. No. 14/841,606, dated Sep. 7, 2018, 34 pages.
Final Office Action received for U.S. Appl. No. 14/864,759, dated Sep. 4, 2018, 24 pages.
Invitation to Pay Additional Fees received for PCT Patent Application No. PCT/US2018/032164, dated Aug. 21, 2018, 10 pages.
Notice of Allowance received for U.S. Appl. No. 14/870,726, dated Sep. 11, 2018, 9 pages.

(56) References Cited

OTHER PUBLICATIONS

Office Action received for Chinese Patent Application No. 201510284850.3, dated Jul. 9, 2018, 11 pages (2 pages of English Translation and 9 pages of Official copy).
Summons to Attend Oral Proceedings received for European Patent Application No. 15730890.9, dated Sep. 10, 2018, 11 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/034175, dated Dec. 14, 2017, 14 pages.
International Preliminary Report on Patentability received for PCT Patent Application No. PCT/US2016/035090, dated Dec. 14, 2017, 14 pages.
International Search Report and Written Opinion received for PCT Patent Application. No. PCT/US2017/034834, dated Aug. 23, 2017, 10 pages.
International Search Report and Written Opinion received for PCT Patent Application No. PCT/US2017/035554, dated Sep. 22, 2017, 42 pages.
Non-Final Office Action received for U.S. Appl. No. 14/841,606, dated Dec. 7, 2017, 30 pages.
Office Action received for European Patent Application No. 15730924.6, dated Dec. 12, 2017, 8 pages.
Office Action received for Japanese Patent Application No. 2016-569945, dated Nov. 10, 2017, 8 pages (4 pages of English Translation and 4 pages of Official Copy).
Office Action received for Australian Patent Application No. 2017101375, dated Dec. 1, 2017, 3 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Extended European Search Report received for European Patent Application No. 16762356.0, dated Nov. 9, 2018, 10 pages.
Office Action received for Australian Patent Application No. 2015298710, dated Nov. 6, 2018, 4 pages.
Non-Final Office Action received for U.S. Appl. No. 14/864,759, dated Mar. 20, 2018, 20 pages.
Notice of Allowance received for Japanese Patent Application No. 2017-505450, dated Mar. 9, 2018, 10 pages (7 pages of English Translation and 3 pages of Official Copy).
Office Action received for Australian Patent Application No. 2015267240, dated Mar. 21, 2018, 5 pages.
Office Action received for Australian Patent Application No. 2016215440, dated Mar. 13, 2018, 3 pages.
Office Action received for Chinese Patent Application No. 201510284850.3, dated Nov. 28, 2017, 15 pages (5 pages of English Translation and 10 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Dec. 1, 2017, 11 pages (5 pages of English Translation and 6 pages of Official Copy).
Office action received for Chinese Patent Application No. 201510483305.7, dated Dec. 1, 2017, 13 pages (5 pages English Translation and 8 pages of Official Copy).
Advisory Action received for U.S. Appl. No. 14/846,511, dated Sep. 19, 2018, 8 pages.
Notice of Acceptance received for Australian Patent Application No. 2016229847, dated Sep. 12, 2018, 3 pages.
Corrected Notice of Allowance received for U.S. Appl. No. 15/183,663, dated Mar. 27, 2019, 2 pages.

Decision to Refuse received for European Patent Application No. 15730924.6, dated Mar. 15, 2019, 12 pages.
Extended European Search Report received for European Patent Application No. 16837432.0, dated Mar. 11, 2019, 10 pages.
Minutes of Oral Proceedings received for European Patent Application No. 15730924.6, dated Mar. 13, 2019, 4 pages.
Non-Final Office Action received for U.S. Appl. No. 15/421,865, dated Mar. 21, 2019, 18 pages.
Notice of Acceptance received for Australian Patent Application No. 2016215440, dated Feb. 28, 2019, 3 pages.
Office Action received for Australian Patent Application No, 2018206770, dated Mar. 5, 2019, 3 pages.
Office Action received for Japanese Patent Application No, 2017-565842, dated Feb. 22, 2019, 11 pages (5 pages of English Translation and 6 pages of Official Copy).
Office Action received for Japanese Patent Application No. 2017-505847, dated Feb. 12, 2019, 13 pages (6 pages of English Translation and 7 pages of Official Copy).
Preliminary Opinion received for European Patent Application No. 15730890,9, dated Mar. 7, 2019, 4 pages.
Supplemental Notice of Allowance received for U.S. Appl. No. 15/616,480, dated Mar. 28, 2019, 2 pages.
Clark, Josh, "Designing Great iPhone Apps", O'Reilly Japan Co., O'Reilly Tim, vol. 1, May 24, 2012, 5 pages (Official Copy only). {See Communication under 37 CFR § 1.98(a) (3)}.
Feist, Jonathan, "Android customization—how to create a custom clock widget using Zooper Widget", May 15, 2014, 10 pages.
Gazer, "iPhone 4S Super Manual", Shuwa System Co., Saito Kazukuni, vol. 1, Jun. 6. 2013, 7 pages (Official Copy only), {See Communication under 37 CFR § 1.98(a) (3)}.
Obara, Yuuta, "iPhone Application Selection for Univesity Students", Shuwa System Co., SAITO Kazukuni, vol. 1, May 16, 2013, 4 pages (Official Copy only). {See Communication under 37 CFR § 1.98(a) (3)}.
Octoba, "Just Install It—Utilizing Method for Android Application Business", ASCII Media Works Co. Takano Kiyoshi, vol. 1, Apr. 25, 2013, 6 pages (Official Copy only). {See Communication under 37 CFR § 1.98(a) (3)}.
Final Office Action received for U.S. Appl. No. 15/881,544, dated Jan. 29, 2019, 14 pages.
Non-Final Office Action received for U.S. Appl. No. 14/821,667, dated Feb. 4, 2019, 13 pages.
Notice of Allowance received for U.S. Appl. No. 14/863,069, dated Feb. 6, 2019, 6 pages.
Office Action received for Australian Patent Application No. 2016215440, dated Jan. 22, 2019, 2 pages.
Office Action received for Chinese Patent Application No. 201610371774.4, dated Dec. 19, 2018, 13 pages (5 pages of English Translation and 8 pages of Official copy).
Office Action received for Korean Patent Application No. 10-2017-7034558, dated Dec. 15, 2018, 15 pages (7 pages of English Translation and 8 pages of Official Copy).
Office Action received for Australian Patent Application No. 2018206770, dated Jul. 25, 2018, 5 pages.
Decision to Grant Received for Danish Patent Application No. PA201770397, dated Feb. 6, 2018, 2 pages.
European Search Report received for European Patent Application No. 17206177.2, dated Apr. 30, 2018, 4 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/599,424, dated Jun. 28, 2018, 12 pages.
Final Office Action received for U.S. Appl. No. 14/599,425, dated Jun. 12, 2018, 45 pages.
Intention to Grant received for European Patent Application No. 16706081.3, dated Jun. 11, 2018, 7 pages.
Non Final Office Action received for U.S. Appl. No. 15/881,544, dated Jun. 7, 2018, 15 pages.
Non-Final Office Action received for U.S. Appl. No. 15/798,235, dated Mar. 14, 2018, 58 pages.

(56) References Cited

OTHER PUBLICATIONS

Office Action received for Chinese Patent Application No. 201510484514.3, dated Apr. 4, 2018, 12 pages (5 pages of English Translation and 7 pages of Official Copy).
Office Action received for Danish Patent Application No. PA201570499, dated Jun. 19, 2018, 4 pages.
Office Action received for Danish Patent Application No. PA201770791, dated Jan. 31, 2018, 8 pages.
Office Action received for European Patent Application No. 15747595.5, dated Jun. 27, 2018, 8 pages.
Office Action received for European Patent Application No. 17206177.2, dated May 15, 2018, 6 pages.
"Reuse Animations—Synfig Animation Studio", Available online at: https://wiki.synfig.org/index.php?title=Doc:Reuse_Animations&oldid=18173, May 20, 2013, 5 pages.
Summons to Attend Oral Proceedings received for European Patent Application No. 15730924.6, dated Jun. 13, 2018, 10 pages.
"Tropical Fish 14", Available online at: https://www.turbosguid.com/3d-models/tropical-fish-3d-model/388510, Feb. 4, 2008, 2 pages.
Non-Final Office Action received for U.S. Appl. No. 14/599,424, dated Jan. 17, 2018, 13 pages.
Office Action received for Danish Patent Application No. PA201670362, dated Jan. 29, 2018, 3 pages.
Office Action received for Taiwanese Patent Application No. 104132636, dated Oct. 31, 2017, 10 pages (4 pages of English Translation and 6 pages of Official Copy).
Final Office Action received for U.S. Appl. No. 14/846,511 dated May 10, 2018, 21 pages.
Final Office Action received for U.S. Appl. No. 14/863,069, dated Jul. 5, 2018, 19 pages.
Non-Final Office Action received for U.S. Appl. No. 15/183,663, dated Jul. 9, 2018, 13 pages.
Office Action received for Danish Patent Application No. PA201770423, dated Jun. 12, 2018, 7 pages.
Final Office Action received for U.S. Appl. No. 15/798,235, dated Oct. 9, 2018, 45 pages.
Non Final Office Action received for U.S. Appl. No. 14/869,877, dated Oct. 5, 2018, 19 pages.
Office Action received for Australian Patent Application No. 2015298710, dated Sep. 24, 2018, 4 pages.
Office Action received for Japanese Patent Application No. 2016-569945, dated Sep. 10, 2018, 11 pages (6 pages of English Translation and 5 pages of Official Copy).
Office Action received for Taiwanese Patent Application No. 104126627, dated Aug. 30, 2018, 22 pages (9 pages of English Translation and 13 pages of Official Copy).
Advisory Action received for U.S. Appl. No. 14/841,606, dated Feb. 28, 2019, 3 pages.
Android Central, "BeWeather weather app for Android", Available at: https://www.youtube.com/watch?v=G2EY2K-XkSI, Sep. 1, 2011, 1 page.
Corrected Notice of Allowance received for U.S. Appl. No. 15/183,663, dated Feb. 25, 2019, 3 pages.
Fukuda, Kazuhiro, "Xperia Z1 Perfect Manual", Sotec Co. Ltd. No. 1, Nov. 15, 2013, pp. 217-218 (Official Copy Only) (See Communication under 37 CFR § 1.98(a) (3)).
Geary, David, "Programming HTML5 Canvas", O'Reilly Japan Inc. No. 1, Jul. 23, 2014, pp. 327-330 (Official Copy Only) (See Communication under 37 CFR § 1.98(a) (3)).
Kenney, Briley, "How to Customize a Smartwatch and other Personalization Questions", Available at: URL:https://smartwatches.org/learn/customize-smartwatch, Jan. 23, 2014, 3 pages.
Notice of Allowance received for U.S. Appl. No. 14/870,726, dated Mar. 6, 2019, 6 pages.
Office Action received for Australian Patent Application No. 2018101855, dated Feb. 22, 2019, 4 pages.
Office Action received for European Patent Application No. 15730925.3, dated Feb. 27, 2019, 6 pages.
Office Action received for Japanese Patent Application No. 2017-562330, dated Jan. 18, 2019, 11 pages (6 pages of English Translation and 5 pages of Official Copy).
Office Action received for Japanese Patent Application No. 2018-074971, dated Jan. 28, 2019, 6 pages (3 pages of English Translation and 3 pages of Official Copy).
Office Action received for Korean Patent Application No. 10-2018-7022101, dated Feb. 14, 2019, 15 pages (6 pages of English Translation and 9 pages of Official Copy).
Office Action received for Taiwanese Patent Application No. 104126627, dated Dec. 20, 2018, 4 pages (2 pages of English Translation and 2 pages Of Official Copy).
Shiota, Shinji, "Windows 7 Dojo", Weekly ASCII, ASCII Mediaworks Inc. vol. 798, Aug. 31, 2010, 3 pages (Official Copy Only) (See Communication under 37 CFR § 1.98(a) (3)).
Supplemental Notice of Allowance received for U.S. Appl. No. 14/863,069, dated Mar. 1, 2019, 3 pages.
Xperia ZL2 SOL25, "Instruction Manual", Detailed version, KDDI Corporation, No. 1, vol. 1, Jun. 2014, 4 pages (Official Copy Only) (See Communication under 37 CFR § 1.98(a) (3)).
Intention to Grant received for European Patent Application No. 16706081.3, dated Jul. 18, 2018, 8 pages.
Office Action received for Australian Patent Application No. 2016229847, dated Jul. 3, 2018, 4 pages.
Office Action received for Chinese Patent Application No. 201580028677.9, dated May 25, 2018, 14 pages (4 pages of English Translation and 10 pages of Official copy).
Office Action received for Danish Patent Application No. PA201770791, dated Jul. 13, 2018, 2 pages.
Extended European Search Report received for European Patent Application No. 16804040.0, dated Feb. 26, 2018, 9 pages.
Final Office Action received for U.S. Appl. No. 14/815,890, dated Feb. 26, 2018, 20 pages.
International Preliminary Report on Patentability received for PCT Patent Application No. PCT/US2016/037686, dated Mar. 1, 2018, 12 pages.
Invitation to Pay Additional Fee received for European Patent Application No. 15747595.5, dated Feb. 9, 2018, 6 pages.
Office Action received for Australian Patent Application No. 2017101375, dated Feb. 19, 2018, 4 pages.
International Preliminary Report on Patentability received for PCT Patent Application No. PCT/US2016/014997, dated Dec. 21, 2017, 16 pages.
Non-Final Office Action received for U.S. Appl. No. 14/599,425, dated Jan. 11, 2018, 42 pages.
Advisory Action received for U.S. Appl. No. 14/863,099, dated Sep. 8, 2016, 3 pages.
Decision on Acceptance received for Australian Patent Application No. 2015298710, dated Jul. 19, 2019, 18 pages.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
Invitation to Pay Addition Fees received for PCT Patent Application No. PCT/US2014/027882, dated Aug. 5, 2014, 2 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.

(56) References Cited

OTHER PUBLICATIONS

Notice of Allowance received for Japanese Patent Application No. 2017-545918, dated Jul. 22, 2019, 4 pages (1 page of English Translation and 3 pages of Official Copy).
Office Action received for Australian Patent Application No. 2019100490, dated Jul. 26, 2019, 4 pages.
Office Action received for Chinese Patent Application No. 201610371774.4, dated Jul. 8, 2019, 6 pages (3 pages of English Translation and 3 pages of Official copy).
Supplementary European Search Report received for European Patent Application No. 17810749.6, dated Aug. 6, 2019, 6 pages.
Dharmasena, Anusha, "iMessage-send as text message Option", YouTube, Available online at: https://www.youtube.com/watch?v=hXG-MdIW6FA, Feb. 18, 2013, 1 page.
Corrected Notice of Allowance received for U.S. Appl. No. 15/798,257, dated Jul. 9, 2019, 2 pages.
Extended European Search Report received for European Patent Application No. 19163212.4, dated Jun. 25, 2019, 11 pages.
Notice of Allowance received for Chinese Patent Application No. 201510484514.3, dated Jun. 6, 2019, 2 pages (1 page of English Translation and 1 page of Official Copy).
Notice of Allowance received for U.S. Appl. No. 15/881,544, dated Jun. 26, 2019, 6 pages.
Office Action received for Australian Patent Application No. 2018279037, dated Jun. 18, 2019, 5 pages.
Wikipedia, "Enhanced Multi-Level Precedence and Pre-emption Service", Available online at: https://de.wikipedia.org/w/index.php?%20title=Enhanced%20Multi%E3%83%BCLevel_Precedence_And_Pre-emption_Service&oldid=123047429, Oct. 2013, 2 pages (Official copy only) {See Communication under 37 CFR § 1.98(a)(3)).
Non-Final Office Action received for U.S. Appl. No. 14/841,606, dated May 8, 2019, 28 pages.
Non-Final Office Action received for U.S. Appl. No. 15/798,235, dated Apr. 24, 2019, 25 pages.
Notice of Allowance received for Japanese Patent Application No. 2018-074971, dated Apr. 23, 2019, 4 pages (1 page of English Translation and 3 pages of Official Copy).
Partial Supplementary European Search Report received for European Patent Application No. 17810749.6, dated Apr. 25, 2019, 8 pages.
Certificate of Examination received for Australian Patent Application No. 2018101855, dated Aug. 6, 2019, 2 pages.
Corrected Notice of Allowance received for U.S. Appl. No. 15/798,257, dated Aug. 26, 2019, 2 pages.
Decision on Appeal received for U.S. Appl. No. 14/863,099, dated Aug. 22, 2019, 9 pages.
Decision on Opposition received for Australian Patent Application No. 2015298710, dated Aug. 9, 2019, 4 pages.
Invitation to Pay Additional Fee received for PCT Patent Application No. PCT/US2019/024790, dated Jul. 18, 2019, 10 pages.
Office Action received for European Patent Application No. 17810749.6, dated Aug. 20, 2019, 9 pages.
Office Action received for Japanese Patent Application No. 2018-537840, dated Jul. 8, 2019, 15 pages (8 pages of English Translation and 7 pages of Official copy).
Supplemental Notice of Allowance received for U.S. Appl. No. 14/863,069, dated Aug. 15, 2019, 3 pages.
Notice of Allowance received for Chinese Patent Application No. 201810037665.8, dated Jul. 9, 2019, 4 pages (1 page of English Translation and 3 pages of Official Copy).
Office Action received for Australian Patent Application No. 2018206770, dated Jul. 16, 2019, 5 pages.
Office Action received for Chinese Patent Application No. 201510284850.3, dated Jun. 21, 2019, 10 pages( 4 pages of English Translation and 6 pages of Official Copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2018-7022101, dated Jul. 9, 2019, 10 pages (5 pages of English Translation and 5 pages of Official Copy).
Final Office Action received for U.S. Appl. No. 14/815,890, dated May 14, 2019, 22 pages.
Notice of Allowance received for Japanese Patent Application No. 2017-505847, dated May 20, 2019, 4 pages (1 page of English Translation and 3 pages of Official Copy).
Notice of Allowance received for U.S. Appl. No. 15/798,257, dated May 22, 2019, 14 pages.
Office Action received for Australian Patent Application No. 2017286296, dated May 8, 2019, 4 pages.
Office Action received for Australian Patent Application No. 2018206770, dated Apr. 30, 2019, 4 pages.
Office Action received for Chinese Patent Application No. 201510483268.X, dated Apr. 16, 2019, 6 pages (3 pages of English Translation and 3 pages of Official Copy).
Office Action received for European Patent Application No. 16804040.0, dated May 13, 2019, 12 pages.
Search Report and Opinion received for Danish Patent Application No. PA201870385, dated Nov. 16, 2018, 10 Pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?" Online Available at: https://forums.watchuseek.com/f2/watch-every-father-needs-m-i-c-k-e-y-m-o-u-s-e-mickey-mouse-855069.html, 2013, 3 pages.
International Search Report and Written Opinion received for PCT Patent Application No. PCT/US2019/024790, dated Sep. 11, 2019, 18 pages.
Notice of Allowance received for Japanese Patent Application No. 2017-562330, dated Sep. 20, 2019, 4 pages (1 page of English Translation and 3 pages of Official Copy).
Office Action received for Chinese Patent Application No. 201680008151.9, dated Aug. 27, 2019, 24 pages (11 pages of English Translation and 13 pages of Official Copy).
Office Action received for Korean Patent Application No. 10-2017-7034558, dated Sep. 25, 2019, 9 pages (4 pages of English Translation and 5 pages of Official Copy).
Summons to Attend Oral Proceedings received for European Patent Application No. 15730925.3, dated Oct. 2, 2019, 8 pages.
Extended European Search Report received for European Patent Application No. 18213157.3, dated Apr. 12, 2019, 8 pages.
Final Office Action received for U.S. Appl. No. 15/614,121, dated Apr. 8, 2019, 32 pages.
Notice of Allowance received for Chinese Patent Application No. 201580028677.9, dated Apr. 2, 2019, 2 pages (1 pages of English Translation and 1 page of Official Copy).
Office Action received for Australian Patent Application No. 2018206772, dated Apr. 1, 2019, 4 pages.
Office Action received for Chinese Patent Application No. 201680047983.1, dated Mar. 18, 2019, 18 pages (6 pages of English Translation and 12 pages of Official Copy).
Office Action received for Danish Patent Application No. PA201770423, dated Mar. 29, 2019, 6 pages.
Office Action received for European Patent Application No. 15747595.5, dated Apr. 15, 2019, 4 pages.
Supplemental Notice of Allowance received for U.S. Appl. No. 14/863,069, dated Mar. 29, 2019, 3 pages.
Decision on Appeal reveived for U.S. Appl. No. 14/774,664, dated Sep. 12, 2019, 8 pages.
Office Action reveiced for Danish Patent Application No. PA201870385, dated Aug. 23, 2019, 3 pages.
Office Action received for Japanese Patent Application No. 2016-569945, dated Jul. 29, 2019, 6 pages (3 pages of English Translation and 3 pages of Official Copy).
Office Action received for Korean Patent Application No. 10-2018-7018904, dated Aug. 20, 2019, 8 pages (3 pages of English Translation and 5 pages of Official Copy).
Corrected Notice of Allowance received for U.S. Appl. No. 15/798,257, dated Jun. 12, 2019, 2 pages.

(56) References Cited

OTHER PUBLICATIONS

Final Office Action received for U.S. Appl. No. 14/846,511, dated Jun. 5, 2019, 24 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Notice of Allowance received for Chinese Patent Application No. 201510481525.6, dated May 27, 2019, 2 pages (1 page of English Translation and 1 page of Official Copy).
Notice of Allowance received for U.S. Appl. No. 14/821,667, dated Jun. 12, 2019, 9 pages.
Office Action received for Chinese Patent Application No. 201510479088.4, dated May 7, 2019, 6 pages (3 pages of English Translation and 3 pages of Official Copy).
Office Action received for Danish Patent Application No. PA201770791, dated Jun. 11, 2019, 3 pages.
Summons to Attend Oral Proceedings received for European Patent Application No. 17206177.2, dated Jun. 3, 2019, 8 pages.
Android Central, "Changing the watchface on your Android Wear device", Retrieved from: https://www.youtube.com/watch?v=YYwFe2K_gil, Jul. 2, 2014, 4 pages.
Ebpman Tech Reviews, "LG G3 Tips: How to customize the clock face", Available online at: https://www.youtube.com/watch?v=evraMWFblfY, Jul. 25, 2014, 1 page.
Omar Romero, "Sony Smartwatch 2 Custom Watchfaces Tutorial", Retrieved From: https://www.youtube.com/watch?v=8odbxgwSQR8, May 1, 2014, 2 pages.
StateofTech, "Samsung Galaxy Gear Tips—Change the Clock Face", Retrieved from: https://www.youtube.com/watch?v=GOom7AZUAjY, Dec. 11, 2013, 2 pages.
Final Office Action received for U.S. Appl. No. 14/869,877, dated Jun. 11, 2019, 35 pages.
Notice of Allowance received for U.S. Appl. No. 14/863,069, dated Jun. 18, 2019, 6 pages.
Office Action received for Australian Patent Application No. 2016270323, dated May 29, 2019, 4 pages.
Office Action received for Australian Patent Application No. 2017277813, dated Jun. 11, 2019, 3 pages.
Office Action received for Korean Patent Application No. 10-2017-7034558, dated Jun. 4, 2019, 7 pages (3 pages of English Translation and 4 pages of Official Copy).
Office Action received for Australian Patent Application No. 2018279037, dated Jan. 17, 2020, 4 pages.
Wikipedia, "Emoji", Available online at: https://en.wikipedia.org/w/index.php?title=Emojioldid=648831795, Feb. 25, 2015, 12 pages.
Wikipedia, "Emoticon", Available online at: https://en.wikipedia.org/w/index.php?title=Emoticonoldid=648776142, Feb. 25, 2015, 9 pages.
Office Action received for Korean Patent Application No. 10-2019-7029673, dated Nov. 5, 2019, 10 pages (4 pages of English Translation and 6 pages of Official Copy).
Internet Blog Post, "[PC] Pre-Customization of Black Desert's Characters", Online Available at: https://blog.naver.com/hsh6051/220209813968, Dec. 14, 2014, 41 pages (21 pages of English translation and 20 pages of Official Copy).
Applicant-Initiated Interview Summary received for U.S. Appl. No. 15/405,122, dated May 21, 2020, 5 pages.
Non-Final Office Action received for U.S. Appl. No. 16/377,892, dated May 21, 2020, 9 pages.
Notice of Acceptance received for Australian Patent Application No. 2017286296, dated May 1, 2020, 3 pages.
Notice of Acceptance received for Australian Patent Application No. 2018279037, dated May 13, 2020, 3 pages.
Office Action received for Chinese Patent Application No. 201510479088.4, dated Apr. 22, 2020, 7 pages (3 pages of English Translation and 4 pages of Official Copy).
Office Action received for European Patent Application No. 18213157.3, dated May 15, 2020, 7 pages.

Advisory Action received for U.S. Appl. No. 15/421,865, dated Apr. 16, 2020, 7 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.
Applicant Initiated Interview Summary received for U.S. Appl. No. 14/846,511, dated Apr. 20, 2020, 4 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Brightness on lock screen, 2019, 1 page.
Decision to Grant received for Danish Patent Application No. PA201870385, dated Mar. 26, 2020, 2 pages.
Examiner's Answer to Appeal Brief received for U.S. Appl. No. 14/815,890, dated Mar. 20, 2020, 16 pages.
Looking for a launcher that changes the default homescreen or widgets based on wifi, location, or other context. Online Available at: https://www.reddit.com/r/androidapps/comments/351u90/looking_for_a_launcher_that_changes_the_default/, 2015, 2 pages.
Non-Final Office Action received for U.S. Appl. No. 16/389,722, dated Apr. 3, 2020, 15 pages.
Non-Final Office Action received for U.S. Appl. No. 16/407,590, dated Apr. 10, 2020, 12 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Notice of Acceptance received for Australian Patent Application No. 2018206772, dated Mar. 17, 2020, 3 pages.
Notice of Allowance received for Japanese Patent Application No. 2017-505842, dated Mar. 16, 2020, 4 pages (1 page of English Translation and 3 pages of Official Copy).
Notice of Allowance received for Japanese Patent Application No. 2018-537840, dated Mar. 19, 2020, 4 pages (1 pages of English Translation and 3 pages of Official Copy).
Notice of Allowance received for U.S. Appl. No. 15/614,121, dated Mar. 6, 2020, 8 pages.
Notice of Allowance received for U.S. Appl. No. 15/798,235, dated Apr. 1, 2020, 8 pages.
Notice of Allowance received for U.S. Appl. No. 16/585,366, dated Jan. 2, 2020, 6 pages.
Nova Launcher—Lock Screen Edit, Online Available at: https://forums.androidcentral.com/ask-question/835057-nova-launcher-lock-screen-edit.html, Sep. 2017, 2 pages.
Office Action received for Australian Patent Application No. 2017277813, dated Mar. 20, 2020, 4 pages.
Office Action received for Australian Patent Application No. 2019208225, dated Mar. 20, 2020, 3 pages.
Office Action received for Chinese Patent Application No. 201710439448.7, dated Mar. 27, 2020, 13 pages (7 pages of English Translation and 6 pages of Official Copy).
Office Action received for Korean Patent Application No. 10-2019-7038235, dated Mar. 9, 2020, 15 pages (7 pages of English Translation and 8 pages of Official Copy).
Android Tips, "Create a Minimal Lock Screen With WidgetLocker", Online Available at: http://appstap192.blogspot.com/2012/01/create-minimal-lock-screen-with.html, Jan. 18, 2012, 6 pages.
Dan, "Get This Look: 'Minimal' Zooper Widget", Online Available at:https://www.androidguys.com/featured/customize/get-look-minimal-zooper-widget/, Mar. 7, 2014, 1 page.
Wade, Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Final Office Action received for U.S. Appl. No. 16/582,020, dated Apr. 28, 2020, 31 pages.
Non-Final Office Action received for U.S. Appl. No. 16/363,945, dated Apr. 24, 2020, 13 pages.

(56) References Cited

OTHER PUBLICATIONS

Non-Final Office Action received for U.S. Appl. No. 16/418,786, dated Apr. 24, 2020, 16 pages.
Office Action received for Chinese Patent Application No. 201680008151.9, dated Apr. 20, 2020, 6 pages (3 pages of English Translation and 3 pages of Official Copy).
Office Action received for Chinese Patent Application No. 201680013193.1, dated Mar. 25, 2020, 21 pages (8 pages of English Translation and 13 pages of Official Copy).
Applicant-Initiated Interview Summary received for U.S. Appl. No. 16/407,590, dated Jun. 5, 2020, 3 pages.
Brief Communication Regarding Oral Proceedings received for European Patent Application No. 16804040.0, dated May 28, 2020, 15 pages.
Intention to Grant received for European Patent Application No. 15730925.3, dated May 28, 2020, 10 pages.
Minutes of Oral Proceedings received for European Patent Application No. 15730925.3, dated May 26, 2020, 11 pages.
Non-Final Office Action received for U.S. Appl. No. 16/378,136, dated Jun. 2, 2020, 8 pages.
Advisory Action received for U.S. Appl. No. 14/846,511, dated Oct. 22, 2019, 5 pages.
Andro Dollar, "Huawei Watch GT Always on Mode Update is finally here! ????", Online Available at: https://www.youtube.com/watch?v=AJw_FlAf7v4, Jun. 6, 2019, 4 pages.
Applicant-Initiated Interview Summary received for U.S. Appl. No. 15/421,865, dated Feb. 3, 2020, 5 pages.
Applicant-Initiated Interview Summary received for U.S. Appl. No. 15/614,121, dated Feb. 13, 2020, 4 pages.
Applicant-Initiated Interview Summary received for U.S. Appl. No. 15/798,235, dated Feb. 3, 2020, 3 pages.
Big Phil TV, "Gear S3 Watch faces with great always on display (A O D)", Available online at: https://www.youtube.com/watch?v=2cxMnrMiGU8, Apr. 5, 2017, 3 pages.
Brief Communication regarding Oral Proceedings received for European Patent Application No. 15730925.3, dated Feb. 18, 2020, 7 pages.
Brief Communication regarding Oral Proceedings received for European Patent Application No. 17206177.2, dated Nov. 21, 2019, 5 pages.
Cancellation of Oral Proceedings received for European Patent Application No. 17206177.2, dated Dec. 4, 2019, 2 pages.
Cengic, Suad, "Samsung Gear S3—Display Always on! Cool!", Available online at: https://www.youtube.com/watch?v=ceeDinbPwOY, Mar. 10, 2017, 3 pages.
Certificate of Examination received for Australian Patent Application No. 2019100490, dated Oct. 16, 2019, 2 pages.
Corrected Notice of Allowance received for U.S. Appl. No. 15/355,956, dated Jan. 3, 2020, 2 pages.
Droid Life, "How to: Use Always-on Apps with Android Wear", Available online at: https://www.youtube.com/watch?v=_-xYB9EBTaA, Jun. 26, 2015, 3 pages.
Extended European Search Report received for European Patent Application No. 17810723.1, dated Nov. 12, 2019, 9 pages.
Extended European Search Report received for European Patent Application No. 17813824.4, dated Dec. 5, 2019, 7 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/798,235, dated Oct. 18, 2019, 25 pages.
"How to Send and Receive files over Bluetooth on an Android Phone", Online Available at: https://web.archive.org/web/20160529062240/http://www.androidtipsandhacks.com/android/send-receive-files-bluetooth-android-phone/, May 29, 2016, 7 pages.
Intention to Grant received for Danish Patent Application No. PA201770791, dated Feb. 19, 2020, 2 pages.
Intention to Grant received for Danish Patent Application No. PA201870385, dated Jan. 24, 2020, 2 pages.
Intention to Grant received for European Patent Application No. 15747595.5, dated Feb. 17, 2020, 8 pages.
Intention to Grant received for European Patent Application No. 17206177.2, dated Feb. 24, 2020, 8 pages.
International Preliminary Report on Patentability received for PCT Patent Application No. PCT/US2018/032164, dated Nov. 21, 2019, 11 pages.
International Search Report and Written Opinion received for PCT Patent Application No. PCT/US2019/030770, dated Oct. 31, 2019, 23 pages.
Invitation to Pay Additional Fees received for PCT Patent Application No. PCT/US2019/030770, dated Jul. 26, 2019, 12 pages.
"Kamcord—Wikipedia", Online Available at: https://en.wikipedia.org/w/index.php?title=Kamcord&oldid=712263010, Mar. 28, 2016, 2 pages.
"Kamcord Developers—Quick Start Guide", Online Available at: https://web.archive.org/web/20140801055705/https://www.kamcord.com/developers/docs/ios/features-and-settings/, Aug. 1, 2014, 10 pages.
"Kamcord Developers", Online Available at: https://web.archive.org/web/20140827043641/http://www.kamcord.com/developers/, Aug. 27, 2014, 7 pages.
Non-Final Office Action received for U.S. Appl. No. 14/846,511 dated Jan. 7, 2020, 25 pages.
Non-Final Office Action received for U.S. Appl. No. 15/614,121, dated Nov. 4, 2019, 44 pages.
Non-Final Office Action received for U.S. Appl. No. 16/145,033, dated Mar. 4, 2020, 50 pages.
Notice of Acceptance received for Australian Patent Application No. 2015298710, dated Oct. 8, 2019, 3 pages.
Notice of Allowance received for Chinese Patent Application No. 201510483268.X, dated Nov. 6, 2019, 2 pages (1 page of English translation and 1 page of Official Copy).
Notice of Allowance received for Japanese Patent Application No. 2016-569945, dated Jan. 7, 2020, 4 pages (1 page of English Translation and 3 pages of Official Copy).
Notice of Allowance received for Korean Patent Application No. 10-2018-7022101, dated Oct. 14, 2019, 4 pages (1 page of English Translation and 3 pages of Official Copy).
Notice of Allowance received for U.S. Appl. No. 15/355,956, dated Nov. 22, 2019, 29 pages.
Notice of Allowance received for U.S. Appl. No. 15/881,544, dated Nov. 7, 2019, 5 pages.
Office Action received for Australian Patent Application No. 2018201089, dated Oct. 11, 2019, 4 pages.
Office Action received for Australian Patent Application No. 2018206772, dated Feb. 6, 2020, 4 pages.
Office Action received for Australian Patent Application No. 2018206772, dated Nov. 6, 2019, 4 pages.
Office Action received for Chinese Patent Application No. 201610371774.4, dated Dec. 2, 2019, 6 pages (3 pages of English Translation and 3 pages of Official Copy).
Office Action received for Chinese Patent Application No. 201680047983.1, dated Nov. 28, 2019, 9 pages (4 pages of English Translation and 5 pages of Official Copy).
Office Action received for Chinese Patent Application No. 201811330077.X, dated Nov. 13, 2019, 14 pages (6 pages of English Translation and 8 pages of Official Copy).
Office Action received for European Patent Application No. 16837432.0, dated Jan. 10, 2020, 7 pages.
Office Action received for Japanese Patent Application No. 2017-505842, dated Sep. 9, 2019, 7 pages (3 pages of English Translation and 4 pages of Official Copy).
Phandroid, "New Android Wear Wrist Gestures in Marshmallow", Available online at: https://www.youtube.com/watch?v=0WhKuklpQ9A, Feb. 11, 2016, 3 pages.
Summons to Attend Oral Proceedings received for European Patent Application No. 16804040.0, dated Jan. 24, 2020, 11 pages.
Zephyrnix, "Steam's In-Game Home menu", Online Available at: https://www.youtube.com/watch?v=jLoRFiPkcUw, see 0;00-1;06., Feb. 15, 2011, 3 pages.

(56) References Cited

OTHER PUBLICATIONS

Notice of Allowance received for Chinese Patent Application No. 201610371774.4, dated Jun. 4, 2020, 2 pages (1 page of English Translation and 1 page of Official Copy).
Notice of Allowance received for Chinese Patent Application No. 201680008151.9, dated Jun. 16, 2020, 2 pages (1 page of English Translation and 1 page of Official Copy).
Office Action received for Australian Patent Application No. 2017277971, dated Jun. 3, 2020, 3 pages.

* cited by examiner

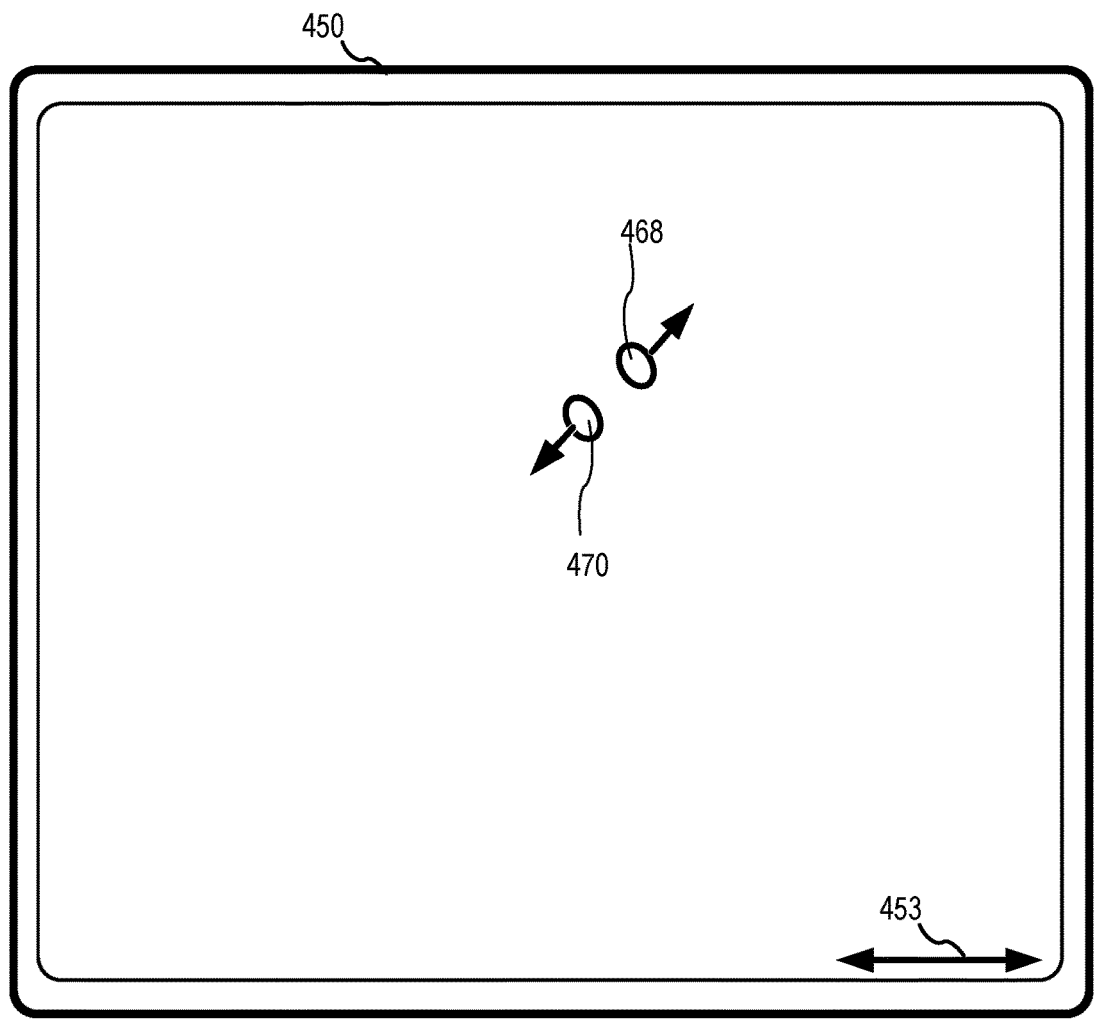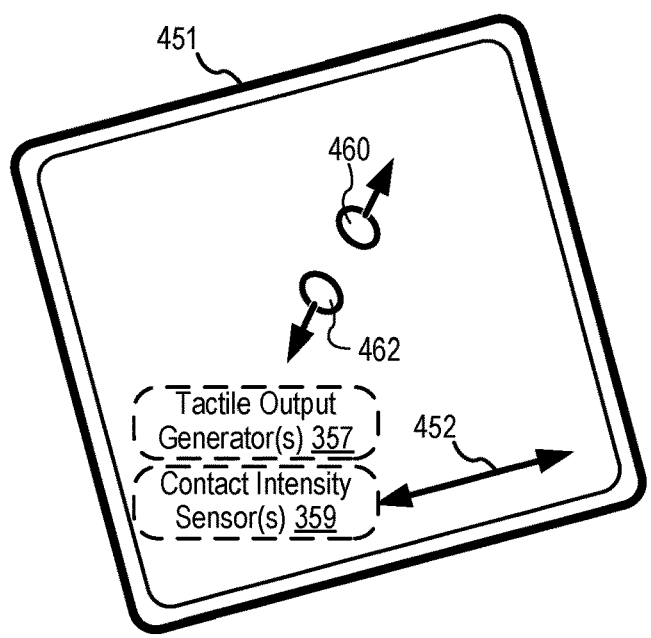
FIG. 4B

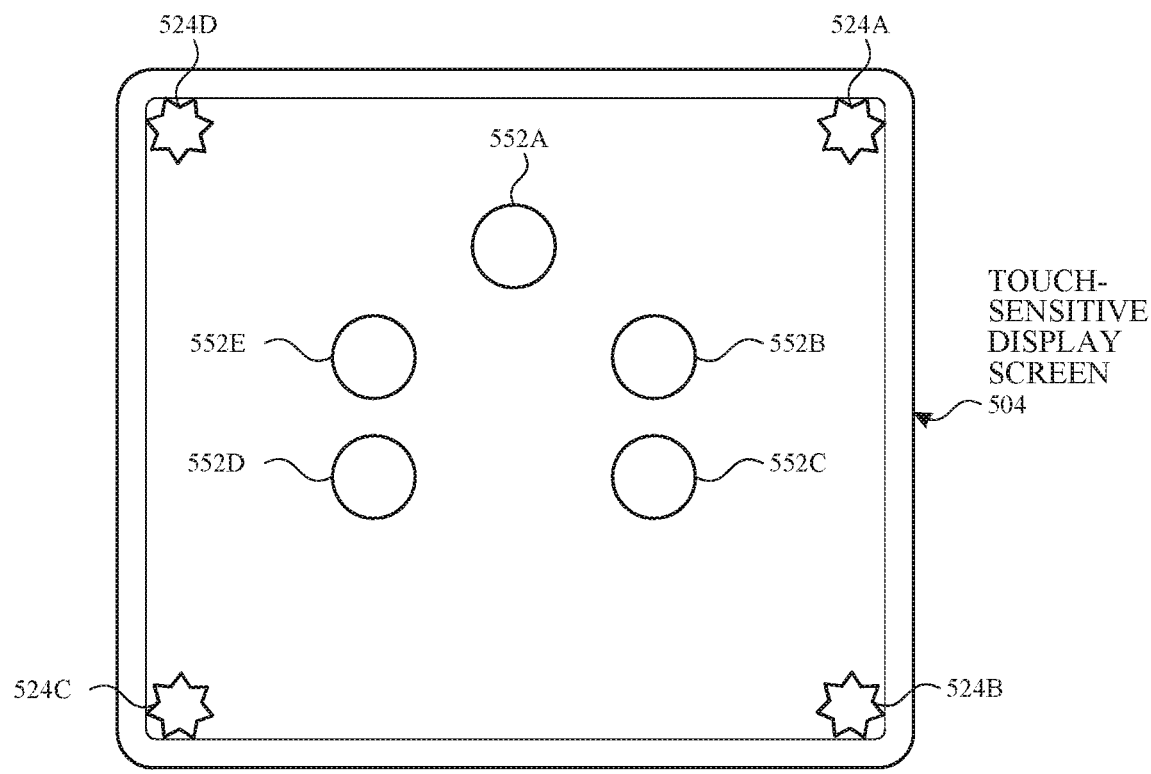
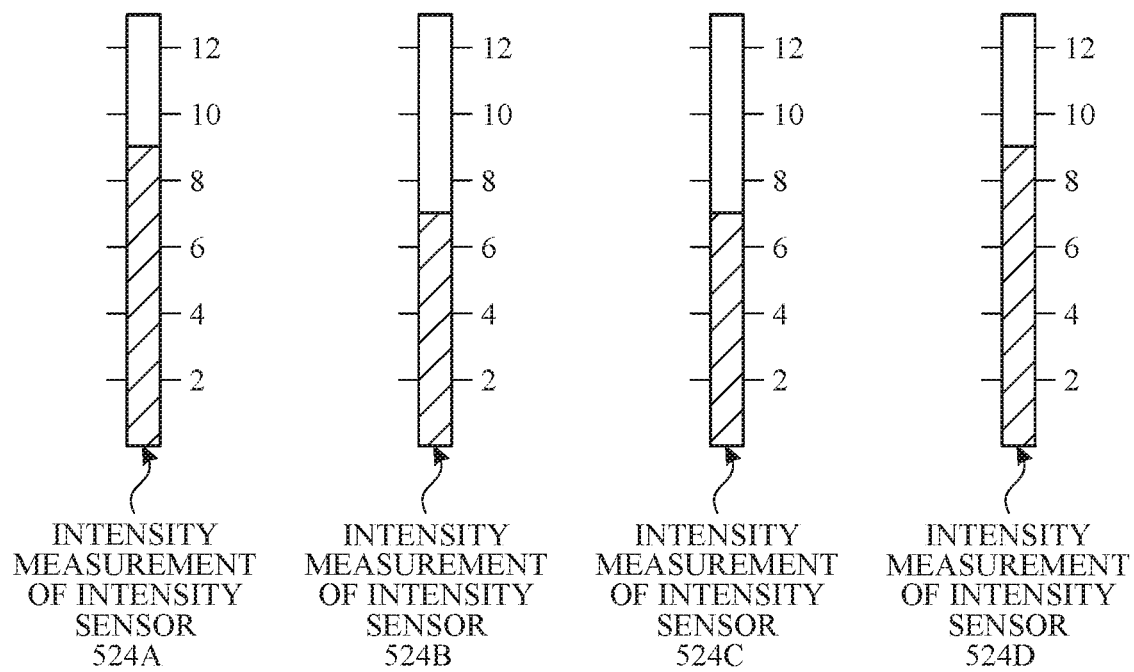
FIG. 5C

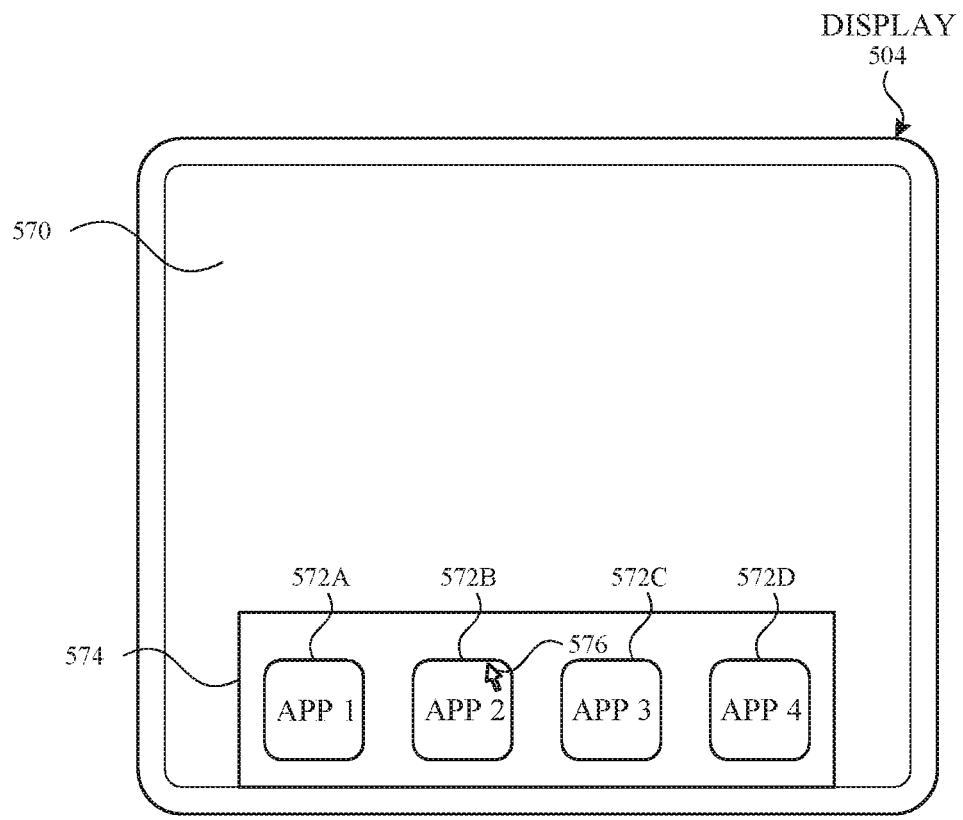
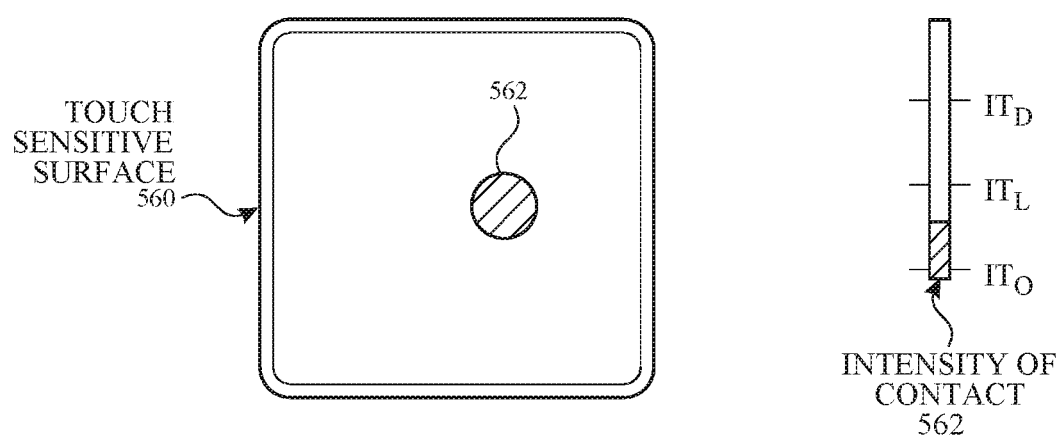
FIG. 5E

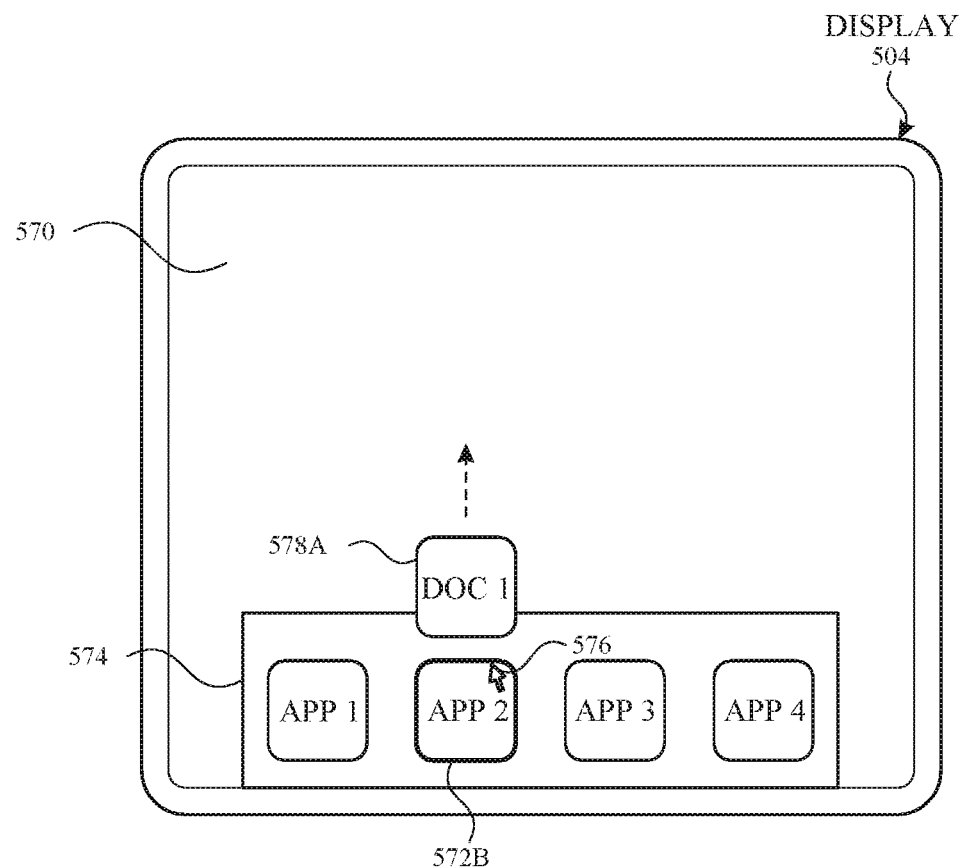
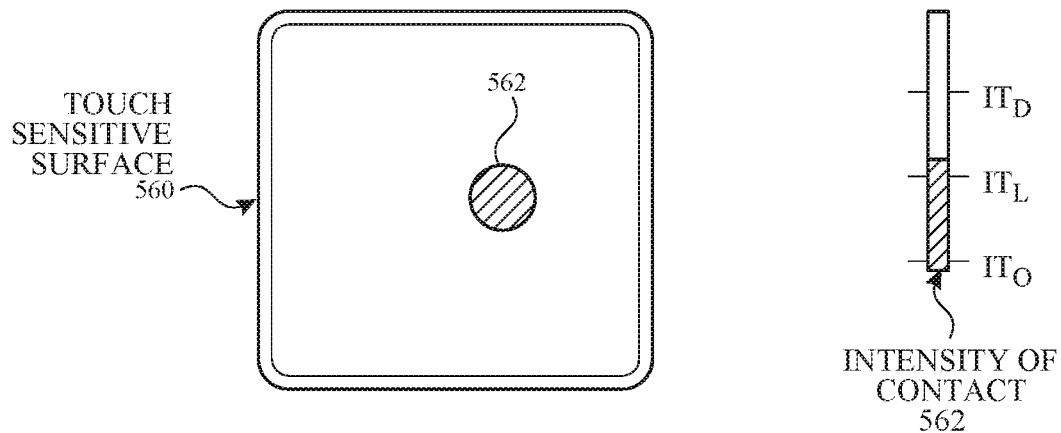
FIG. 5F

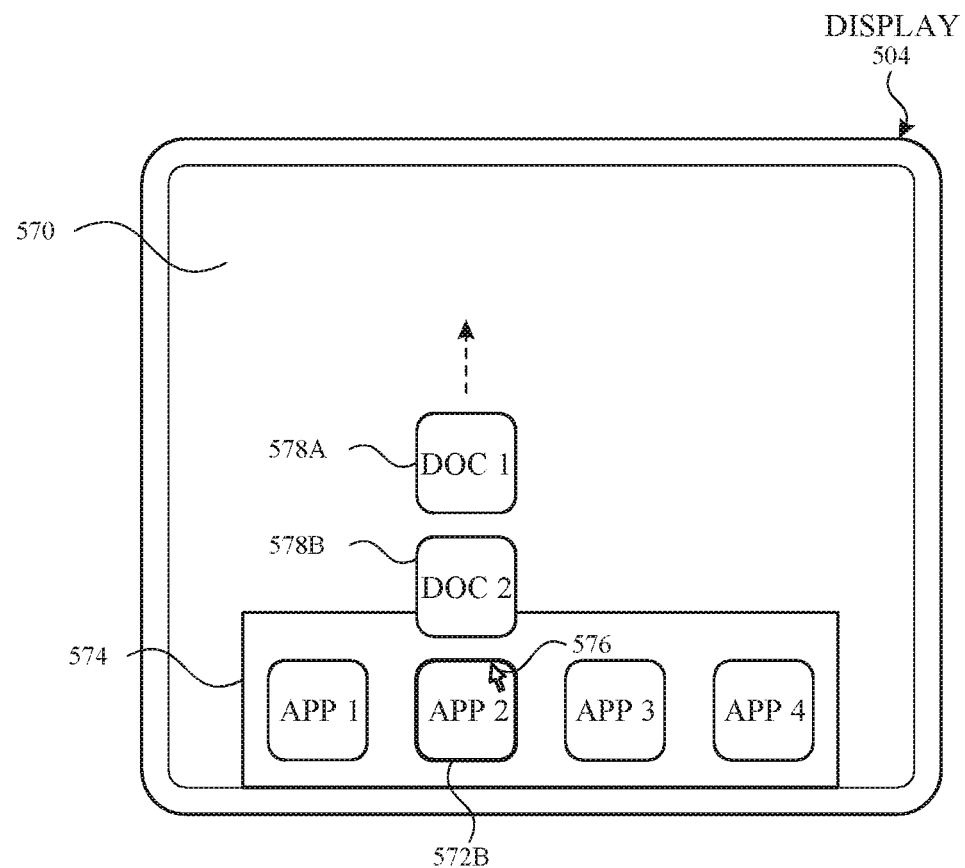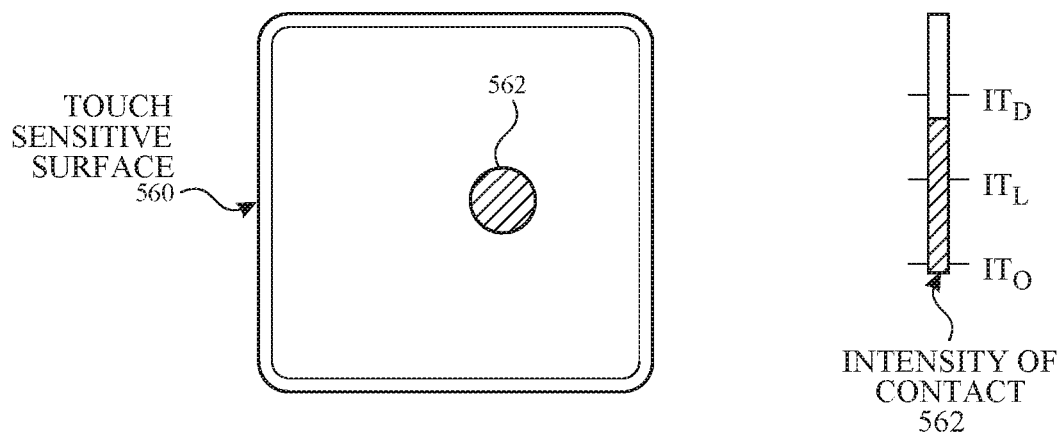
FIG. 5G

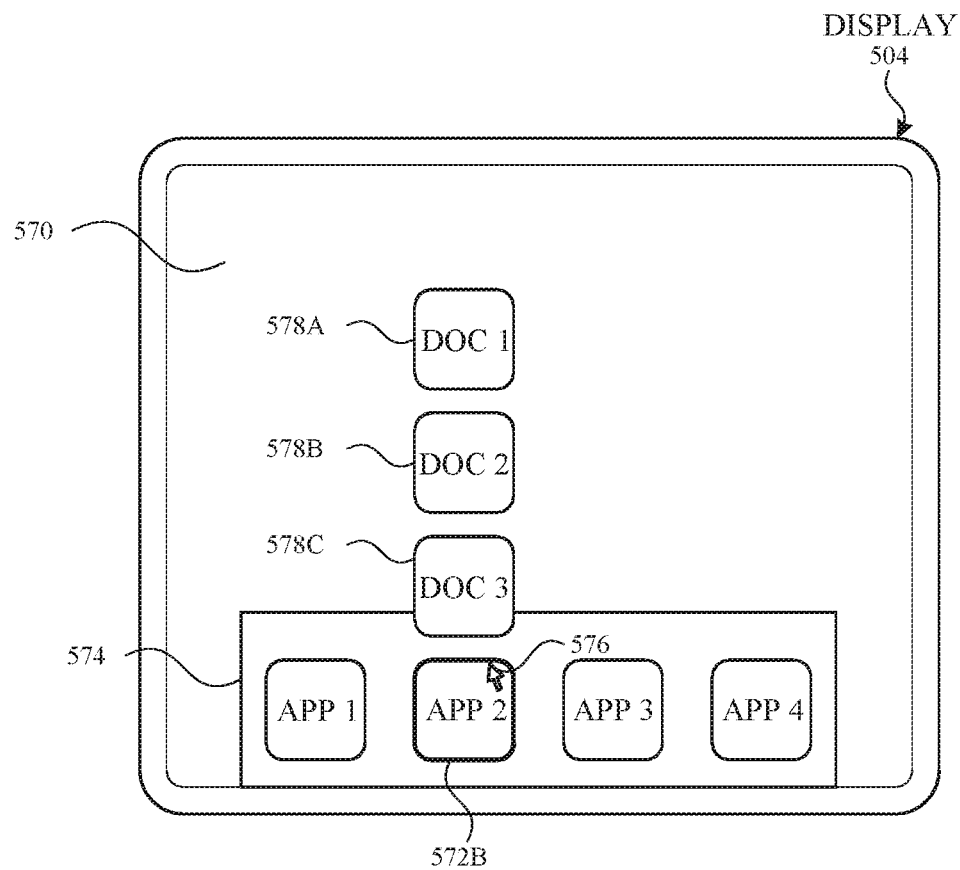
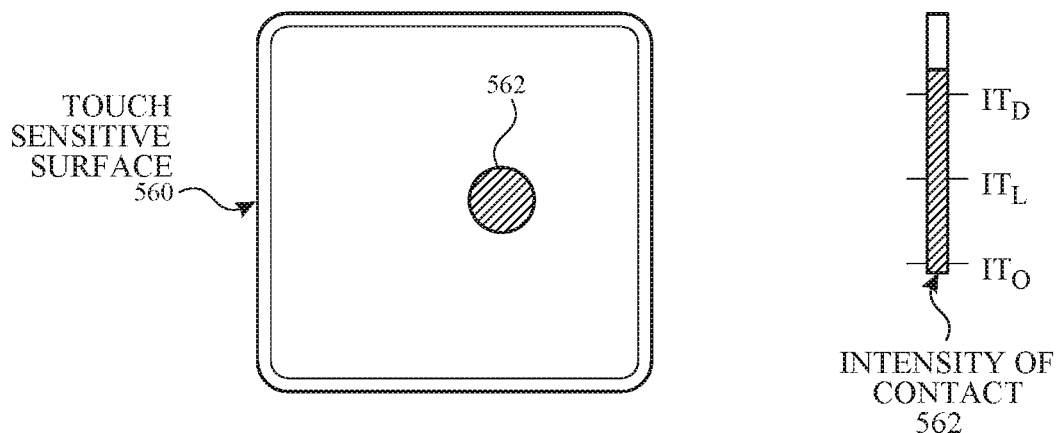
FIG. 5H

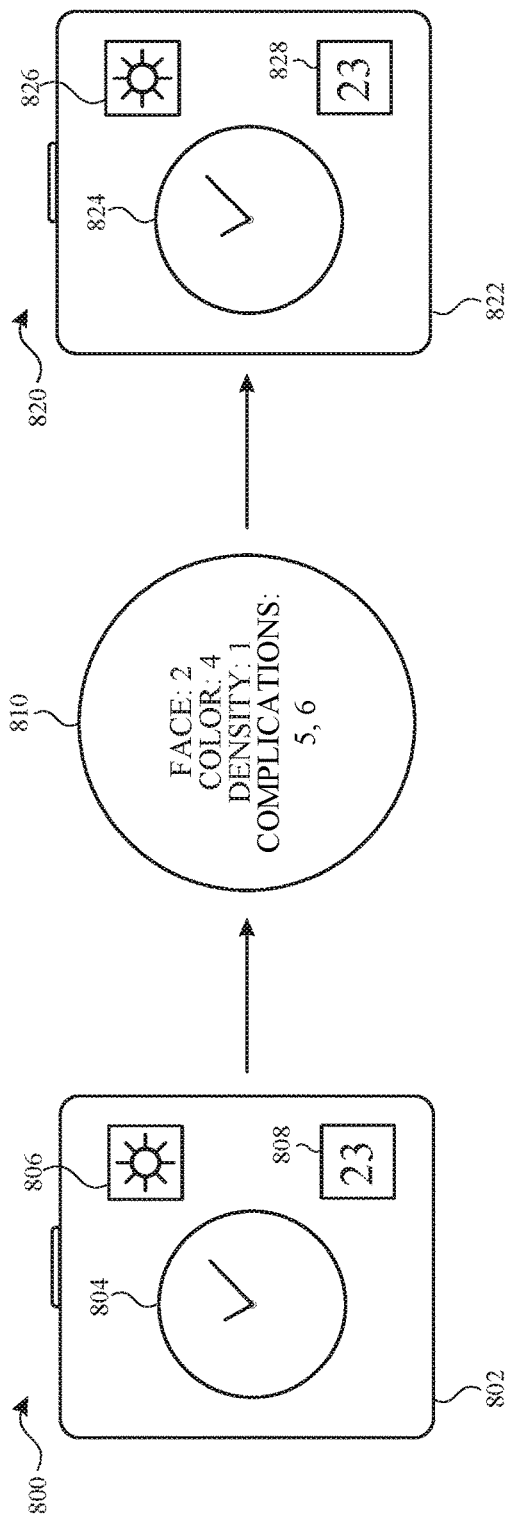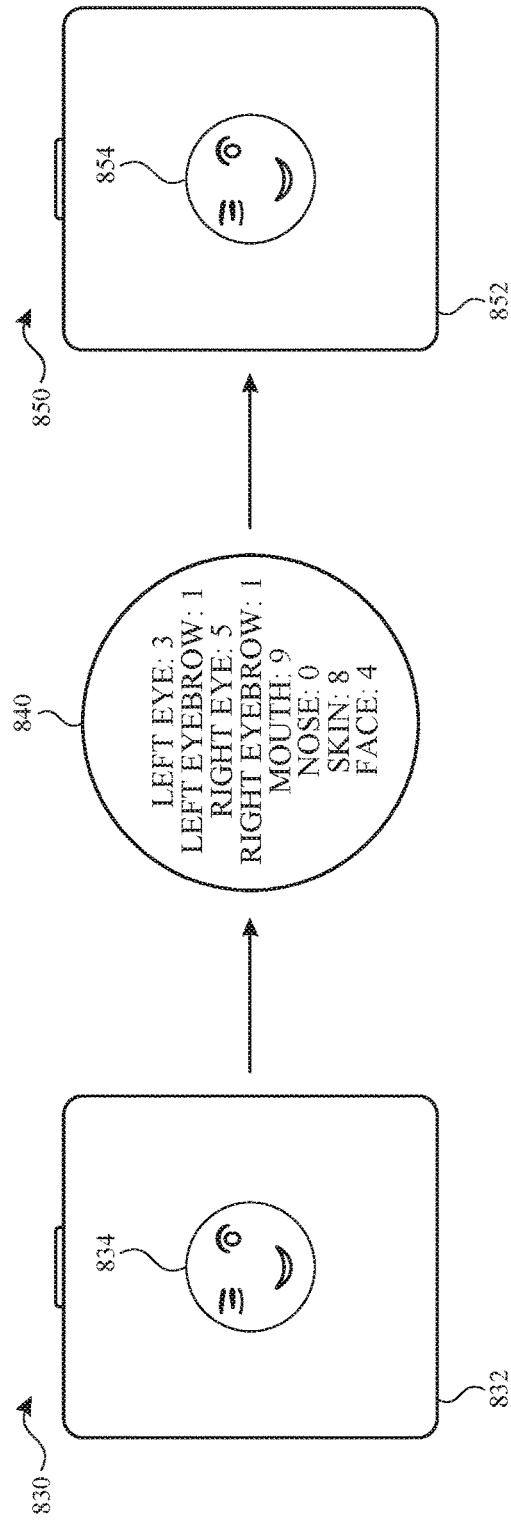

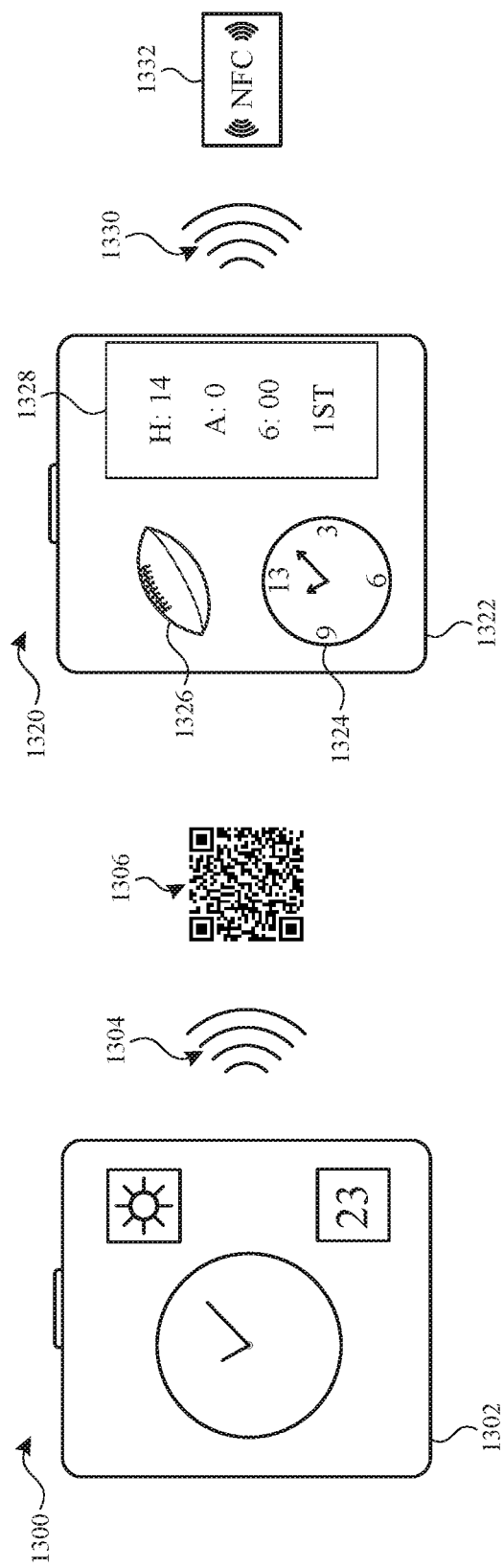

2000

2002
Display an emoji graphical object

2004
Receive a first user input corresponding to a manipulation of the emoji graphical object

2006
In response to receiving the first user input, change a visual aspect of the emoji graphical object (based on the manipulation) to generate a user-customized emoji graphical object

2008
Receive a second user input corresponding to selection of the user-customized emoji graphical object for sharing

2010
Display a user interface for selecting a recipient device

2102
Receive data identifying a manipulation for generating a user-customized emoji graphical object from an emoji graphical object stored in the memory of the device

2104
Change a visual aspect of the emoji graphical object based on the manipulation to generate the user-customized emoji graphical object

2106
Display the user-customized emoji graphical object

Receive data representing a user-configurable graphical construct. Data includes:

Information representing a first graphical element of the user-configurable construct. Information includes data identifying a first graphical asset of the discrete set and data indicating the arrangement of the first graphical asset.

Information representing a second graphical element of the user-configurable construct. Information includes data identifying a second graphical asset of the discrete set and data indicating the arrangement of the second graphical asset.

Optionally, information representing a non-local graphical element of the user-configurable construct. Information includes data identifying a non-local graphical asset not from the discrete set, data indicating the arrangement of the non-local graphical asset, and a preview image representing the non-local graphical asset.

4204

Based on the received data and at least a subset of the discrete set of graphical assets, generate the user-configurable graphical construct or a representation of the user-configurable graphical construct Optionally, representation includes the preview image representing the non-local graphical asset.

4206

Display the user-configurable graphical construct or the representation of the user-configurable graphical construct

4208

Receive a user input, via the user interface, indicating acceptance of the user-configurable graphical construct

4210

Store the received data in memory

Display a user-configurable graphical construct or a representation of the user-configurable graphical construct

4304

Receive user input corresponding to request to share data representing the user-configurable graphical construct or a representation of the user-configurable graphical construct

4306

Optionally, display user interface for selecting a recipient device

4308

Optionally, receive user input corresponding to selection of the recipient device

4310

Transmit data representing the user-configurable graphical construct. Data includes:

Information representing a first graphical element of the user-configurable construct. Information includes data identifying a first graphical asset of the discrete set and data indicating the arrangement of the first graphical asset.

Information representing a second graphical element of the user-configurable construct. Information includes data identifying a second graphical asset of the discrete set and data indicating the arrangement of the second graphical asset.

Optionally, information representing a non-local graphical element of the user-configurable construct. Information includes data identifying a non-local graphical asset not from the discrete set, data indicating the arrangement of the non-local graphical asset, and a preview image representing the non-local graphical asset.

*FIG. 43*

SHARING USER-CONFIGURABLE GRAPHICAL CONSTRUCTS

CROSS-REFERENCE TO RELATED APPLICATIONS

This application is a U.S. National Stage patent application of PCT/US2016/021403, filed on Mar. 8, 2016, which claims priority to U.S. Provisional Patent Application Ser. No. 62/129,919, filed Mar. 8, 2015, and is a continuation-in-part of PCT/US2015/053353, filed Sep. 30, 2015, which are each hereby incorporated by reference in their entirety.

This application relates to the following applications: U.S. Provisional Application Ser. No. 62/032,562, filed Aug. 2, 2014; U.S. Provisional Application Ser. No. 62/044,994, filed Sep. 2, 2014; and U.S. Provisional Application Ser. No. 62/044,923, filed Sep. 2, 2014. The content of these applications is hereby incorporated by reference in their entirety.

FIELD

The present disclosure relates generally to computer user interfaces, and more specifically to techniques for sharing user-configurable graphical constructs.

BACKGROUND

Users rely on portable multifunction devices for many operations, such as running software application, keeping time, communicating with other users (e.g., through voice, text, and visual messages, such as emojis), and viewing information. It is desirable to allow the user to customize their user interfaces with the device, allowing the user to access information more quickly and efficiently. A user may also wish to share configurable user interfaces, e.g., send/receive a user-configured interface or emoji to/from a friend, or obtain a customized user interface from a magazine ad or sports organization. It is therefore desirable to provide various ways of sending and/or receiving user-configurable graphical constructs (e.g., user interfaces and/or other user-customized content, such as emojis) quickly and efficiently.

BRIEF SUMMARY

Of the potential techniques for sharing user-configurable graphical constructs using electronic devices, the present invention recognizes that many are generally cumbersome, inefficient, and data-intensive. For example, some techniques use a complex and time-consuming user interface (which may include multiple key presses or keystrokes) or require transfer of large amounts of data. These techniques require more time and more data transfer than necessary, wasting user time, bandwidth, and device energy. This latter consideration is particularly important in battery-operated devices.

Accordingly, the present technique provides electronic devices with faster, more efficient methods and interfaces for sharing user-configurable graphical constructs. Such methods and interfaces optionally complement or replace other methods for sharing user-configurable graphical constructs. Such methods and interfaces reduce the cognitive burden on a user and produce a more efficient human-machine interface. For battery-operated computing devices, such methods and interfaces conserve power and increase the time between battery charges.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has hardware input mechanisms such as depressible buttons and/or rotatable input mechanisms. In some embodiments, the device has a graphical user interface (GUI), one or more processors, memory, and one or more modules, programs, or sets of instructions stored in the memory for performing multiple functions. In some embodiments, the user interacts with the GUI through finger contacts and gestures on the touch-sensitive surface and/or through rotating the rotatable input mechanism and/or through depressing hardware buttons. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a method for sharing user-configurable graphical constructs comprises: at an electronic device with a display, one or more processors, and memory, the memory storing a discrete set of graphical assets: receiving data representing a user-configurable graphical construct, wherein the received data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the received data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct; subsequent to receiving the data, generating the user-configurable graphical construct or a representation of the user-configurable graphical construct based on the received data and at least a subset of the discrete set of graphical assets stored in the memory; subsequent to generating the user-configurable graphical construct or the representation of the user-configurable graphical construct, displaying: the generated user-configurable graphical construct or the generated representation of the user-configurable graphical construct, and a user interface for accepting the user-configurable graphical construct; receiving a user input, via the user interface, indicating acceptance of the user-configurable graphical construct; and in response to receiving the user input: storing the received data in the memory of the electronic device.

In some embodiments, a method for sharing user-configurable graphical constructs comprises: at an electronic device with a display, one or more processors, and memory, the memory storing a discrete set of graphical assets: displaying a user-configurable graphical construct or a representation of the user-configurable graphical construct; receiving a first user input corresponding to a request to share data representing the user-configurable graphical construct; and in response to receiving the first user input, transmitting the data representing the user-configurable graphical construct, wherein the transmitted data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

In some embodiments, a non-transitory computer-readable storage medium comprises one or more programs for execution by one or more processors of a first device with a display and a memory, the memory storing a discrete set of graphical assets, and the one or more programs including instructions which, when executed by the one or more processors, cause the first device to: receive data representing a user-configurable graphical construct, wherein the received data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the received data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct; subsequent to receiving the data, generate the user-configurable graphical construct or a representation of the user-configurable graphical construct based on the received data and at least a subset of the discrete set of graphical assets stored in the memory; subsequent to generating the user-configurable graphical construct or the representation of the user-configurable graphical construct, display: the generated user-configurable graphical construct or the generated representation of the user-configurable graphical construct, and a user interface for accepting the user-configurable graphical construct; receive a user input, via the user interface, indicating acceptance of the user-configurable graphical construct; and in response to receiving the user input: store the received data in the memory of the first device.

In some embodiments, a non-transitory computer-readable storage medium comprises one or more programs for execution by one or more processors of a first device with a display and a memory, the memory storing a discrete set of graphical assets, and the one or more programs including instructions which, when executed by the one or more processors, cause the first device to: display a user-configurable graphical construct or a representation of the user-configurable graphical construct; receive a first user input corresponding to a request to share data representing the user-configurable graphical construct; and in response to receiving the first user input, transmit the data representing the user-configurable graphical construct, wherein the transmitted data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

In some embodiments, a device comprises a display; one or more processors; a memory, the memory storing a discrete set of graphical assets; and one or more programs, wherein the one or more programs are stored in the memory and configured to be executed by the one or more processors, the one or more programs including instructions for: receiving data representing a user-configurable graphical construct, wherein the received data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the received data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct; subsequent to receiving the data, generating the user-configurable graphical construct or a representation of the user-configurable graphical construct based on the received data and at least a subset of the discrete set of graphical assets stored in the memory; subsequent to generating the user-configurable graphical construct or the representation of the user-configurable graphical construct, displaying: the generated user-configurable graphical construct or the generated representation of the user-configurable graphical construct, and a user interface for accepting the user-configurable graphical construct; receiving a user input, via the user interface, indicating acceptance of the user-configurable graphical construct; and in response to receiving the user input: storing the received data in the memory of the electronic device.

In some embodiments, a device comprises a display; one or more processors; a memory, the memory storing a discrete set of graphical assets; and one or more programs, wherein the one or more programs are stored in the memory and configured to be executed by the one or more processors, the one or more programs including instructions for: displaying a user-configurable graphical construct or a representation of the user-configurable graphical construct; receiving a first user input corresponding to a request to share data representing the user-configurable graphical construct; and in response to receiving the first user input, transmitting the data representing the user-configurable graphical construct, wherein the transmitted data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

In some embodiments, a device comprises means for receiving data representing a user-configurable graphical construct, wherein the received data includes: first information representing a first graphical element of the user-configurable construct, the first information representing the first graphical element including i) data identifying a first graphical asset of the discrete set of graphical assets, the first graphical asset being part of a discrete set of graphical assets stored in a memory of the device, and ii) data indicating the arrangement of the first graphical asset in the user-configurable graphical construct, and wherein the received data further includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the received data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct; means for, subsequent to receiving the data, generating the user-configurable graphical construct or a representation of the user-configurable graphical construct based on the received data and at least a subset of the discrete set of graphical assets stored in the memory; means for, subsequent to generating the user-configurable graphical construct or the representation of the user-configurable graphical construct, displaying: the generated user-configurable graphical construct or the generated representation of the user-configurable graphical construct, and a user interface for accepting the user-configurable graphical construct; means for receiving a user input, via the user interface, indicating acceptance of the user-configurable graphical construct; and means responsive to receiving the user input for storing the received data in the memory of the electronic device.

In some embodiments, a device comprises means for displaying a user-configurable graphical construct or a representation of the user-configurable graphical construct; means for receiving a first user input corresponding to a request to share data representing the user-configurable graphical construct; means responsive to receiving the first input for transmitting the data representing the user-configurable graphical construct, wherein the transmitted data includes: first information representing a first graphical element of the user-configurable construct, the first information representing the first graphical element including i) data identifying a first graphical asset of the discrete set of graphical assets, the first graphical asset being part of a discrete set of graphical assets stored in a memory of the device, and ii) data indicating the arrangement of the first graphical asset in the user-configurable graphical construct, and wherein the transmitted data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

Thus, devices are provided with faster, more efficient methods and interfaces for sharing user-configurable graphical constructs, thereby increasing the effectiveness, efficiency, and user satisfaction with such devices. Such methods and interfaces may complement or replace other methods for sharing user-configurable graphical constructs.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 8A and 8B illustrate exemplary user interfaces for sharing user-configurable graphical constructs.

FIGS. 13A and 13B illustrate exemplary user interfaces for sharing user-configurable graphical constructs.

FIG. 20A is a flow diagram illustrating a process for sharing user-configurable graphical constructs.

FIG. 21 is a flow diagram illustrating a process for sharing user-configurable graphical constructs.

FIG. 42 is a flow diagram illustrating a process for receiving data representing user-configurable graphical constructs in accordance with some embodiments.

FIG. 43 is a flow diagram illustrating a process for transmitting data representing user-configurable graphical constructs in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

As described above, there is a need for electronic devices that provide efficient methods and interfaces for sharing user-configurable graphical constructs. Users may wish to send and receive customized user-configurable graphical constructs from various sources. It is desirable for these sending and receiving operations to be accomplished quickly, efficiently, and using minimal bandwidth. Such techniques can reduce the cognitive burden on a user who wishes to send or receive custom content, thereby enhancing productivity. Further, such techniques can reduce processor and battery power otherwise wasted on redundant user inputs.

Figure 29:
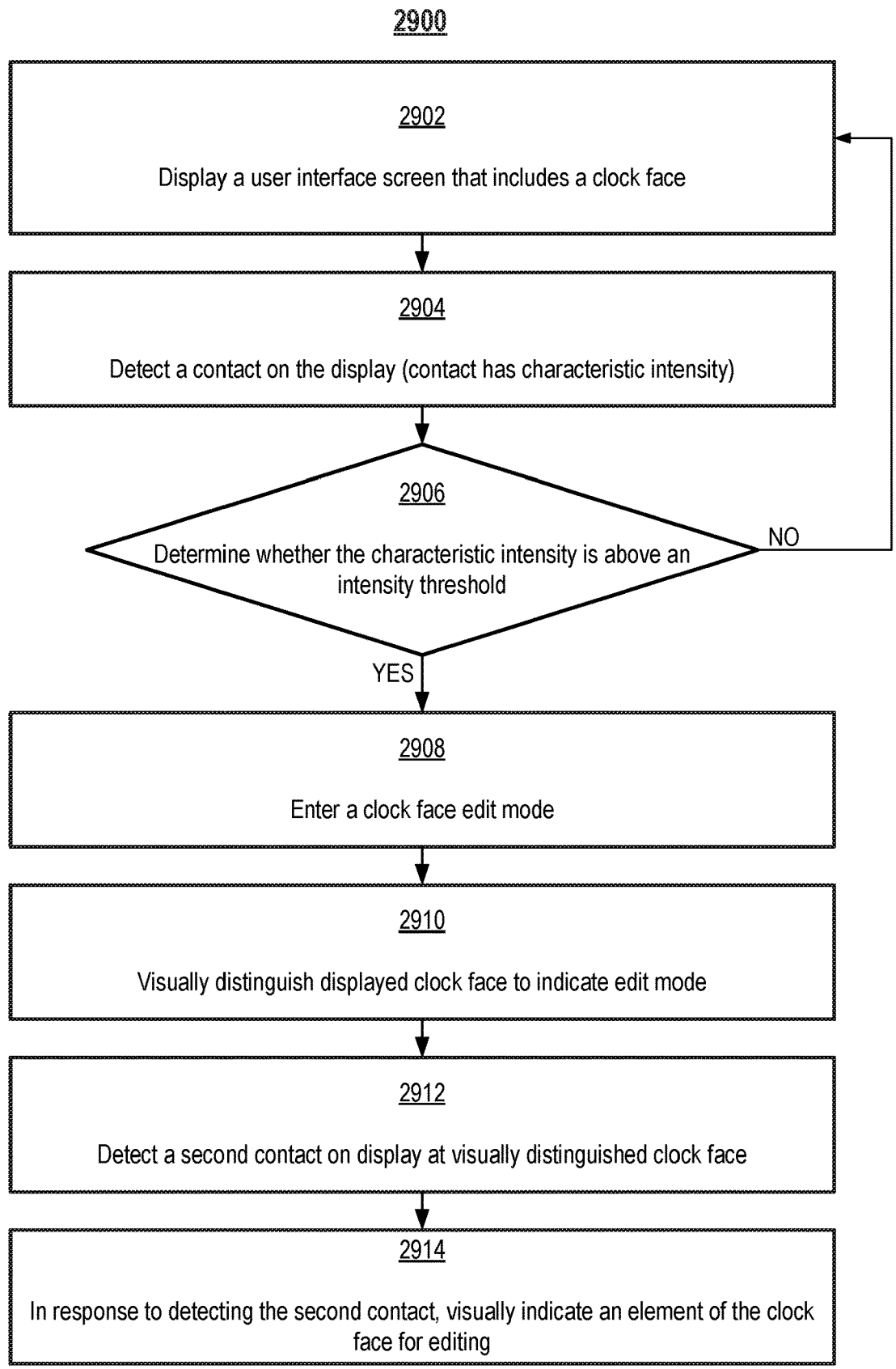
FIG. 29 is a flow diagram illustrating a process for customizing user-configurable graphical constructs.
Figure 30:
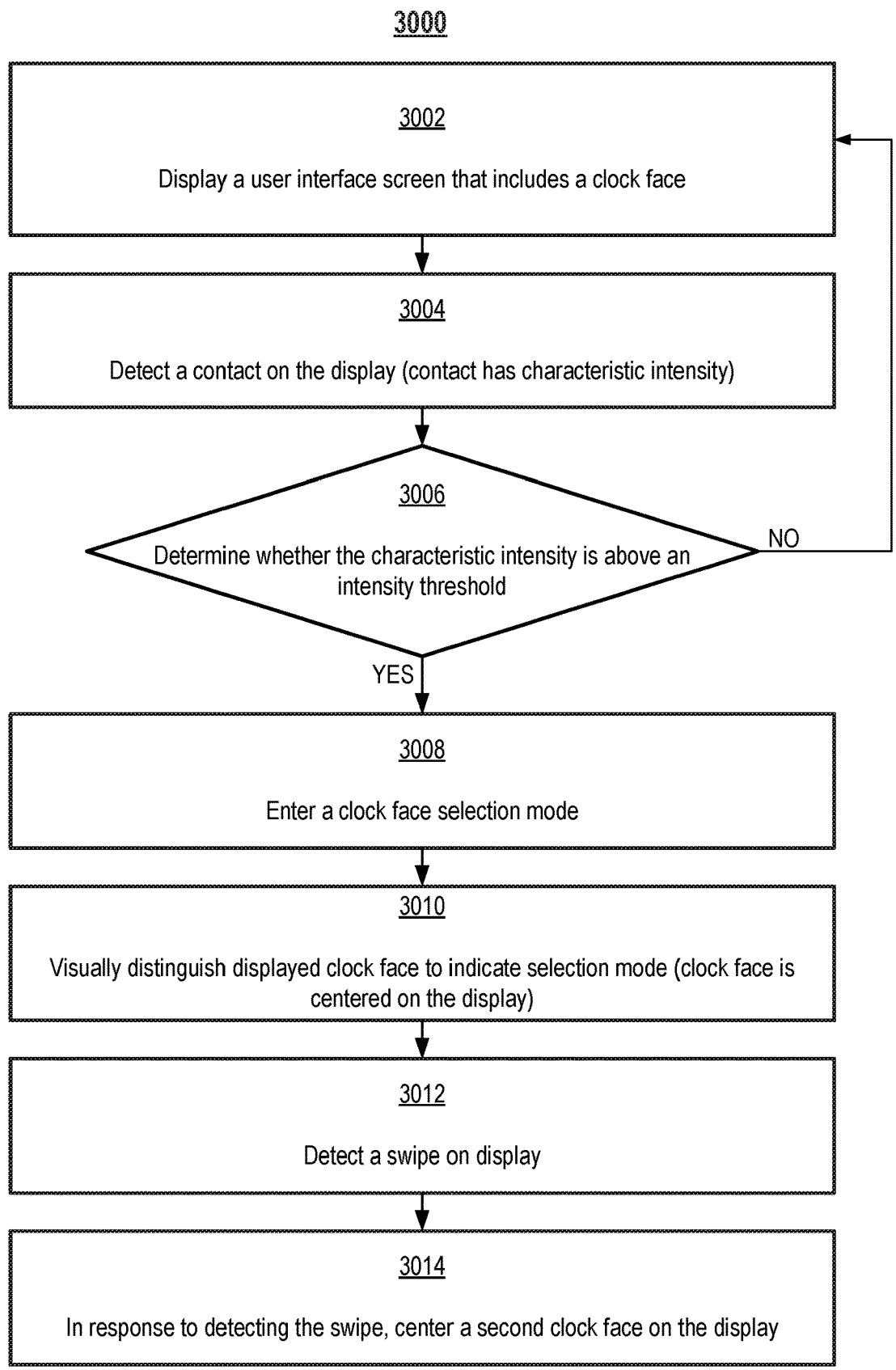
FIG. 30 is a flow diagram illustrating a process for selecting user-configurable graphical constructs.
Figure 31:
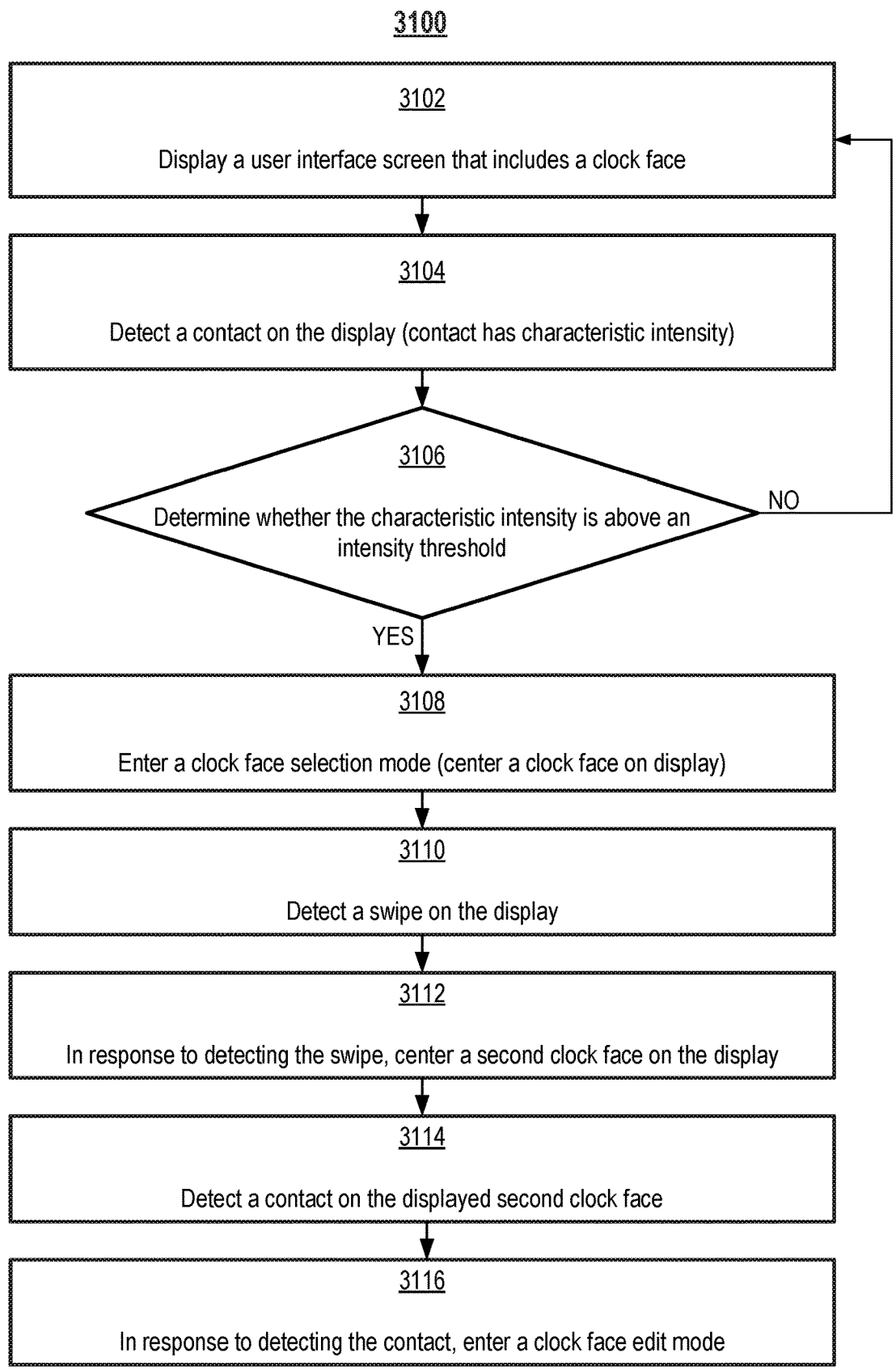
FIG. 31 is a flow diagram illustrating a process for customizing and/or selecting user-configurable graphical constructs.

Below, FIGS. 1A-1B, 2, 3, 4A-4B, and 5A-5B provide a description of exemplary devices for performing the techniques for sharing user-configurable graphical constructs. FIGS. 6-15, 16B, 17, and 32A-41 illustrate exemplary user interfaces for sharing user-configurable graphical constructs. FIGS. 16A, 18-21, 42, and 43 are flow diagrams illustrating methods of sharing user-configurable graphical constructs in accordance with some embodiments. The user interfaces in FIGS. 6-15, 16B, 17, and 32A-41 are used to illustrate the processes described below, including the processes in FIGS. 16A, 18-21, 42, and 43. FIGS. 26-28C illustrate exemplary user interfaces for customizing and/or selecting user-configurable graphical constructs. FIGS. 29-31 are flow diagrams illustrating methods of customizing and/or selecting user-configurable graphical constructs in accordance with some embodiments. The user interfaces in FIGS. 6-15, 16B, 17, 26-28C, and 32A-41 are used to illustrate the processes described below, including the processes in FIGS. 16A, 18-21, and 29-31, 42, and 43.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
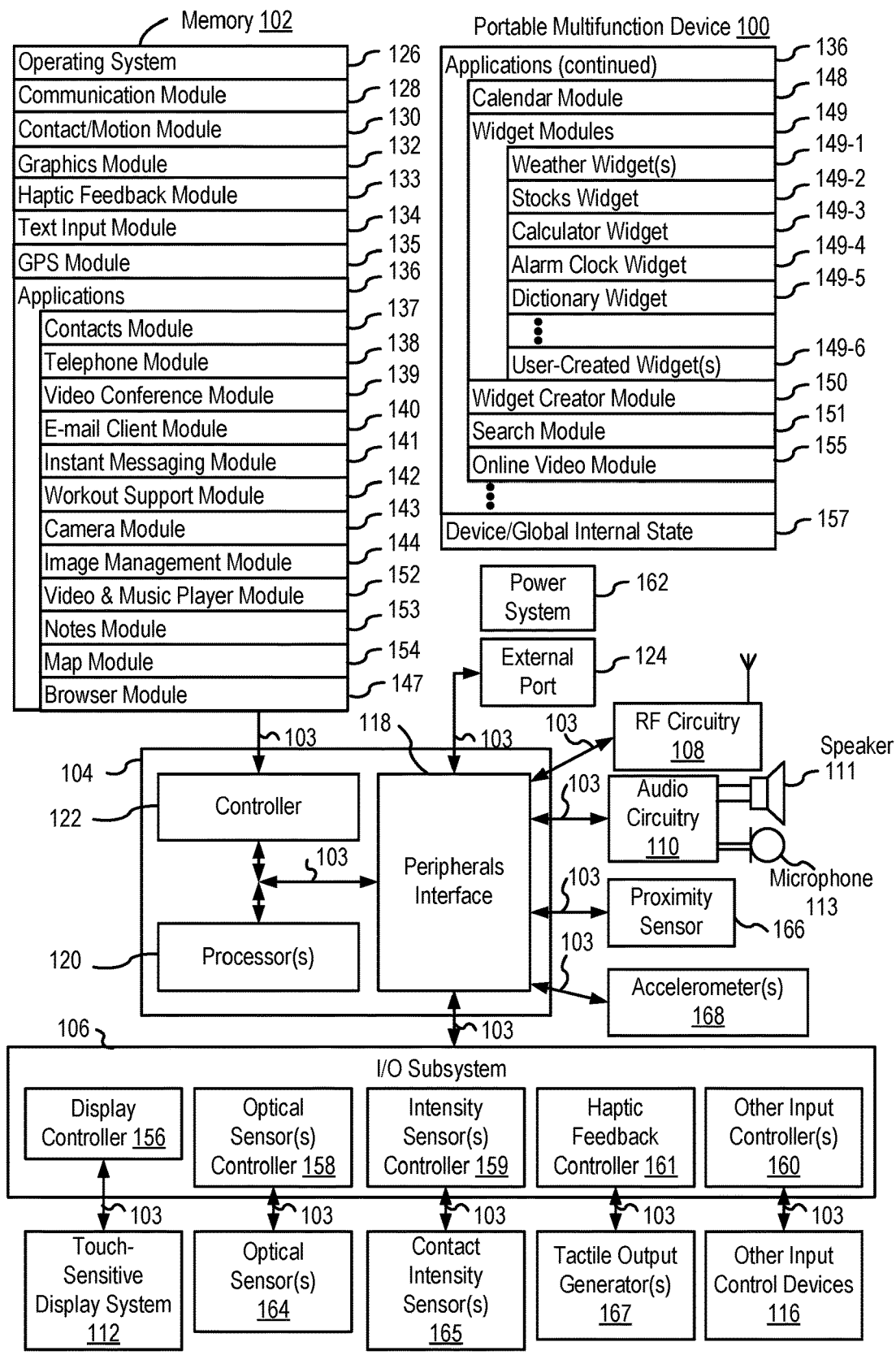
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
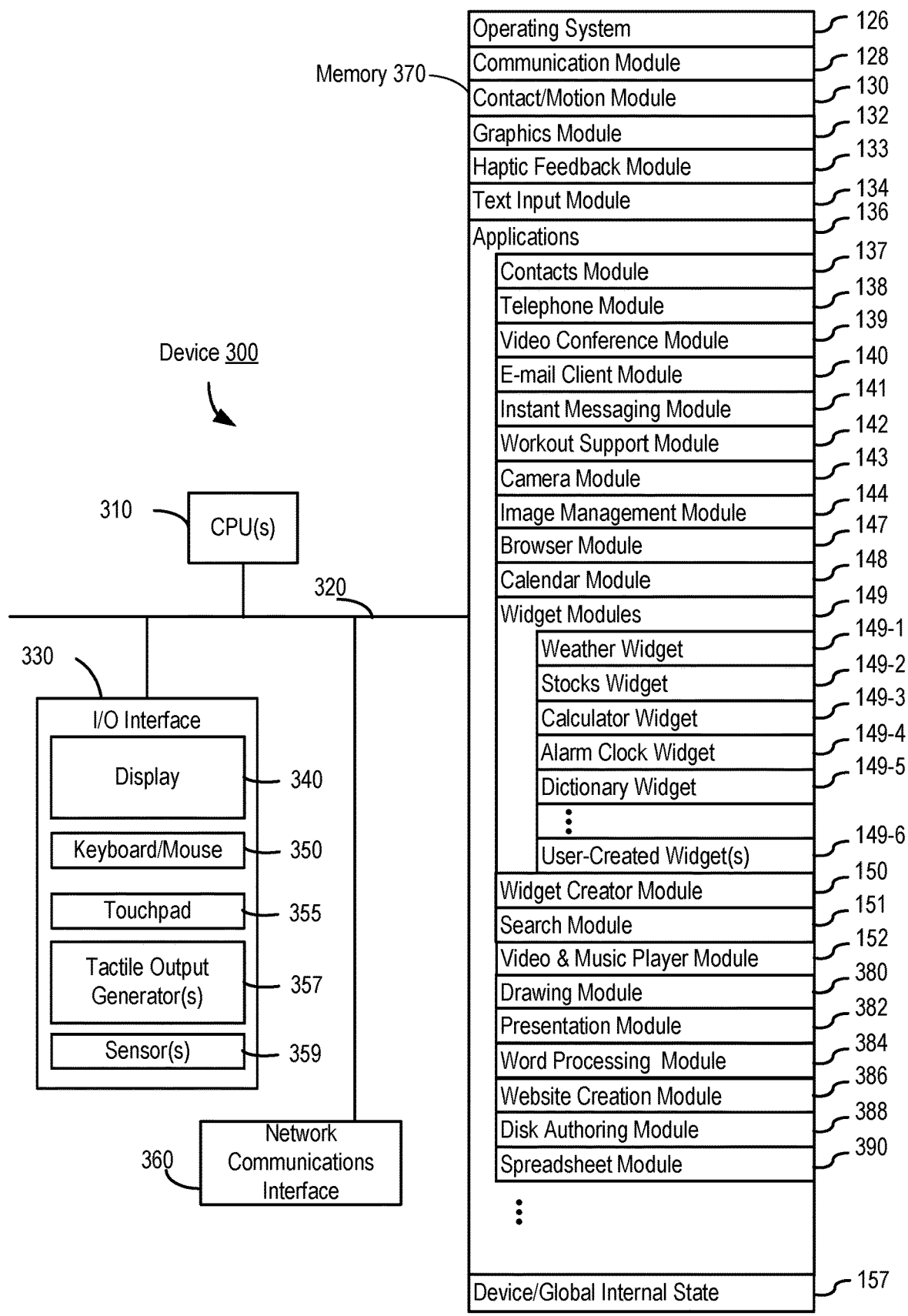
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
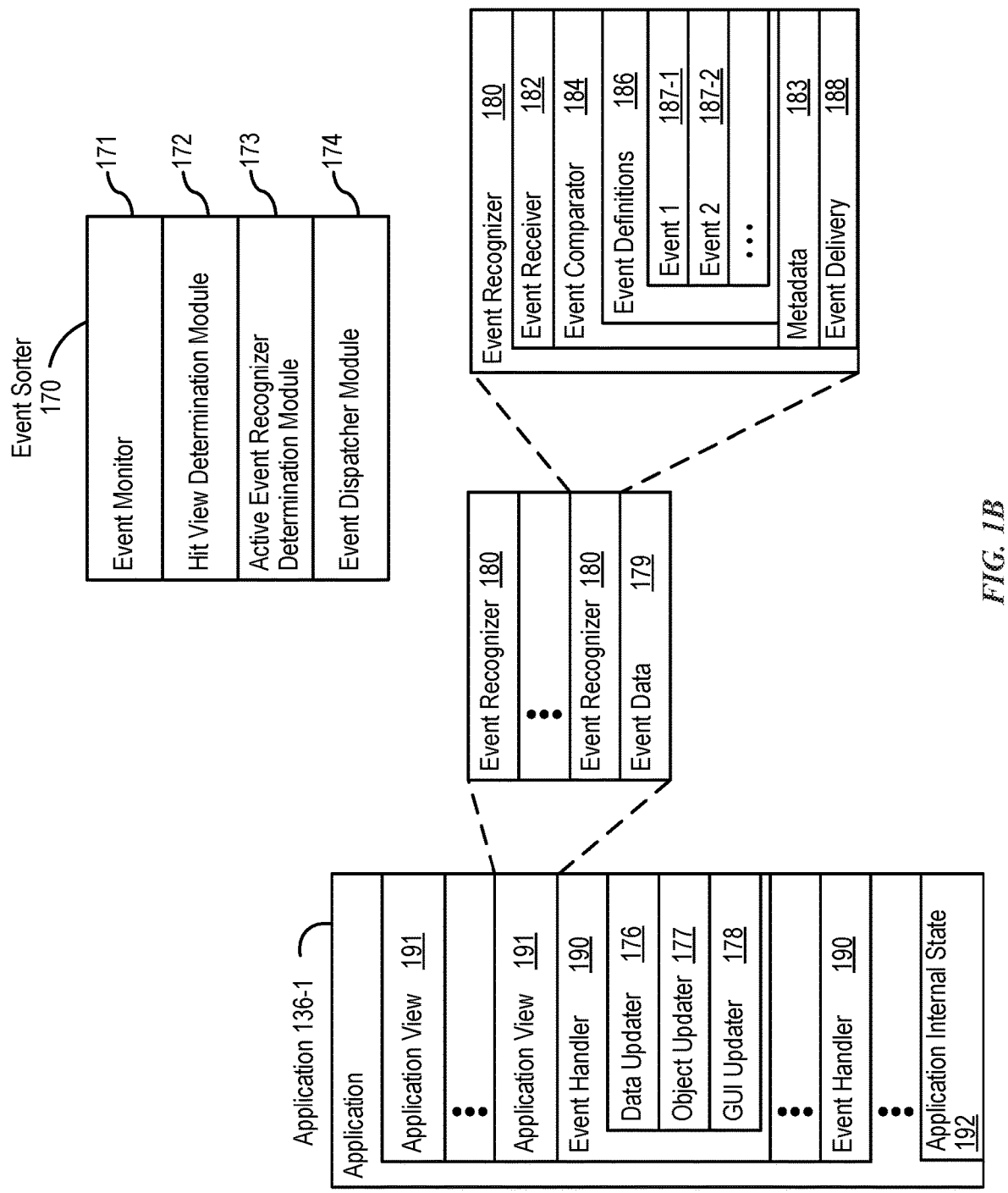
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
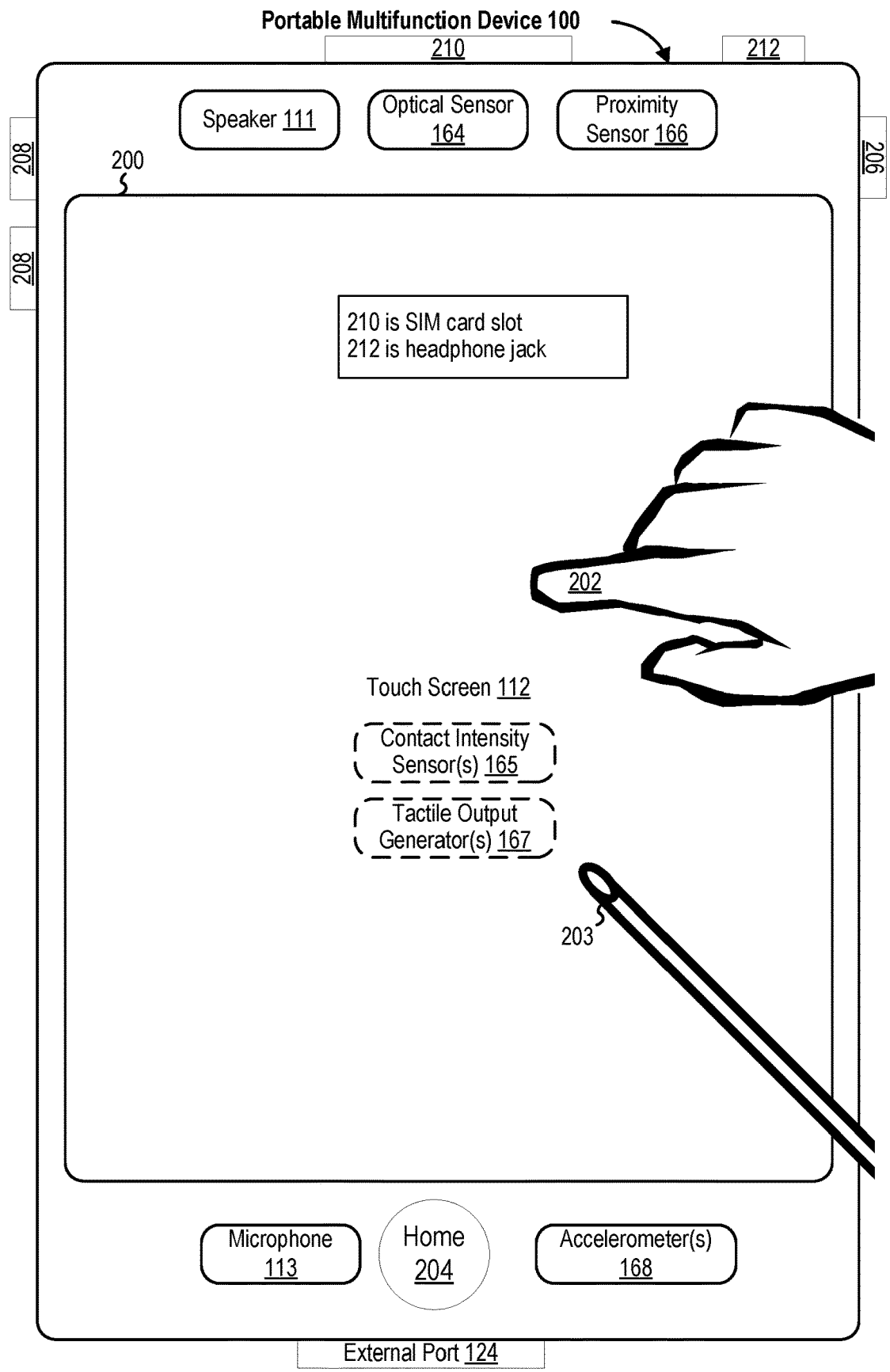
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
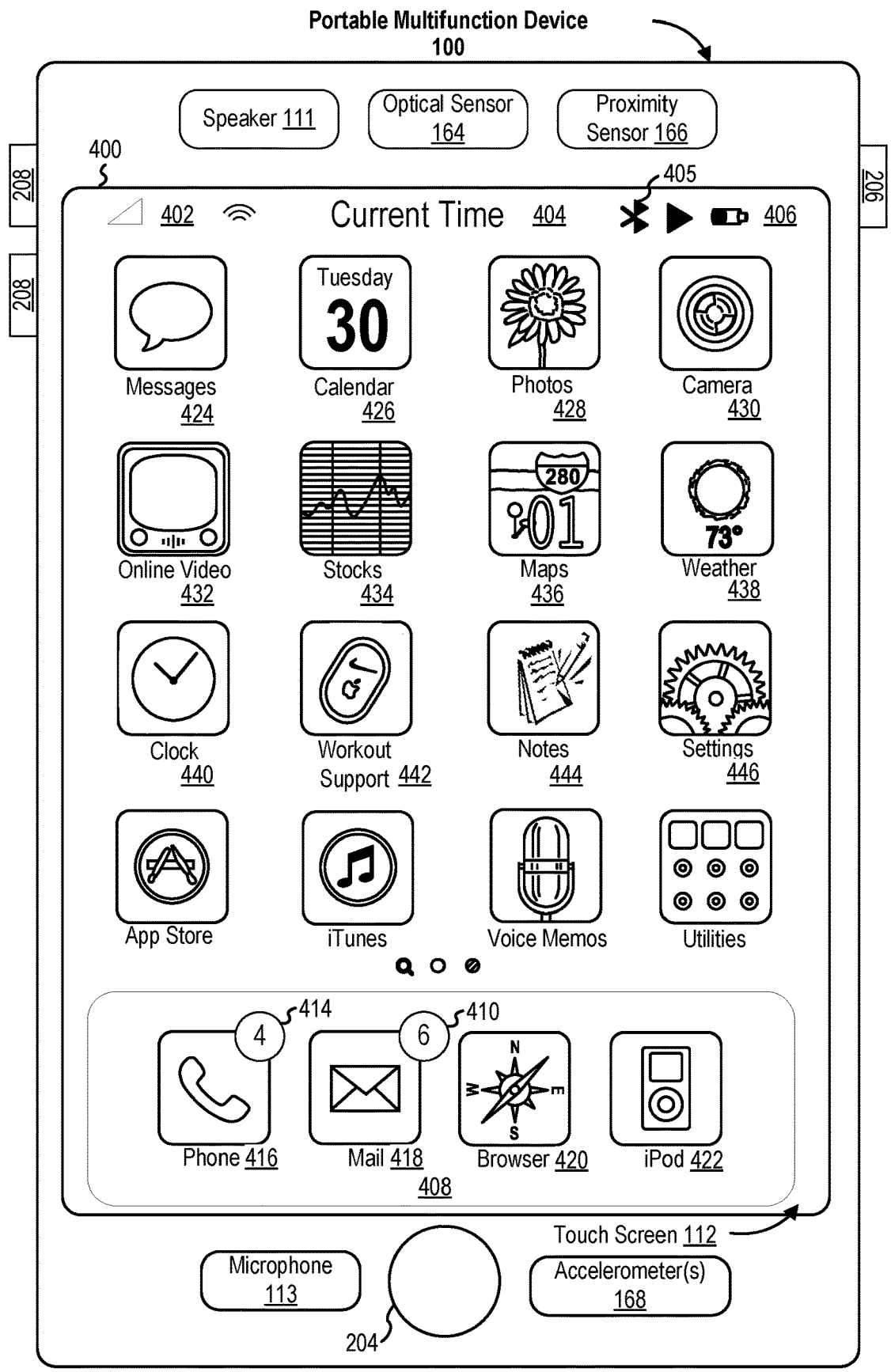
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
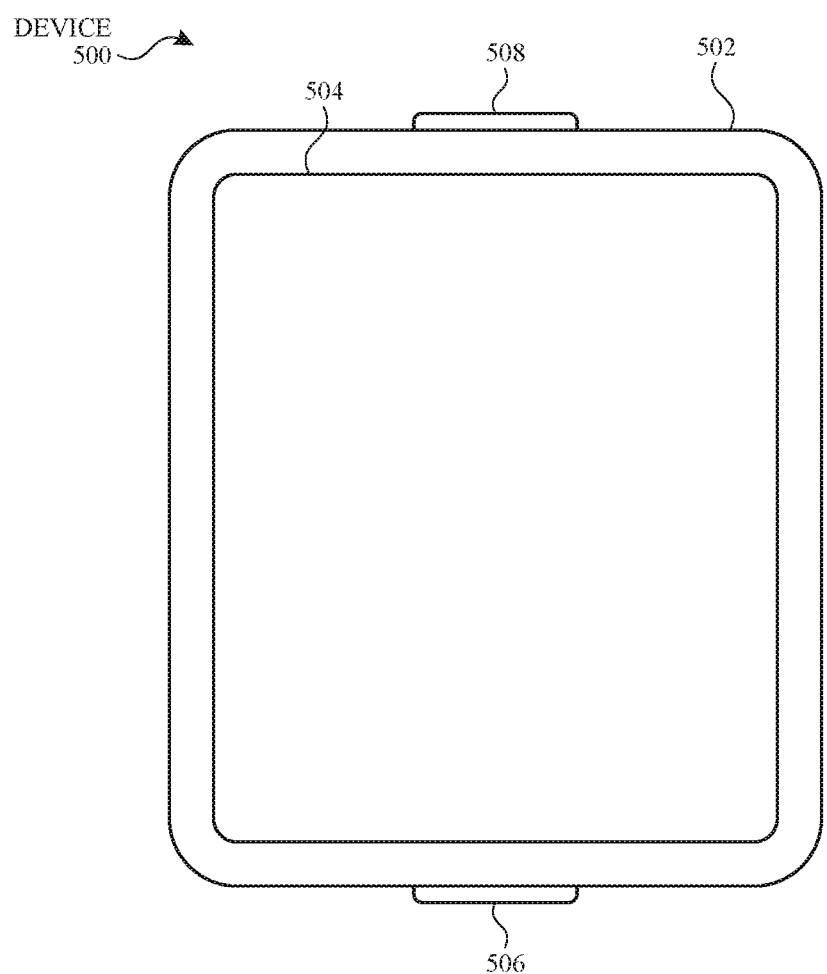
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
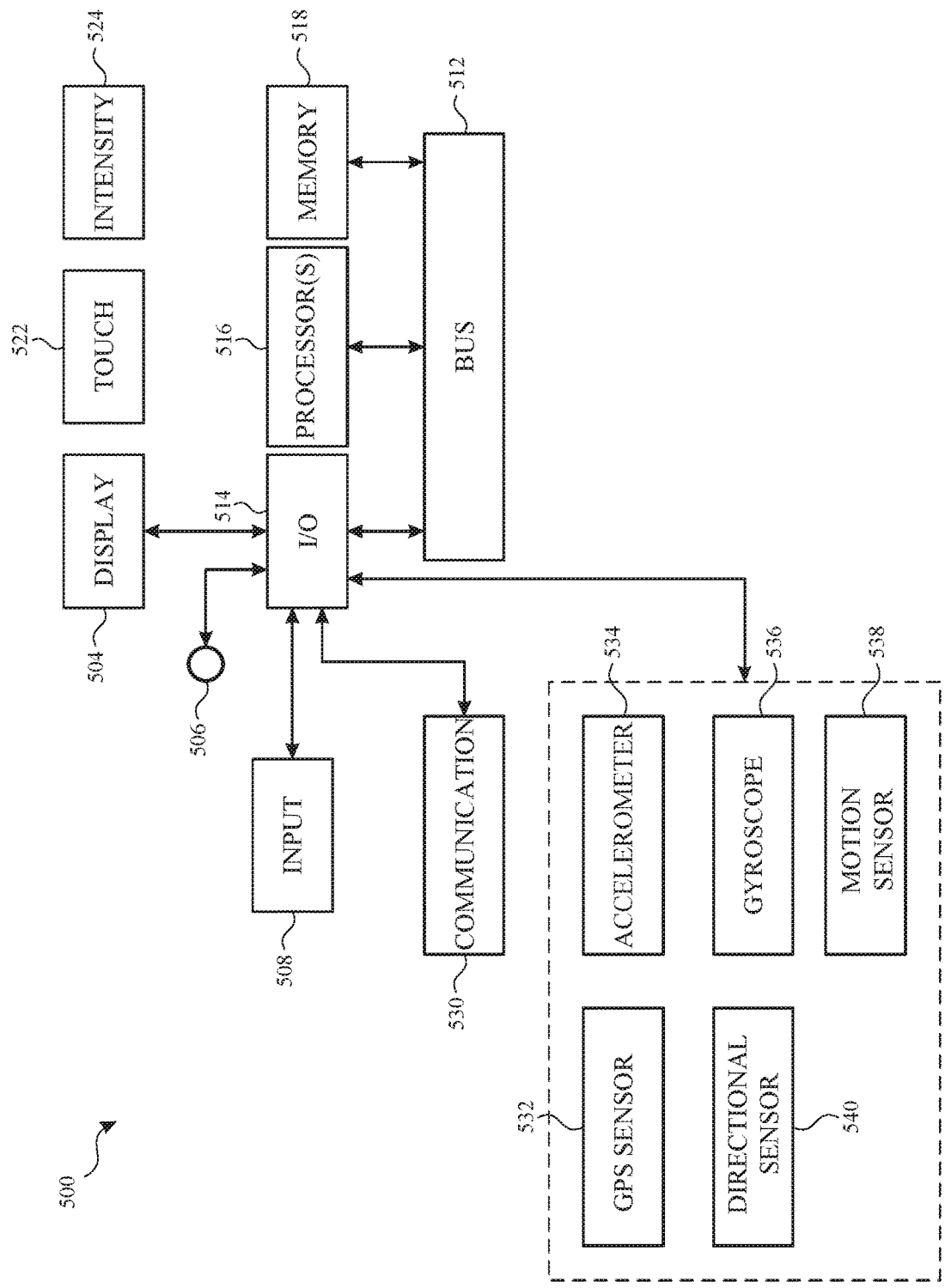
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described below, including processes 1600, 1800-2100, 2900-3100, 4000, and 4100 (FIGS. 16A, 18-21, 29-31, 40, and 41). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
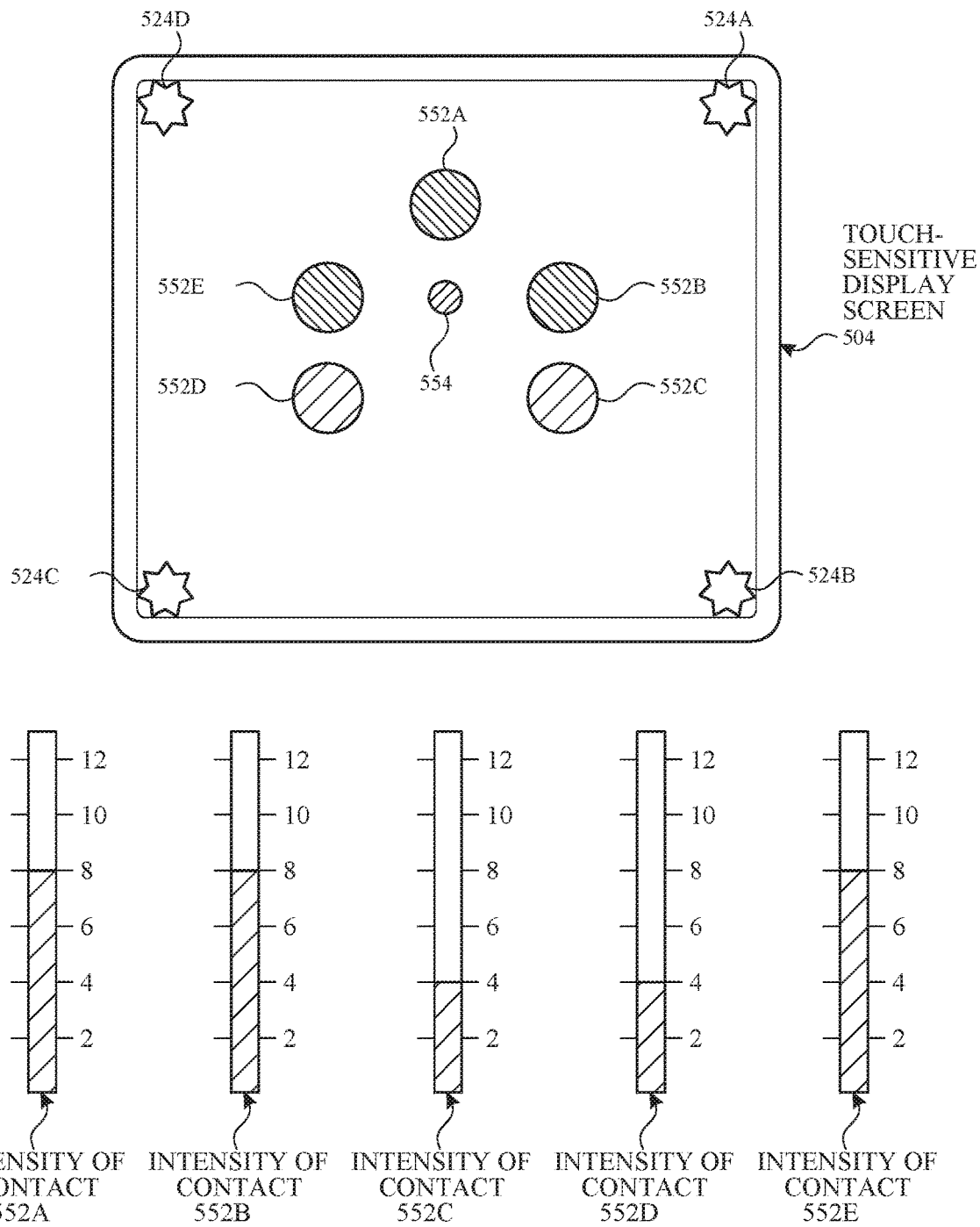

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are optionally implemented on an electronic device, such as portable multifunction device 100, device 300, or device 500.

As described above, it is desirable to provide a user with the ability to customize various features of a user interface or other graphical construct on an electronic device, such as portable multifunction device 100, device 300, or device 500. Exemplary classes of graphical constructs for which customization may be desirable include without limitation context-specific user interfaces (e.g., watch faces, time keeping interfaces, and the like) and emoji graphical objects.

To begin with the specific example of watch faces, a user may wish to customize a watch face with particular watch face features. Exemplary watch faces, as well as interfaces for selecting, editing, and otherwise configuring watch faces and/or watch face features or elements, are described in International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; and International Patent Application Serial No. PCT/US2015/034607, titled "Context-Specific User Interfaces," filed Jun. 7, 2015, published as WIPO Publication No. WO/2016/022205; each of which is hereby incorporated by reference in its entirety. Each "base" watch face (e.g., a watch face not yet customized by the user, such as a watch face loaded in the memory of a portable multi-function device before user customization) optionally has its own particular customizable watch face features. For example, a stopwatch watch face (see, e.g., FIGS. 7A and 7B in WO/2016/022203, WO/2016/022204, and WO/2016/022205) optionally includes watch face features such as a stopwatch hand, a stopwatch timescale indicator, and a start/stop affordance, whereas a watch face with watch complications (see, e.g., FIGS. 28A-28C) optionally includes watch face features such as an analog time indicator (e.g., a representation of an analog clock with an hour hand, a minute hand, and one or more hourly indications), a digital time indicator (e.g., a representation of a digital clock with an hour and minute indications), and/or one or more complications (e.g., complications displaying information from an application, a custom monogram, or other watch complications). Those of skill in the art will readily appreciate that many other types of watch faces may be used.

Starting with a base watch face with particular watch face features, a user may wish to customize the watch face by configuring a variety of aspects of the watch face. For example, a user may wish to configure colors (e.g., a background color, a seconds hand color, a color of an hour or minute indicator, a color of a representation of a digital clock, etc.), display density (e.g., the number of visible divisions of time or hour/minute indicators, which may be numerical and/or symbolic; the number of watch hands; and so forth), and/or complications (e.g., a type or amount of information pulled from an application and displayed as a complication; an application from which complication information is obtained; and so on). Those of skill in the art will readily appreciate that many other customizable aspects of a watch face may be used. Exemplary techniques for customizing and selecting watch faces are provided infra (e.g., as described in reference to FIGS. 26-28C).

Figure 6:
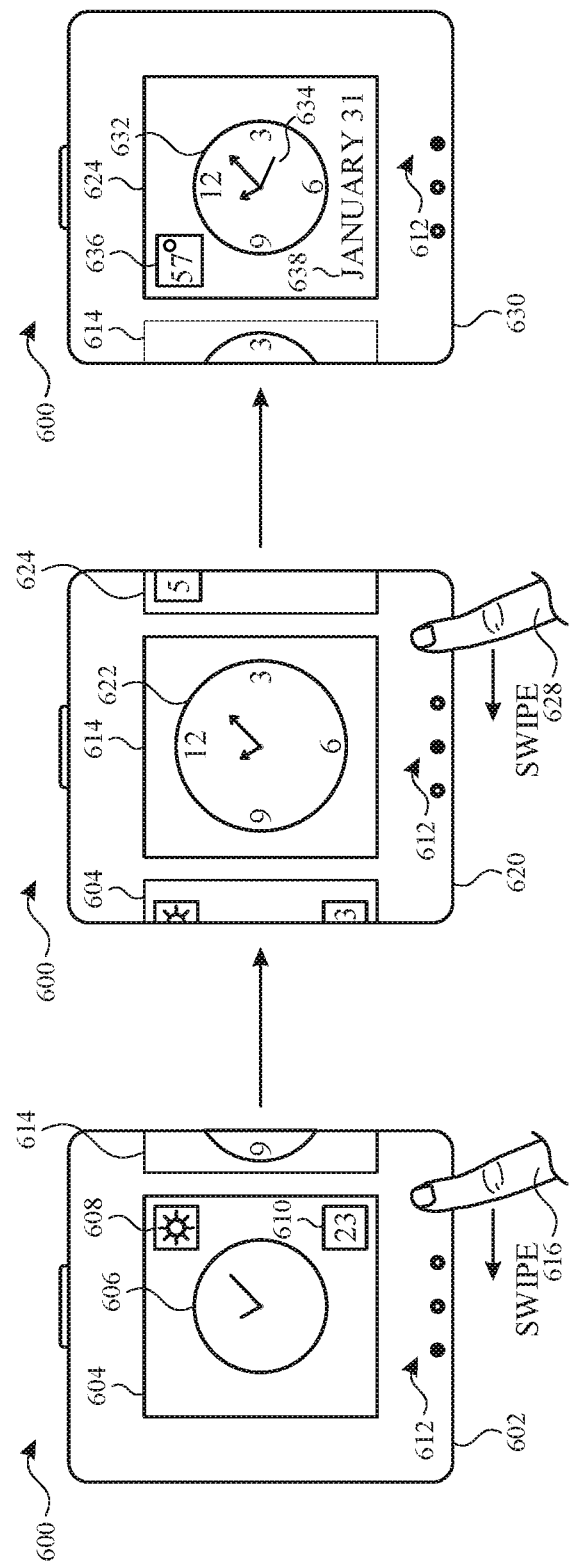
FIG. 6 illustrates exemplary user interfaces for sharing user-configurable graphical constructs.

FIG. 6 illustrates exemplary user interfaces for sharing user-configurable graphical constructs that are optionally operated on device 600, in accordance with some embodiments. Optionally, device 600 is device 100, 300, or 500 in some embodiments. The electronic device has a display (e.g., 504). The user interfaces in this figure are used to illustrate the processes described below, including the processes in FIG. 18.

As shown in FIG. 6, device 600 is displaying screen 602, which includes a graphical representation 604 corresponding to a user-configurable graphical construct. In some embodiments, the user-configurable graphical construct optionally includes a watch face. In FIG. 6, the user-configurable graphical construct of which a representation is shown on screen 602 is a watch face that contains independently configurable graphical elements (e.g., aspects of the watch face, such as a clock face, display density, color, and/or one or more complications). Graphical representation 604 represents the independently configurable graphical elements of the watch face, such as a representation of an analog clock 606 and complications 608 and 610. Complication 608 is a weather complication that displays information from a weather application. For example, complication 608 can optionally show a current weather condition (e.g., at the current location of device 600, obtainable by GPS module 135): in this case, a sun for sunny weather. Complication 610 is a calendar complication that displays the current date (e.g., information from a calendar application). Clock 606 has a relatively low display density, showing only hour and minute hands with no hour or minute indications (numerical or symbolic). Clock 606 optionally includes one or more user-configurable colors, such as a color of the clock face background, or a color of an hour or minute hand. In some embodiments, the watch face may include configurable aspects of the watch face that may be independently selected from other aspects including, for example, watch complications, color, display density, and watch face features.

The specific graphical elements of the graphical construct represented by graphical representation 604 have optionally been independently configured by the user to generate this specific customization. While graphical representation 604 optionally contains many graphical elements, each individual graphical element is a particular configuration of one or more variables, with each variable corresponding to a particular graphical asset stored in the memory of device 600 (e.g., memory 518). Each configuration of a graphical element can optionally be selected from a discrete set of graphical assets stored in the memory of device 600. For example, the user may select a red hour hand as a graphical element on their watch face, which corresponds to the graphical asset representing the red hour hand, selected from a discrete set of hour hand options and other graphical assets. The user may select a low display density, which leads to foregoing display of hour and/or minute indications, or the user may select a higher display density, which leads to the display of a number of hour and/or minute indications corresponding to individual graphical assets.

Device 600 optionally has several user-configurable graphical constructs stored in memory (e.g., a library of stored user-configurable graphical constructs), as illustrated in FIG. 6. Screen 602 shows a partial view of a second user-configurable graphical construct 614, indicating to the user that other graphical constructs are available. Also shown on screen 602 is paging affordance 612. Paging affordances optionally indicate where the user is within a sequence of options, as well as how many options are available in the sequence. Paging affordance 612 on screen 602 indicates that the user is viewing the first of three selectable graphical constructs. In some embodiments, two or more graphical representations from the plurality of graphical representations may be displayed. In other embodiments, a single graphical representation from the plurality of graphical representations is displayed. In some embodiments, a name associated with a graphical representation is displayed.

In some embodiments, a user swipes the display (e.g., swipe 616), and in response to detecting the swipe, device 600 displays screen 620. Screen 620 shows second graphical representation 614, corresponding to a second user-configurable graphical construct. The graphical construct represented by 614 includes clock face 622. Compared to clock face 606, clock face 622 includes different graphical elements, such as different hour and minute hands, and four numerical hour indications (e.g., a higher display density). Unlike clock face 606, clock face 622 does not include a complication. Paging affordance 612 has been updated on screen 620 to indicate that the user is viewing the second of three graphical constructs. Screen 620 also shows a partial view of a third graphical representation 624.

In some embodiments, the user swipes the display (e.g., swipe 628), and in response to detecting the swipe, device 600 displays screen 630. Screen 630 shows third graphical representation 624, corresponding to a third user-configurable graphical construct. The graphical construct represented by 624 includes clock face 632. Compared to clock face 622, clock face 632 includes different graphical elements, such as a seconds hand 634, a weather complication 636, and a calendar complication 638. Like clock face 608, complication 636 displays information obtained from a weather application; however, the displayed information is different. 636 displays a temperature (e.g., a current temperature), whereas 608 displays a weather condition. Like 610, complication 626 displays information from a calendar application but, unlike 610, 626 displays different information (a month and date) and has a different size and shape. Paging affordance 612 has been updated on screen 630 to indicate that the user is viewing the third of three graphical constructs.

In some embodiments, a device (e.g., device 600) displays a graphical representation (e.g., 604, 614, or 624, as shown in FIG. 6) from a plurality of graphical representations, where the graphical representation from the plurality of graphical representations independently corresponds to a user-configurable graphical construct (e.g., a context-specific user interface, such as a watch face, or an emoji graphical object) comprising a plurality of independently configurable graphical elements (e.g., watch face or emoji features), where each graphical element of the plurality is selected from a discrete set of graphical assets stored in the memory of the electronic device. FIG. 6 illustrates a few representations of exemplary graphical constructs. It will be appreciated that many other potential watch faces, and watch face graphical element configurations are contemplated.

Figure 7:
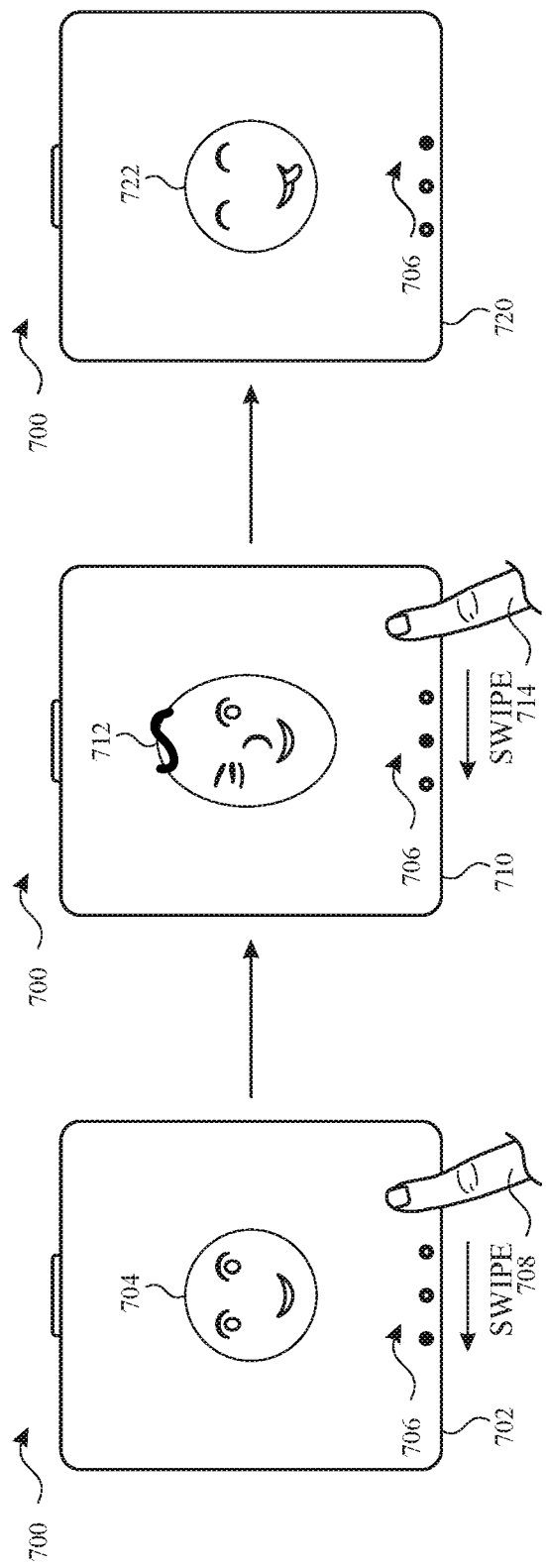
FIG. 7 illustrates exemplary user interfaces for sharing user-configurable graphical constructs.

FIG. 7 illustrates exemplary user interfaces for sharing user-configurable graphical constructs that are optionally operated on device 700, in accordance with some embodiments. Device 700 is device 100, 300, or 500 in some embodiments. The electronic device has a display (e.g., 504). The user interfaces in this figure are used to illustrate the processes described below, including the processes in FIG. 18.

FIG. 7 illustrates another exemplary embodiment of a user-configurable graphical construct, an emoji graphical object. In some embodiments, the user-configurable graphical construct optionally includes an emoji graphical object, which, as shown in FIG. 7, can optionally be a user-configurable graphical construct containing a plurality of independently configurable graphical elements selected from a discrete set of graphical assets stored in the memory of device 700 (e.g., memory 518). In some embodiments, the independently configurable graphical elements of the emoji graphical object optionally includes configurable facial features, such as eyes, eyebrows, a nose, mouth, hair, teeth, a tongue, skin, face shape, and the like. In some embodiments, an emoji graphical object displays a representation of a head or face. In some embodiments, an emoji graphical object displays a representation of part or all of the body (e.g., a hand, an avatar such as a full-body avatar, etc.). In some embodiments, an emoji graphical object optionally includes animation. In some embodiments, an emoji graphical object can optionally be configured to represent a two-dimensional object. In other embodiments, an emoji graphical object can optionally be configured to represent a three-dimensional object.

For example, device 700 is displaying screen 702, which contains emoji graphical object 704. Emoji graphical construct 704 has been customized by configuring particular graphical elements, such as two eyes, two eyebrows and a mouth, each of which is selected from a discrete set of available options (each option corresponding to a stored graphical asset). Screen 702 also displays paging affordance 706 to indicate the position of the displayed emoji graphical object within the sequence of stored emoji graphical objects, as well as the number of stored emoji graphical objects. As shown in FIG. 7, the user may view different emoji graphical objects 712 and 722 (e.g., from a library of stored user-configurable graphical constructs). In some embodiments, 712 and 722 can optionally be viewed by swiping the display (e.g., swipes 708 and 714). In response to detecting the swipe, device 700 displays screen 710 or 720. 712 and 722 illustrate different potential user-configurable emoji graphical objects, each with its own set of graphical elements: e.g., particular eyes, eyebrows, noses, mouths (optionally including teeth and/or a tongue), skin tones, face shapes, hair, etc., each selected from a discrete set of graphical assets.

Once a user has customized a particular graphical construct (e.g., a watch face configuration or emoji graphical object), the user may wish to share the customization. For example, once a user has customized various aspects of a watch face (or otherwise obtained a customized watch face), they may wish to share their customized watch face with a friend, or they may wish to send a customized watch face they themselves have received from another device. Companies or celebrities may wish to distribute customized watch faces and/or emojis promoted in magazines, movies, the Internet, and other media. Because of the vast number of possible combinations available, it may be too laborious for a user to recreate a particular configuration, as that may require cycling through a huge number of configurable aspects and potential options therefor. Thus, it is desirable to provide methods and interfaces for sharing (e.g., sending and/or receiving) user-configurable graphical constructs, such as the watch faces and emojis described above.

FIGS. 8A and 8B illustrate exemplary user interfaces for sharing user-configurable graphical constructs that are optionally operated on devices 800, 820, 830, and/or 850, in accordance with some embodiments. Devices 800, 820, 830, and/or 850 are devices 100, 300, or 500 in some embodiments. The electronic devices have a display (e.g., 504). The user interfaces in this figure are used to illustrate the processes described below, including the processes in FIG. 18.

FIGS. 8A and 8B illustrate an exemplary method for sharing user-configurable graphical constructs, including context-specific user interfaces (e.g., watch faces) and emoji graphical objects, in accordance with some embodiments. As described above, each user-configurable graphical construct contains independently configurable graphical elements selected from a discrete set of stored graphical assets. For example, device 800 is displaying screen 802, which includes clock face 804 and complications 806 (showing a weather condition) and 808 (showing a date). The graphical elements that make up 804, 806, and 808 constitute a user-configurable graphical construct (e.g., the watch face). Each of the graphical elements that make up 804, 806, and 808 can optionally be independently configurable and can optionally be selected from a discrete set of graphical assets stored in the memory of device 800 (e.g., memory 518).

In the exemplary embodiment of FIG. 8A, in order to share the user-configurable graphical construct shown on screen 802 with another device (e.g., a device configured like device 800, such as device 820 in FIG. 8A), device 800 can optionally transmit data 810 identifying the particular graphical elements, selected from the discrete set of graphical assets stored in memory, that constitute the graphical construct. In some embodiments, the device does not transmit data encoding the assets themselves, since device 820 already has the assets stored in its memory. For example, exemplary data 810 identifies the plurality of independently configurable graphical elements constituting the user-configurable graphical construct shown on screen 802. Data 810 represents each of the independently configurable graphical elements as number data (e.g., face 2, color 4, display density 1, and complications 5 and 6). In some embodiments, data representing a name associated with the user-configurable graphical construct is optionally transmitted.

Once device 820 has received the data identifying the configuration (e.g., data 810 identifying the independently graphical elements constituting the graphical construct), it can recreate the graphical construct using the graphical assets stored in its own memory (as opposed to using assets transmitted by device 800). As shown in FIG. 8A, upon receiving data 810, device 820 recreates the graphical construct of screen 802 and, optionally, displays the graphical construct on screen 822 and/or stores the graphical construct in its memory. As shown in FIG. 8A, screen 822 includes clock face 824 and complications 826 and 828, which have configurations like 804, 806, and 808, respectively.

Similarly, FIG. 8B illustrates an exemplary method for sharing emoji graphical objects. Device 830 displays screen 832, which includes emoji graphical object 834. In order to share 834 with device 850, device 830 transmits data identifying the particular graphical elements (selected from the discrete set of graphical assets stored in memory) that constitute 834. For example, data 840 includes number data identifying the graphical elements of 834 (e.g., left eye 3, left eyebrow 1, right eye 5, right eyebrow 1, mouth 9, nose 0, skin 8, and face shape 4). Upon receiving data 840, device 850 (configured like device 830, with the discrete set of graphical assets stored in memory) recreates 834 and, optionally, displays emoji graphical object 854 (with a configuration like 834) on screen 852 and/or stores the graphical construct in its memory.

Figure 9:
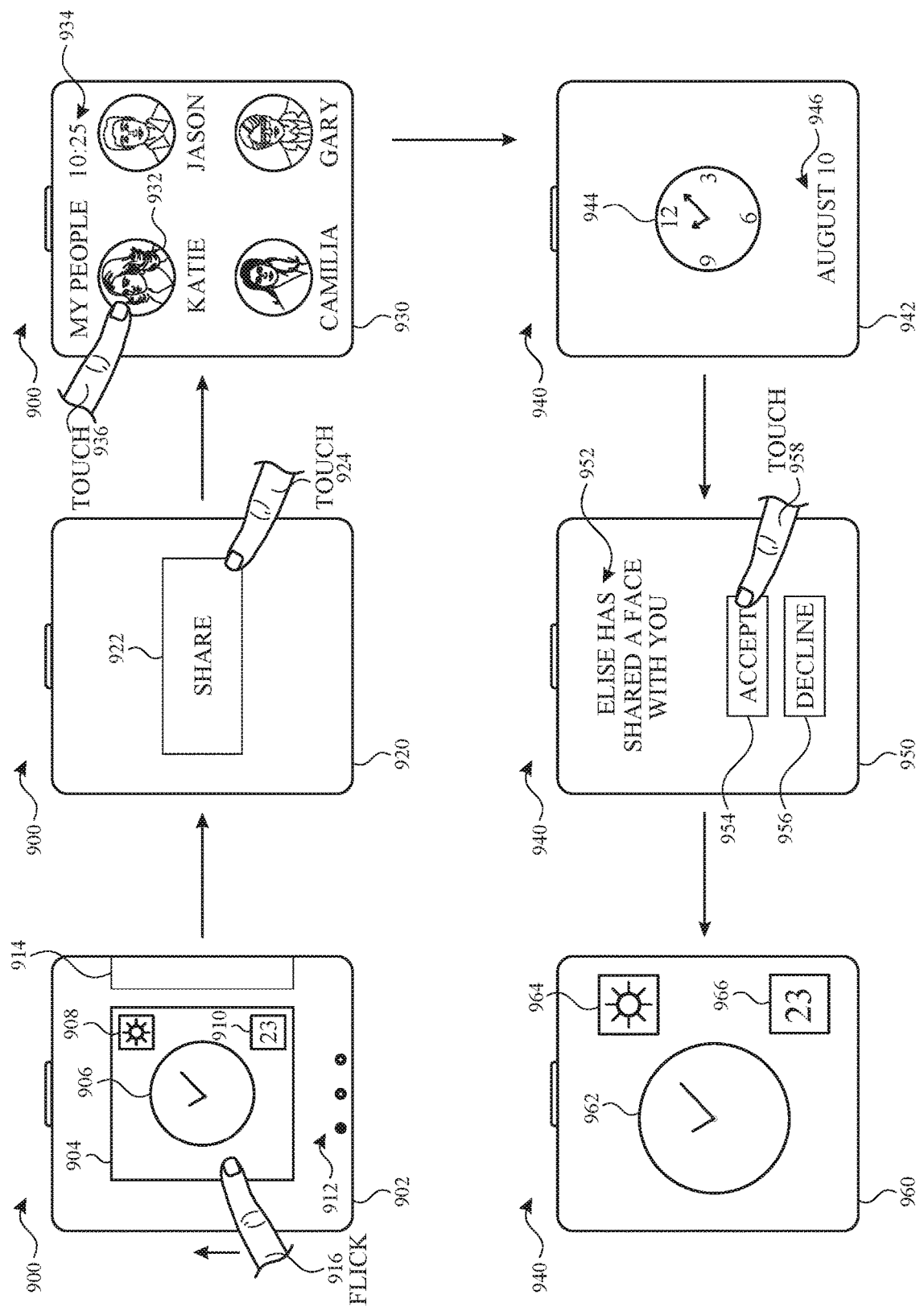
FIG. 9 illustrates exemplary user interfaces for sharing user-configurable graphical constructs.

Turning now to FIG. 9, FIG. 9 illustrates exemplary user interfaces for sharing user-configurable graphical constructs are optionally operated on device 900, in accordance with some embodiments. Device 900 is device 100, 300, or 500 in some embodiments. The electronic device has a display (e.g., 504). The user interfaces in this figure are used to illustrate the processes described below, including the processes in FIG. 18.

As shown in FIG. 9, device 900 can optionally display screen 902, which includes graphical representation 904 from a plurality of graphical representations, each graphical representation (e.g., 904) independently corresponding to a user-configurable graphical construct made of a plurality of independently configurable graphical elements. For example, graphical representation 904 represents a user-configurable graphical construct that includes independently configurable graphical elements such as a clock face, a weather complication, and a calendar complication, represented by 906, 908, and 910, respectively. Screen 902 also includes paging affordance 912 and a partial view of representation 914, indicating to the user that additional graphical representations from the plurality can optionally be viewed (e.g., in response to a swipe on the display).

While displaying a graphical representation from a plurality of graphical representations, device 900 receives a user input corresponding to a selection of the graphical representation from the plurality of graphical representations. In some embodiments, the display of device 900 is optionally a touch-sensitive display (e.g., 112 or 504), and the user input includes a touch gesture on the display. For example, FIG. 9 depicts upward flick 916 on the display. In some embodiments, a touch-sensitive surface of device 900 can optionally be used to receive a touch gesture. In some embodiments, device 900 detects a contact (e.g., a touch gesture) on displayed graphical representation 904 and, while continuing to receive the user contact, detects movement (e.g., with contact/motion module 130) of the user contact without a break in contact of the user contact (e.g., flick 916) on the touch-sensitive display. Optionally, other user inputs can also be used, such as other touch gestures, inputs on input mechanisms such as 506 or 508, and/or audio (e.g., voice) inputs.

Device 900 can optionally display a user interface for selecting a recipient device. In some embodiments, the user interface for selecting a recipient device includes an affordance for sharing the selected graphical representation. For example, as shown in FIG. 9, device 900 optionally displays screen 920, which includes affordance 922 for sharing the selected graphical representation (e.g., 904). In some embodiments, screen 920 optionally includes affordances indicating other options for 904, including options to delete, etc. In some embodiments, the user interface for selecting a recipient device can optionally include one or more user contacts from a plurality of user contacts (e.g., a stored list of friends). As illustrated in FIG. 9, the user optionally touches (e.g., touch 924) affordance 922 to share the graphical representation, and, in response to detecting touch 924 on displayed affordance 922, device 900 displays a plurality of user contacts, as shown on screen 930.

Screen 930 includes several contacts from the user's contacts list (e.g., as depicted by heading 934, "My People," along with an optional display of a time of day). Each can optionally be associated with a recipient device for receiving a shared graphical construct. Device 900 optionally displays a list of user contacts stored in device 900, or on an external device coupled to device 900 via wireless communication, or optionally it displays a list of nearby electronic devices configured to receive a shared graphical construct. While displaying the user interface for selecting a recipient device, device 900 optionally receives a user input corresponding to a selection of a recipient device. In some embodiments, the user input corresponding to a selection of a recipient device can optionally be a touch (e.g., touch 936) on a displayed user contact (e.g., affordance 932, corresponding to "Katie"). Other user inputs can optionally be used, such as other touch gestures, inputs on input mechanisms such as 506 or 508, and/or audio (e.g., voice) inputs.

After receiving the user input corresponding to selection of the graphical representation and the user input corresponding to selection of a recipient device, device 900 can optionally transmit to the recipient device data identifying the plurality of independently configurable graphical elements constituting the user-configurable graphical construct that corresponds to the selected graphical representation (e.g., as described above in reference to FIG. 8A). As illustrated in FIG. 9, device 900 optionally shares the graphical construct represented by 904 to recipient device 940.

In some embodiments, prior to transmitting the data identifying the plurality of independently configurable graphical elements to the recipient device, device 900 can optionally identify the recipient device (e.g., device 940) as a device that includes memory comprising the discrete set of graphical assets associated with the plurality of independently configurable graphical elements constituting the user-configurable graphical construct that corresponds to the selected graphical representation. In some embodiments, as described above in reference to FIG. 8A, transmitting data identifying the plurality of independently configurable graphical elements does not include transmitting the assets encoding the graphical elements of the plurality of independently configurable graphical elements.

In some embodiments, prior to transmitting the data identifying the plurality of independently configurable graphical elements to the recipient device, device 900 can optionally determine whether the recipient device (e.g., device 940) includes memory comprising the discrete set of graphical assets associated with the plurality of independently configurable graphical elements constituting the user-configurable graphical construct that corresponds to the selected graphical representation.

In accordance with a determination that the recipient device (e.g., device 940) includes memory comprising the discrete set of graphical assets associated with the plurality of independently configurable graphical elements, device 900 can optionally transmit to the recipient device data identifying the plurality of independently configurable graphical elements constituting the user-configurable graphical construct that corresponds to the selected graphical representation (e.g., as in the exemplary embodiment illustrated in FIG. 8A). In some embodiments, transmitting the data identifying the plurality of independently configurable graphical elements constituting the user-configurable graphical construct that corresponds to the selected graphical representation does not include transmitting the assets (e.g., graphical assets) encoding the graphical elements of the plurality of independently configurable graphical elements.

In accordance with a determination that the recipient device (e.g., device 940) does not include memory comprising the discrete set of graphical assets associated with the plurality of independently configurable graphical elements, device 900 can optionally transmit to the recipient device data representing the user-configurable graphical construct that corresponds to the selected graphical representation. For example, device 900 can optionally transmit data including the assets (e.g., graphical assets) encoding the graphical elements of the graphical construct, rather than the configuration of the graphical elements. Therefore, device 900 can share a user-configurable graphical construct with a device that does not have the stored graphical assets constituting the graphical elements of the graphical construct. An exemplary process 1800 that includes the steps described above is set forth infra and further illustrated in FIG. 18B.

Figure 10:
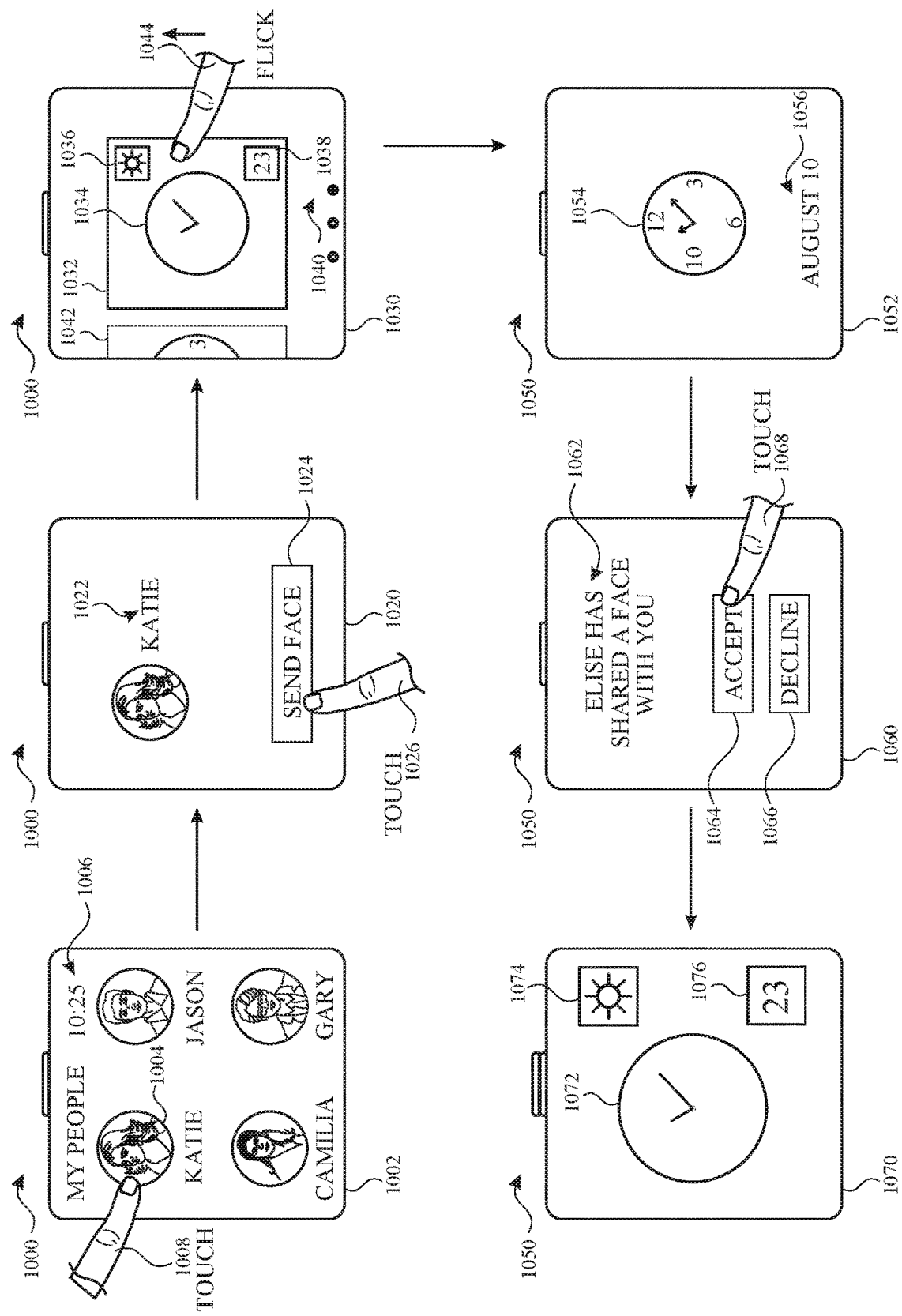
FIG. 10 illustrates exemplary user interfaces for sharing user-configurable graphical constructs.

As shown in FIG. 9, device 940 optionally receives data from device 900. The data can optionally identify the plurality of independently configurable graphical elements constituting the user-configurable graphical construct that corresponds to graphical representation 904, or the data can optionally represent the user-configurable graphical construct that corresponds to graphical representation 904, as described above. Exemplary embodiments for receiving user-configurable graphical constructs are provided in FIGS. 9 and 10, presented briefly for the purpose of illustrating how the transmitted data may be used. Further descriptions and exemplary embodiments for receiving user-configurable graphical constructs are subsequently provided in greater detail.

Device 940 displays screen 942, which includes a first user-configurable graphical construct (in this example, a watch face) that has clock face 944 and date complication 946. Optionally, this graphical construct has been configured or received by the user of device 940. In response to receiving the data transmitted by device 900, device 940 can optionally display screen 950, which includes message 952 indicating to the user that a friend has shared a user-configurable graphical construct and affordances 954 and 956 for accepting or declining, respectively, the graphical construct. In some embodiments, the user provides a user input to accept the graphical construct, e.g., by touching the "accept" affordance 954 with touch 958 to accept the graphical construct. Other user inputs can optionally be used, such as other touch gestures, inputs on input mechanisms such as 506 or 508, and/or audio (e.g., voice) inputs. In response to detecting touch 958, device 940 can optionally display screen 960. Screen 960 includes the user-configurable graphical construct represented by graphical representation 904. Screen 960 includes clock face 962 and complications 964 and 966, which are like clock face 906 and complications 908 and 910. Thus, the graphical construct represented by 904 has been shared by device 900.

In some embodiments, displaying the plurality of graphical representations occurs before displaying the user interface for selecting a recipient device. This is illustrated in FIG. 9. For example, the user can optionally select a user-configurable graphical construct (in this example, a watch face) first, then select a recipient device (e.g., associated with a user contact).

Another exemplary embodiment for sharing user-configurable graphical constructs is shown in FIG. 10. FIG. 10 illustrates exemplary user interfaces for sharing user-configurable graphical constructs that are optionally operated on device 1000, in accordance with some embodiments. Optionally, device 1000 is device 100, 300, or 500 in some embodiments. The electronic device has a display (e.g., 504). The user interfaces in this figure are used to illustrate the processes described below, including the processes in FIG. 18.

In some embodiments, displaying the plurality of graphical representations occurs after displaying the user interface for selecting a recipient device. For example, the user can optionally select a recipient device (e.g., associated with a user contact) first, then select a user-configurable graphical construct (in this example, a watch face).

As shown in FIG. 10, device 1000 can optionally display screen 1002 that, similar to screen 930 in FIG. 9, represents a user interface for selecting a recipient device and contains a list of user contacts (e.g., as indicated by heading 1006) including user contact 1004. Device 1000 can optionally display a list of user contacts stored in device 1000, or on an external device coupled to device 1000 via wireless communication, or it can optionally display a list of nearby electronic devices configured to receive a shared graphical construct. The user can optionally provide a user input (e.g., touch 1008) corresponding to a selection of a recipient device. For example, the user may select user contact 1004 by touch 1008 on the displayed user contact.

Device 1000 can optionally display screen 1020. In some embodiments, screen 1020 includes information associated with the selected user contact, such as name 1022, as well as an affordance 1024 for sharing a user-configurable graphical construct. The user can optionally touch (e.g., touch 1026) affordance 1024 to share a graphical construct with this user contact. In some embodiments, a touch-sensitive surface of device 1000 can optionally be used to receive a touch gesture.

Device 1000 can optionally display screen 1030, which, like screen 902 in FIG. 9, includes graphical representation 1032 of a user-configurable graphical construct. Screen 1030 displays graphical representation 1032 from a plurality of graphical representations, each independently corresponding to a user-configurable graphical construct. In this case, the graphical construct is a watch face, which includes the independently configurable graphical elements such as clock face 1034, weather complication 1036, and date complication 1038. Each graphical element of the plurality can optionally be selected from a discrete set of graphical assets stored in the memory of device 1000. Screen 1030 also includes paging affordance 1040, which indicates that representation 1032 is the third of three available graphical representations, as well as a partial display of a second graphical representation 1042.

Optionally, while displaying screen 1030, the user provides a user input (e.g., upward flick 1044) corresponding to a selection of graphical representation 1032 from the plurality of graphical representations. After receiving the user input corresponding to selection of a recipient device, and the user input corresponding to a user-configurable graphical construct, device 1000 can optionally transmit to the recipient device (e.g., device 1050) data identifying the plurality of independently configurable graphical elements constituting the user-configurable graphical construct that corresponds to the selected graphical representation. As described above, in some embodiments, the data identifying the plurality of independently configurable graphical elements does not include transmitting the assets encoding the graphical elements of the plurality of independently configurable graphical elements, or the data can optionally represent the user-configurable graphical construct that corresponds to the selected graphical representation, responsive at least in part to a determination whether device 1050 includes memory comprising the discrete set of graphical assets associated with the plurality of independently configurable graphical elements (see exemplary process 1800 in FIG. 18).

In some embodiments, device 1050 can optionally display screen 1052, containing clock face 1054 and date complication 1056. Optionally, this graphical construct has been configured or received by the user of device 1050. In response to receiving the data transmitted by device 1000, device 1050 can optionally display screen 1060, which includes message 1062 indicating to the user that a friend has shared a user-configurable graphical construct and affordances 1064 and 1066 for accepting or declining, respectively, the graphical construct. In some embodiments, the user provides a user input to accept the graphical construct, e.g., by touching the "accept" affordance 1064 with touch 1068 to accept the graphical construct. Other user inputs can optionally be used, such as other touch gestures, inputs on input mechanisms such as 506 or 508, and/or audio (e.g., voice) inputs. In response to detecting touch 1068, device 1050 can optionally display screen 1070. Screen 1070 includes the user-configurable graphical construct represented by graphical representation 1032. Screen 1070 includes clock face 1072 and complications 1074 and 1076, which are like clock face 1034 and complications 1036 and 1038. Thus, the graphical construct represented by 1032 has been shared by device 1000.

Various mechanisms for transmitting the data described above are contemplated. In some embodiments, the electronic device (e.g., device 600, 700, 800, 900, or 1000) can optionally include a radio frequency transmitter or transceiver (e.g., RF circuitry 108 or communication unit 530).

In some embodiments, the data identifying the plurality of independently configurable graphical elements is transmitted or received by the electronic device. In other embodiments, the data identifying the plurality of independently configurable graphical elements is transmitted or received by an external device coupled to (e.g., paired with) the electronic device via wireless communication. For example, an electronic device (e.g., device 600, 700, 800, 900, or 1000) can optionally be paired with an external or companion device. As used herein, coupling or pairing two electronic devices includes establishing a means of communication between the two devices. Once the two devices are connected, data are able to be transferred wirelessly between the two devices over the communication link. The means of communication can optionally include those described in U.S. Patent Application Ser. No. 62/005,751, "Predefined Wireless Pairing," filed May 30, 2014, which is incorporated in this disclosure by reference. Once the devices are paired, they can optionally exchange data including data used for sharing user-configurable graphical constructs, as described above. In some embodiments, wireless communication, for purposes of pairing, occurs over a peer-to-peer wireless communication protocol such as Bluetooth and/or Bluetooth Low Energy (BTLE). In some embodiments, wireless communication for purposes of pairing functionality utilizes more than one wireless communication protocol. For example, WiFi may be used in addition to BTLE. In these embodiments, an initial communication between two devices is able to occur over a lower powered protocol, such as BTLE, even if the protocol yields a slower data transfer speed. Subsequent communications are able to occur over a secondary network that is relatively faster, such as WiFi.

As such, any or all of the exemplary data transmissions illustrated in FIGS. 8A-10 or described herein can optionally include data transmission from an electronic device to another electronic device, from an electronic device to an external or companion device coupled to another electronic device, from an external or companion device coupled to an electronic device to another electronic device, or from an external or companion device coupled to an electronic device to another external or companion device coupled to another electronic device.

Figure 11:
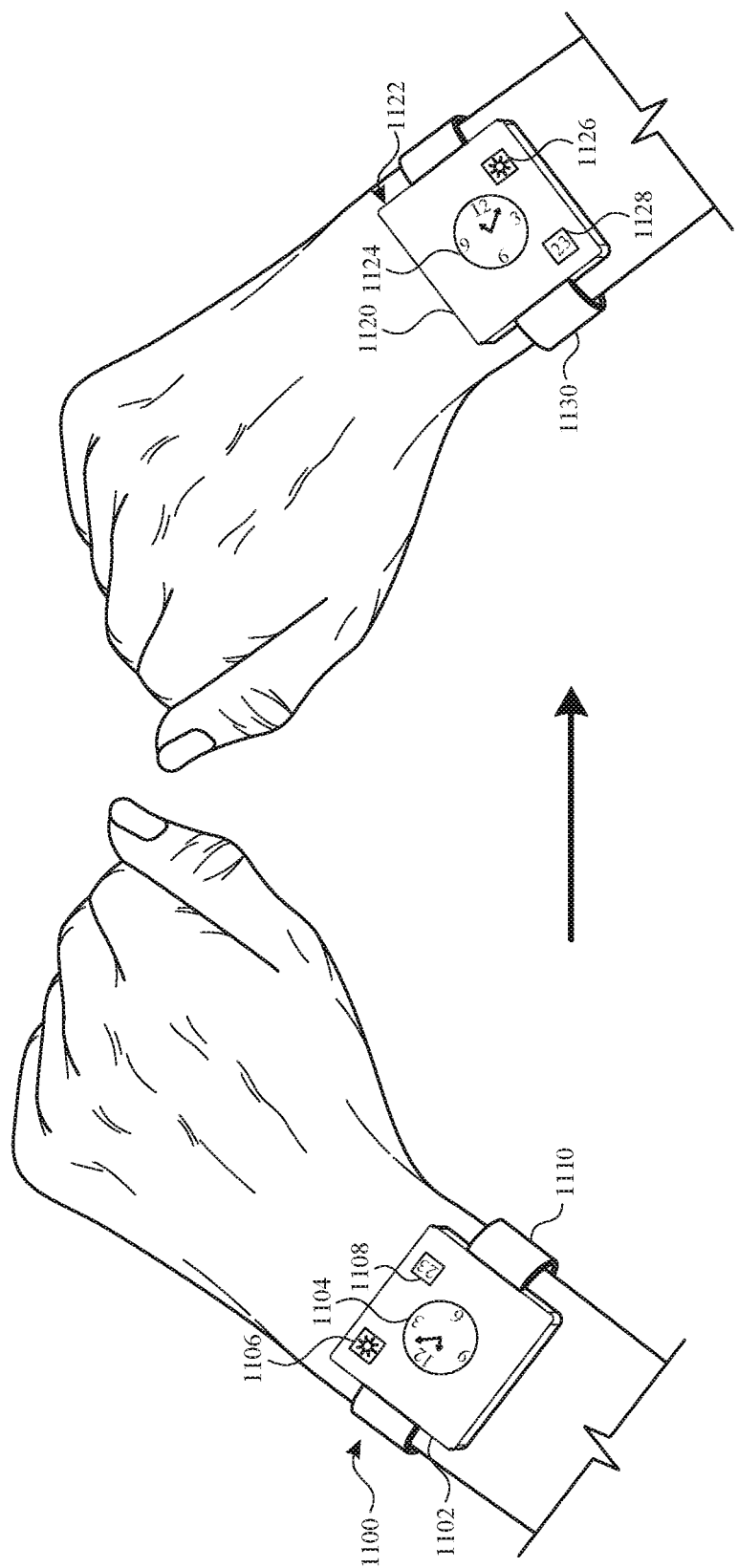
FIG. 11 illustrates exemplary user interfaces for sharing user-configurable graphical constructs.

For example, FIG. 11 illustrates sharing user-configurable graphical constructs between devices 1100 and 1120, in accordance with some embodiments. Optionally, devices 1100 and 1120 are device 100, 300, or 500 in some embodiments. The electronic devices have a display (e.g., 504). The user interfaces in this figure are used to illustrate the processes described below, including the processes for sending and receiving user-configurable graphical constructs in FIGS. 18 and 19.

As shown in FIG. 11, the user of device 1100 is sharing a user-configurable graphical construct with the user of device 1120. Device 1100 displays screen 1102, which includes clock face 1104 and complications 1106 and 1108. In the exemplary embodiments shown in FIG. 11, devices 1100 and 1120 have attachment mechanisms (e.g., watch straps 1110 and 1130, respectively) to permit user wearing. After device 1100 transmits data as described above to enable the user to share a user-configurable graphical construct, device 1120 displays screen 1122, which includes clock face 1124 and complications 1126 and 1128 configured like 1104, 1106, and 1108, respectively.

As described above, device 1100 can optionally include a radio frequency transmitter or transceiver (e.g., RF circuitry 108 or communication unit 530) and can optionally transmit the data to device 1120. Alternatively, device 1100 is coupled to (e.g., paired with) an external device via wireless communication, and the data are transmitted by the external device. Similarly, device 1120 can optionally include a radio frequency receiver or transceiver (e.g., RF circuitry 108 or communication unit 530) and can optionally receive the data, or device 1120 can optionally be coupled to (e.g., paired with) an external device via wireless communication and receive the data via the external device (or, alternatively, receive second data from the external device based on the data received from device 1100).

One or more protocols can optionally be used to transmit data identifying a plurality of independently configurable graphical elements of a user-configurable graphical construct (or data representing a user-configurable graphical construct), as described above. For example, one or more protocols such as near field communication (NFC), Wi-Fi, Bluetooth, Bluetooth low energy (BTLE), a cellular protocol, and/or other wireless communication techniques described herein can optionally be used. In some embodiments, an ad-hoc network such as AirDrop® (Apple Inc.) can optionally be used. In some embodiments, a device or external device coupled via wireless communication to an electronic device can optionally be configured to use multiple protocols, either in combination or as single alternative protocols. In some embodiments, a device or external device coupled via wireless communication to an electronic device can optionally be configured to employ different protocols, depending on context. For example, NFC and/or WiFi can optionally be used to transmit data if the recipient device is in sufficient proximity (e.g., 10 cm or less) or on a shared WLAN with the sender device, and a cellular protocol can optionally be used if the sender and recipient devices are farther away or not on a shared WLAN. In some embodiments, the data can optionally be transmitted via email (e.g., as an attachment, or an embedded link in an email), peer-to-peer (P2P) communications over WiFi and/or NFC, text message (e.g., iMessage®, or a separate graphical construct messaging channel), or upload to a website or cloud-based server.

Figure 12:
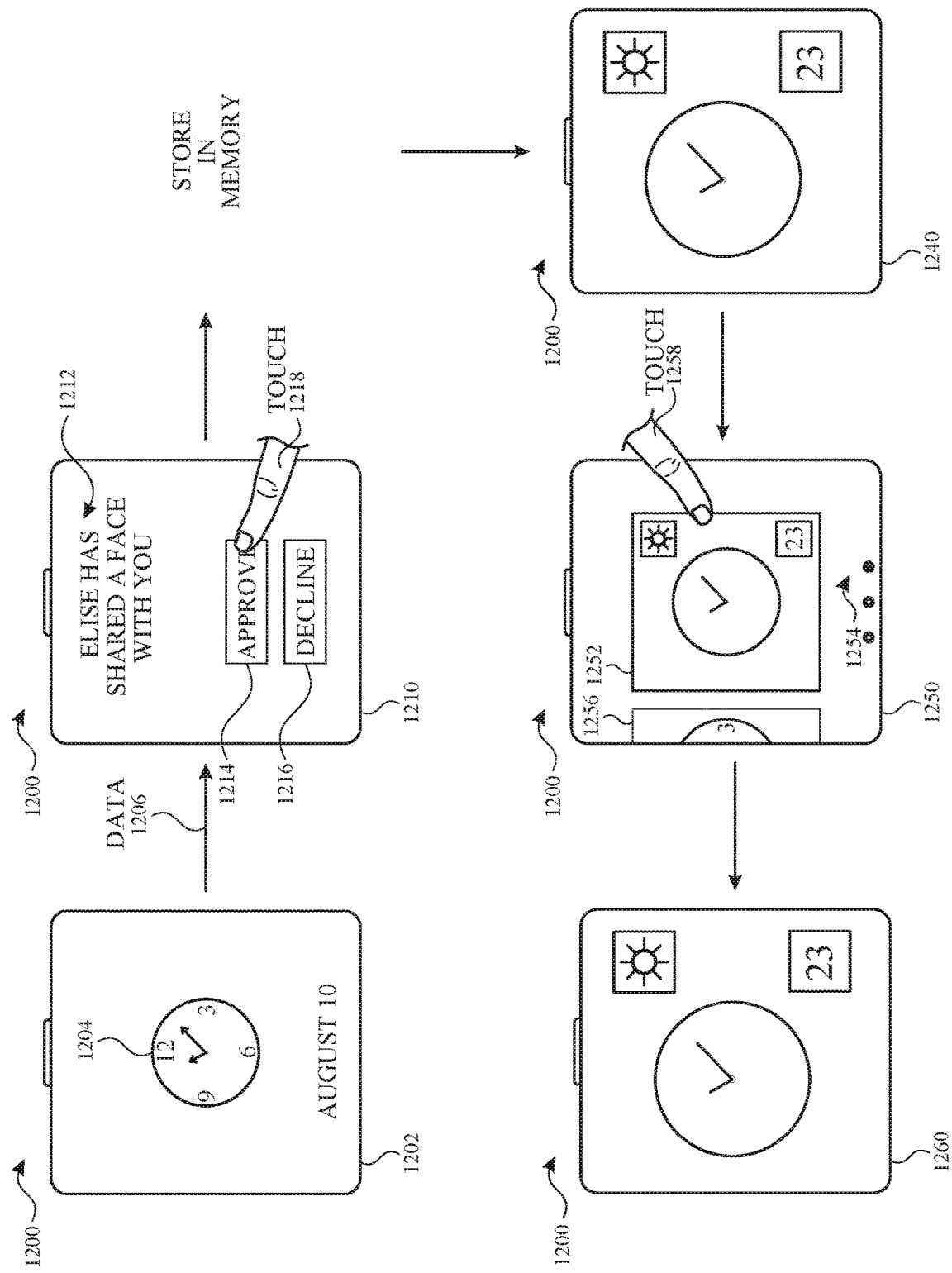
FIG. 12 illustrates exemplary user interfaces for sharing user-configurable graphical constructs.

Turning now to FIG. 12, a user may wish to receive a user-configurable graphical construct. FIG. 12 illustrates exemplary user interfaces for sharing user-configurable graphical constructs that can optionally be operated on device 1200, in accordance with some embodiments. Optionally, device 1200 is device 100, 300, or 500 in some embodiments. The electronic device has a display (e.g., 504). The user interfaces in this figure are used to illustrate the processes described below, including the processes in FIG. 19.

In some embodiments, device 1200 can optionally receive data identifying a plurality of independently configurable graphical elements, where each graphical element of the plurality of independently configurable graphical elements is selected from a discrete set of graphical assets stored in the memory of device 1200, and where the plurality of independently configurable graphical elements constitute a user-configurable graphical construct. As shown in FIG. 12, device 1200 is displaying screen 1202, which includes graphical construct 1204. Device 1200 receives data 1206 (e.g., from another electronic device, such as device 600, 700, 800, 900, 1000, or 1100).

In response to receiving the data (e.g., data 1206), device 1200 can optionally display a user interface for accepting the user-configurable graphical construct. For example, in FIG. 12, device 1200 displays screen 1210, which includes message 1212 to indicate to the user that a user wishes to share a graphical construct and affordances 1214 and 1216 for accepting or declining the graphical construct, respectively. Providing the user the ability to accept or decline a user-configurable graphical construct, e.g., through a user interface for accepting the graphical construct, may be advantageous in preventing spamming or spoofing. In some embodiments, the user interface for accepting the user-configurable graphical construct can optionally include a displayed graphical representation of the user-configurable graphical construct, thereby allowing the user to preview the graphical construct before accepting or declining.

While displaying the user interface for accepting the user-configurable graphical construct, device 1200 can optionally receive a user input indicating acceptance of the user-configurable graphical construct. For example, in FIG. 12, the user touches acceptance affordance 1214 with touch 1218 to indicate acceptance. Other user inputs can optionally be used, such as other touch gestures, inputs on input mechanisms such as 506 or 508, and/or audio (e.g., voice) inputs.

In response to receiving the user input (e.g., touch 1218), and as shown in FIG. 12, device 1200 can optionally store in the memory of the electronic device (e.g., memory 518) the user-configurable graphical construct for later display. The stored user-configurable graphical construct includes the plurality of independently configurable graphical elements, selected from the discrete set of graphical assets stored in the memory based on the received data.

In some embodiments, in response to receiving the user input (e.g., touch 1218), device 1200 can optionally display the user-configurable graphical construct on the display. In FIG. 12, device 1200 displays the received user-configurable graphical construct on screen 1240. In some embodiments, the device automatically displays the shared graphical construct on the display in response to receiving the user input.

In other embodiments, after storing the user-configurable graphical construct in the memory, device 1200 displays a graphical representation corresponding to the user-configurable graphical construct, receives a second user input indicating selection of the user-configurable graphical construct, and after receiving the user input indicating selection of the user-configurable graphical construct, displays the user-configurable graphical construct on the display. For example, in FIG. 12, device 1200 displays screen 1250, which includes a representation of the shared graphical construct (e.g., representation 1252) as part of a stored graphical construct library. Screen 1250 includes a partial view of a second stored graphical construct 1256, which has optionally been configured by the user on device 1200 or received by device 1200. Screen 1250 also includes paging affordance 1254 to indicate that representation 1252 is the third of three available representations corresponding to stored graphical constructs. Device 1200 can optionally receive a user input indicating selection of the user-configurable graphical construct (e.g., touch 1258 on displayed representation 1252) and, after receiving touch 1258, display screen 1260, which includes the shared graphical construct represented by 1252. In some embodiments, after storing the received data in memory, device 1200 shows the shared graphical construct (e.g., on screen 1240). In other embodiments, after storing the received data in memory, device 1200 shows a representation of the shared graphical construct (e.g., representation 1252 on screen 1250). The user can optionally then select (e.g., with touch 1258) the representation to cause the device to display the shared graphical construct. Put another way, the shared graphical construct is now available for selection as one of the stored graphical constructs of device 1200 (e.g., as part of a library of available graphical constructs).

In some embodiments, the received data identifying a plurality of independently configurable graphical elements does not include the assets encoding the graphical elements of the plurality of independently configurable graphical elements. In other embodiments, the received data represents the user-configurable graphical construct that corresponds to the selected graphical representation (e.g., the received data includes the assets encoding the graphical elements constituting the graphical construct). In some embodiments, data representing a name associated with the user-configurable graphical construct can optionally be received.

As described above in reference to transmitting data, in some embodiments, the shared graphical construct can optionally be a context-specific user interface (e.g., a watch face). In some embodiments, the watch face can optionally include configurable aspects of the watch face that are independently selected from aspects including, for example, watch complications, color, display density, and watch face features. In some embodiments, the shared graphical construct can optionally be an emoji graphical object containing a plurality of independently configurable graphical elements selected from a discrete set of graphical assets stored in the memory of device 1200. In some embodiments, the independently configurable graphical elements of the emoji graphical object can optionally include configurable facial features, such as eyes, eyebrows, a nose, mouth, hair, teeth, a tongue, skin, face shape, and the like.

Figure 13C:
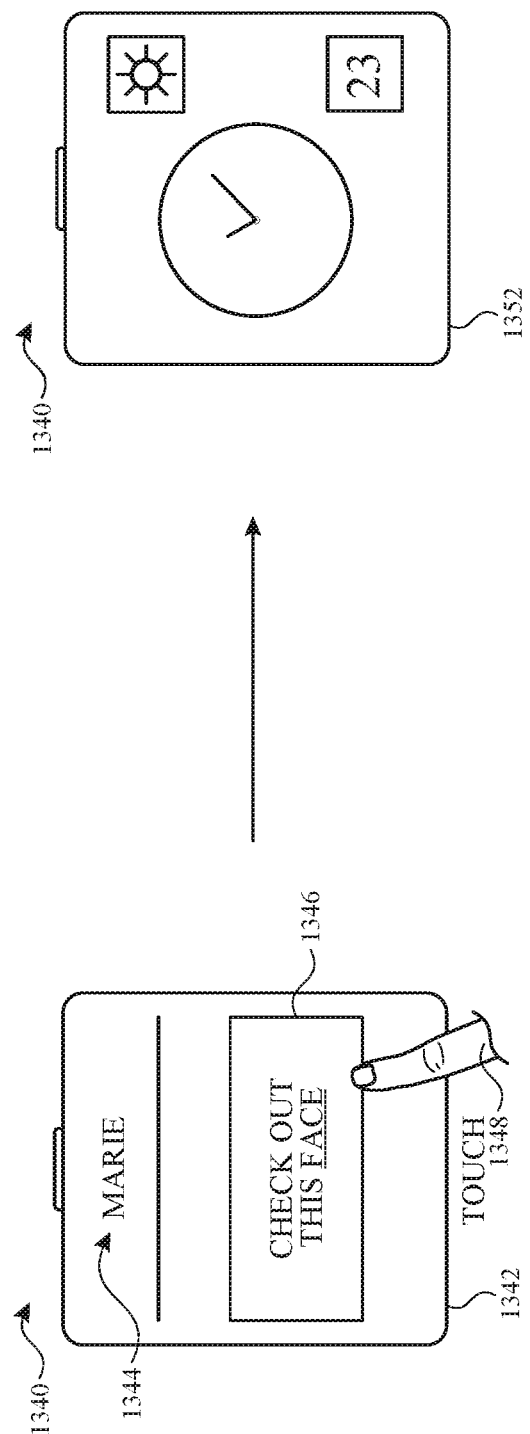
FIG. 13C illustrates exemplary user interfaces for sharing user-configurable graphical constructs.

FIGS. 13A-C illustrate methods for sharing user-configurable graphical constructs that are optionally operated on device 1300, 1320, 1340, or 1350, in accordance with some embodiments. Optionally, device 1300, 1320, 1340, or 1350 is device 100, 300, or 500 in some embodiments. The electronic device has a display (e.g., 504). The user interfaces in this figure are used to illustrate the processes described below, including the processes in FIG. 19. FIGS. 13A-C illustrate some of the potential methods by which an electronic device can optionally receive a shared user-configurable graphical construct. These are provided merely to exemplify some aspects of sharing and are in no way intended to be limiting.

As described above, an electronic device can optionally include a radio frequency receiver or transceiver (e.g., RF circuitry 108 or communication unit 530) and can optionally receive the data, or an electronic device can optionally be coupled to (e.g., paired with) an external device via wireless communication and can optionally receive the data via the external device (or, alternatively, receive second data from the external device based on the data received from device 1100).

Similar to the description above referring to data transmissions, an electronic device can optionally receive data for sharing a user-configurable graphical construct in various ways. Optionally, data can be received from an electronic device by another electronic device, from an electronic device by an external or companion device coupled to another electronic device, from an external or companion device coupled to an electronic device by another electronic device, or from an external or companion device coupled to an electronic device by another external or companion device coupled to another electronic device.

A user may wish to receive a user-configurable graphical construct from a QR (Quick Response) code. For example, a magazine or other source may print or otherwise provide a QR code representing the configuration of a customized graphical construct that readers may use to scan and receive data identifying the plurality of independently configurable graphical elements constituting the graphical construct. As shown in FIG. 13A, device 1300 displays screen 1302, which includes a user-configurable graphical construct. Through data 1304 from QR code 1306, device 1300 receives the configuration of the independently configurable graphical elements constituting the graphical construct and displays the graphical construct on screen 1302. In some embodiments, device 1300 can optionally include a QR code scanner. In some embodiments, device 1300 can optionally be coupled via wireless communication to an external device with a QR code scanner and can optionally receive the data identifying the plurality of independently configurable graphical elements constituting the graphical construct from the external device, based on the QR code.

A user may wish to receive a shared user-configurable graphical construct by near field communication (NFC). In some embodiments, data identifying the plurality of independently configurable graphical elements constituting the graphical construct are received via near field communication from a second electronic device with a display, one or more processors, and memory. In some embodiments, data identifying the plurality of independently configurable graphical elements constituting the graphical construct are received via near field communication from an external device coupled to a second electronic device with a display, one or more processors, and memory. In some embodiments, data identifying the plurality of independently configurable graphical elements constituting the graphical construct are received from an NFC sticker or NFC tag. For example, a user attending a concert may place their device in proximity to an NFC sticker posted at the entrance of the concert and receive data identifying a graphical construct customized with information or designs related to the concert, such as musician information, a program or setlist, a schedule for subsequent concerts, venue information, merchandise information, and the like.

As another example, a user attending a sporting event may enter the stadium, place their electronic device in proximity to an NFC sticker posted at the entrance of the stadium, and receive data identifying a customized graphical construct related to the sporting event. As shown in FIG. 13B, device 1320 can optionally receive data (e.g., data 1330) from NFC transmitter (e.g., NFC sticker or tag) 1332. In this example, NFC transmitter 1332 may be at a football stadium. Based on data 1330, device 1320 can optionally display screen 1322, which includes clock face 1324, football icon 1326, and affordance 1328, which includes information related to a football team.

One or more protocols can optionally be used to receive data identifying a plurality of independently configurable graphical elements of a user-configurable graphical construct (or data representing a user-configurable graphical construct), as described above. For example, one or more protocols such as near field communication (NFC), Wi-Fi, Bluetooth, Bluetooth low energy (BTLE), a cellular protocol, and/or other wireless communication techniques described herein can optionally be used. In some embodiments, an ad-hoc network such as AirDrop® (Apple Inc.)

can optionally be used. In some embodiments, a device or external device coupled via wireless communication to an electronic device can optionally be configured to use multiple protocols, either in combination or as single alternative protocols. In some embodiments, a device or external device coupled via wireless communication to an electronic device can optionally be configured to employ different protocols, depending on context. For example, NFC and/or WiFi can optionally be used to receive data if the recipient device is in sufficient proximity (e.g., 10 cm or less) to the sender device or on a shared WLAN with the sender device, and a cellular protocol can optionally be used if the sender and recipient devices are farther away or not on a shared WLAN. In some embodiments, the data can optionally be received via email (e.g., as an attachment, or an embedded link in an email), peer-to-peer (P2P) communications over WiFi and/or NFC, text message (e.g., iMessage®, or a separate graphical construct messaging channel), or download from a website or cloud-based server.

FIG. 13C illustrates an example of receiving a shared user-configurable graphical construct through a messaging protocol (e.g., text messaging). Device 1340 displays screen 1342, which includes the name of a sender 1344 and affordance 1346 indicating that the sender wants to share a user-configurable graphical construct. The user can optionally touch (e.g., touch 1348) the displayed affordance 1346, and in response to detecting the touch, device 1340 can optionally display screen 1352, which includes the shared user-configurable graphical construct. In some embodiments, the text message appears like a traditional text message with a link or affordance for accepting the graphical constructs. In other embodiments, the text message is formatted in a manner specific to sharing user-configurable graphical constructs. In some embodiments, the text message can optionally be received by device 1340. In some embodiments, the text message can optionally be received by an external device coupled to device 1340 via wireless communication.

Figure 14:
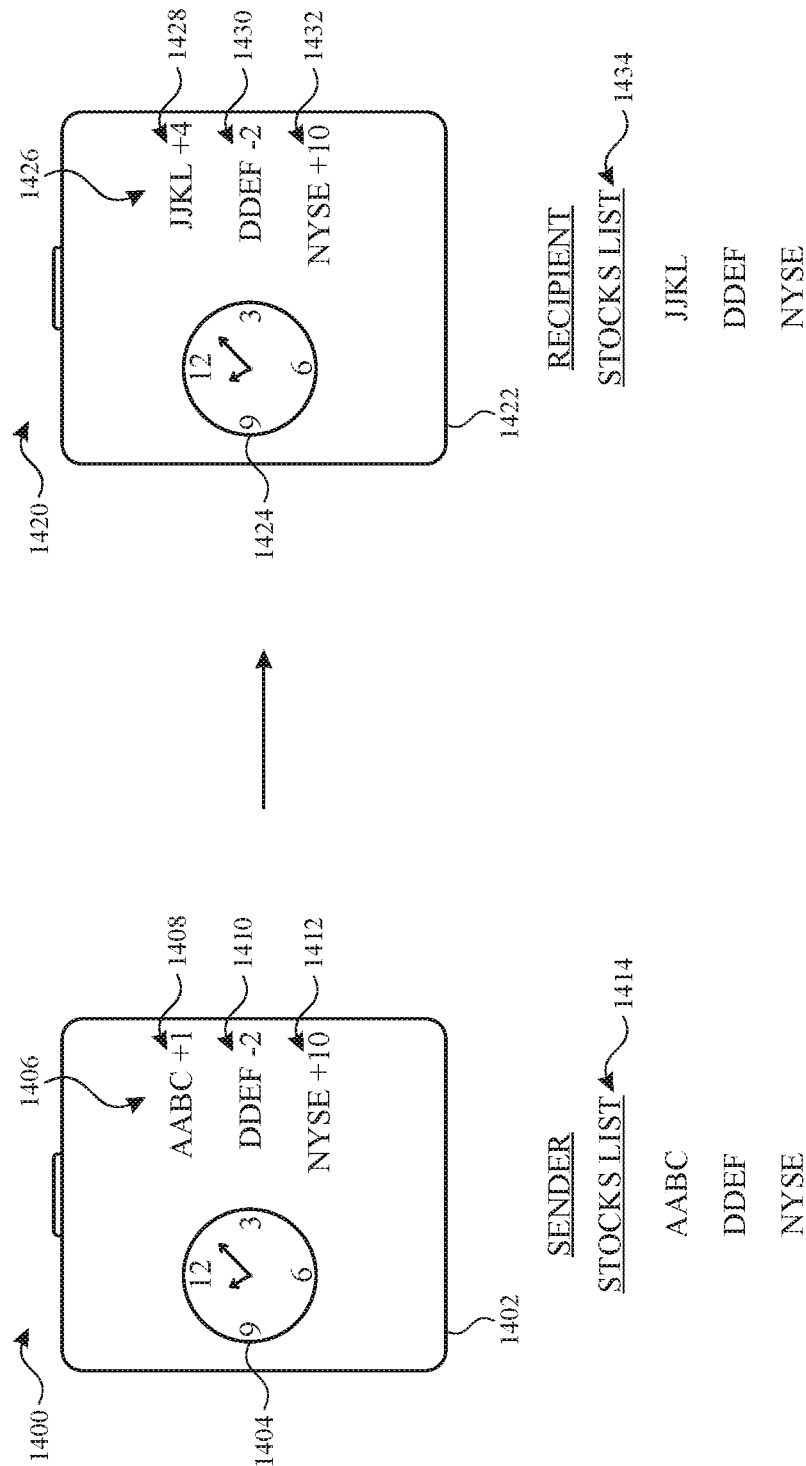
FIG. 14 illustrates exemplary user interfaces for sharing user-configurable graphical constructs.

FIG. 14 illustrates exemplary user interfaces for sharing user-configurable graphical constructs that can optionally be operated on device 1400, in accordance with some embodiments. Optionally, device 1400 is device 100, 300, or 500 in some embodiments. The electronic device has a display (e.g., 504). The user interfaces in this figure are used to illustrate the processes described below, including the processes in FIG. 19.

With regarding to sending and/or receiving user-configurable graphical constructs, a user may wish to send or receive an independently configurable graphical element of a certain class or type. For example, a user may wish to send or receive a user-configurable graphical construct with a stocks complication that displays stock information. In some cases, a user may wish to send or receive a stocks complication, but populate the complication with information supplied by a stocks application on their device (e.g., a list of stocks stored in their stocks application). In this case, the shared graphical elements of the sender and recipient correspond with each other (e.g., both represent a stocks complication), but they need not be identical, since each device populates its stocks complication with a list from its stocks complication (e.g., stored in its own memory, or in the memory of an external device coupled to the device by wireless communication). Another potential example of this concept is illustrated by a world clock complication. In some embodiments, a user-configurable graphical construct with a world clock complication can optionally be sent and/or received, but the cities displayed in the world clock complication are populated using the sender/recipient world clocks list.

As shown in FIG. 14, device 1400 displays screen 1402, which includes clock face 1404 and stocks complication 1406. Stocks complication 1406 shows information for stocks AABC, DDEF, and NYSE, as represented by user interface objects 1408, 1410, and 1412, respectively. As shown by stocks list 1414, device 1400 (the "sender" device) includes a stocks list (e.g., as stored in a stocks application) that includes AABC, DDEF, and NYSE.

Device 1400 can optionally share the user-configurable graphical construct of screen 1402 with device 1420. Upon receiving data from device 1400, device 1420 displays screen 1422. Screen 1422, includes clock face 1424, which is identical to clock face 1404 on screen 1402 of device 1400. Like screen 1402 with complication 1406, screen 1422 also displays a stocks complication 1426. However, stocks complication 1426 displays information for stocks JJKL, DDEF, and NYSE, as represented by user interface objects 1428, 1430, and 1432, respectively. As shown by stocks list 1434, device 1420 (the "recipient" device) includes a stocks list (e.g., as stored in a stocks application) that includes JJKL, DDEF, and NYSE. Thus, the shared user-configurable graphical construct shown by device 1420 corresponds to that of device 1400, but contains a displayed graphical element populated with a recipient-side value corresponding, but not identical, to a sender-side value.

As illustrated by FIG. 14, in some embodiments, an electronic device (e.g., device 1420) can optionally receive, concurrently with the data identifying the plurality of independently configurable graphical elements, second data representing an independently configurable sender graphical element (e.g., representing user interface object 1408). Optionally, the independently configurable sender graphical element corresponds to, but is not identical to, a recipient graphical element (e.g., 1428) from the discrete set of graphical assets stored in the memory of the electronic device. For example, in some embodiments, the recipient device does not contain a stored asset identical to the independently configurable sender graphical element. Device 1420 can optionally select, from the discrete set of graphical assets stored in the memory, the recipient graphical element (e.g., 1428) corresponding to the sender graphical element (e.g., 1408), and can optionally store the selected recipient graphical element (e.g., 1428) as part of the user-configurable graphical construct (e.g., as shown on screen 1422).

Figure 15:
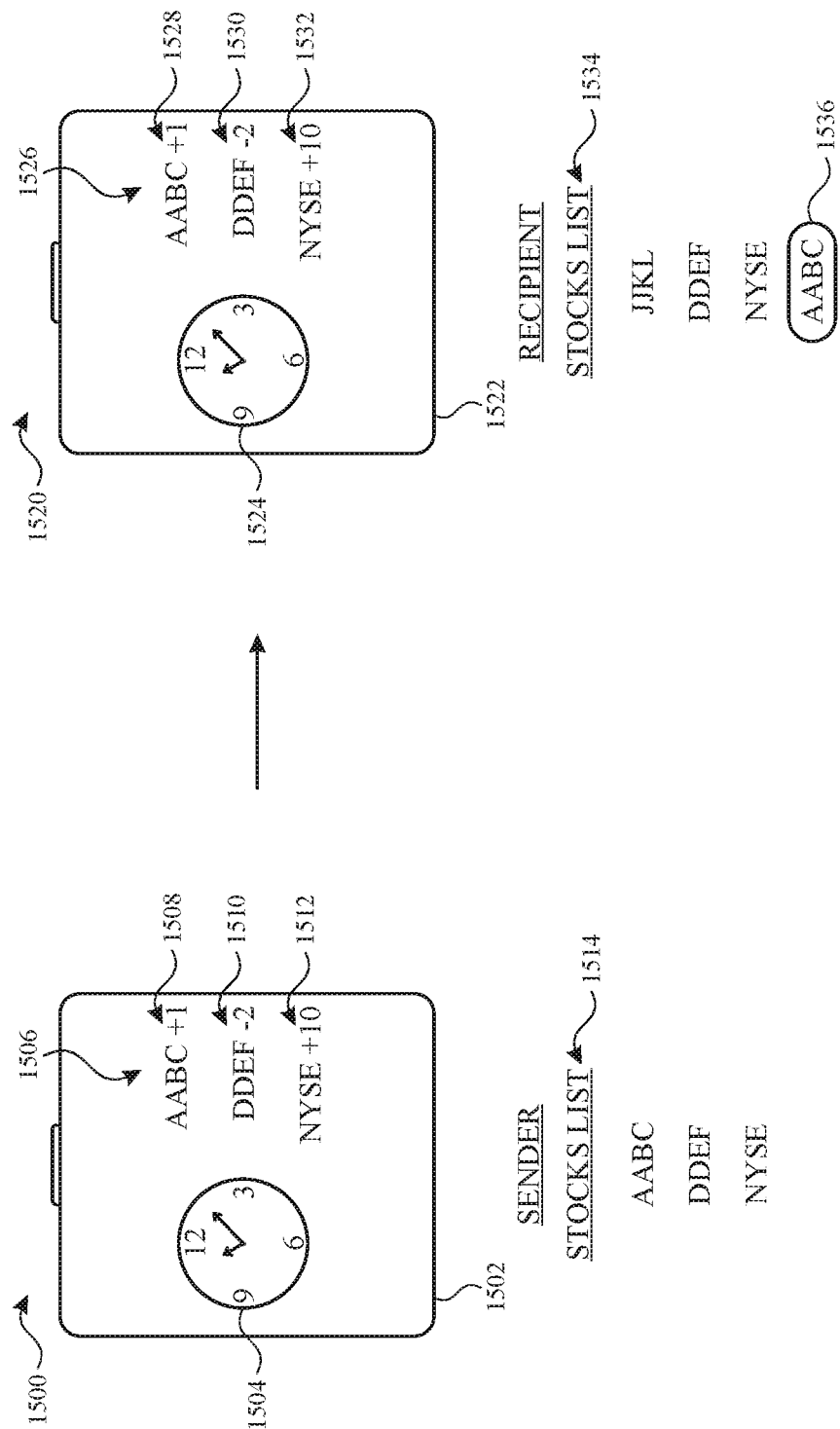
FIG. 15 illustrates exemplary user interfaces for sharing user-configurable graphical constructs.

Turning now to the example shown in FIG. 15, FIG. 15 illustrates exemplary user interfaces for sharing user-configurable graphical constructs that can optionally be operated on device 1500, in accordance with some embodiments. Optionally, device 1500 is device 100, 300, or 500 in some embodiments. The electronic device has a display (e.g., 504). The user interfaces in this figure are used to illustrate the processes described below, including the processes in FIG. 19.

With regarding to sending and/or receiving user-configurable graphical constructs, a user may wish to send or receive an independently configurable graphical element of a certain class or type and share an identical independently configurable graphical element between sender and recipient. For example, a user may wish to send or receive a user-configurable graphical construct with a stocks complication that displays stock information. In some cases, a user may wish to send or receive a stocks complication and populate the complication with information supplied by a stocks application on the sender's device (e.g., a list of stocks stored in the sender's stocks application). In this case, the shared graphical elements of the sender and recipient are identical, and the recipient device can optionally store the asset corresponding to the sender's independently configurable graphical element in its memory. Using the example of the world clocks complication, if the sender's complication contains an entry for Tokyo, and the recipient's world clock application does not include Tokyo, the recipient device can optionally add Tokyo to its stored world clock list.

As shown in FIG. 15, device 1500 displays screen 1502, which includes clock face 1504 and stocks complication 1506. Stocks complication 1506 shows information for stocks AABC, DDEF, and NYSE, as represented by user interface objects 1508, 1510, and 1512, respectively. As shown by stocks list 1514, device 1500 (the "sender" device) includes a stocks list (e.g., as stored in a stocks application) that includes AABC, DDEF, and NYSE.

Device 1500 can optionally share the user-configurable graphical construct of screen 1502 with device 1520. Upon receiving data from device 1500, device 1520 displays screen 1522. Screen 1522, includes clock face 1524, which is identical to clock face 1504 on screen 1502 of device 1500. Like screen 1502 on device 1500, screen 1522 also displays a stocks complication 1526. Like stocks complication 1506 on screen 1502 of device 1500, stocks complication 1526 displays information for stocks AABC, DDEF, and NYSE, as represented by user interface objects 1528, 1530, and 1532, respectively. Prior to receiving the data from device 1500, the stocks list of device 1520 (the "recipient" device) had a stocks list (e.g., as stored in a stocks application) that includes JJKL, DDEF, and NYSE, but not AABC. Upon receiving the data from device 1500, device 1520 can optionally add stock AABC (depicted by 1536) to the recipient stocks list and/or display 1536 on screen 1522.

As illustrated in FIG. 15, in some embodiments, an electronic device (e.g., device 1520) can optionally receive, concurrently with the data identifying the plurality of independently configurable graphical elements, data representing an asset corresponding to an independently configurable graphical element (e.g., represented by 1508). The device (e.g., device 1520) can optionally store the asset (e.g., 1536) corresponding to the independently configurable graphical element in the memory of the electronic device (e.g., in the recipient stocks list 1534 of the stocks application), where the asset corresponding to the independently configurable graphical element (e.g., 1528) is stored for later display as part of the user-configurable graphical construct (e.g., as shown on screen 1522). In some embodiments, the asset (e.g., 1536) is stored until the next reboot of device 1520. In some embodiments, the asset (e.g., 1536) is stored until the user deletes the asset from the memory of device 1520. In some embodiments, the asset (e.g., 1536) is stored on a memory of an external device coupled to device 1520 via wireless communication.

Figure 16A:
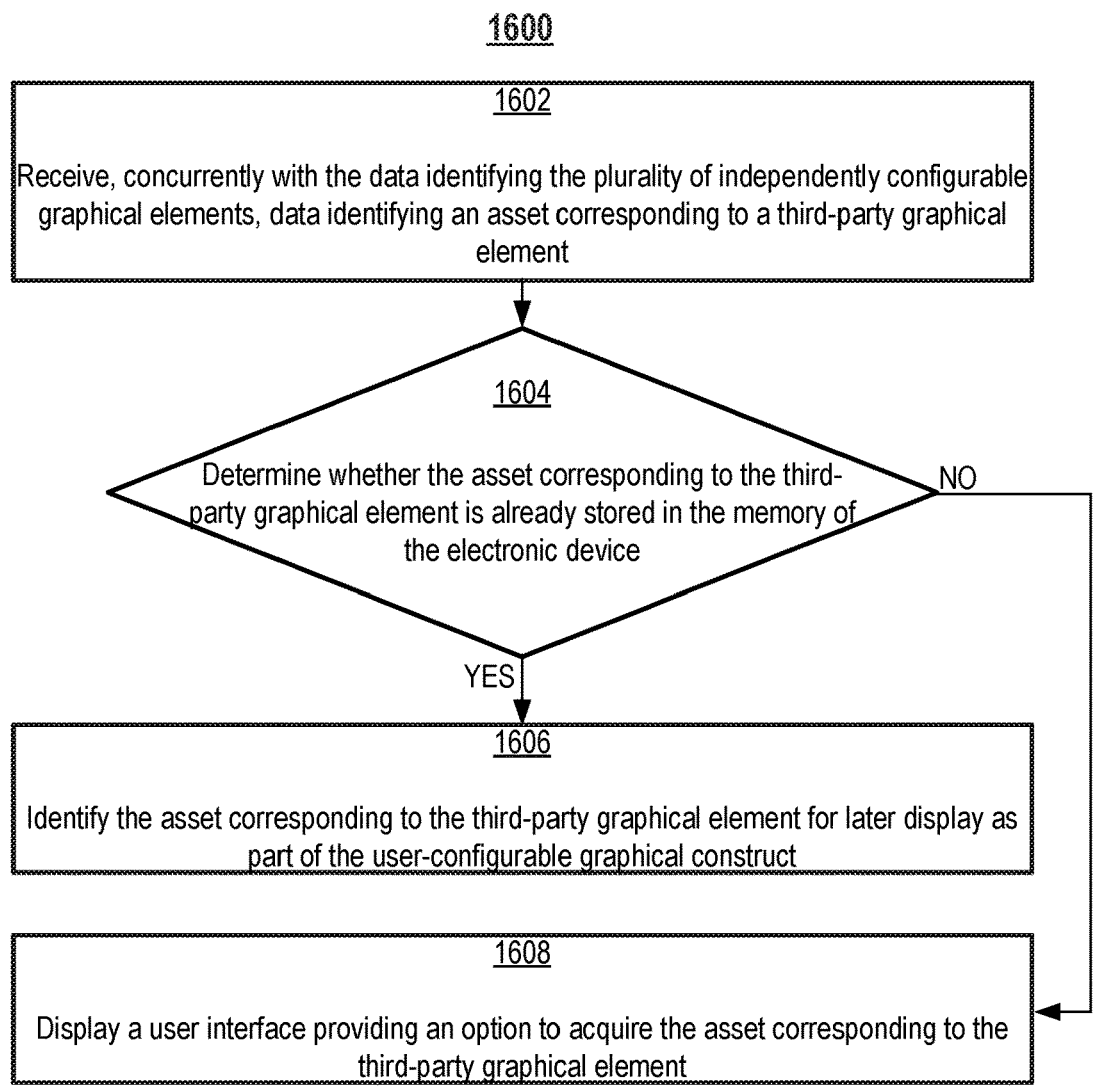
FIG. 16A is a flow diagram illustrating a process for sharing user-configurable graphical constructs.

FIG. 16A is a flow diagram illustrating a method for sharing user-configurable graphical constructs using an electronic device in accordance with some embodiments. Method 1600 is performed at a device (e.g., 100, 300, 500, or 1610) with a display. Some operations in method 1600 may be combined, the order of some operations may be changed, and some operations may be omitted. As described below, FIG. 16 illustrates an exemplary embodiment for sharing user-configurable graphical constructs (e.g., containing a third-party graphical element), but other orders of operation are possible. Method 1600 provides for sharing user-configurable graphical constructs with third-party content in a comprehensive yet easy-to-use manner, thus conserving power and increasing battery life.

A user may wish to send and/or receive a user-configurable graphical construct with a third-party graphical element. For example, in some embodiments, an electronic device is loaded with a discrete set of graphical assets, stored in the memory of the electronic device, corresponding to independently configurable graphical elements. A third-party may generate a third-party graphical element with a third-party graphical asset that is not part of the discrete set of graphical assets stored in the memory of the electronic device. Therefore, in order to display the user-configurable graphical construct, the user may wish to download the third-party graphical asset. For example, a sports organization may create a user-configurable graphical construct with independently configurable graphical elements having third-party graphical assets, such as sports insignia, information, and the like, that are not part of a device's stored set of graphical assets.

As shown in FIG. 16A, an exemplary process for sharing user-configurable graphical constructs with third-party graphical assets is provided in method 1600. At block 1602, the device receives, concurrently with the data identifying the plurality of independently configurable graphical elements (described above), data identifying an asset corresponding to a third-party graphical element. At block 1604, responsive at least in part to receiving the data identifying the asset corresponding to a third-party graphical element, the device determines whether the asset corresponding to the third-party graphical element is stored in the memory of the electronic device. At block 1606, responsive at least in part to a determination that the asset corresponding to the third-party graphical element is stored in the memory of the electronic device, the device identifies the asset corresponding to the third-party graphical element for later display as part of the user-configurable graphical construct. For example, the user may have already downloaded the third-party graphical asset (e.g., as part of a third-party application) onto the memory of the device, and the device can optionally identify this asset for display as part of the user-configurable graphical construct. At block 1608, responsive at least in part to a determination that the asset corresponding to the third-party graphical element is not stored in the memory of the electronic device, the device displays a user interface providing an option to acquire the asset corresponding to the third-party graphical element.

Note that details of the processes described above with respect to method 1600 (e.g., FIG. 16A) are also applicable in an analogous manner to the methods (e.g., methods 1800, 1900, 2000, and/or 2100 in FIGS. 18-21 and/or methods 2900, 3000, and/or 3100 in FIGS. 29-31) described below. For example, method 1900 may include one or more of the characteristics of the various methods described above with reference to method 1600. For example, a device receiving data identifying a plurality of independently configurable graphical elements (as shown at block 1902 in method 1900) can optionally receive concurrently data identifying an asset corresponding to a third-party graphical element (as shown at block 1602 in method 1600). For brevity, these details are not repeated below.

Figure 16B:
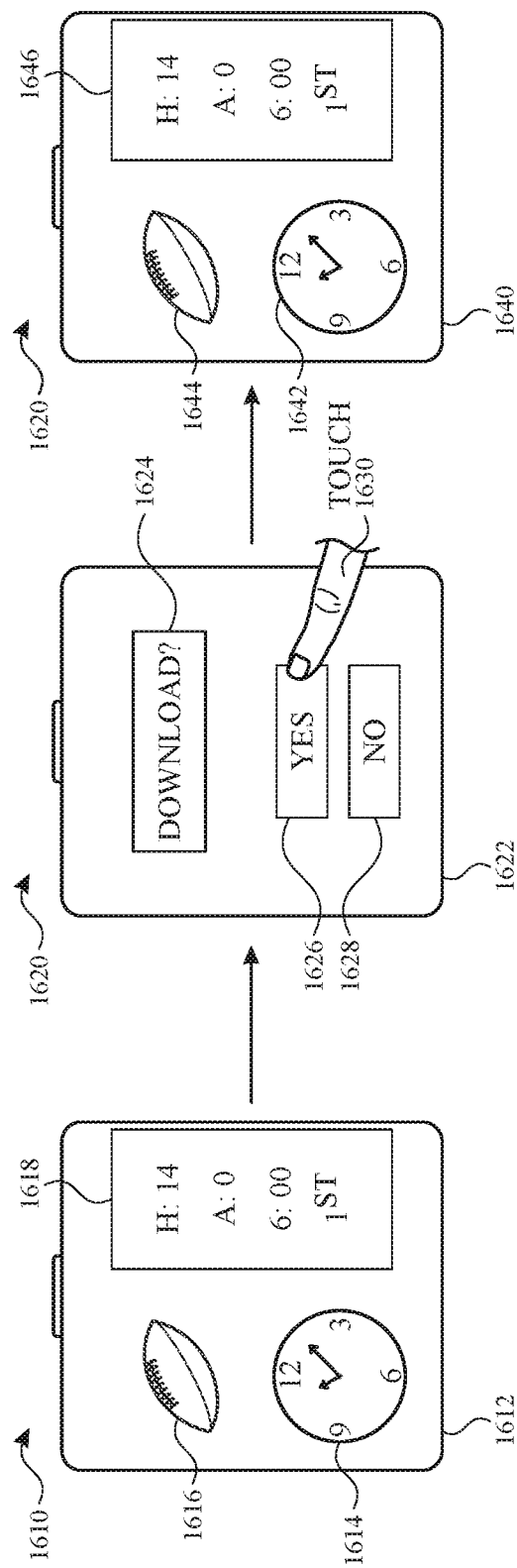
FIG. 16B illustrates exemplary user interfaces for sharing user-configurable graphical constructs.

FIG. 16B illustrates exemplary user interfaces for sharing user-configurable graphical constructs (e.g., containing third-party graphical assets) that can optionally be operated on device 1610 or device 1620, in accordance with some embodiments. Optionally, devices 1610 and 1620 are device 100, 300, or 500 in some embodiments. The electronic devices have a display (e.g., 504). The user interfaces in this figure are used to illustrate the processes described herein, including the processes in FIGS. 16A and 19.

As shown in FIG. 16B, device 1610 displays screen 1612. Screen 1612 shows a user-configurable graphical construct with clock face 1614. Screen 1612 also displays third-party graphical elements: in this case, football icon 1616 and football complication 1618 (e.g., updated with football scores obtained from a third-party football application). The user of device 1610 wishes to send the user-configurable graphical construct of screen 1612 with the user of device 1620. However, the graphical assets corresponding to the third-party graphical elements shown on screen 1612 are not stored in the memory of device 1620.

In response to receiving data from device 1410, and in accordance with a determination that the assets corresponding to the third-party graphical elements are not already stored in the memory of device 1620, device 1620 displays screen 1622. Screen 1622 shows an exemplary user interface providing an option to acquire the assets corresponding to the third-party graphical elements. Screen 1622 includes a message 1624 asking the user whether to download the third-party graphical assets and affordances 1626 and 1628 for choosing to download, or not to download, the third-party graphical assets, respectively. In this example, the user touches displayed "yes" affordance 1626 with touch 1630. In response to detecting touch 1630, device 1620 downloads, or provides an interface to download, the third-party graphical assets. Optionally, as shown on screen 1640, device 1620 displays the user-configurable graphical construct, including clock face 1642, football icon 1644, and football complication 1646, corresponding to 1614, 1616, and 1618, respectively. In some embodiments, third-party graphical assets may be obtained from a third-party website (e.g., accessed by device 1620 or an external device coupled to device 1620 via wireless communication), an online store, or any other source for downloading and/or purchasing applications.

Figure 17:
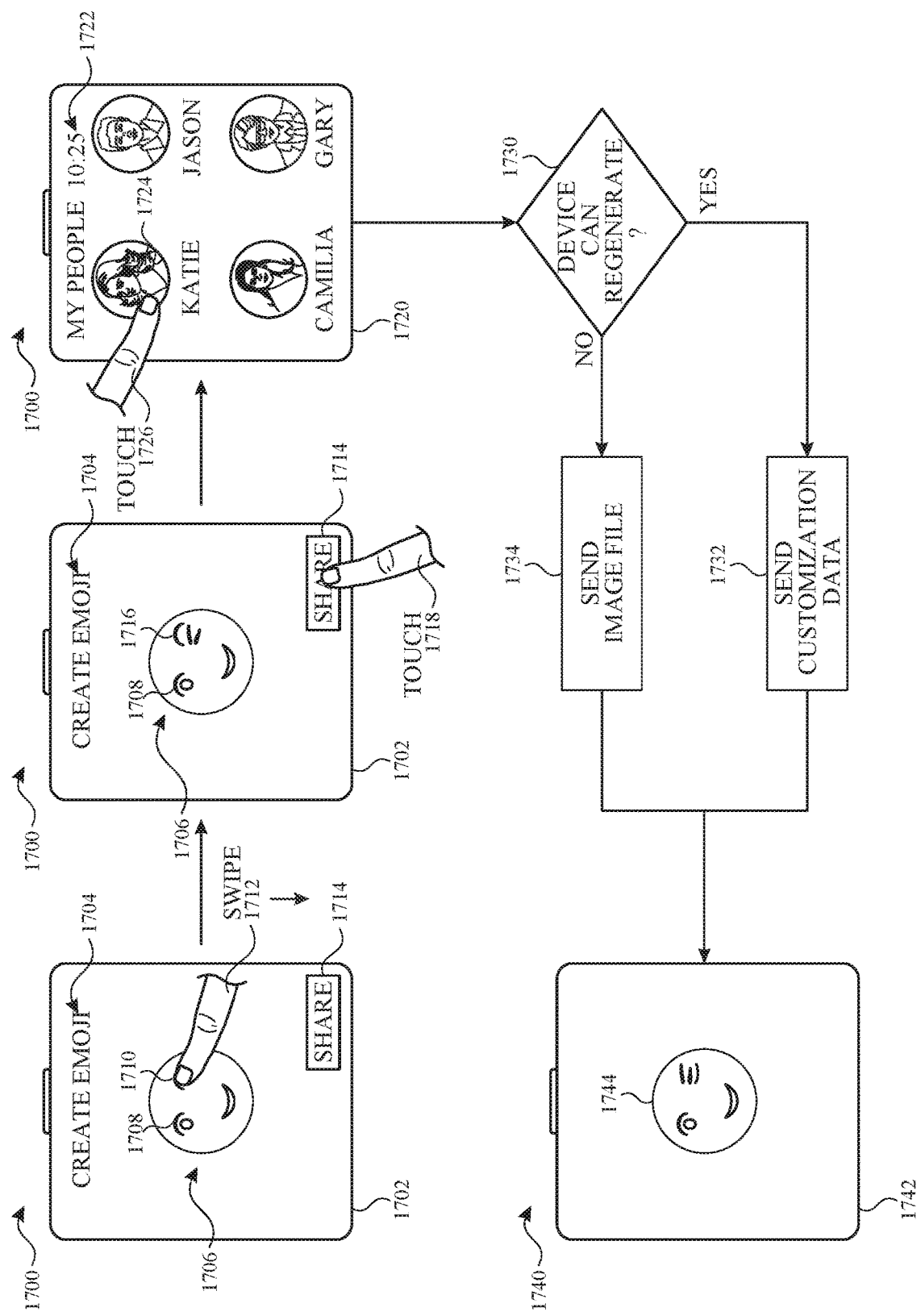
FIG. 17 illustrates exemplary user interfaces for sharing user-configurable graphical constructs.

Turning now to FIG. 17, a user may wish to send an emoji graphical object. FIG. 17 illustrates exemplary user interfaces for sharing user-configurable graphical constructs that can optionally be operated on device 1700, in accordance with some embodiments. Optionally, device 1700 is device 100, 300, or 500 in some embodiments. The electronic device has a display (e.g., 504). The user interfaces in this figure are used to illustrate the processes described below, including the processes in FIGS. 20A and 20B.

As described above, one possible class of emoji graphical objects are those containing a plurality of independently configurable graphical elements selected from a discrete set of graphical assets stored in the memory of device 1700. These independently configurable graphical elements of the emoji graphical object may include configurable facial features, such as eyes, eyebrows, a nose, mouth, hair, teeth, a tongue, skin, face shape, and the like, as illustrated in FIG. 8B.

Another possible class of emoji graphical objects includes user-customized emoji graphical objects generated by user manipulation(s) of a customizable "base" emoji graphical object. A user may wish to express an emotion or provide a simple message (e.g., I'm happy or unhappy, yes or no) to a recipient. It may be difficult for the user to quickly and efficiently provide textual information to express the emotion or provide the message. Thus, it may be helpful to display an interactive emoji (e.g., a customizable "base" emoji graphical object), which the user can manipulate to generate a user-customized emoji graphical object to express the emotion or provide the message. The manipulated emoji may then be sent to a recipient. U.S. Provisional Application Ser. No. 62/044,923, which is hereby incorporated by reference in its entirety, describes exemplary methods for manipulating an emoji based on user input, aspects of which may be used in the methods described herein. These methods reduce the cognitive burden on a user preparing an emoji graphical object using a device, thereby creating a more efficient human-machine interface. For battery-operated computing devices, enabling a user to prepare a message faster and more efficiently conserves power and increases the time between battery charges.

As illustrated in FIG. 17, in some embodiments, device 1700 can optionally display screen 1702, which includes emoji graphical object 1706. Device 1700 can optionally receive a user input corresponding to a manipulation of emoji graphical object 1706. In this example, the user provides downward swipe 1712 on displayed right eye 1710. Prior to receipt of swipe 1712, displayed right eye 1710 looks identical to displayed left eye 1708. Screen 1702 also includes affordance 1714 for sharing an emoji graphical object.

In response to receiving the user input (e.g., swipe 1712), device 1700 can optionally change a visual aspect of the emoji graphical object, based at least in part on the manipulation, to generate a user-customized emoji graphical object. As shown in FIG. 17, in response to receiving swipe 1712, device 1700 updates emoji graphical object 1706 to display right eye 1716. Compared to right eye 1710, a visual aspect of displayed right eye 1716 has been changed based on the manipulation. For example, the manipulation of swipe 1712 included a downward movement, and right eye 1716 has been changed to depict a close or winking eye (e.g., to depict a closing of the eyelid).

In some embodiments, as depicted in FIG. 17, device 1700 includes a touch-sensitive surface, and a touch gesture on the display can optionally be used to change a particular visual aspect of the emoji graphical object. For example, when the device receives a smile touch gesture (e.g., a touch gesture in a "U" shape), device 1700 can optionally change the mouth of the emoji graphical object to indicate a smile. When device 1700 receives a frown touch gesture (e.g., a touch gesture in an upside-down "U" shape), device 1700 can optionally change the mouth of the emoji graphical object to indicate a frown. In some examples, different degrees of an up or down swipe cause the emoji graphical object to have correspondingly different degrees of a happy or sad mouth. As illustrated in FIG. 17, when device 1700 receives an eye closing touch gesture (e.g., a touch gesture in an downward swipe across an eye), device 1700 can optionally change the eye of the emoji graphical object to represent a closed or winking eye. The smile touch gesture and the frown touch gesture do not need to be at the location of the emoji graphical object's mouth (similarly, the eye closing touch gesture does not need to be at the location of the emoji graphical object's eye). This allows the user to quickly modify a visual aspect of the emoji graphical object without requiring a high degree of precision of the location of the touch gesture. As will be understood, other gestures, such as tapping, can optionally be used to change the emoji elements. For example, repeatedly tapping the same element can change it through various states. Thus, the user can manipulate different visual aspects of the emoji graphical object by providing user input, prior to sending the emoji graphical object to the recipient.

In accordance with some embodiments, device 1700 includes a touch-sensitive surface, and the user input associated with the emoji graphical object comprises a touch gesture at a location on the touch-sensitive surface associated with the first visual aspect of the emoji graphical object (e.g., the user performs a drag, swipe, or tap on the eye of the emoji).

In accordance with some embodiments, device 1700 includes a touch-sensitive surface configured to detect intensity of touches. Optionally, the user input associated with the emoji graphical object comprises a touch gesture having a characteristic intensity (e.g., the user tap has an intensity; deep press or light press). In response to receiving the user input and in accordance with a determination that the characteristic intensity exceeds an intensity threshold (e.g., the touch gesture is a deep press), device 1700 changes a visual aspect of the emoji graphical object by changing a first feature of the emoji graphical object (e.g., changing the size or color of the emoji).

In accordance with some embodiments, in response to receiving the user input and in accordance with a determination that the characteristic intensity does not exceed the intensity threshold (e.g., the touch gesture is not a deep press), changing a visual aspect of the emoji graphical object comprises changing a second feature of the emoji graphical object different than the first feature (e.g., changing the expression or orientation of the emoji). Thus, a touch gesture can change different features of the emoji graphical object based on the characteristic intensity of the touch.

In some embodiments, the user-customized emoji graphical object is an animated emoji graphical object (e.g., the emoji winks and/or the tongue of the emoji flops around). In some embodiments, changing the visual aspect of the emoji graphical object includes animating a change in the visual aspect of the emoji graphical object (e.g., a swipe up on a corner of a smiley's mouth causes the mouth to get bigger/more happy). For example, in some embodiments, the transmitted data can include additional information, such as the order in which the elements were changed, so that the emoji is animated in the same fashion at the recipient device.

Device 1700 can optionally receive a user input corresponding to selection of the user-customized emoji graphical object for sharing. For example, as shown in FIG. 17, the user can optionally touch "share" affordance 1714 (e.g., touch 1718). Optionally, other user inputs can be used, such as other touch gestures, inputs on input mechanisms such as 506 or 508, and/or audio (e.g., voice) inputs.

Device 1700 can optionally display a user interface for selecting a recipient device. As shown in FIG. 17, device 1700 displays screen 1720, which displays several contacts from the user's contacts list (e.g., as depicted by heading 1722, "My People," along with an optional display of a time of day, such as the current time). In some embodiments, device 1700 can optionally receive a user input corresponding to selection of the user-customized emoji graphical object for sharing before displaying a user interface for selecting a recipient device (e.g., as illustrated in FIG. 17 and similar to the sequence of user interfaces shown in FIG. 9). In other embodiments, device 1700 can optionally display a user interface for selecting a recipient device before receiving a user input corresponding to selection of the user-customized emoji graphical object for sharing. For example, similar to FIG. 10, a recipient device is selected by a user, then an emoji graphical object is displayed, a user input corresponding to a manipulation is received, a user-customized emoji graphical object based on the manipulation is generated, and a user input corresponding to selection of the user-customized emoji graphical object for sharing is received.

In some embodiments, while displaying the user interface for selecting a recipient device, device 1700 can optionally receive a user input corresponding to a selection of the recipient device. In the example shown in FIG. 17, the user can optionally touch (e.g., touch 1726) a displayed contact (e.g., contact 1724) to select a recipient device associated with the displayed contact. Device 1700 can optionally display a list of user contacts stored in device 1700, or on an external device coupled to device 1700 via wireless communication, or it can optionally display a list of nearby electronic devices configured to receive a shared graphical construct. Optionally, other user inputs can used, such as other touch gestures, inputs on input mechanisms such as 506 or 508, and/or audio (e.g., voice) inputs.

After receiving the user input corresponding to selection of the user-customized emoji graphical object for sharing (e.g., touch 1718) and the user input corresponding to a selection of the recipient device (e.g., touch 1726), device 1700 can optionally determine whether the recipient device (e.g., device 1740) is capable of re-generating the user-customized emoji graphical object based on data identifying the manipulation (e.g., as depicted in 1730). For example, device 1700 determines whether the recipient device is configured to receive data representing a manipulation of an emoji graphical object and to use the data to re-render the user-customized emoji graphical object based on the manipulation. Device 1700 can optionally determine whether the recipient device has a graphical asset stored in memory representing the "base" emoji graphical object used as the starting point for re-rendering the user-customized emoji graphical object based on the manipulation.

At 1732, in accordance with a determination that the recipient device is capable of re-generating the user-customized emoji graphical object based on data identifying the manipulation, device 1700 can optionally transmit to the recipient device (e.g., device 1740) data identifying the manipulation for generating the user-customized emoji graphical object. Optionally, the customization data of 1732 includes instructions for re-rendering the user-customized emoji graphical object, or includes data representing the manipulation for re-rendering the user-customized emoji graphical object. As described above, in some embodiments, the transmitted data can include additional information, such as the order in which the elements were changed, so that the user-customized emoji graphical object is animated in the same fashion at the recipient device. Advantageously, sending data identifying the manipulation for generating the user-customized emoji graphical object (rather than a large animated image file) saves bandwidth and promotes more efficient data transfer, thereby conserving power and increasing battery life.

At 1734, in accordance with a determination that the recipient device is not capable of re-generating the user-customized emoji graphical object based on data identifying the manipulation, device 1700 can optionally transmit to the recipient device (e.g., device 1740) data comprising an image representing the user-customized emoji graphical object (e.g., an image file, such as an animated GIF file). This allows the user to send a user-customized emoji graphical object to a device regardless of whether the device is capable of re-generating the user-customized emoji graphical object based on data identifying the manipulation.

One or more protocols can optionally be used to transmit data identifying the manipulation for generating the user-customized emoji graphical object or data comprising an image representing the user-customized emoji graphical object. For example, one or more protocols such as near field communication (NFC), Wi-Fi, Bluetooth, Bluetooth low energy (BTLE), a cellular protocol, and/or other wireless communication techniques described herein can optionally be used. In some embodiments, an ad-hoc network such as AirDrop® (Apple Inc.) can optionally be used. In some embodiments, a device or external device coupled via wireless communication to an electronic device can optionally be configured to use multiple protocols, either in combination or as single alternative protocols. In some embodiments, a device or external device coupled via wireless communication to an electronic device can optionally be configured to employ different protocols, depending on context. For example, NFC and/or WiFi can optionally be used to transmit data if the recipient device is in sufficient proximity (e.g., 10 cm or less) or on a shared WLAN with the sender device, and a cellular protocol can optionally be used if the sender and recipient devices are farther away or not on a shared WLAN. In some embodiments, the data can optionally be transmitted via email (e.g., as an attachment, or an embedded link in an email), peer-to-peer (P2P) communications over WiFi and/or NFC, text message (e.g., iMessage®, or a separate graphical construct messaging channel), or upload to a website or cloud-based server.

As shown in FIG. 17, device 1740 receives the data from device 1700. Device 1740 may be device 100, 300, or 500 in some embodiments. The electronic device has a display (e.g., 504). As described above, regardless of whether device 1740 is capable of re-generating the user-customized emoji graphical object based on data identifying the manipulation, device 1740 can optionally display the user-customized emoji graphical object. That is to say, device 1740 is capable of re-generating the user-customized emoji graphical object based on the received data identifying the manipulation, or device 1740 is capable of displaying the user-customized emoji graphical object based on the received data comprising an image representing the user-customized emoji graphical object.

Device 1740 can optionally receive data identifying a manipulation for generating a user-customized emoji graphical object from an emoji graphical object stored in the memory of device 1740 (e.g., memory 518) and change a visual aspect of the emoji graphical object based on the manipulation to generate the user-customized emoji graphical object (e.g., as described above). In some embodiments, device 1740 can optionally display the user-customized emoji graphical object, as shown on screen 1742. Device 1740 displays user-customized emoji graphical object 1744, which corresponds to the user-customized emoji graphical object displayed on screen 1702 of device 1700. In some embodiments, device 1740 can optionally store the user-customized emoji graphical object in a memory.

A variety of user inputs can optionally be used as the user input corresponding to a manipulation of the emoji graphical object. As described above, various touch gestures are contemplated. In some embodiments, the display is a touch-sensitive display, and the first user input comprises a touch gesture at a location on the touch-sensitive display associated with the visual aspect of the emoji graphical object. In other embodiments, as described above, the touch gesture is not at a location on the touch-sensitive display associated with the visual aspect of the emoji graphical object. In some embodiments, device 1700 includes a rotatable input mechanism (e.g., input mechanism 506), and the user input corresponding to a manipulation of the emoji graphical object includes a rotation of the rotatable input mechanism. For example, a user can optionally rotate the rotatable input mechanism to change the shape of the eye. In some embodiments, device 1700 may include a touch-sensitive display and a rotatable input mechanism, and the user input corresponding to a manipulation of the emoji graphical object may include a rotation of the rotatable input mechanism and a touch on the display. For example, the user may tap or tap and hold on the displayed eye of the emoji to identify the feature to change and rotate the rotatable input mechanism to cause the change of the identified feature.

One or more protocols can optionally be used to receive data identifying a manipulation for generating a user-customized emoji graphical object from an emoji graphical object stored in memory. For example, one or more protocols such as near field communication (NFC), Wi-Fi, Bluetooth, Bluetooth low energy (BTLE), a cellular protocol, and/or other wireless communication techniques described herein can optionally be used. In some embodiments, an ad-hoc network such as AirDrop® (Apple Inc.) can optionally be used. In some embodiments, a device or external device coupled via wireless communication to an electronic device can optionally be configured to use multiple protocols, either in combination or as single alternative protocols. In some embodiments, a device or external device coupled via wireless communication to an electronic device can optionally be configured to employ different protocols, depending on context. For example, NFC and/or WiFi can optionally be used to receive data if the recipient device is in sufficient proximity (e.g., 10 cm or less) to the sender device or on a shared WLAN with the sender device, and a cellular protocol can optionally be used if the sender and recipient devices are farther away or not on a shared WLAN. In some embodiments, the data can optionally be received via email (e.g., as an attachment, or an embedded link in an email), peer-to-peer (P2P) communications over WiFi and/or NFC, text message (e.g., iMessage®, or a separate graphical construct messaging channel), or download from a website or cloud-based server.

In some embodiments, data identifying a manipulation for generating a user-customized emoji graphical object from an emoji graphical object stored in memory can optionally be received from a QR code read by a QR code scanner (similar to the concept illustrated in FIG. 13A). In some embodiments, a recipient device such as device 1740 can optionally include a QR code scanner. In some embodiments, a recipient device such as device 1740 can optionally be coupled via wireless communication to an external device with a QR code scanner and can optionally receive the data identifying the manipulation for generating a user-customized emoji graphical object from an emoji graphical object stored in memory from the external device, based on the QR code.

In some embodiments, data identifying a manipulation for generating a user-customized emoji graphical object from an emoji graphical object stored in memory can optionally be received via near field communication (NFC) from a second electronic device (e.g., device 1700). In some embodiments, data identifying a manipulation for generating a user-customized emoji graphical object from an emoji graphical object stored in memory can optionally be received via near field communication (NFC) from an NFC sticker or tag, similar to the concept illustrated in FIG. 13B. In some embodiments, data identifying a manipulation for generating a user-customized emoji graphical object from an emoji graphical object stored in memory can optionally be received through a messaging protocol (e.g., text messaging), similar to the concept illustrated in FIG. 13C.

Figure 18:
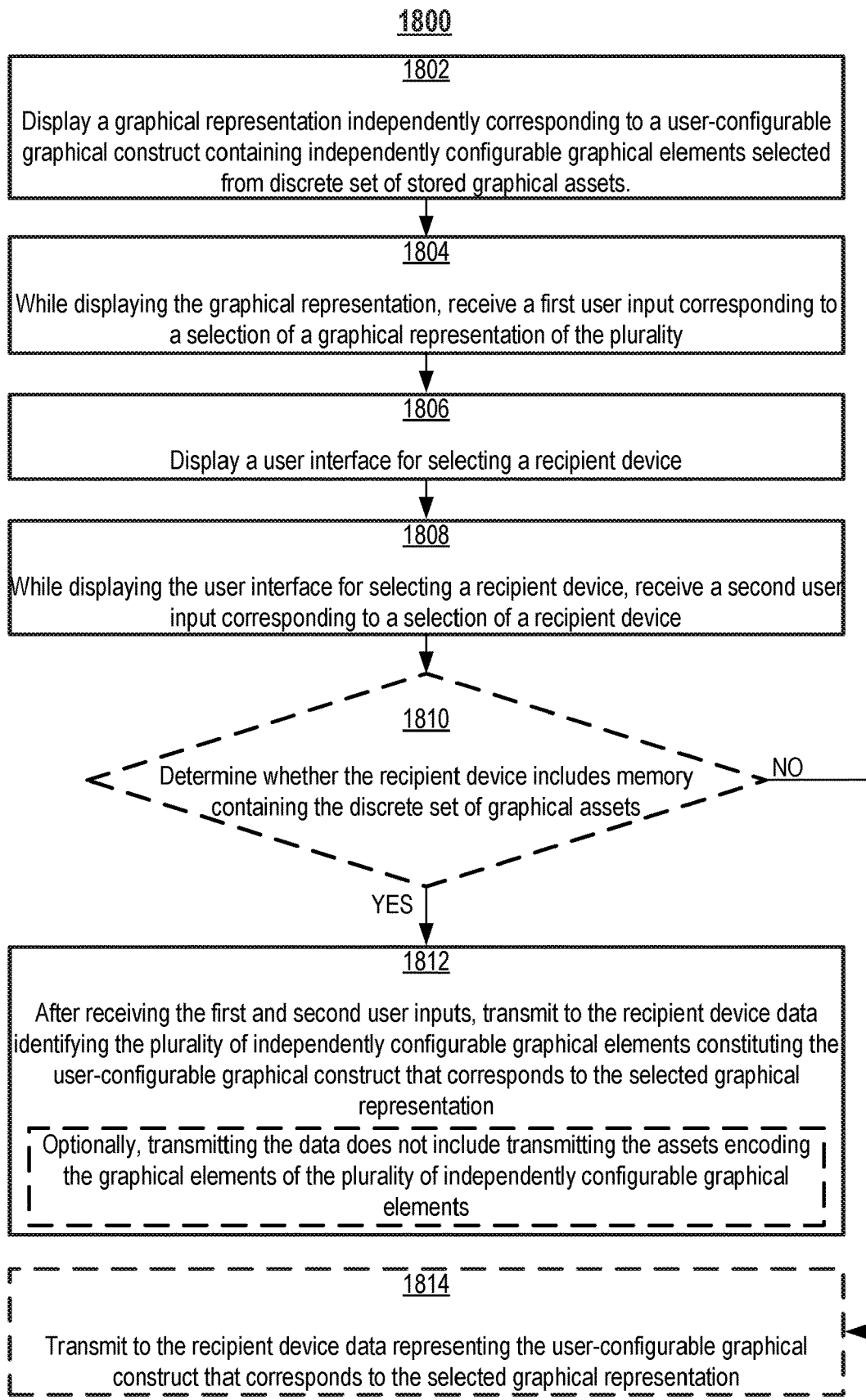
FIG. 18 is a flow diagram illustrating a process for sharing user-configurable graphical constructs.

FIG. 18 is a flow diagram illustrating a method for sharing user-configurable graphical constructs using an electronic device in accordance with some embodiments. Method 1800 is performed at a device (e.g., 100, 300, or 500) with a display. Some operations in method 1800 may be combined, the order of some operations may be changed, and some operations may be omitted.

As described below, method 1800 provides an intuitive way for sharing user-configurable graphical constructs. The method reduces the cognitive burden on a user for sharing user-configurable graphical constructs, thereby creating a more efficient human-machine interface. For battery-operated computing devices, enabling a user to share user-configurable graphical constructs faster and more efficiently conserves power and increases the time between battery charges.

At block 1802, the device displays a graphical representation (e.g., from a plurality of graphical representations) that independently corresponds to a user-configurable graphical construct comprising a plurality of independently configurable graphical elements, where each graphical element of the plurality is selected from a discrete set of graphical assets stored in the memory of the electronic device. At block 1804, while displaying the graphical representation, the device receives a first user input corresponding to a selection of the graphical representation (e.g., from the plurality of graphical representations). At block 1806, the device displays a user interface for selecting a recipient device. At block 1808, while displaying the user interface for selecting a recipient device, the device receives a second user input corresponding to a selection of a recipient device. Optionally, at block 1810, the device determines whether the recipient device includes memory comprising the discrete set of graphical assets associated with the plurality of independently configurable graphical elements constituting the user-configurable graphical construct that corresponds to the selected graphical representation. At block 1812, optionally in accordance with a determination that the recipient device includes memory comprising the discrete set of graphical assets associated with the plurality of independently configurable graphical elements, after receiving the first user input and the second user input, the device transmits to the recipient device data identifying the plurality of independently configurable graphical elements constituting the user-configurable graphical construct that corresponds to the selected graphical representation. Optionally, at block 1812, transmitting the data identifying the plurality of independently configurable graphical elements constituting the user-configurable graphical construct that corresponds to the selected graphical representation does not include transmitting the assets encoding the graphical elements of the plurality of independently configurable graphical elements. Optionally, at block 1814, in accordance with a determination that the recipient device does not include memory comprising the discrete set of graphical assets associated with the plurality of independently configurable graphical elements, the device transmits to the recipient device data representing the user-configurable graphical construct that corresponds to the selected graphical representation.

Note that details of the processes described above with respect to method 1800 (e.g., FIG. 18) are also applicable in an analogous manner to methods 1600 (FIG. 16A) and 1900-2100 (FIGS. 19-21) described herein. For example, method 2000 may include one or more of the characteristics of the various methods described above with reference to method 1800. For example, certain aspects of sharing an emoji graphical object depicted in method 2000, such as user interfaces for selecting a recipient device, may include one or more characteristics of method 1800 (e.g., at block 1806). For brevity, these details are not repeated below.

Figure 19:
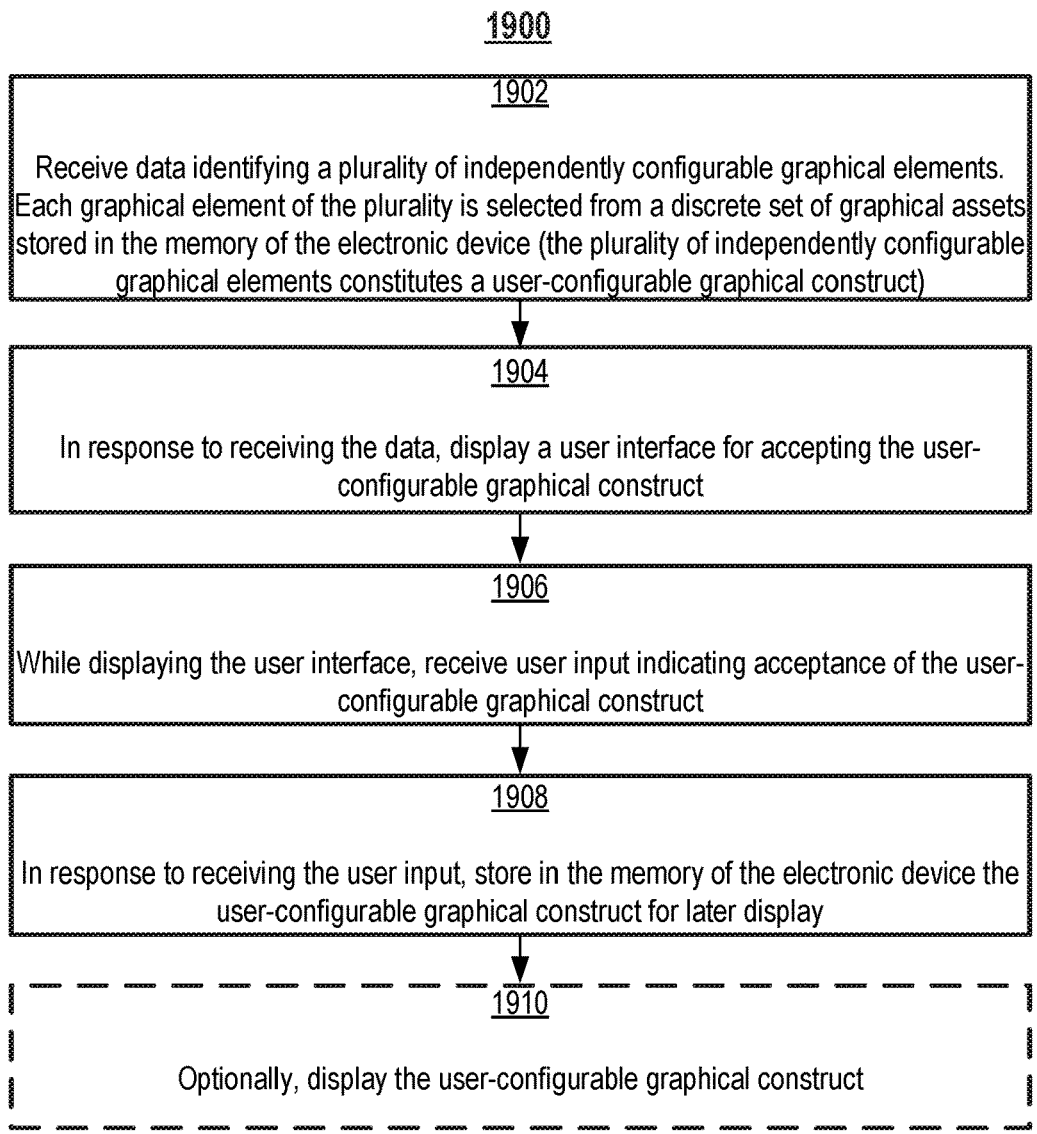
FIG. 19 is a flow diagram illustrating a process for sharing user-configurable graphical constructs.

FIG. 19 is a flow diagram illustrating a method for sharing user-configurable graphical constructs using an electronic device in accordance with some embodiments. Method 1900 is performed at a device (e.g., 100, 300, or 500) with a display. Some operations in method 1900 may be combined, the order of some operations may be changed, and some operations may be omitted.

As described below, method 1900 provides an intuitive way for sharing user-configurable graphical constructs. The method reduces the cognitive burden on a user for sharing user-configurable graphical constructs, thereby creating a more efficient human-machine interface. For battery-operated computing devices, enabling a user to share user-configurable graphical constructs faster and more efficiently conserves power and increases the time between battery charges.

At block 1902, the device receives data identifying a plurality of independently configurable graphical elements. Each graphical element of the plurality of independently configurable graphical elements is selected from a discrete set of graphical assets stored in the memory of the electronic device, and the plurality of independently configurable graphical elements constitutes a user-configurable graphical construct. At block 1904, responsive at least in part to receiving the data, the device displays a user interface for accepting the user-configurable graphical construct. At block 1906, while displaying the user interface for accepting the user-configurable graphical construct, the device receives a user input indicating acceptance of the user-configurable graphical construct. At block 1908, responsive at least in part to receiving the user input, the device stores in a memory the user-configurable graphical construct for later display. The user-configurable graphical construct includes the plurality of independently configurable graphical elements selected from the discrete set of graphical assets stored in the memory. Optionally, at block 1910, the device displays the user-configurable graphical construct.

Note that details of the processes described above with respect to method 1900 (e.g., FIG. 19) are also applicable in an analogous manner to methods 1600 (FIG. 16A), 1800 (FIG. 18) and 2000-2100 (FIGS. 20A-21) described herein. For example, method 2100 may include one or more of the characteristics of the various methods described above with reference to method 1900. For example, certain aspects of receiving data (e.g., from another electronic device) depicted in method 2100 may include one or more characteristics of method 1900. For brevity, these details are not repeated below.

FIG. 20A is a flow diagram illustrating a method for sharing user-configurable graphical constructs using an electronic device in accordance with some embodiments. Method 2000 is performed at a device (e.g., 100, 300, or 500) with a display. Some operations in method 2000 may be combined, the order of some operations may be changed, and some operations may be omitted.

As described below, method 2000 provides an intuitive way for sharing user-configurable graphical constructs. The method reduces the cognitive burden on a user for sharing user-configurable graphical constructs, thereby creating a more efficient human-machine interface. For battery-operated computing devices, enabling a user to share user-configurable graphical constructs faster and more efficiently conserves power and increases the time between battery charges.

At block 2002, the device displays an emoji graphical object. At block 2004, the device receives a first user input corresponding to a manipulation of the emoji graphical object. At block 2006, responsive at least in part to receiving the first user input, the device changes a visual aspect of the emoji graphical object to generate a user-customized emoji graphical object. The change in the visual aspect is based on the manipulation. At block 2008, the device receives a second user input corresponding to selection of the user-customized emoji graphical object for sharing. At block 2010, the device displays a user interface for selecting a recipient device.

Figure 20B:
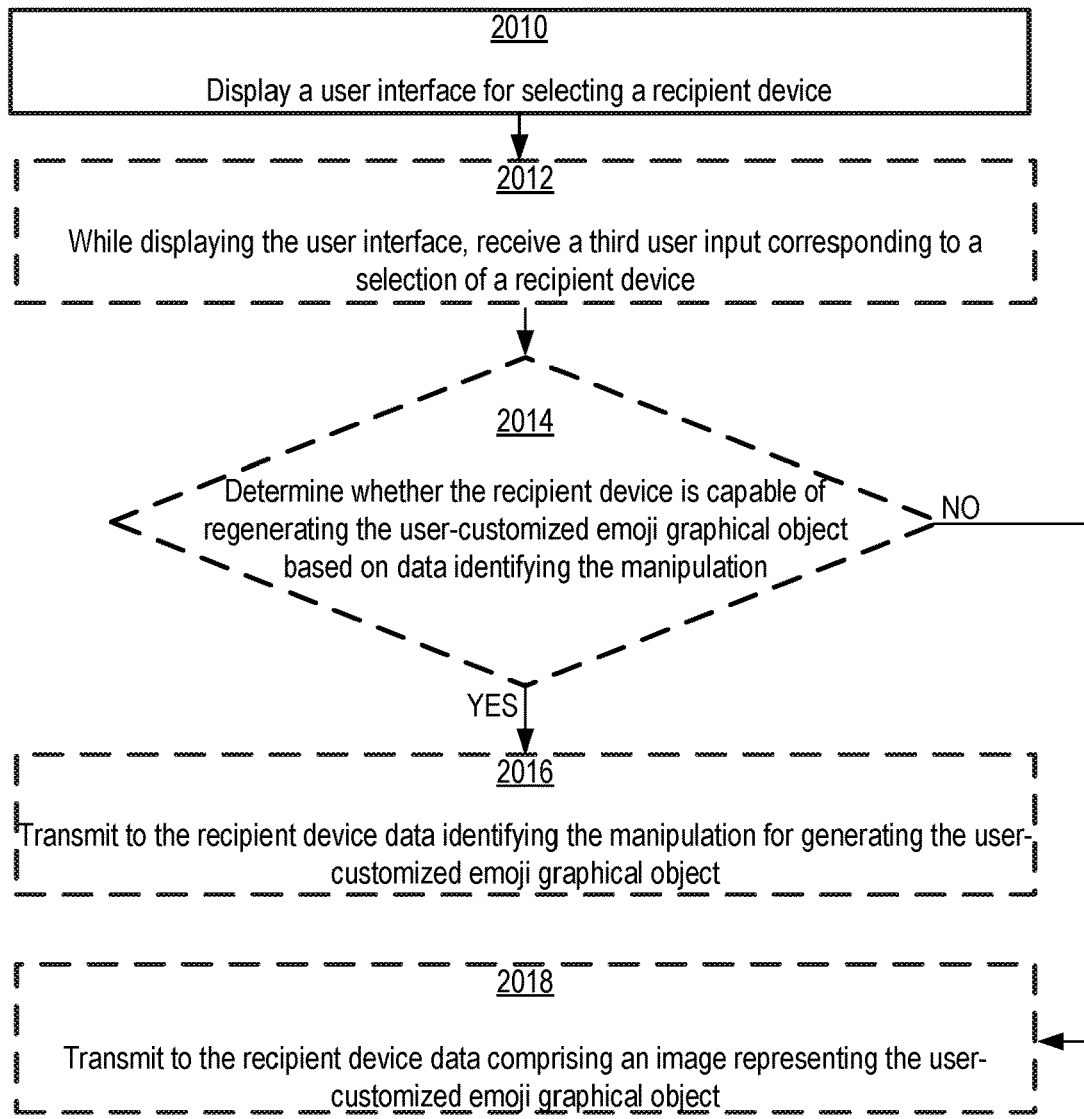
FIG. 20B is a flow diagram illustrating a process for sharing user-configurable graphical constructs.

FIG. 20B is a flow diagram illustrating steps that may optionally be included in method 2000 for sharing user-configurable graphical constructs using an electronic device in accordance with some embodiments. Beginning with block 2010 as shown in FIG. 20A and described above, the device displays a user interface for selecting a recipient device. Optionally, at block 2012, while displaying the user interface for selecting a recipient device, the device receives a third user input corresponding to a selection of a recipient device. Optionally, at block 2014, the device determines whether the recipient device is capable of re-generating the user-customized emoji graphical object based on data identifying the manipulation. Optionally, at block 2016, in accordance with a determination that the recipient device is capable of re-generating the user-customized emoji graphical object based on data identifying the manipulation, the device transmits to the recipient device data identifying the manipulation for generating the user-customized emoji graphical object. Optionally, at block 2018, in accordance with a determination that the recipient device is not capable of re-generating the user-customized emoji graphical object based on data identifying the manipulation, the device transmits to the recipient device data comprising an image representing the user-customized emoji graphical object.

Note that details of the processes described above with respect to method 2000 (e.g., FIGS. 20A and 20B) are also applicable in an analogous manner to methods 1600 (FIG. 16A), 1800 (FIG. 18), 1900 (FIG. 19) 2100 (FIG. 21) described herein. For example, method 2100 may include one or more of the characteristics of the various methods described above with reference to method 2000. For example, certain aspects of data identifying a manipulation for generating a user-customized emoji graphical object from an emoji graphical object depicted in method 2100 (e.g., at block 2102) may include one or more characteristics of method 2000 (e.g., at block 2016). For brevity, these details are not repeated below.

FIG. 21 is a flow diagram illustrating a method for sharing user-configurable graphical constructs using an electronic device in accordance with some embodiments. Method 2100 is performed at a device (e.g., 100, 300, or 500) with a display. Some operations in method 2100 may be combined, the order of some operations may be changed, and some operations may be omitted.

As described below, method 2100 provides an intuitive way for sharing user-configurable graphical constructs. The method reduces the cognitive burden on a user for sharing user-configurable graphical constructs, thereby creating a more efficient human-machine interface. For battery-operated computing devices, enabling a user to share user-configurable graphical constructs faster and more efficiently conserves power and increases the time between battery charges.

At block 2102, the device receives data identifying a manipulation for generating a user-customized emoji graphical object from an emoji graphical object stored in the memory of the device. At block 2104, the device changes a visual aspect of the emoji graphical object based on the manipulation to generate the user-customized emoji graphical object. At block 2106, the device displays the user-customized emoji graphical object.

Note that details of the processes described above with respect to method 2100 (e.g., FIG. 21) are also applicable in an analogous manner to methods 1600 (FIG. 16A) and 1800-2000 (FIGS. 18-20B) described herein. For example, method 2100 may include one or more of the characteristics of the various methods described above with reference to method 2000. For example, certain aspects related to changing a visual aspect of an emoji graphical object based on a manipulation, as depicted in method 2100 (e.g., at block 2104), may include one or more characteristics of method 2000 (e.g., at block 2006). For brevity, these details are not repeated above.

Figure 22:
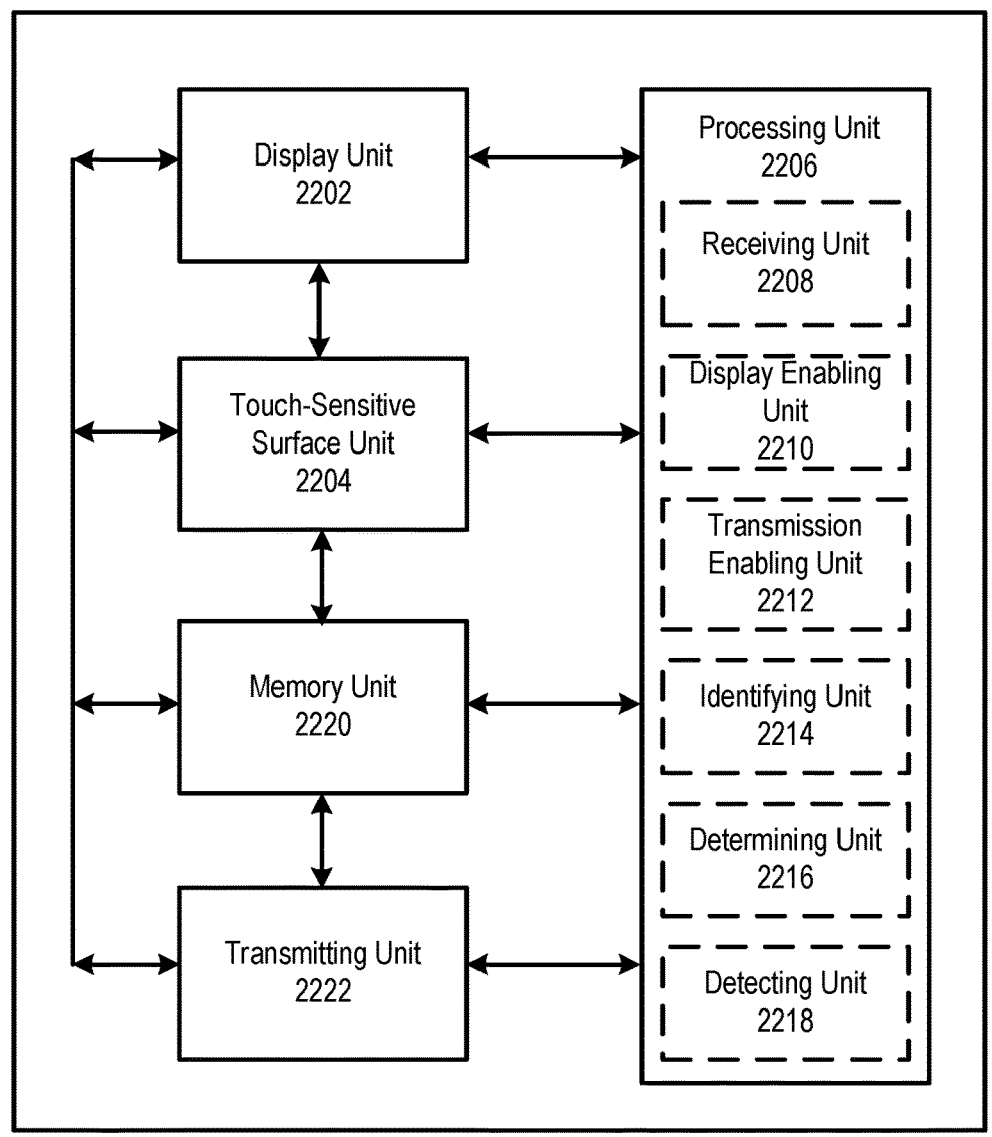
FIG. 22 is a functional block diagram of an electronic device in accordance with some embodiments.

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes a display unit 2202 configured to display a graphic user interface (optionally configured to receive contacts as a touch-sensitive display), a touch-sensitive surface unit 2204 configured to receive contacts, a memory unit 2220 configured to store data, a transmitting unit 2222 configured to transmit and optionally receive data, and a processing unit 2206 coupled to the display unit 2202, the touch-sensitive surface unit 2204, the memory unit 2220, and the transmitting unit 2222. In some embodiments in which display unit 2202 is a touch-sensitive display unit configured to receive contacts, display unit 2202 and touch-sensitive surface unit 2204 may be the same unit. In some embodiments, the processing unit 2206 includes a receiving unit 2208, a display enabling unit 2210, a transmission enabling unit 2212, an identifying unit 2214, a determining unit 2216, and a detecting unit 2218.

The processing unit 2206 is configured to enable display (e.g., with display enabling unit 2210), on the display unit (e.g., display unit 2202), of a graphical representation from a plurality of graphical representations, wherein the graphical representation from the plurality of graphical representations independently corresponds to a user-configurable graphical construct comprising a plurality of independently configurable graphical elements, wherein each graphical element of the plurality is selected from a discrete set of graphical assets stored in the memory unit (e.g., memory unit 2220) of the electronic device; while enabling display (e.g., with display enabling unit 2210), on the display unit (e.g., display unit 2202), of the graphical representation, receive (e.g., with receiving unit 2208) a first user input corresponding to a selection of the graphical representation from the plurality of graphical representations; enable display (e.g., with display enabling unit 2210), on the display unit (e.g., display unit 2202), of a user interface for selecting a recipient device; while enabling enable display (e.g., with display enabling unit 2210), on the display unit (e.g., display unit 2202), of the user interface for selecting a recipient device, receive (e.g., with receiving unit 2208) a second user input corresponding to a selection of a recipient device; and after receiving the first user input and the second user input: enable transmission (e.g., with transmission enabling unit 2212), by the transmitting unit (e.g., transmitting unit 2222), to the recipient device data identifying the plurality of independently configurable graphical elements constituting the user-configurable graphical construct that corresponds to the selected graphical representation.

In some embodiments, the processing unit 2206 is further configured to: prior to enabling transmission (e.g., with transmission enabling unit 2212), by the transmitting unit (e.g., transmitting unit 2222), of the data identifying the plurality of independently configurable graphical elements to the recipient device: identify (e.g., with identifying unit 2214), by the transmitting unit (e.g., transmitting unit 2222), the recipient device as a device that includes memory comprising the discrete set of graphical assets associated with the plurality of independently configurable graphical elements constituting the user-configurable graphical construct that corresponds to the selected graphical representation.

In some embodiments, the transmission of data identifying the plurality of independently configurable graphical elements does not include transmission of the assets encoding the graphical elements of the plurality of independently configurable graphical elements.

In some embodiments, the processing unit 2206 is further configured to: prior to enabling transmission (e.g., with transmission enabling unit 2212), by the transmitting unit (e.g., transmitting unit 2222), of the data identifying the plurality of independently configurable graphical elements to the recipient device: determine (e.g., with determining unit 2216, optionally in conjunction with transmitting unit 2222) whether the recipient device includes memory comprising the discrete set of graphical assets associated with the plurality of independently configurable graphical elements constituting the user-configurable graphical construct that corresponds to the selected graphical representation; in accordance with a determination that the recipient device includes memory comprising the discrete set of graphical assets associated with the plurality of independently configurable graphical elements: enable transmission (e.g., with transmission enabling unit 2212), by the transmitting unit (e.g., transmitting unit 2222), to the recipient device data identifying the plurality of independently configurable graphical elements constituting the user-configurable graphical construct that corresponds to the selected graphical representation; and in accordance with a determination that the recipient device does not include memory comprising the discrete set of graphical assets associated with the plurality of independently configurable graphical elements: enable transmission (e.g., with transmission enabling unit 2212), by the transmitting unit (e.g., transmitting unit 2222), to the recipient device data representing the user-configurable graphical construct that corresponds to the selected graphical representation.

In some embodiments, the transmission of the data identifying the plurality of independently configurable graphical elements constituting the user-configurable graphical construct that corresponds to the selected graphical representation does not include transmission of the assets encoding the graphical elements of the plurality of independently configurable graphical elements.

In some embodiments, two or more graphical representations from the plurality of graphical representations are displayed.

In some embodiments, enabling display (e.g., with display enabling unit 2210), on the display unit (e.g., display unit 2202), of the graphical representation occurs before enabling display (e.g., with display enabling unit 2210), on the display unit (e.g., display unit 2202), of the user interface for selecting a recipient device.

In some embodiments, enabling display (e.g., with display enabling unit 2210), on the display unit (e.g., display unit 2202), of the graphical representation occurs after enabling display (e.g., with display enabling unit 2210), on the display unit (e.g., display unit 2202), of the user interface for selecting a recipient device.

In some embodiments, the display unit 2202 is a touch-sensitive display unit, and the first user input corresponding to a selection of one graphical representation comprises: detecting (e.g., with detecting unit 2218), on the touch-sensitive display unit (e.g., display unit 2202), a user contact on the displayed graphical representation; and while continuing to receive the user contact on the touch-sensitive display unit (e.g., display unit 2202), detecting (e.g., with detecting unit 2218) movement of the user contact on the touch-sensitive display unit (e.g., display unit 2202) without a break in contact of the user contact on the touch-sensitive display unit (e.g., display unit 2202).

In some embodiments, the user interface for selecting a recipient device comprises an affordance for sharing the selected graphical representation, and the processing unit 2206 is further configured to: detect (e.g., with detecting unit 2218) a touch on the touch-sensitive surface unit (e.g., touch-sensitive surface unit 2204) on the displayed affordance; and in response to detecting the touch: enable display (e.g., with display enabling unit 2210), on the display unit (e.g., display unit 2202), of a plurality of user contacts.

In some embodiments, receiving the second user input corresponding to a selection of a recipient device comprises detecting (e.g., with detecting unit 2218) a touch on the touch-sensitive surface unit (e.g., touch-sensitive surface unit 2204) on a displayed user contact of the plurality of user contacts.

In some embodiments, the user-configurable graphical construct comprises a watch face.

In some embodiments, the independently configurable graphical elements comprise configurable aspects of the watch face independently selected from the group consisting of watch complications, color, display density, and watch face features.

In some embodiments, the user-configurable graphical construct comprises an emoji graphical object. In some embodiments, the independently configurable graphical elements comprise configurable facial features of the emoji graphical object.

In some embodiments, the data identifying the plurality of independently configurable graphical elements are transmitted by the transmitting unit (e.g., transmitting unit 2222) of the electronic device.

In some embodiments, the data identifying the plurality of independently configurable graphical elements are transmitted by an external device coupled to the electronic device via wireless communication with the transmitting unit (e.g., transmitting unit 2222) of the electronic device.

In some embodiments, the data identifying the plurality of independently configurable graphical elements are transmitted via one or more protocols selected from the group consisting of near field communication, Wi-Fi, Bluetooth, Bluetooth low energy, and a cellular protocol.

The operations described above with reference to FIG. 22 are, optionally, implemented by components depicted in FIGS. 1A-1B or FIG. 18. For example, displaying operation 1802, receiving operation 1804, and displaying operation 1806 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
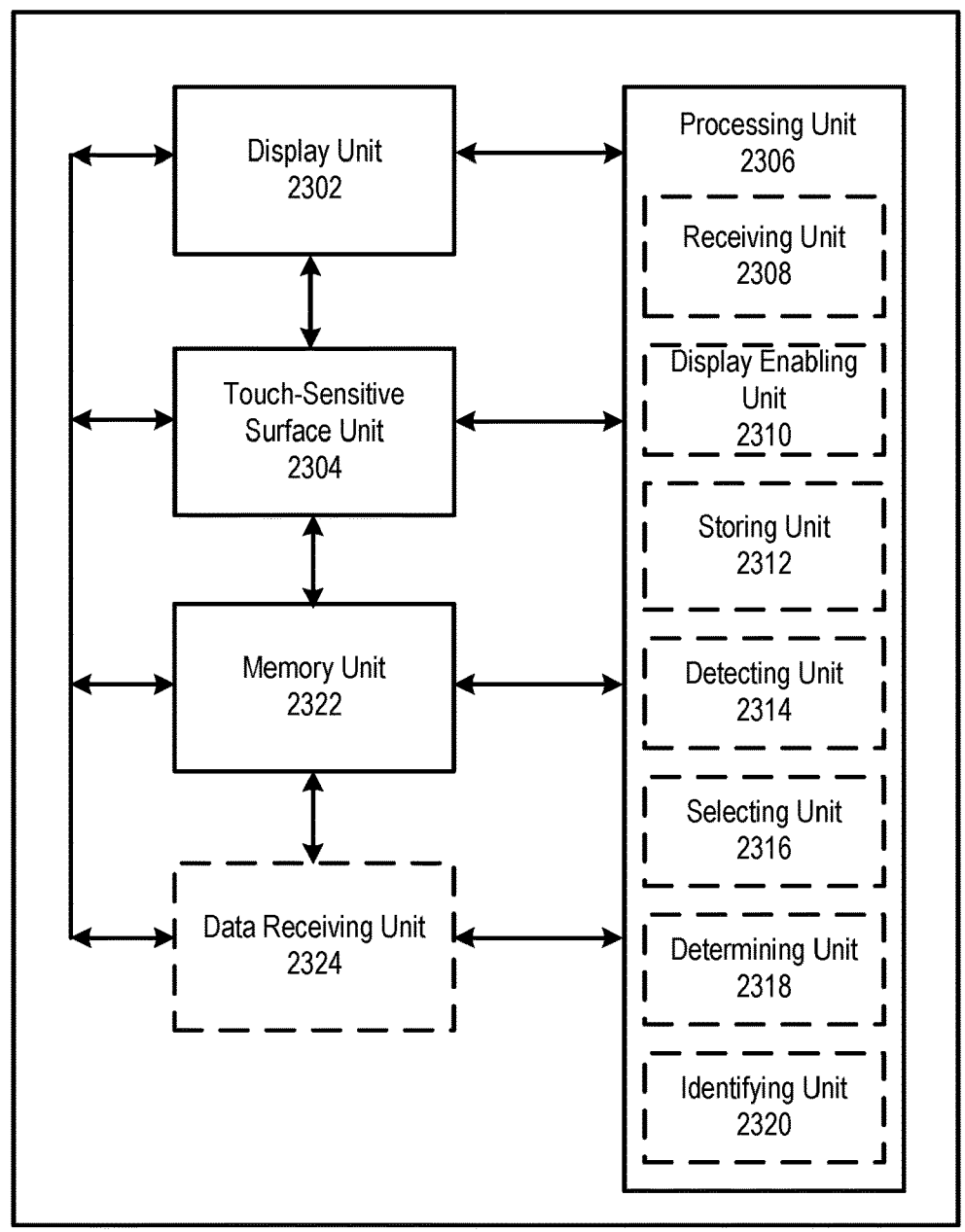
FIG. 23 is a functional block diagram of an electronic device in accordance with some embodiments.

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes a display unit 2302 configured to display a graphic user interface (optionally configured to receive contacts as a touch-sensitive display), a touch-sensitive surface unit 2304 configured to receive contacts, a memory unit 2322 configured to store data, optionally, a data receiving unit 2324 configured to receive and optionally transmit data (in certain embodiments, data receiving unit 2324 is configured to scan QR codes as a QR code scanning unit), and a processing unit 2306 coupled to the display unit 2302, the touch-sensitive surface unit 2304, the memory unit 2322, and optionally, the data receiving unit 2324. In some embodiments in which display unit 2302 is a touch-sensitive display unit configured to receive contacts, display unit 2302 and touch-sensitive surface unit 2304 may be the same unit. In some embodiments, the processing unit 2306 includes a receiving unit 2308, a display enabling unit 2310, a storing unit 2312, a detecting unit 2314, a selecting unit 2316, a determining unit 2318, and an identifying unit 2320.

The processing unit 2306 is configured to receive (e.g., with receiving unit 2308) data identifying a plurality of independently configurable graphical elements, wherein each graphical element of the plurality of independently configurable graphical elements is selected from a discrete set of graphical assets stored in the memory unit (e.g., memory unit 2322) of the electronic device 2300, and wherein the plurality of independently configurable graphical elements constitutes a user-configurable graphical construct; enable display (e.g., with display enabling unit 2310), on the display unit (e.g., display unit 2302), of a user interface for accepting the user-configurable graphical construct; while enabling display (e.g., with display enabling unit 2310), on the display unit (e.g., display unit 2302), of the user interface for accepting the user-configurable graphical construct, receive (e.g., with receiving unit 2308) a user input indicating acceptance of the user-configurable graphical construct; and in response to receiving the user input: store (e.g., with storing unit 2312) in the memory unit (e.g., memory unit 2322) of the electronic device 2300 the user-configurable graphical construct for later display on the display unit (e.g., display unit 2302), the user-configurable graphical construct comprising the plurality of independently configurable graphical elements selected from the discrete set of graphical assets stored in the memory unit (e.g., memory unit 2322).

In some embodiments, the processing unit 2306 is further configured to: in response to receiving the user input: enable display (e.g., with display enabling unit 2310), on the display unit (e.g., display unit 2302), of the user-configurable graphical construct.

In some embodiments, the received data identifying the plurality of independently configurable graphical elements does not include the assets encoding the graphical elements of the plurality of independently configurable graphical elements.

In some embodiments, the processing unit 2306 is further configured to: after storing (e.g., with storing unit 2312) the user-configurable graphical construct in the memory unit (e.g., memory unit 2322) of the electronic device 2300, enable display (e.g., with display enabling unit 2310), on the display unit (e.g., display unit 2302), of a graphical representation corresponding to the user-configurable graphical construct; and receive (e.g., with receiving unit 2308) a second user input indicating selection of the user-configurable graphical construct, wherein enabling display (e.g., with display enabling unit 2310), on the display unit (e.g., display unit 2302), of the user-configurable graphical construct on the display occurs after receiving (e.g., with receiving unit 2308) the user input indicating selection of the user-configurable graphical construct.

In some embodiments, the display unit (e.g., display unit 2302) is a touch-sensitive display unit, wherein the user interface for accepting the user-configurable graphical construct comprises an acceptance affordance, and wherein the processing unit 2306 is further configured to: detect (e.g., with detecting unit 2314) a third user input comprising a contact on the display unit (e.g., display unit 2302) indicating selection of the approval affordance, wherein the user input indicating acceptance of the user-configurable graphical construct comprises the contact on the display unit (e.g., display unit 2302).

In some embodiments, the user-configurable graphical construct comprises a watch face.

In some embodiments, the independently configurable graphical elements comprise configurable aspects of the watch face selected from the group consisting of watch complications, color, display density, and watch face features.

In some embodiments, the user-configurable graphical construct comprises an emoji graphical object.

In some embodiments, the independently configurable graphical elements comprise configurable facial features of the emoji graphical object.

In some embodiments, the processing unit 2306 is further configured to: receive (e.g., with receiving unit 2308), concurrently with the data identifying the plurality of independently configurable graphical elements, second data representing an independently configurable sender graphical element, the sender graphical element corresponding to, but not identical to, a recipient graphical element from the discrete set of graphical assets stored in the memory unit (e.g., memory unit 2322) of the electronic device 2300; and select (e.g., with selecting unit 2316), from the discrete set of graphical assets stored in the memory unit (e.g., memory unit 2322), the recipient graphical element corresponding to the sender graphical element, wherein storing the user-configurable graphical construct in the memory unit (e.g., memory unit 2322) of the electronic device 2300 further comprises storing in the memory unit (e.g., memory unit 2322) of the electronic device 2300 the selected recipient graphical element as part of the user-configurable graphical construct.

In some embodiments, the processing unit 2306 is further configured to: receive (e.g., with receiving unit 2308), concurrently with the first data identifying the plurality of independently configurable graphical elements, third data representing an asset corresponding to an independently configurable graphical element; and store (e.g., with storing unit 2312) the asset corresponding to the independently configurable graphical element in the memory unit (e.g., memory unit 2322) of the electronic device 2300, wherein the asset corresponding to the independently configurable graphical element is stored for later display on the display unit (e.g., display unit 2302) as part of the user-configurable graphical construct.

In some embodiments, the processing unit 2306 is further configured to: receive (e.g., with receiving unit 2308), concurrently with the first data identifying the plurality of independently configurable graphical elements, fourth data identifying an asset corresponding to a third-party graphical element; determine (e.g., with determining unit 2318) whether the asset corresponding to the third-party graphical element is stored in the memory unit (e.g., memory unit 2322) of the electronic device 2300; in accordance with a determination that the asset corresponding to the third-party graphical element is stored in the memory unit (e.g., memory unit 2322) of the electronic device 2300: identify (e.g., with identifying unit 2320) the asset corresponding to the third-party graphical element for later display on the display unit (e.g., display unit 2302) as part of the user-configurable graphical construct; and in accordance with a determination that the asset corresponding to the third-party graphical element is not stored in the memory unit (e.g., memory unit 2322) of the electronic device 2300: enable display (e.g., with display enabling unit 2310), on the display unit (e.g., display unit 2302), of a user interface providing an option to acquire the asset corresponding to the third-party graphical element.

In some embodiments, enabling display (e.g., with display enabling unit 2310), on the display unit (e.g., display unit 2302), of the user interface for accepting the user-configurable graphical construct comprises displaying a graphical representation of the user-configurable graphical construct.

In some embodiments, the electronic device 2300 further comprises a data receiving unit (e.g., data receiving unit 2324), the processing unit 2306 is coupled to the data receiving unit (e.g., data receiving unit 2324), and the processing unit 2306 is further configured to: receive (e.g., with receiving unit 2308) the first data, the second data, the third data, and/or the fourth data by the data receiving unit (e.g., data receiving unit 2324) via one or more protocols selected from the group consisting of near field communication, Wi-Fi, Bluetooth, Bluetooth low energy, and a cellular protocol. In some embodiments, the data are received by electronic device 2300. In some embodiments, the data are received by an external device coupled to electronic device 2300 via wireless communication (e.g., with data receiving unit 2324).

In some embodiments, the data identifying the plurality of independently configurable graphical elements are received (e.g., with receiving unit 2308) by the data receiving unit (e.g., data receiving unit 2324) via near field communication by the data receiving unit 2324 from a second electronic device with a display unit, one or more processing units, and a memory unit.

In some embodiments, the data identifying the plurality of independently configurable graphical elements are received (e.g., with receiving unit 2308) by the data receiving unit (e.g., data receiving unit 2324) via near field communication by the data receiving unit 2324 from a near field communication sticker.

In some embodiments, the electronic device 2300 further comprises a data receiving unit (e.g., data receiving unit 2324), the processing unit 2306 is coupled to the data receiving unit (e.g., data receiving unit 2324), and the processing unit 2306 is further configured to: receive (e.g., with receiving unit 2308) the data identifying the plurality of independently configurable graphical elements from a QR code (e.g., with data receiving unit 2324 configured to scan the QR code).

The operations described above with reference to FIG. 23 are, optionally, implemented by components depicted in FIGS. 1A-1B or FIG. 19. For example, receiving operation 1902, displaying operation 1904, and receiving operation 1906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
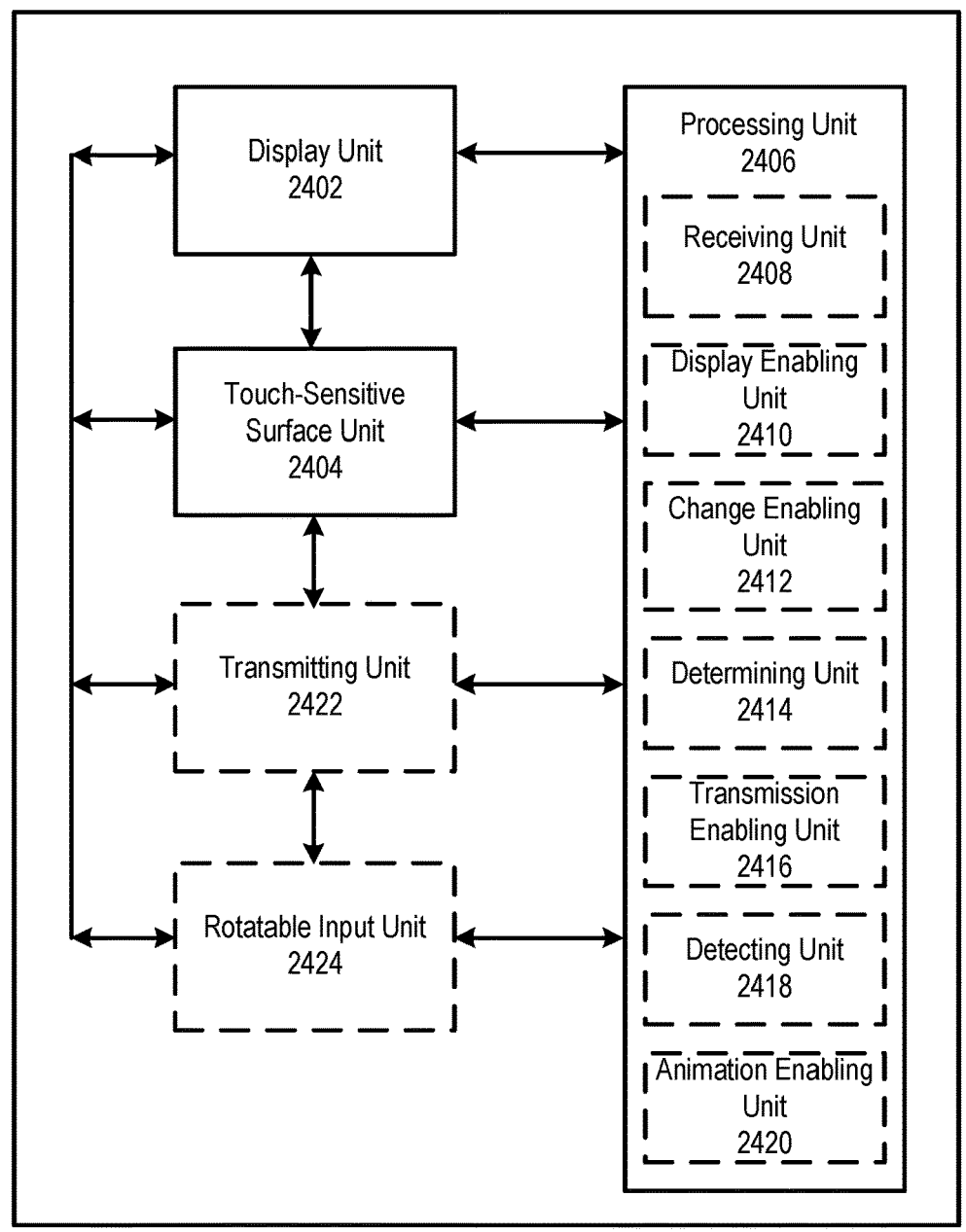
FIG. 24 is a functional block diagram of an electronic device in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a display unit 2402 configured to display a graphic user interface (optionally configured to receive contacts as a touch-sensitive display), a touch-sensitive surface unit 2404 configured to receive contacts, optionally, a transmitting unit 2422 configured to transmit and optionally receive data, optionally a rotatable input unit 2424 configured to detect or receive rotatable input, and a processing unit 2406 coupled to the display unit 2402, the touch-sensitive surface unit 2404, optionally, the transmitting unit 2422, and optionally, the rotatable input unit 2424. In some embodiments in which display unit 2402 is a touch-sensitive display unit configured to receive contacts, display unit 2402 and touch-sensitive surface unit 2404 may be the same unit. In some embodiments, the processing unit 2406 includes a receiving unit 2408, a display enabling unit 2410, a change enabling unit 2412, a determining unit 2414, a transmission enabling unit 2416, a detecting unit 2418, and an animation enabling unit 2420.

The processing unit 2406 is configured to enable display (e.g., with display enabling unit 2410), on the display unit (e.g., display unit 2402), of an emoji graphical object; receive (e.g., with receiving unit 2408) a first user input corresponding to a manipulation of the emoji graphical object; in response to receiving the first user input, enable change (e.g., with change enabling unit 2412), on the display unit (e.g., display unit 2402), of a visual aspect of the emoji graphical object to generate a user-customized emoji graphical object, wherein the change in the visual aspect is based on the manipulation; receive (e.g., with receiving unit 2408) a second user input corresponding to selection of the user-customized emoji graphical object for sharing; and enable display (e.g., with display enabling unit 2410), on the display unit (e.g., display unit 2402), of a user interface for selecting a recipient device.

In some embodiments, the electronic device 2400 further comprises a transmitting unit (e.g., transmitting unit 2422), wherein the transmitting unit (e.g., transmitting unit 2422) is coupled to the processing unit 2406, and wherein the processing unit 2406 is further configured to: while enabling display (e.g., with display enabling unit 2410), on the display unit (e.g., display unit 2402), of the user interface for selecting a recipient device, receive (e.g., with receiving unit 2408) a third user input corresponding to a selection of a recipient device; after receiving the second user input and the third user input, determine (e.g., with determining unit 2414) whether the recipient device is capable of re-generating the user-customized emoji graphical object based on data identifying the manipulation; in accordance with a determination that the recipient device is capable of re-generating the user-customized emoji graphical object based on data identifying the manipulation: enable transmission (e.g., with transmission enabling unit 2416), by the transmitting unit (e.g., transmitting unit 2422), to the recipient device data identifying the manipulation for generating the user-customized emoji graphical object; and in accordance with a determination that the recipient device is not capable of re-generating the user-customized emoji graphical object based on data identifying the manipulation: enable transmission (e.g., with transmission enabling unit 2416), by the transmitting unit (e.g., transmitting unit 2422), to the recipient device data comprising an image representing the user-customized emoji graphical object.

In some embodiments, the display unit (e.g., display unit 2402) is a touch-sensitive display unit, and the processing unit 2406 is further configured to: detect (e.g., with detecting unit 2418) a touch gesture on the touch-sensitive display unit (e.g., display unit 2402), wherein the first user input comprises a touch gesture at a location on the touch-sensitive display unit (e.g., display unit 2402) associated with the visual aspect of the emoji graphical object.

In some embodiments, the electronic device 2400 further comprises a rotatable input unit (e.g., rotatable input unit 2424), the rotatable input unit (e.g., rotatable input unit 2424) is coupled to the processing unit 2406, and the processing unit 2406 is further configured to: detect (e.g., with detecting unit 2418) a rotatable input by the rotatable input unit (e.g., rotatable input unit 2424), wherein the first user input comprises a rotation of the rotatable input unit.

In some embodiments, the emoji graphical object is an animated emoji graphical object.

In some embodiments, enabling change (e.g., with change enabling unit 2412), on the display unit (e.g., display unit 2402), of the visual aspect of the emoji graphical object comprises enabling animation (e.g., with animation enabling unit 2420), on the display unit (e.g., display unit 2402), of a change in the visual aspect of the emoji graphical object.

In some embodiments, the data identifying the manipulation for generating the user-customized emoji graphical object and/or the data comprising the image representing the user-customized emoji graphical object are transmitted by the transmitting unit (e.g., transmitting unit 2422) via one or more protocols selected from the group consisting of near field communication, Wi-Fi, Bluetooth, Bluetooth low energy, and a cellular protocol.

The operations described above with reference to FIG. 24 are, optionally, implemented by components depicted in FIGS. 1A-1B or FIGS. 20A and 20B. For example, displaying operation 2002, receiving operation 2004, and changing operation 2006 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
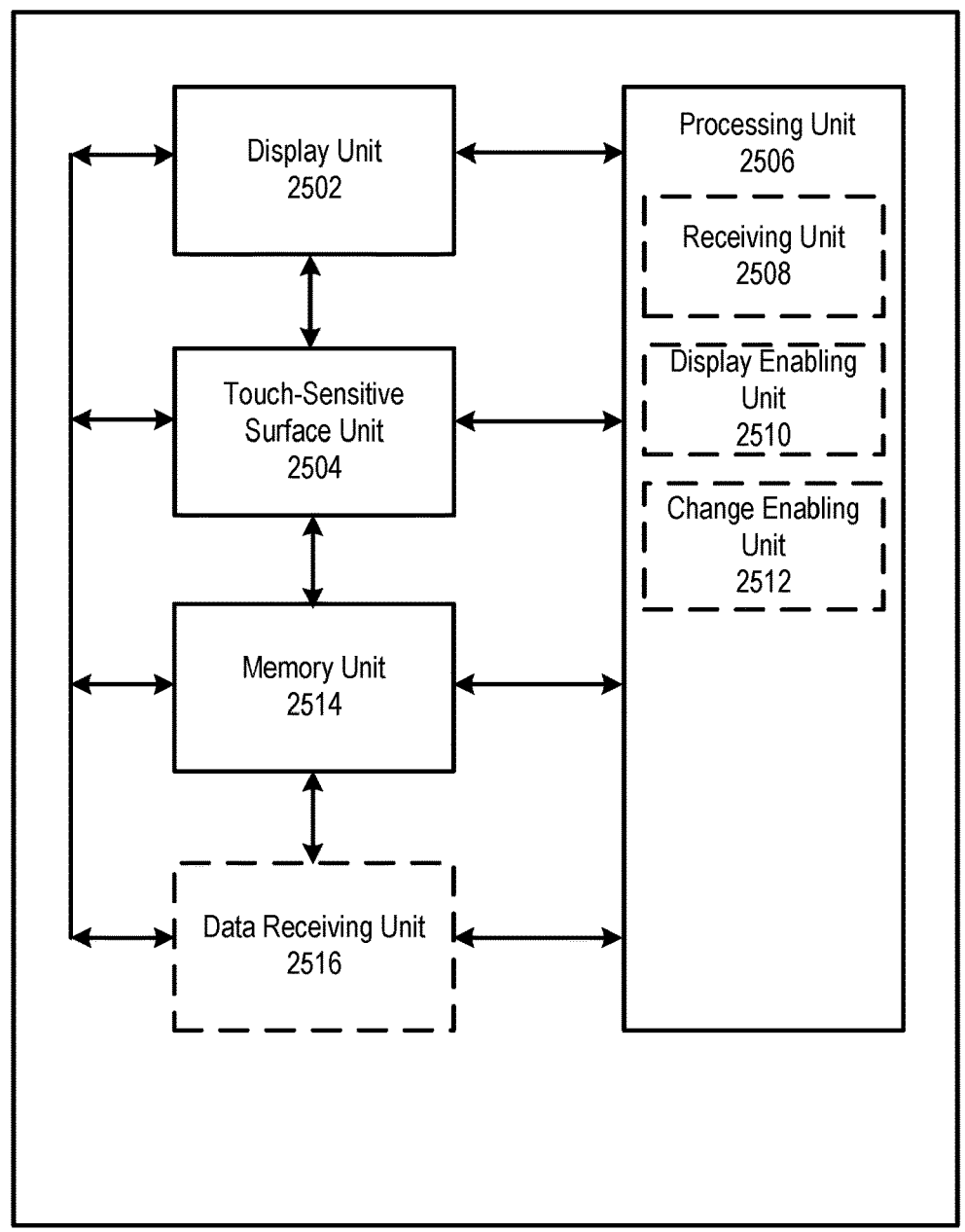
FIG. 25 is a functional block diagram of an electronic device in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a display unit 2502 configured to display a graphic user interface, a touch-sensitive surface unit 2504 configured to receive contacts, a memory unit 2514 configured to store data, optionally, a data receiving unit 2516 configured to receive and optionally transmit data (in certain embodiments, data receiving unit 2516 is configured to scan QR codes as a QR code scanning unit), and a processing unit 2506 coupled to the display unit 2502, the touch-sensitive surface unit 2504, the memory unit 2514, and optionally, the data receiving unit 2516. In some embodiments in which display unit 2502 is a touch-sensitive display unit configured to receive contacts, display unit 2502 and touch-sensitive surface unit 2504 may be the same unit. In some embodiments, the processing unit 2506 includes a receiving unit 2508, a display enabling unit 2510, and a change enabling unit 2512.

The processing unit 2506 is configured to receive (e.g., with receiving unit 2508) data identifying a manipulation for generating a user-customized emoji graphical object from an emoji graphical object stored in the memory unit (e.g., memory unit 2514) of the device; enable change (e.g., with change enabling unit 2512), on the display unit (e.g., display unit 2502), of a visual aspect of the emoji graphical object based on the manipulation to generate the user-customized emoji graphical object; and enable display (e.g., with display enabling unit 2510), on the display unit (e.g., display unit 2502), of the user-customized emoji graphical object.

In some embodiments, the electronic device 2500 further comprises a data receiving unit (e.g., data receiving unit 2516), wherein the data receiving unit (e.g., data receiving unit 2516) is coupled to the processing unit 2506, and wherein the processing unit 2506 is further configured to: receive (e.g., with receiving unit 2508) the data identifying the manipulation by the data receiving unit (e.g., data receiving unit 2516) via one or more protocols selected from the group consisting of near field communication, Wi-Fi, Bluetooth, Bluetooth low energy, and a cellular protocol. In some embodiments, the data are received by electronic device 2500. In some embodiments, the data are received by an external device coupled to electronic device 2500 via wireless communication (e.g., with data receiving unit 2516).

In some embodiments, the data identifying the plurality of independently configurable graphical elements are received by the data receiving unit (e.g., data receiving unit 2516) via near field communication from a second electronic device with a display, one or more processors, and memory.

In some embodiments, the data identifying the plurality of independently configurable graphical elements are received by the data receiving unit (e.g., data receiving unit 2516) via near field communication from a near field communication sticker.

In some embodiments, the electronic device 2500 further comprises a data receiving unit (e.g., data receiving unit 2516), wherein the data receiving unit (e.g., data receiving unit 2516) is coupled to the processing unit 2506, and wherein the processing unit 2506 is further configured to: receive (e.g., with receiving unit 2508) the data identifying the plurality of independently configurable graphical elements by the data receiving unit (e.g., data receiving unit 2516) from a QR code (e.g., with data receiving unit 2324) configured to scan the QR code).

The operations described above with reference to FIG. 25 are, optionally, implemented by components depicted in FIGS. 1A-1B or FIG. 21. For example, receiving operation 2102, changing operation 2104, and displaying operation 2106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The context-specific user interfaces described and illustrated herein provide numerous elements and features that a user can optionally customize, depending upon a particular context. As described, these customizable elements enhance the user interfaces, making them more personal and interactive to the user.

At the same time, a user also wants a device that is easy and intuitive to use. Providing a multitude of features only serves to frustrate the user if the user interface does not provide comprehensible ways to edit these features. Described below are user interfaces for editing context-specific user interfaces that provide easy and intuitive methods that facilitate user customization. Any of the techniques described infra for editing and/or selecting context-specific user interfaces may find use in any of the techniques for sharing user-configurable graphical constructs described supra.

Importantly, it is to be appreciated that, while particular embodiments such as clock faces may be described with respect to particular editing features, these editing features may also apply to one or more of the other user interfaces described herein. For example, a method for customizing a color of a clock face can optionally be used to change the color of a seconds hand, change an animated object (e.g., a butterfly), or change a clock face background (e.g., a photo or image of a scene). Similarly, methods for customizing complications can optionally be used to add and/or edit various complications on any clock face, regardless of whether an embodiment of that clock face bearing a particular complication was described herein. A skilled artisan will recognize that the methods described below provide user interface functionalities that may be applied to elements and aspects of various context-specific user interfaces in numerous combinations, such that each possible combination would be impossible to elaborate individually.

It is to be further appreciated that references to a "clock face" with respect to clock face editing and/or selection as described herein are not in any way limited to a traditional notion of a "clock face," e.g., a circular display with hour indications and one or more hands to indicate time, or a representation of a digital clock. Any context-specific user interface with an indication of time described herein may properly be termed a clock face.

Figure 26:
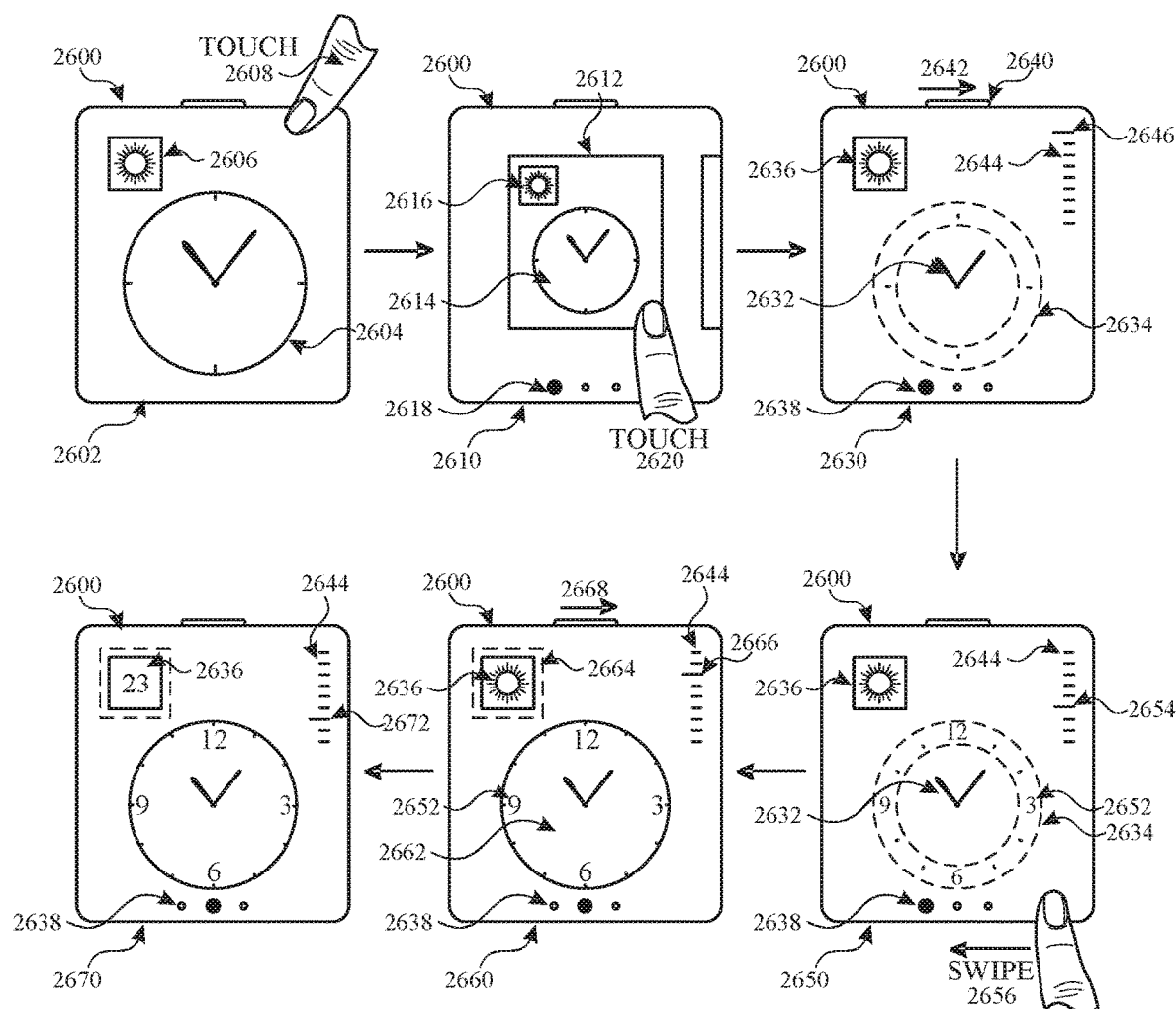
FIG. 26 illustrates exemplary context-specific user interfaces for customizing user-configurable graphical constructs.

Attention is now directed to FIG. 26. FIG. 26 shows exemplary context-specific user interfaces that can optionally be operated on device 2600. Optionally, device 2600 is device 100, 300, or 500 in some embodiments. The electronic device has a touch-sensitive display (e.g., touchscreen 504) configured to detect the intensity of contacts. Exemplary components for detecting the intensity of contacts, as well as techniques for their detection, have been referenced and described in greater detail above.

Device 2600 displays user interface screen 2602, which includes clock face 2604. Clock face 2604 also includes complication 2606 that displays a set of information from a weather application (e.g., current weather conditions). In this example, the user wishes to change multiple aspects of clock face 2604. Specifically, the user decides to change the hour indications on clock face 2604 and complication 2606.

The user contacts the touch-sensitive display of device 2600 with touch 2608. Touch 2608 has a characteristic intensity above an intensity threshold, which prompts device 2600 to enter a clock face edit mode, shown on screen 2610. Clock face edit mode allows the user to edit one or more aspects of a clock face. Device 2600 indicates that the user has entered clock face edit mode by visually distinguishing the clock face. In this example, screen 2610 shows a smaller version of the display of screen 2602 (e.g., 2612), which includes reduced size clock face 2614 based on clock face 2604. Reduced size complication 2616, which is based on complication 2606, is also displayed. This display indicates to the user that the user is in clock face edit mode while giving the user an indication of what the edited clock face will look like on the display. In some embodiments, a user may be able to select a different clock face by swiping displayed screen 2610, as described in greater detail below in reference to FIGS. 27A-C.

Screen 2610 also displays paging affordance 2618. Paging affordances may indicate where the user is within a sequence of options, as well as how many options are available in the sequence. In clock face edit mode, paging affordances may indicate which editable aspect of the clock face a user is editing, where this aspect falls within a sequence of editable aspects, and the total number of editable aspects in the sequence (if clock face selection is available on this screen, paging affordance 2618 can optionally depict the currently selected clock face within a sequence of selectable clock faces and/or clock face options, as described below). A paging affordance may be advantageous in clock face edit mode to help the user navigate the interface and explore all of the editable options available within each type of clock face.

The user selects the displayed clock face for editing by contacting 2612 through touch 2620. In response to detecting touch 2620, device 2600 visually indicates an element of the clock face for editing. As shown on screen 2630, the hour indications have been selected for editing, as indicated by outline 2634 around the position of the hour indications. The other elements of the clock face are still retained, as shown by hour hand and minute hand 2632 and complication 2636.

In this example, three aspects of the clock face are available for user editing. This is depicted by paging affordance 2638. The first editable aspect is the hour indications (e.g., their number and/or appearance). This is relayed to the user by paging affordance 2638. By viewing outline 2634 in combination with paging affordance 2638, the user recognizes that the hour indications are the first of three editable aspects of this clock face.

Device 2600 also has rotatable input mechanism 2640. The user can optionally move rotatable input mechanism 2640 to cycle through different options for editing different aspects of the clock face. On screen 2630, the user can optionally select different options for the hour indications (which are currently editable, as depicted by outline 2634) through movement 2642. Advantageously, using a rotatable input mechanism to cycle through editing options (rather than using, e.g., a touch interaction) frees up touch interactions with the screen to instead provide other functionalities, thus expanding the interactability of the device. Using a rotatable input mechanism is also helpful in cases where smaller elements of the display are being edited, as finer-scale touch gestures may be difficult on a reduced-size display for users with large fingers.

Also displayed on screen 2630 is positional indicator 2644, shown as a column of 9 lines. Positional indicator 2644 is an indicator of a current position along a series of positions. This is may be used, for example, in combination with rotatable input mechanism 2640. On screen 2630, positional indicator 2644 indicates to the user the position of the currently selected option (e.g., by line 2646) within a series of all selectable options.

Upon detecting movement 2642, device 2600 displays screen 2650. In response to detecting movement 2642, device 2600 edits the hour indications, in this case by increasing the number of indications and adding numerals. This is shown by indications 2652, still highlighted by outline 2634. The other elements of the clock face, hour hand and minute hand 2632 and complication 2636, remain the same. Positional indicator 2644 has been updated to indicate the position of this hour indication option, highlighted by line 2654, within a series of positions of hour indication options.

As indicated by paging affordance 2638, the hour indications are the first editable aspect of this clock face within a sequence of editable aspects. The user can optionally select a second editable aspect by swiping the touch-sensitive display (e.g., swipe 2656). In response to detecting the swipe, device 2600 displays screen 2660. Screen 2660 includes clock face 2662, which now has 12 hour indications, including 4 numerical indications, as depicted by hour indications 2652. Note that these hour indications are the hour indications that were selected by the user on the previous screen (see indications 2652). Paging affordance 2638 has now been updated to indicate that editing complications is the second editable aspect within the sequence of editable aspects in this clock face.

On screen 2660, complication 2636 is currently editable, as indicated to the user by outline 2664. Currently, complication 2636 is displaying current weather conditions using information from a weather application. This option is option 3 in a series of options, as indicated by updated positional indicator 2644 and line 2666. Positional indicator 2644 lets the user know that the currently selected feature (i.e., complication 2636) is editable by the rotatable input mechanism.

While screen 2660 depicts a single complication, it should be understood that multiple complications may be displayed. When multiple complications are displayed, a user can optionally select a particular complication for editing by contacting the corresponding position of the complication. Outline 2664 then transitions from the previously selected complication or element to the currently selected complication or element, and a rotatable input mechanism can optionally be used to edit the complication or element at the selected location. This concept is described in greater detail below in reference to FIG. 28C.

It is to be noted that positional indicator 2644 is displayed on screens 2630, 2650, and 2660, even though the available options depicted by the indicators are different. A positional indicator may be a universal indicator of options available through a particular type of user input, such as a movement of the rotatable input mechanism. Rather than displaying positions within a particular context, such as editing a certain feature or displaying data from a particular application, a positional indicator shows the user positions available through a type of user input, no matter the particular context in which the user input is being used. This better indicates to the user which user input should be used for this functionality. In some embodiments, a positional indicator is displayed on the display at a position adjacent to the user input for which it is used (e.g., next to the rotatable input mechanism to indicate positions accessible by moving the rotatable input mechanism).

A positional indicator (e.g., positional indicator 2644) can optionally be responsive to one or more inputs. For example, as shown in FIG. 26, the positional indicator 2644 can optionally indicate options available through a movement of the rotatable input mechanism. As described above, the user can optionally scroll through the available options using movement of the rotatable input mechanism. However, a user may also wish to scroll through the available options using a second type of input, such as a contact (e.g., a swipe) on the touch-sensitive display. In some embodiments, a user viewing screen 2630 swipes the touch-sensitive display in a different direction than the swipe used for removing a visual indication of a first element of the clock face for editing and visually indicating a second element of the clock face for editing (e.g., a downward swipe on the display). For example, to scroll through the available options shown in FIG. 26, the user can optionally swipe in a substantially horizontal direction (e.g., swipe 2656) to scroll through editable aspects (e.g., with swipes moving left-to-right resulting in scrolling through the sequence of editable aspects in one direction, and swipes moving right-to-left resulting in scrolling through the sequence of editable aspects in a different direction, as depicted by updating the paging affordance 2638). In this example, the user can optionally swipe in a substantially vertical direction (e.g., perpendicular to swipe 2656) to scroll through available options (e.g., with swipes moving downwards resulting in scrolling through the sequence of available options in one direction, and swipes moving upwards resulting in scrolling through the sequence of available options in a different direction, as depicted by updating the positional indicator 2644). In some embodiments, the user can optionally swipe the display at or near the location of the displayed positional indicator to scroll through the sequence of available options.

In some embodiments, upon detecting the swipe, the device updates an indicator of position (e.g., an indicator of position along a series of positions that indicates a position of a currently selected option for the editable aspect along a series of selectable options for the editable aspect of the visually indicated element of the clock face) to indicate a second position along the series. In some embodiments, upon detecting the swipe, the device can optionally edit an aspect of the visually indicated element of the clock face. In some embodiments, the device visually distinguishes the positional indicator (e.g., by changing a color, size, shape, animation, or other visual aspect) based on the type of input used to scroll the indicator. For example, in some embodiments, in response to detecting a movement of the rotatable input mechanism, the device can optionally display the positional indicator in a first color (e.g., green), and in some embodiments, in response to detecting a swipe, the device can optionally display the positional indicator in a second color different from the first color (e.g., white).

Optionally, in clock face edit mode depicted on screen 2660, the user is able to cycle through different types of information from the weather application, or is able to change the application from which the information is drawn. In this case, the user moves rotatable input mechanism using movement 2668, which causes device 2600 to display screen 2670. This updates complication 2636 to display the current date, which is obtained from a calendar application. This option is indicated within positional indicator 2644 by line 2672. Note that paging affordance 2638 still indicates the second position because the user is still engaged in editing complications, the second editable aspect of this clock face. A determination that the contact has a characteristic intensity above a predetermined threshold can optionally be used to distinguish the contact from other gestures, such as a tap or the beginning of a swipe.

Having finished editing the clock face, the user optionally exits clock face selection mode, and the edited clock face is displayed on the display. In some embodiments, this can optionally be done by detecting a user contact with a characteristic intensity above an intensity threshold. In accordance with a determination that the characteristic intensity is above the intensity threshold, the device can optionally exit clock face edit mode and cease to visually distinguish the displayed clock face for editing (e.g., by increasing the size of the displayed clock face). In some embodiments, in accordance with a determination that the characteristic intensity is above the intensity threshold, the device can optionally save this edited clock face as a new clock face that is accessible through clock face selection mode (described below). In accordance with a determination that the characteristic intensity is not above the intensity threshold (where the clock face includes an affordance representing an application, and where the contact is on the affordance representing the application), the device can optionally launch the application represented by the affordance.

In some embodiments, the device has a rotatable and depressible input mechanism (e.g., 506), and in response to detecting a depression of the rotatable and depressible input mechanism, the device can optionally exit clock face edit mode, display the currently edited clock face, and/or save the currently edited clock face for later user selection, as described above.

FIG. 26 illustrates an exemplary embodiment of clock face edit mode, but a number of other potential embodiments are possible within the scope of the techniques described herein. For example, in FIG. 26, an element was indicated for editing by visibly distinguishing an outline around the element (e.g., by displaying a visible outline, or by distinguishing a pre-existing outline already visible around the element), as illustrated by outlines 2634 and 2664. In some embodiments, the outline can optionally be animated to depict a rhythmic expansion and contraction (e.g., animation similar to pulsing or breathing). In some embodiments, the element indicated for editing itself can optionally be animated to depict a rhythmic expansion and contraction. In some embodiments, the element can optionally be animated to depict flashing. In some embodiments, a color of the element can optionally be changed (e.g., a change in color and/or intensity). Any or all of these indications can be used to visually indicate the element that is currently editable.

As shown in FIG. 26, movement of a rotatable input mechanism can optionally be employed as the user input for editing an aspect of the element indicated for editing. In some embodiments, if an outline is used to indicate the currently editable element, the outline disappears when the rotatable input mechanism is being moved, and reappears when the movement stops. In this way, the user is able to see what the edited element will look like on the clock face as a whole, without any possible obstruction or distraction from the outline.

In some embodiments, in response to detecting the movement, the device can optionally change a color of the element. This can optionally include, e.g., changing a color of a clock face background (e.g., substituting a color if the clock face background is a particular color, or selecting a different image if the clock face background includes an image), changing a color of part or all of a seconds hand (if included on the clock face), changing a color of an hour and/or minute indication, and/or changing a color of a number or colon in the display of a representation of a digital clock. Since a seconds hand is a smaller element than a background (and therefore may be more difficult for the user to perceive), changing the color of the seconds hand can optionally include an animated color change. For example, the seconds hand can optionally first change a color of a particular point (e.g., a dot depicted along the seconds hand), then propagate this color change in either direction along the seconds hand. Alternatively, the color change can optionally begin at the origin of the clock face and propagate outward. Animating a color change, particularly a change of a smaller element of the clock face, may be helpful to draw the user's attention to the color change.

In other embodiments, in response to detecting movement of the rotatable input mechanism, the device changes an aspect of a complication. For example, this can optionally be used to change application data displayed by an application complication. In some embodiments, the complication can optionally indicate a first set of information obtained by an application (e.g., application data. For example, if the application is a weather application, a set of information can optionally include a forecasted weather condition, a current temperature, etc.), and upon editing, the complication can optionally be updated to indicate a second set of information from the same application (e.g., if the application is a weather application, the display can optionally be edited from showing a current temperature to showing current precipitation). In other embodiments, upon editing, the complication can optionally be updated to indicate a set of information from a different application (e.g., if the application is a weather application, the display can optionally be edited from showing weather to showing data from a calendar application, as illustrated by complication 2636).

In other embodiments, in response to detecting movement of the rotatable input mechanism, the device changes an aspect of display density. For example, as illustrated in FIG. 26, this can optionally be used to edit the number of visible divisions of time (e.g., the number of displayed hour and/or minute indications, such as numbers 1-12 or other marks/symbols positioned along the clock face at the hour positions). In response to detecting movement of the rotatable input mechanism, the device can optionally increase or decrease the number of visible divisions of time. As illustrated on screens 2630, 2650, and 2660, this can optionally involve changing the number of visible divisions (e.g., from 4 to 12) and/or changing the number of numerical/symbolic hour indications (e.g., from 0 to 4).

In some embodiments, as illustrated in FIG. 26, an indicator of positions along a series of positions can optionally be displayed (e.g., positional indicator 2644). In response to detecting movement of the rotatable input mechanism, the device can optionally update the indicator from indicating a first to indicating a second position along the series of positions. In some embodiments, the indicated position reflects a currently selected option for the currently editable aspect along a series of selectable options for the currently editable aspect. As described above, in some embodiments, the indicator is displayed on the display at a position adjacent to the rotatable input mechanism, thereby strengthening the user's association between the indicator and the input. In some embodiments, if the currently editable aspect is color, the device can optionally display a positional indicator that includes a series of colors, such that the currently selected color option matches the color of the position currently indicated by the positional indicator (e.g., the color could be a similar or identical color). In some embodiments, the number of positions displayed in a position indicator increases or decreases depending on the number of options for the currently selected editable aspect.

In some embodiments, upon reaching the last position indicated by the positional indicator, the device can optionally provide an indication to the user that the last option has been displayed. For example, the device can optionally depict a dimming of one or more of the selected element, an outline around the selected element, and the positional indicator. In some embodiments, the device can optionally animate one or more of the selected element, an outline around the selected element, and the positional indicator to expand and contract (e.g., like a rubber band). In some embodiments, the device can optionally animate one or more of the selected element, an outline around the selected element, and the positional indicator to move on the display (e.g., by bouncing). These features may be advantageous to provide an indication to the user that the last option in the series of options has been reached.

In some embodiments, a user selects the element on the clock face for editing by contacting the touch-sensitive display at the position of the displayed element. In other embodiments, the element is selected by swiping the touch-sensitive display, or by rotating the rotatable input mechanism. Regardless of the input, selecting a second element for editing can optionally involve removing a visual indication from the previous element and visually indicating a second element for editing (visually indicating can optionally include any or all of the techniques described above).

In some embodiments, if the element selected for editing is indicated by an outline around the element, changing an element for editing can optionally involve translating the outline on-screen away from the first element and/or translating a visible on-screen in a continuous on-screen movement towards the second element until the outline is displayed around the second element.

As illustrated in FIG. 26, clock face edit mode allows the user to alter multiple editable aspects of the clock faces described herein. In some embodiments, in response to detecting a swipe on the touch-sensitive display (e.g., swipe 2656), the device can optionally select a second element of the clock face for editing, which in response to detecting another user input (e.g., a movement of the rotatable input mechanism), can optionally be edited. This allows the user to cycle through different editable aspects of the displayed clock face, such as colors, number and/or type of complications, and display density.

A user may wish to match a color of a displayed clock face to an image. In some embodiments, the device receives a user input, and in response to receiving the user input, the device enters a color selection mode. While in the color selection mode, the device can optionally receive data representing an image, and in response to receiving the data, the device can optionally select a color of the image and update a displayed clock face by changing a color on the clock face (e.g., a clock face background, hour and/or minute indication, and/or seconds hand) to match the color of the image. In some embodiments, the color selected has the greatest prevalence of the colors in the image. This allows the user to further customize a clock face to display a designated color. For example, if the user is wearing a blue shirt, the user is able to take an image of the blue shirt and match the color of the clock face to the shirt. In some embodiments, the data representing the image can optionally be obtained from an image stored on the device, an image stored on an external device in wireless communication with the device (e.g., Wi-Fi, Bluetooth™, near field communication ("NFC"), or any of the other cellular and/or other wireless communication techniques described herein), or an image taken using a camera on the device, such as camera module 143 or optical sensor 164.

Figure 27A:
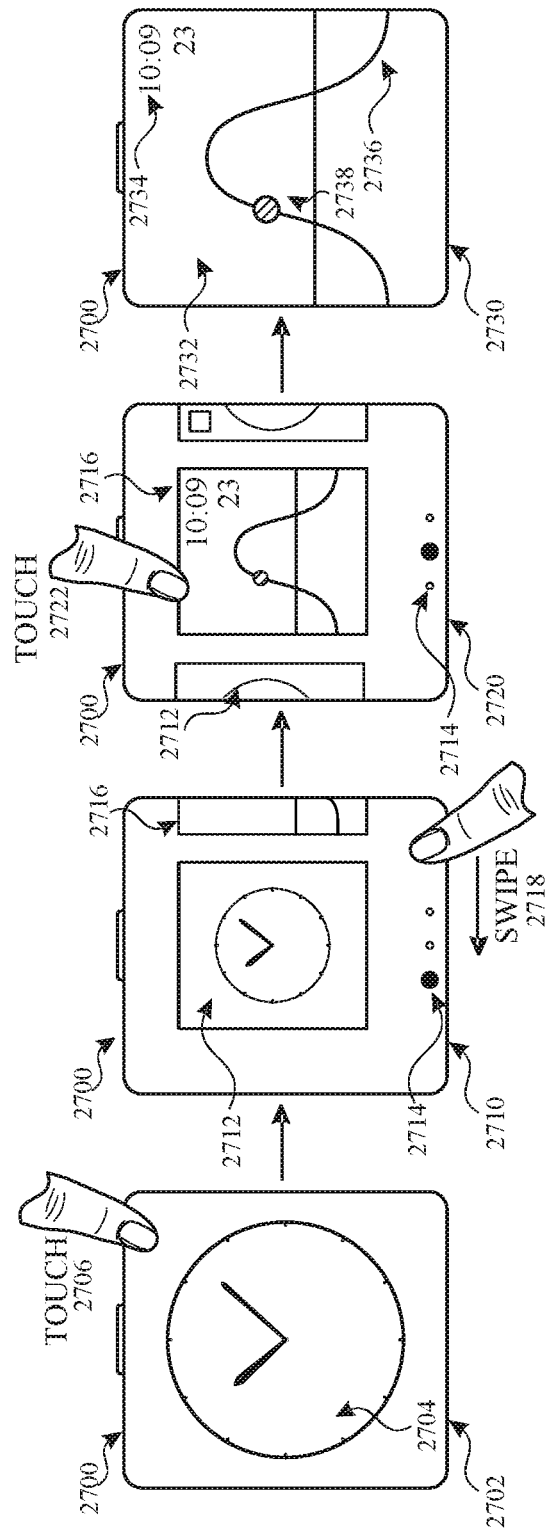
FIGS. 27A-E illustrate exemplary context-specific user interfaces for customizing and/or selecting user-configurable graphical constructs.
Figure 27B:
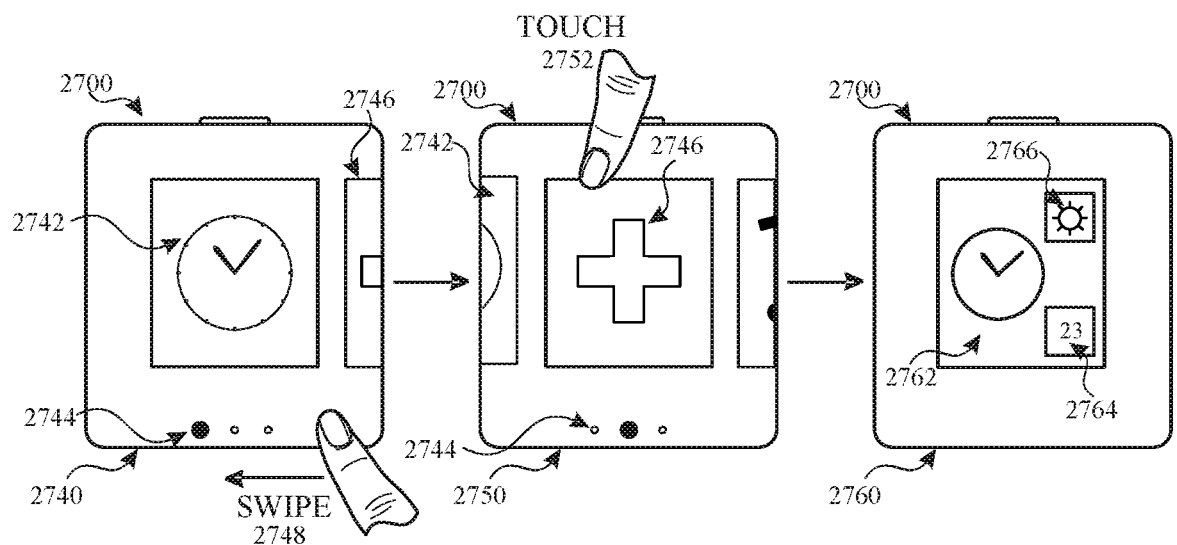
Figure 27C:
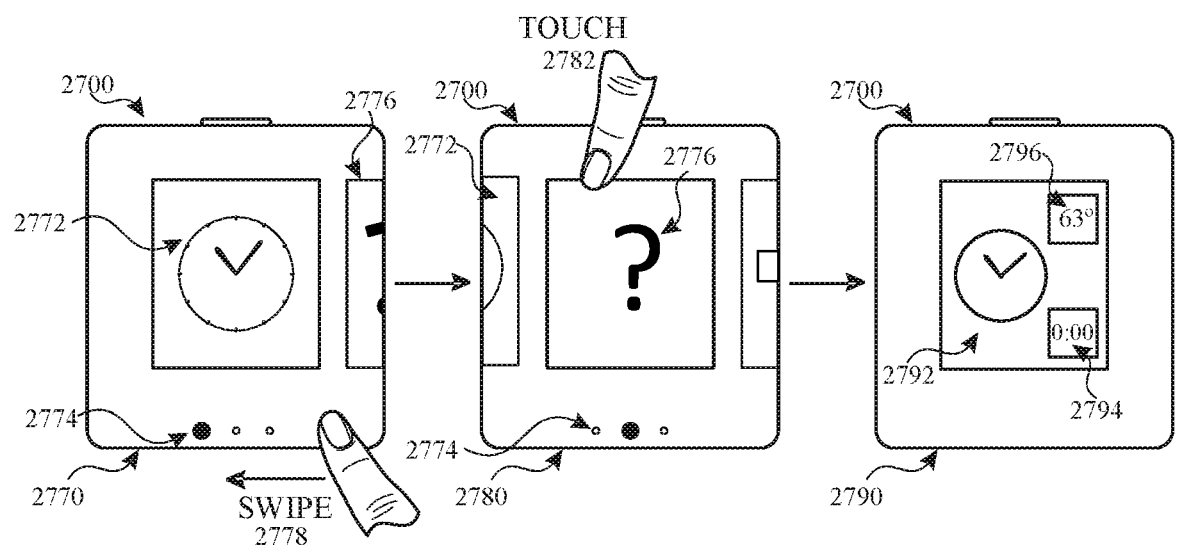
Figure 27D:
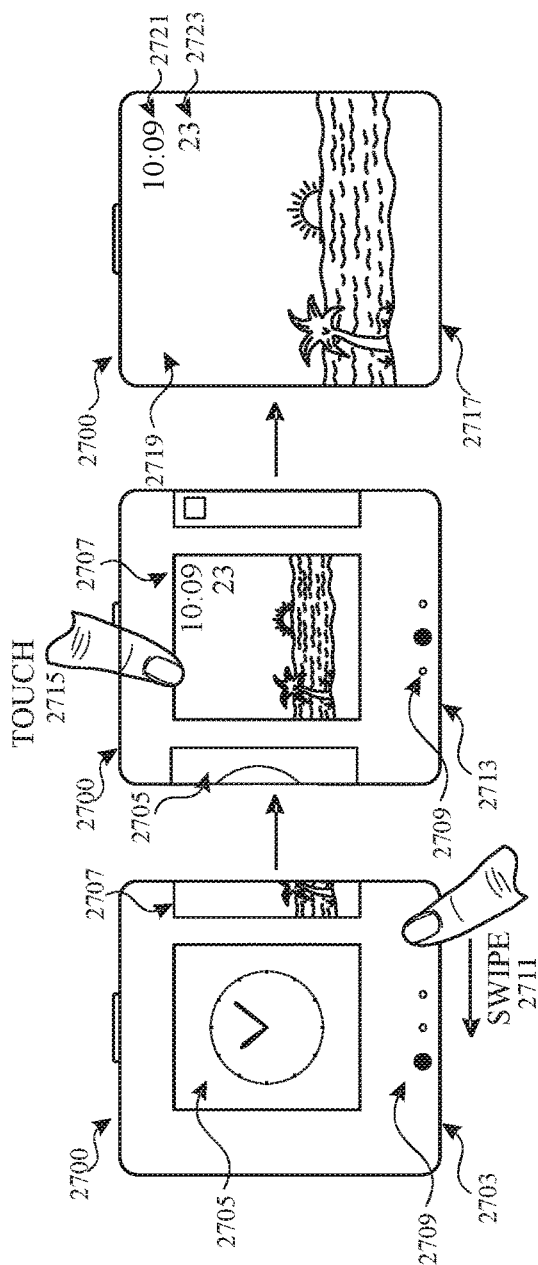
Figure 27E:
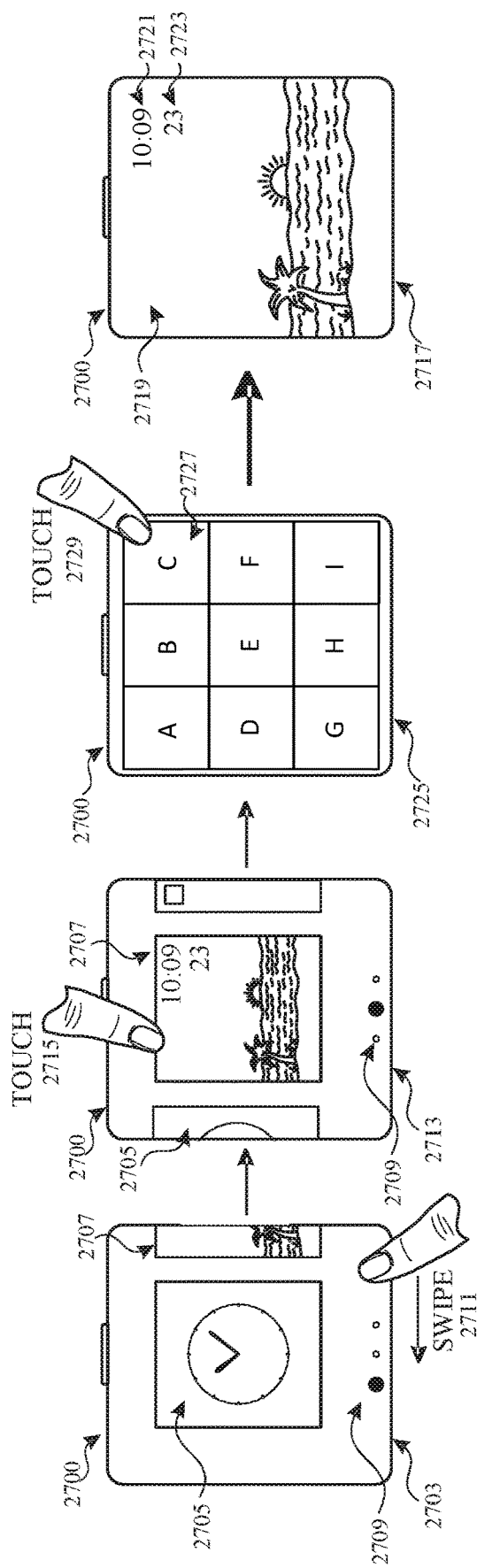

Having described various context-specific user interfaces and methods of user editing thereof, attention is now directed to methods of selecting a context-specific user interface shown in FIGS. 27A-C. Numerous individual context-specific user interfaces are possible using the techniques described here. A user may wish to select a particular clock face (e.g., from a saved library of clock faces) or make a new one, depending on a particular context. For example, a user may wish to display a particular clock face during working hours to project a professional appearance, but change the clock face during the weekend to reflect an interest (such as astronomy, exercise, or photography). A user may wish for quick access to a stopwatch in one context, while desiring an indication of daytime hours in another.

FIG. 27A shows exemplary context-specific user interfaces that may be operated on device 2700. Device 2700 may be device 100, 300, or 500 in some embodiments. The electronic device has a touch-sensitive display (e.g., touchscreen 504) configured to detect the intensity of contacts. Exemplary components for detecting the intensity of contacts, as well as techniques for their detection, have been referenced and described in greater detail above.

Device 2700 displays user interface screen 2702, which includes clock face 2704. In this example, the user wishes to switch from clock face 2704 to a different clock face. The user contacts the touch-sensitive display of device 2700 with touch 2706. Touch 2706 has a characteristic intensity above an intensity threshold, which prompts device 2700 to enter a clock face selection mode, shown on screen 2710. Clock face selection mode allows the user to select a clock face.

Device 2700 indicates that the user has entered clock face selection mode by visually distinguishing the clock face. This is shown on screen 2710. Screen 2710 visually distinguishes that the user has entered clock face selection mode by centering reduced size clock face 2712 on the display (reduced size clock face 2712 is based on clock face 2704). This indicates to the user that the user is in clock face selection mode while giving the user an indication of what the clock face will look like when displayed at full size.

Screen 2710 also includes paging affordance 2714. As described above, paging affordances can optionally indicate where the user is within a sequence of options, as well as how many options are available in the sequence. Paging affordance 2714 indicates to the user that clock face 2712 is the first in a series of three selectable clock faces and/or clock face options (e.g., an option to add a new clock face or randomly generate a clock face, as described below). In clock face selection mode, a paging affordance can optionally indicate a currently centered clock face and/or clock face option, a position of the currently centered clock face and/or clock face option within a sequence of clock faces and/or clock face options, and a total number of available clock faces and/or clock face options. This helps the user navigate the clock faces and clock face options.

Screen 2710 also includes a partial view of a second clock face, as shown by a partial view of second clock face 2716. In some embodiments, when the device is in clock face selection mode, the device can optionally include a display a partial view of another clock face, or clock face option, particularly the clock face or clock face option next in the sequence (e.g., as indicated by the paging affordance). This further helps the user understand that additional options are available. In other embodiments, only one clock face is displayed at any time.

Clock face selection mode can optionally be used to select a clock face for display as a context-specific user interface, or to select a clock face for editing. Therefore, in some embodiments, when a clock face such as clock face 2712 and/or clock face 2716 is centered on the display, a user can optionally contact the displayed clock face on the touch-sensitive display to select the centered clock face for editing and enter into clock face editing mode (as described above in reference to FIG. 26). In some embodiments, clock face editing mode is entered when the contact has a characteristic intensity above an intensity threshold. Coupling clock face edit and selection modes in a single interface allows the user to select different clock faces and edit them quickly and easily.

A user may select a different clock face (for editing or for display as a context-specific user interface) by swiping. Device 2700 detects a swipe on the touch-sensitive display (e.g., swipe 2718). In response to detecting swipe 2718, device 2700 displays screen 2720. Screen 2720 includes second clock face 2716 centered on the display (part of second clock face 2716 was depicted on screen 2710). Screen 2720 also shows paging affordance 2714, which has been updated to indicate that the currently centered clock face 2716 is second within the sequence of clock faces and/or clock face options. Also shown is a partial view clock face 2712. This helps the user understand the sequence of clock faces, similar to a paging affordance but with the added benefit of displaying a partial view of the clock faces for user recognition.

To select clock face 2716, the user contacts the touch-sensitive display on clock face 2716 (e.g., touch 2722). In response to detecting touch 2722, device 2700 exits the clock face selection mode and displays screen 2730. Screen 2730 includes full-sized clock face 2732, which is based on clock face 2716. In this example, clock face 2732 is a context-specific user interface that includes affordance 2734 indicating the time of day, user interface object 2736 (a sinusoidal wave indicating a path of the Sun through the day), and affordance 2738 representing the Sun.

As described above and illustrated in FIG. 27A, a user can optionally select a clock face from a plurality of clock faces in the device's clock face selection mode. In some embodiments, at least a first and a second clock face are shown when the device is in clock face selection mode. These clock faces can optionally be shown in sequence, but at a reduced size. In some embodiments, one clock face is centered on the display at any time, and the one or more additional clock faces on the display are shown in partial view, as depicted by partial views of clock faces 2712 and 2716. Centering a clock face optionally includes translating the prior clock face in the sequence on-screen and displaying the prior clock face in partial view. In other embodiments, only a single clock face is displayed on the device at any one time (i.e., no partial views).

In some embodiments, centering a clock face on the display includes simulating a movement of the clock face towards the user on the display, as if it is approaching the user. This helps draw the user's attention to the clock face while conveying to the user a sense of the clock face sequence.

As depicted by screen 2720, device 2700 can optionally display multiple available clock faces and/or clock face options in a sequence for selection by the user. A user may wish to re-order one or more clock faces within the sequence. Therefore, device 2700 can optionally provide a clock face rearrangement mode to allow the user to select a particular clock face and change its order within the sequence of available clock faces and/or clock face options. In some embodiments, a user contacts the touch-sensitive display on a clock face (e.g., clock face 2716) and maintains the contact beyond a threshold interval (e.g., a "press and hold"-type user input). In response to detecting the contact, and in accordance with a determination that the contact exceeds a predetermined threshold, device 2700 can optionally enter a clock face rearrangement mode. Device 2700 can optionally highlight, outline, animate, or otherwise visually distinguish the clock face to indicate to the user that device 2700 has entered clock face rearrangement mode, and that the clock face has been selected for rearrangement. In some embodiments, while continuing to receive the user contact, device 2700 detects movement of the user contact from a first position within the sequence of displayed clock faces and/or clock face options to a second position, which is different from the first position, without a break in contact of the user contact on the touch-sensitive display. In other embodiments, the contact comprising the movement from a first position within the sequence of displayed clock faces and/or clock face options to a second position, which is different from the first position, without a break in contact of the user contact on the touch-sensitive display, is a separate contact subsequent to entry into clock face rearrangement mode. In response to detecting the contact at the second position, device 2700 can optionally translate the clock face on-screen from the first position to the second position. Optionally, other partial or complete clock faces and/or clock face options on the display are moved accordingly to accommodate the new position of the user-selected clock face. A user can optionally then cease the contact to select the second position as the new position for the clock face within the sequence of displayed clock faces and/or clock face options. In some embodiments, device 2700 can optionally exit clock face rearrangement mode in response to detecting the break in contact on the touch-sensitive display after the position of at least one clock face has been rearranged. In other embodiments, in response to detecting a user input subsequent to the break in contact on the touch-sensitive display (e.g., a depression of a rotatable and depressible input mechanism such as 506), device 2700 can optionally exit clock face rearrangement mode. In some embodiments, upon exiting clock face rearrangement mode, device 2700 can optionally re-enter clock face selection mode.

In addition to selecting an existing context-specific user interface, a user may also wish to add a new one. FIG. 27B illustrates an exemplary user interface for generating a new clock face. Shown on FIG. 27B is device 2700, which displays screen 2740. Screen 2740 displays clock face 2742 and paging affordance 2744, which indicates to the user that the currently centered clock face is the first in a sequence of three selectable clock faces and/or clock face options. Screen 2740 also displays a partial view of a clock face generation affordance (e.g., 2746).

In this example, the user swipes the display (e.g., swipe 2748), and in response to detecting the swipe, device 2700 displays a full view of clock face generation affordance 2746 centered on screen 2750. In some embodiments, as depicted by affordance 2746, a clock face generation affordance may include a plus sign (or other text and/or symbol) to convey to the user that, upon activation of affordance 2746, device 2700 will generate a new clock face.

Note that screen 2750 also displays a partial view of previously displayed clock face 2742. This partial view of 2742 and updated paging affordance 2744 (updated to indicate that clock face generation is the second available user interface in the sequence) help orient the user within the sequence of available clock faces and/or clock face options. Further note that the partial view of clock face generation affordance 2746 on screen 2740 indicates to the user that a swipe will center affordance 2746 on the display (e.g., as displayed on screen 2750) for user activation.

A user can optionally activate affordance 2746, for example by contacting affordance 2746 on the touch-sensitive display (e.g., touch 2752). In response to detecting the contact, device 2700 displays screen 2760, which includes newly generated clock face 2762 centered on the display. As shown on screen 2760, new clock face 2762 includes affordance 2764, which displays the current date (e.g., obtained from a calendar application), and affordance 2766, which displays the current weather conditions (e.g., obtained from a weather application).

In response to detecting an activation of affordance 2746, in some embodiments, the device remains in clock face selection mode after centering the displayed new clock face. In other embodiments, upon centering the newly generated clock face on the display, the device enters into clock face edit mode, as described above. This allows the user to edit one or more aspects of the newly generated clock face. In some embodiments, the device exits clock face selection mode and centers the new clock face as a full-size clock face on the display.

It is to be appreciated that, while new clock face 2762 depicts a representation of an analog clock, any of the context-specific user interfaces described herein (with any of the optional features described herein) can optionally be a new clock face generated in response to activating the clock face generation affordance. In some embodiments, a new clock face can optionally have a different customizable aspect, as compared to existing clock faces on the device. For example, if the user already has a clock face that includes a blue seconds hand, the device can optionally generate a new clock face that includes a red seconds hand. This helps the user explore the options available for context-specific user interfaces described herein, thus enhancing the user interface by increasing variety.

In addition to selecting an existing context-specific user interface or generating a new context-specific user interface, a user may also wish to create a random context-specific user interface. FIG. 27C illustrates an exemplary user interface for generating a random clock face. Shown on FIG. 27C is device 2700, which displays screen 2770. Screen 2770 displays clock face 2772 and paging affordance 2774, which indicates to the user that the currently centered clock face is the first in a sequence of three selectable clock faces and/or clock face options. Screen 2770 also displays a partial view of a random clock face generation affordance (e.g., 2776).

In this example, the user swipes the display (e.g., swipe 2778), and in response to detecting the swipe, device 2700 displays a full view of random clock face generation affordance 2776 centered on screen 2780. In some embodiments, as depicted by affordance 2776, a random clock face generation affordance may include a question mark (or other text and/or symbol, such as the letter "R") to convey to the user that, upon activation of affordance 2776, device 2700 will generate a random clock face.

Note that screen 2780 also displays a partial view of previously displayed clock face 2772. The partial view of 2772, along with updated paging affordance 2774 (updated to indicate that random clock face generation is the second available user interface in the sequence), helps orient the user to the sequence of clock faces and/or options available in the sequence. Further note that the partial view of random clock face generation affordance 2776 on screen 2770 indicates to the user that a swipe will center affordance 2776 on the display (e.g., as displayed on screen 2780) for user activation.

A user can optionally activate affordance 2776, for example by contacting affordance 2776 on the touch-sensitive display (e.g., touch 2782). In response to detecting the contact, device 2700 displays screen 2790, which includes randomly generated clock face 2792 centered on the display. As shown on screen 2790, new clock face 2792 includes affordance 2794, which represents an affordance for launching a stopwatch application, and affordance 2796, which displays the current temperature (e.g., obtained from a weather application).

In response to detecting an activation of affordance 2776, in some embodiments, the device remains in clock face selection mode after centering the displayed random clock face. In other embodiments, upon centering the randomly generated clock face on the display, the device enters into clock face edit mode, as described above. This allows the user to edit one or more aspects of the randomly generated clock face. In some embodiments, the device exits clock face selection mode and centers the random clock face as a full-size clock face on the display.

It is to be appreciated that, while random clock face 2792 depicts a representation of an analog clock, any of the context-specific user interfaces described herein (with any of the optional features described herein) can optionally be a random clock face generated in response to activating the random clock face generation affordance.

In some embodiments, the random clock face can optionally be different from any of the other clock faces available in clock face selection mode. The device can optionally accomplish this in multiple ways. In some embodiments, the device randomly generates a random clock face, and then checks the random clock face against the other stored clock faces to ensure that it is different. In other embodiments, the device generates a random clock face and relies on the inherent probability that it will be different from the stored clock faces, given the sheer number of potential clock faces made available by the techniques described herein.

In some embodiments, upon displaying the random clock face, the device can optionally display a user prompt for generating a second random clock face. This allows the user to randomly generate another clock face if the user does not like the particular type of context-specific user interface and/or customized features of the random clock face. In some embodiments, the random clock face generation affordance may depict, e.g., a slot machine or other indication of a user prompt for generating a second random clock face, to provide this feature.

In addition to centering a clock face on the display for selection, the device can optionally also highlight the centered clock face in one or more ways. For example, in some embodiments, the centered clock face can optionally be displayed by visibly distinguishing an outline around the centered clock face (e.g., by displaying a visible outline, or by distinguishing a pre-existing outline already visible around the clock face), as illustrated by 2712, 2722, 2742, and 2772. In some embodiments, the outline can optionally be animated to depict a rhythmic expansion and contraction (e.g., animation similar to pulsing or breathing). In some embodiments, the centered clock face itself can optionally be animated to depict a rhythmic expansion and contraction. In some embodiments, the centered clock face can optionally be animated to depict flashing. In some embodiments, a color of the centered clock face can optionally be changed (e.g., a change in color and/or intensity). Any or all of these indications can optionally be used to visually indicate that the centered clock face is currently selectable.

In some embodiments, the user can optionally access clock face edit mode and clock face selection mode through a shared interface. For example, a contact with a characteristic intensity above the intensity threshold can optionally cause the device to enter clock face selection mode. In this example, screen 2610 in FIG. 26 represents clock face selection mode, with a paging affordance that indicates the currently selected clock face within a sequence of selectable clock faces and/or clock face options. Upon entering clock face selection mode, in some embodiments, a second contact with a characteristic intensity above the intensity threshold causes the device to enter into the clock face edit mode and select the currently centered clock face for editing. In other embodiments, upon entering clock face selection mode, the device displays an affordance representing clock face edit mode. Upon detecting a contact on the displayed affordance, the device enters into the clock face edit mode and select the currently centered clock face for editing. These features help tie the context-specific user interface selection and editing functionalities into a single interface that is user-friendly and intuitive.

Figure 28A:
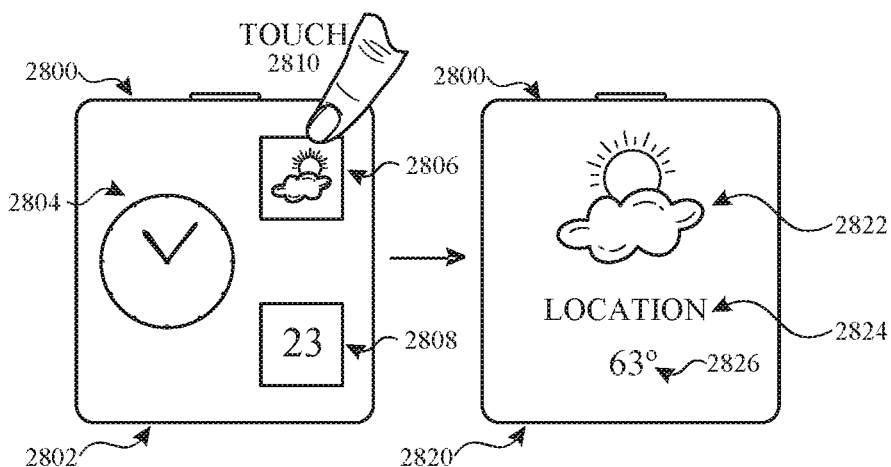
FIGS. 28A-C illustrate exemplary context-specific user interfaces and techniques for customizing user-configurable graphical constructs.

Turning now to FIG. 28A, any or all of the context-specific user interfaces described herein can optionally include one or more complications. One type of complication a user may wish to use is a complication for launching an application. For example, the affordance representing the complication on the clock face can optionally display a set of information from the corresponding application. However, a user may wish to view additional information from the application, or launch the full application itself.

FIG. 28A shows exemplary context-specific user interfaces that can optionally be operated on device 2800. Optionally, device 2800 is device 100, 300, or 500 in some embodiments. In some embodiments, the electronic device has a touch-sensitive display (e.g., touchscreen 504).

Device 2800 displays user interface screen 2802. Screen 2802 includes clock face 2804 and affordances 2806 and 2808, which are displayed as complications. Affordances 2806 and 2808 represent applications and include a set of information obtained from the corresponding application. In this example, affordance 2806 represents a weather application and displays weather conditions obtained from the weather application. Affordance 2808 represents a calendar application and displays the current date obtained from the calendar application. Affordance 2806 and affordance 2808 are updated in accordance with data from the corresponding application. For example, affordance 2806 is updated to display current weather conditions obtained from the weather application. Affordance 2808 is updated to display the current date obtained from the calendar application. For example, these complications may be application widgets updated based on application data.

To launch the weather application, a user contacts the display at affordance 2806 (e.g., touch 2810). In response, device 2800 launches the weather application, which is depicted on screen 2820. Screen 2820 shows further weather information, including current weather conditions (e.g., user interface object 2822), an indication of the current location (e.g., user interface object 2824), and an indication of the current temperature (e.g., user interface object 2826).

Figure 28B:
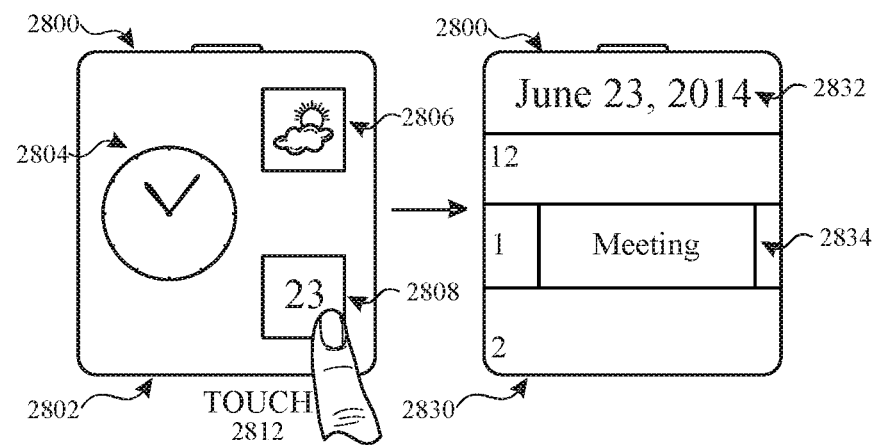

FIG. 28B also depicts device 2800 displaying screen 2802. As depicted in FIG. 28A, screen 2802 includes clock face 2804 and affordances 2806 and 2808, which are displayed as complications.

If a user wishes to launch the calendar application instead of the weather application, the user contacts the display at affordance 2808 (e.g., touch 2812). In response, device 2800 launches the calendar application, which is depicted on screen 2830. Screen 2830 shows further calendar information, including user interface object 2832, which depicts the full date, and user interface object 2834, which represents a calendar event (in this case, a meeting at 1).

In some embodiments, a user interface screen can optionally display a complication that represents an application and includes a set of information obtained from the corresponding application. In some embodiments, as illustrated by FIGS. 28A and 28B, a user interface screen can optionally display a plurality of complications that represent applications and include sets of information obtained from a plurality of applications, or a plurality of sets of information obtained from a single application.

In some embodiments, as described above, a user can optionally move a rotatable input mechanism to scroll a displayed indication of time forward or backward. In some embodiments, the device can optionally display two or more indications of time, and in response to detecting a movement of the rotatable input mechanism, the device can optionally update one or more of the displayed indications of time and keep another indication of time constant. To illustrate using screen 2802 in FIGS. 28A and 28B as an example, if affordance 2808 represents an indication of current time (e.g., a digital display), the device updates the displayed clock face in response to detecting the movement of the rotatable input mechanism while continuing to display the current time with affordance 2808. The displayed clock face can optionally be updated, for example, by animating a clockwise or counter-clockwise movement of one or more clock hands, depending on whether the displayed time is scrolled forward or backward.

In some embodiments, the device can optionally update other displayed complications (e.g., those that do not indicate a time per se) in response to detecting the movement of the rotatable input mechanism. For example, in addition to updating the time displayed by clock face 2804, the device also updates the forecasted or historical weather condition displayed by affordance 2806 to correspond with the time indicated by clock face 2804. In these embodiments, the device can optionally forego updating another displayed complication in response to scrolling the displayed time. For example, a displayed stopwatch complication can optionally remain the same while the displayed clock face is updated. In some embodiments, a displayed complication that is not updated in response to detecting the movement of the rotatable input mechanism is visually distinguished, such as by changing a hue, saturation, and/or lightness of the displayed complication. This allows the user to distinguish which complications are updated and which remain constant.

Advantageously, these context-specific user interface methods, which may be applied to any of the context-user interfaces described herein simply by including an application complication, allow the user to view updated information from a particular application while also presenting a quick way to launch the corresponding application in the same user interface object. Moreover, the application and/or application information depicted by the complication can optionally be further customized using the editing methods described in reference to FIG. 26 (see, e.g., screens 2660 and 2670).

A user may navigate screens on, e.g., a portable multifunction device, that include many affordances. These affordances may represent, for example, applications that may be launched on the device. One such affordance can optionally activate a context-specific user interface, such as those described herein. In order to help the user recognize that a particular affordance corresponds to launching a context-specific user interface, an animation that visually connects the affordance to the interface may be desirable.

Figure 28C:
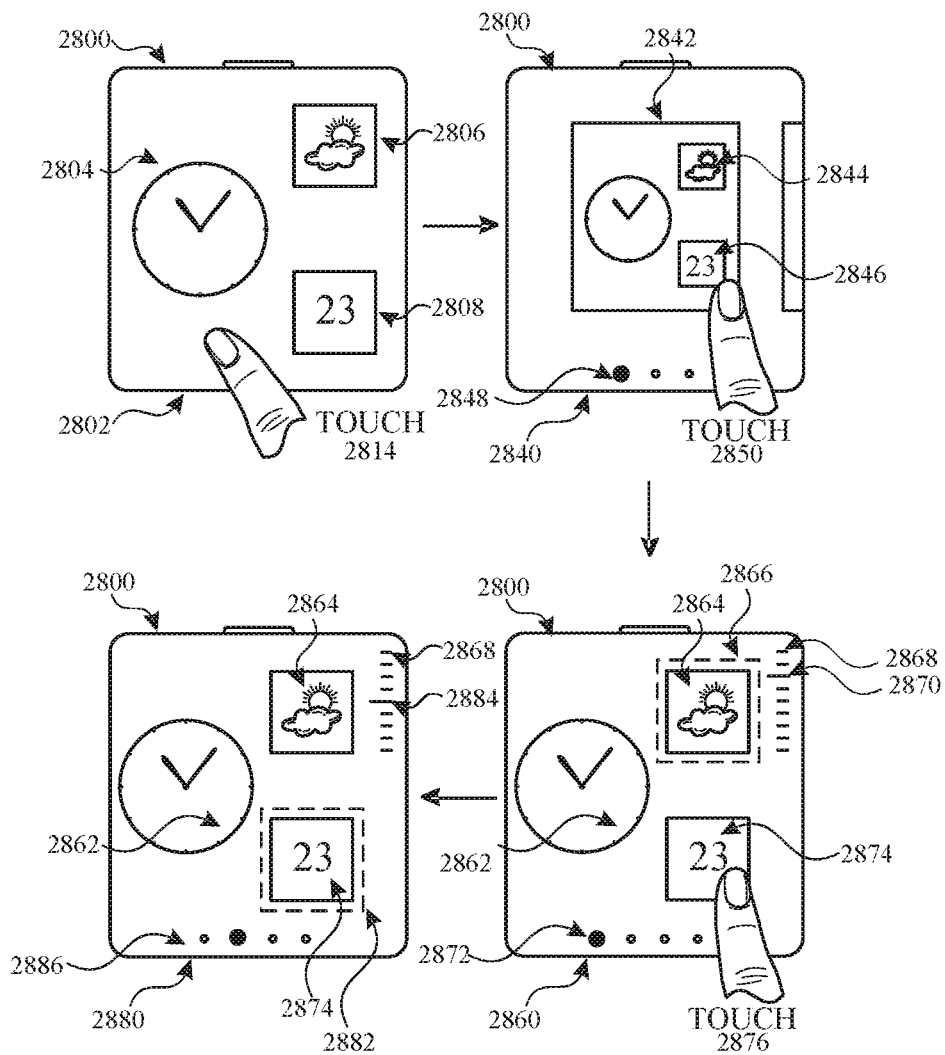

FIG. 28C shows an exemplary user interface for editing a clock face that contains more than one complication, such as the ones depicted in FIGS. 28A and 28B. FIG. 28C again depicts device 2800 displaying screen 2802, which includes clock face 2804, affordance 2806 representing a weather application, and affordance 2808 representing a calendar application.

As discussed above in reference to FIG. 26, a user can optionally customize the complications displayed on screen 2802 by entering clock face edit mode. The user contacts the touch-sensitive display of device 2800 with touch 2814. Touch 2814 has a characteristic intensity above an intensity threshold, which prompts device 2800 to enter a clock face edit mode, shown on screen 2840. Device 2800 indicates that the user has entered clock face edit mode by visually distinguishing the clock face. In this example, screen 2840 shows a smaller version of the display of screen 2802 (e.g., 2842), which includes a reduced size clock face, reduced size complication 2844, which is based on complication 2806, and reduced size complication 2846, which is based on complication 2808.

A user selects this clock face for editing by contacting displayed clock face 2842 (e.g., touch 2850). In some embodiments, touch 2850 is a contact on the touch-sensitive display. In some embodiments, touch 2850 is a contact on the touch-sensitive display with a characteristic intensity above an intensity threshold. This causes device 2800 to enter into clock face edit mode and display screen 2860. Screen 2860 displays clock face 2862 for editing. Currently, affordance 2864 representing the weather application is selected for editing, as highlighted by outline 2866. Also displayed is positional indicator 2868, which indicates the position of the displayed complication in a series of complication options using line 2870. Positional indicator 2868 further indicates to the user that a rotatable input mechanism may be used to cycle through options available for editing affordance 2864 (e.g., which set of information from the weather application to display, or another application from which a set of information may be displayed). Paging affordance 2872 also displays the position of the aspect of clock face 2862 currently selected for editing (i.e., complication 2864) in a series of editable aspects.

Screen 2860 also displays affordance 2874, which represents the calendar application. To select this complication for editing, the user contacts displayed affordance 2874 (e.g., touch 2876). In response, device 2800 displays screen 2880. Like screen 2860, screen 2880 displays clock face 2862, affordance 2864 (which represents the weather application), positional indicator 2868, and affordance 2874 (which represents the weather application). Affordance 2874 is now highlighted for editing, as shown by outline 2882. The position of this complication option is depicted by line 2884 in positional indicator 2868. Finally, paging affordance 2886 has been updated to display the position of affordance complication 2874 in a series of editable aspects of clock face 2862. The user can optionally now edit the set of information displayed by affordance 2874 using the rotatable input mechanism (e.g., which set of information from the calendar application to display, or another application from which a set of information may be displayed). In summary, while in clock face edit mode, a user can optionally select a complication for editing when more than one complication is displayed by contacting the displayed complication. In some embodiments, this causes the affordance to be highlighted (e.g., by a visible outline or other means for visibly distinguishing the affordance described herein).

FIG. 29 is a flow diagram illustrating process 2900 for providing context-specific user interfaces (e.g., user-configurable graphical constructs comprising a plurality of independently configurable graphical elements). In some embodiments, process 2900 may be performed at an electronic device with a touch-sensitive display configured to detect intensity of contacts, such as 500 (FIG. 5) or 2600 (FIG. 26). Some operations in process 2900 may be combined, the order of some operations may be changed, and some operations may be omitted. Process 2900 provides for editing multiple aspects of various context-specific user interfaces in a comprehensive yet easy-to-use manner, thus conserving power and increasing battery life.

At block 2902, the device displays a user interface screen that includes a clock face (e.g., 2604). At block 2904, the device detects a contact on the display (contact has characteristic intensity; see, e.g., touch 2608). At block 2906, a determination is made as to whether the characteristic intensity is above an intensity threshold. At block 2908, in accordance with a determination that the characteristic intensity is above the intensity threshold, the device enters a clock face edit mode (see, e.g., screen 2610). In accordance with a determination that the characteristic intensity is not above the intensity threshold (where the clock face includes an affordance representing an application, and where the contact is on the affordance representing the application), the device may launch the application represented by the affordance. At block 2910, the device visually distinguishes the displayed clock face to indicate edit mode (e.g., 2612). At block 2912, the device detects a second contact on the display at the visually distinguished clock face (e.g., 2620). At block 2914, responsive at least in part to detecting the second contact, the device visually indicates an element of the clock face for editing (e.g., 2634).

Note that details of the processes described above with respect to process 2900 (FIG. 29) are also applicable in an analogous manner to processes 1600 (FIG. 16A), 1800 (FIG. 18), 1900 (FIG. 19), 2000 (FIGS. 20A and 20B), 2100 (FIG. 21), 3000 (FIG. 30), and/or 3100 (FIG. 31) described herein. For example, methods 1600 (FIG. 16A), 1800 (FIG. 18), 1900 (FIG. 19), 2000 (FIGS. 20A and 20B), 2100 (FIG. 21), 3000 (FIG. 30), and/or 3100 (FIG. 31) may include one or more of the characteristics of the various methods described above with reference to process 2900. For example, one or more aspects of process 2900 may be used to configure one or more of the graphical elements, selected from a discrete set of stored graphical assets (which can optionally be selectable as elements, e.g., as in block 2914), of a user-configurable graphical construct from block 1802 and/or block 1902. For brevity, these details are not repeated below.

It should be understood that the particular order in which the operations in FIG. 29 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of processes 1600 (FIG. 16A), 1800 (FIG. 18), 1900 (FIG. 19), 2000 (FIGS. 20A and 20B), 2100 (FIG. 21), 3000 (FIG. 30), and 3100 (FIG. 31) may be incorporated with one another. Thus, the techniques described with respect to process 2900 may be relevant to processes 1600 (FIG. 16A), 1800 (FIG. 18), 1900 (FIG. 19), 2000 (FIGS. 20A and 20B), 2100 (FIG. 21), 3000 (FIG. 30), and/or 3100 (FIG. 31).

FIG. 30 is a flow diagram illustrating process 3000 for providing context-specific user interfaces (e.g., user-configurable graphical constructs comprising a plurality of independently configurable graphical elements). In some embodiments, process 3000 may be performed at an electronic device with a touch-sensitive display configured to detect intensity of contacts, such as 500 (FIG. 5) or 2700 (FIGS. 27A-E). Some operations in process 3000 may be combined, the order of some operations may be changed, and some operations may be omitted. Process 3000 provides for selecting context-specific user interfaces in a comprehensive yet easy-to-use manner, thus conserving power and increasing battery life.

At block 3002, the device displays a user interface screen that includes a clock face (e.g., 2704). At block 3004, the device detects a contact on the display (contact has characteristic intensity (e.g., 2706). At block 3006, a determination is made as to whether the characteristic intensity is above an intensity threshold. At block 3008, in accordance with a determination that the characteristic intensity is above the intensity threshold, the device enters a clock face selection mode (see, e.g., screen 2710). In accordance with a determination that the characteristic intensity is not above the intensity threshold (where the clock face includes an affordance representing an application, and where the contact is on the affordance representing the application), the device may launch the application represented by the affordance. At block 3010, the device visually distinguishes the displayed clock face to indicate selection mode (the clock face is centered on the display; see, e.g., 2712). At block 3012, the device detects a swipe on the display at the visually distinguished clock face (e.g., 2718). At block 3014, responsive at least in part to detecting the swipe, the device centers a second clock face on the display (e.g., 2716 on screen 2720).

Note that details of the processes described above with respect to process 3000 (FIG. 30) are also applicable in an analogous manner to processes 1600 (FIG. 16A), 1800 (FIG. 18), 1900 (FIG. 19), 2000 (FIGS. 20A and 20B), 2100 (FIG. 21), 2900 (FIG. 29), and/or 3100 (FIG. 31) described herein. For example, methods 1600 (FIG. 16A), 1800 (FIG. 18), 1900 (FIG. 19), 2000 (FIGS. 20A and 20B), 2100 (FIG. 21), 2900 (FIG. 29), and/or 3100 (FIG. 31) may include one or more of the characteristics of the various methods described above with reference to process 3000. For example, one or more aspects of process 3000 may be used to select a user-configurable graphical construct of block 1802 and/or 1902. For brevity, these details are not repeated below.

It should be understood that the particular order in which the operations in FIG. 30 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of processes 1600 (FIG. 16A), 1800 (FIG. 18), 1900 (FIG. 19), 2000 (FIGS. 20A and 20B), 2100 (FIG. 21), 2900 (FIG. 29), and 3100 (FIG. 31) may be incorporated with one another. Thus, the techniques described with respect to process 3000 may be relevant to processes 1600 (FIG. 16A), 1800 (FIG. 18), 1900 (FIG. 19), 2000 (FIGS. 20A and 20B), 2100 (FIG. 21), 2900 (FIG. 29), and/or 3100 (FIG. 31).

FIG. 31 is a flow diagram illustrating process 3100 for providing context-specific user interfaces (e.g., user-configurable graphical constructs comprising a plurality of independently configurable graphical elements). In some embodiments, process 3100 may be performed at an electronic device with a touch-sensitive display configured to detect intensity of contacts, such as 500 (FIG. 5), 2600 (FIG. 26), or 2700 (FIGS. 27A-E). Some operations in process 3100 may be combined, the order of some operations may be changed, and some operations may be omitted. For example, FIG. 31 illustrates an exemplary embodiment for accessing clock face selection and edit modes from a single interface, but other orders of operation are possible. Process 3100 provides for selecting and editing context-specific user interfaces in a comprehensive yet easy-to-use manner, thus conserving power and increasing battery life.

At block 3102, the device displays a user interface screen that includes a clock face (e.g., 2602 and/or 2702). At block 3104, the device detects a contact on the display (contact has characteristic intensity; see, e.g., 2608 and/or 2706). At block 3106, a determination is made as to whether the characteristic intensity is above an intensity threshold. At block 3108, in accordance with a determination that the characteristic intensity is above the intensity threshold, the device enters a clock face selection mode and visually distinguishes the displayed clock face to indicate selection mode (the clock face is centered on the display; see, e.g., 2612 and/or 2712). In accordance with a determination that the characteristic intensity is not above the intensity threshold (where the clock face includes an affordance representing an application, and where the contact is on the affordance representing the application), the device may launch the application represented by the affordance. At block 3110, the device detects a swipe on the display at the visually distinguished clock face (e.g., 2718). At block 3112, responsive at least in part to detecting the swipe, the device centers a second clock face on the display (e.g., 2716 on screen 2720). At block 3114, the device detects a contact on the touch-sensitive display at the displayed second clock face (e.g., 2620). At block 3116, responsive at least in part to detecting the contact, the device enters a clock face edit mode for editing the second clock face (see, e.g., screen 2630).

Note that details of the processes described above with respect to process 3100 (FIG. 31) are also applicable in an analogous manner to processes 1600 (FIG. 16A), 1800 (FIG. 18), 1900 (FIG. 19), 2000 (FIGS. 20A and 20B), 2100 (FIG. 21), 2900 (FIG. 29), and/or 3000 (FIG. 30) described herein. For example, methods 1600 (FIG. 16A), 1800 (FIG. 18), 1900 (FIG. 19), 2000 (FIGS. 20A and 20B), 2100 (FIG. 21), 2900 (FIG. 29), and/or 3000 (FIG. 30) may include one or more of the characteristics of the various methods described above with reference to process 3100. For example, one or more aspects of process 3100 may be used to select a user-configurable graphical construct of block 1802 and/or 1902 and/or configure one or more graphical elements of a user-configurable graphical construct of block 1802 and/or 1902. For brevity, these details are not repeated below.

It should be understood that the particular order in which the operations in FIG. 31 have been described is exemplary and not intended to indicate that the described order is the only order in which the operations could be performed. One of ordinary skill in the art would recognize various ways to reorder the operations described herein, as well as excluding certain operations. For example, the device could detect a contact on the displayed first clock face before detecting the swipe. In this case, the device may enter clock face edit mode to edit the first clock face. For brevity, all of these details are not repeated here. Additionally, it should be noted that aspects of processes 1600 (FIG. 16A), 1800 (FIG. 18), 1900 (FIG. 19), 2000 (FIGS. 20A and 20B), 2100 (FIG. 21), 2900 (FIG. 29), and 3000 (FIG. 30) may be incorporated with one another. Thus, the techniques described with respect to process 3100 may be relevant to processes 1600 (FIG. 16A), 1800 (FIG. 18), 1900 (FIG. 19), 2000 (FIGS. 20A and 20B), 2100 (FIG. 21), 2900 (FIG. 29), and/or 3000 (FIG. 30).

As discussed above, certain aspects of the present disclosure relate to user-configurable graphical constructs. In some embodiments, the user-configurable graphical constructs may include watch faces or user interface screens including a watch face, which in some embodiments include a clock (e.g., representation of an analog or digital clock) with various clock features (e.g., numerals or symbols depicting hours and/or minutes; hour, minute, and/or seconds hands; one or more complications; etc.). One or more complications may be associated with the clock, e.g., displayed within, adjacent to, or otherwise sharing a screen with the clock. As used herein, consistent with its accepted meaning in art, a complication refers to any clock feature other than those used to indicate the hours and minutes of a time (e.g., clock hands or hour/minute indications). Complications may provide different types of information to a user, such as data obtained from an application, and the use may also configure or customize the information conveyed by the complication (e.g., as described in reference to FIGS. 26 and 28C). In some embodiments, a complication may also serve as an affordance for launching an application.

As used herein, user-configurable graphical constructs (e.g., watch faces, or user interface screens including a watch face) may be broken down into modular constituents. A user-configurable graphical construct may include one or more graphical elements, which may themselves be independently configurable. Examples of graphical elements include without limitation aspects of the watch face, such as a clock, display density, color, and one or more optional complications. Each graphical element, as displayed to the user, may be thought to contain two dimensions of relevant information: what particular graphical asset(s) make up the graphical element, and how the graphical asset(s) are arranged within the user-configurable graphical construct (e.g., where they are displayed). Stated another way, the graphical asset(s) and their arrangement make up a graphical element, and a plurality of graphical elements makes up a user-configurable graphical construct. Graphical assets need not themselves be graphical (they are assets making up a graphical element, rather than strictly "graphical" assets). In some embodiments, a clock may contain a graphical element or a set of graphical elements. Examples of graphical assets may include, for example, images or icons, text elements, animations, sound files, data obtained from an application, and so forth.

Figure 32A:
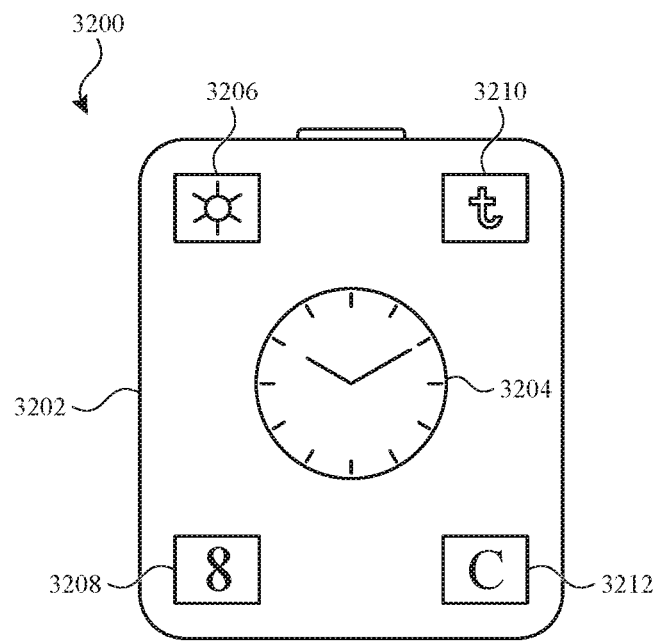
FIGS. 32A and 32B illustrate exemplary user-configurable graphical constructs in accordance with some embodiments.
Figure 32B:
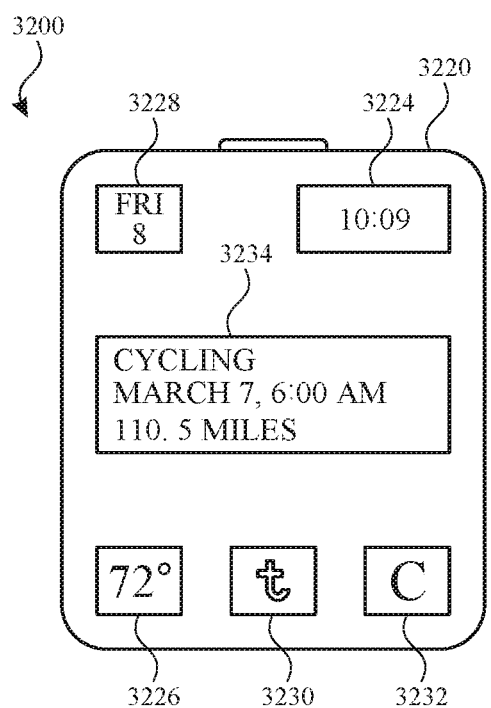

Exemplary user-configurable graphical constructs are illustrated in FIGS. 32A and 32B. These exemplary user-configurable graphical constructs are operated on device 3200, which may optionally be device 100, 300, or 500, in accordance with some embodiments. The electronic device has a display (e.g., 504).

In FIG. 32A, device 3200 displays user interface screen 3202, which includes a user-configurable graphical construct. This exemplary user-configurable graphical construct includes clock 3204 (e.g., a graphical element or set of graphical elements). In some embodiments, clock 3204 may be independently configurable by the user, e.g., using one or more of the concepts described in reference to FIGS. 26 and 28C. For example, the user may independently configure an appearance and/or number of indications of hours or minutes, a color (e.g., a color of the seconds hand), and so on. In some embodiments, a complication may be displayed within clock 3204 (e.g., a complication that displays data obtained from a calendar application, such as the current date, or a complication that displays a monogram or other customizable text and/or image(s)).

In addition, the user-configurable graphical construct also includes four graphical elements, 3206, 3208, 3210, and 3212, which are displayed as complications associated with clock 3204. Each of these graphical elements is rendered on the displayed user-configurable graphical construct using one or more graphical assets (e.g., icons, application data, colors, text, and the like) and using an arrangement of the one or more graphical assets in the user-configurable graphical construct. For example, graphical element 3206 is rendered using data obtained from a weather application (e.g., data identifying a sunny weather condition), a graphical asset representing a sun, and an indication that graphical element 3206 is to be displayed in the upper left corner of screen 3202. Similarly, graphical element 3208 is rendered using data obtained from a calendar application (e.g., data identifying the date), a graphical asset representing a numerical date indication (e.g., a text element), and an indication that graphical element 3208 is to be displayed in the lower left corner of screen 3202.

In some embodiments, a graphical element may be a non-local graphical element (e.g., graphical elements 3210 and 3212 on screen 3202). In some embodiments, a non-local graphical element or asset is one that meets one or more of the following criteria: is provided by a certain party, is not preprogrammed or provided as default on the device, is downloaded by a user, is downloaded by a user subsequent to initiation of the device, and/or is not provided by the manufacturer as part of the standard- or default-installed memory. Stated another way, all of the devices described herein will have stored in memory the discrete set of graphical assets used to make standard or local graphical elements (unless these are deleted by a user). In contrast, the devices may not necessarily have stored in memory a non-local graphical asset or non-local graphical element, unless a user has downloaded and installed them (e.g., subsequent to initial device use). Thus, non-local graphical assets and elements may be considered non-universal or optional components that a particular device may or may not have stored in memory. In other embodiments, a graphical element may be a local graphical element (e.g., graphical elements 3206 and 3208 on screen 3202). In some embodiments, a local graphical element or asset is one that meets one or more of the following criteria: is provided by a certain party (e.g., different from the party providing a non-local graphical element), is preprogrammed or otherwise provided as default on the device, is not downloaded by a user, is not downloaded by a user subsequent to initiation of the device, is provided by the manufacturer as part of the standard- or default-installed memory, and/or uses local (e.g., default) graphical assets stored in memory in the discrete set of assets.

In some embodiments, a non-local graphical element may refer to a graphical element with non-local assets that are not within the discrete set of graphical assets initially stored in memory of the electronic device. In some embodiments, the non-local graphical assets may be stored on the device, but they may be stored separately from the pre-programmed discrete set of graphical assets used to construct clocks, pre-programmed application complications, and the like. For example, the non-local graphical assets may be stored with a non-local application, e.g., an application that was downloaded by the user (e.g., not preprogrammed on the memory of the device). The non-local graphical assets may be entirely non-local (e.g., they may use an image file, animation, or font that is not installed as default on the device), or they may represent instructions to present a local graphical asset (e.g., a system font or image) that is installed as default on the device but is presented in a new way (e.g., displaying a text element based on data obtained from a non-local application). In some embodiments, a non-local graphical element may be a complication that represents an application, displays live application data, and/or launches the application in response to a user contact, but the application may not necessarily already be stored in memory of the recipient device.

Graphical elements 3210 and 3212 represent non-local graphical elements that the user of device 3200 has installed. For example, non-local graphical element 3210 represents a social networking application (e.g., a non-local application installed in the memory of device 3200 by the user), and non-local graphical element 3212 represents a fitness application for cycling (e.g., a non-local application installed in the memory of device 3200 by the user). Non-local graphical element 3210 is rendered using a non-local graphical asset (e.g., a logo or other data obtained from the social networking application, such as a text element) and an indication that graphical element 3210 is to be displayed in the upper right corner of screen 3202. Similarly, non-local graphical element 3212 is rendered using a non-local graphical asset (e.g., a logo or other data obtained from the cycling application, such as fitness data, or a previous or future scheduled ride or workout) and an indication that graphical element 3212 is to be displayed in the lower right corner of screen 3202.

FIG. 32B illustrates another exemplary user-configurable graphical construct displayed on screen 3220 of device 3200. This screen includes clock 3224 (e.g., a graphical element or set of graphical elements). It also includes five complications: 3226, 3228, 3230, 3232, and 3234, each a graphical element. Graphical element 3226 is rendered using data obtained from a weather application (e.g., data identifying a temperature), a graphical asset representing a numerical temperature indication, and an indication that graphical element 3226 is to be displayed in the lower left corner of screen 3220. Graphical element 3228 is rendered using data obtained from a calendar application (e.g., data identifying the date and day of the week), graphical assets representing a numerical date indication and a text element indicating the day of the week, and an indication that graphical element 3228 is to be displayed in the upper left corner of screen 3202. Non-local graphical element 3230 is rendered using a non-local graphical asset representing a logo, an indication that graphical element 3230 is to be displayed in the lower middle portion of screen 3220, and optionally data obtained from the social networking app (e.g., a text element). Similarly, non-local graphical element 3232 is rendered using a non-local graphical asset representing a logo, an indication that graphical element 3232 is to be displayed in the lower right corner of screen 3220, and optionally data obtained from the cycling app (e.g., fitness data, or a previous or future scheduled ride or workout).

In this user-configurable graphical construct, screen 3220 also includes non-local graphical element or complication 3234. Like non-local graphical element 3232, non-local graphical element 3234 also represents the cycling application. Non-local graphical element 3234 is rendered using non-local graphical assets from the cycling application, an indication that graphical element 3234 is to be displayed in the center portion of screen 3220, and data obtained from the cycling application. However, compared to 3232, graphical element 3234 displays a different type and amount of content (e.g., a different set and/or amount of non-local graphical assets). For example, graphical element 3234 includes several text elements; it displays a header showing the name of the application ("Cycling"), a body text indicating the date and time of the previous ride, and a second body text indicating the length of the previous ride. All of these text elements are displayed based on data obtained from the non-local application. Thus, in some embodiments, the amount and/or type of graphical assets (including both standard or local and non-local graphical assets) making up a graphical element (including both standard or local and non-local graphical elements) is based on the arrangement of the graphical element in the user-configurable graphical construct. In this example, a graphical element (including standard or local and non-local graphical assets) displayed in the center portion of screen 3220 as complication 3234 displays a different type and/or amount of content, as compared to being displayed in another portion of 3220 (e.g., as complication 3232).

If a user wishes to share a user-configurable graphical construct with a second user, and each user's device stores in memory a discrete set of graphical assets from which the graphical elements may be generated, the methods, devices, systems, and computer-readable storage media described herein need only transmit and receive data representing a user-configurable graphical construct, rather than transmitting or receiving the full user-configurable graphical construct, e.g., as an asset. For example, in some embodiments, the methods include receiving data representing a user-configurable graphical construct. In some embodiments, the received data include first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct. In some embodiments, the received data further include second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct. Advantageously, such methods, devices, systems, and computer-readable storage media described herein may reduce bandwidth requirements, thus conserving processor, memory, and/or battery usage, which are particularly relevant for portable multifunction devices.

Figure 33A:
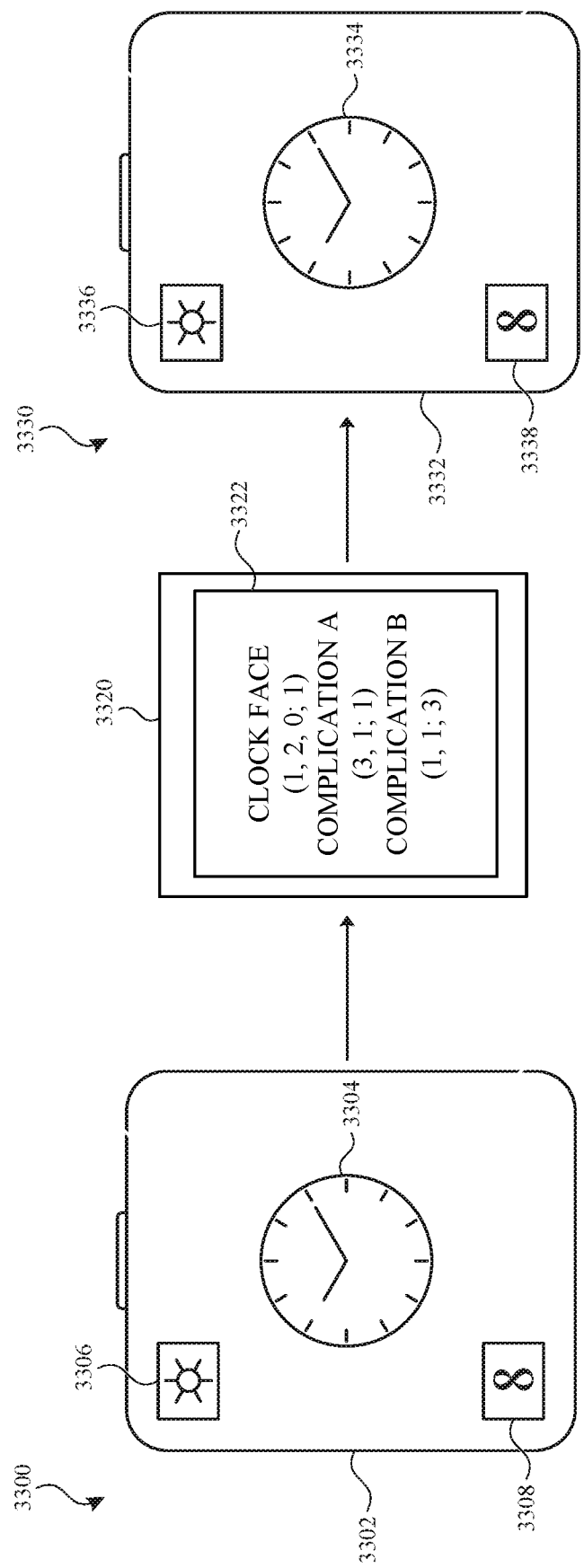
FIGS. 33A and 33B illustrate exemplary user interfaces for receiving data representing user-configurable graphical constructs in accordance with some embodiments.

The concept of sharing data representing a user-configurable graphical construct with local graphical assets and elements is illustrated in FIG. 33A. This exemplary user-configurable graphical construct is optionally operated on device 3300 and/or 3330, each of which may optionally be devices 100, 300, 500, or 3200, in accordance with some embodiments. The electronic devices have a display (e.g., 504).

Device 3300 displays user interface screen 3302, which includes clock 3304 and complications 3306 and 3308, representing a weather application and a calendar application, respectively. Each of graphical elements 3304, 3306, and 3308 is made of local graphical assets. In this example, the user of device 3300 wants to share data representing this user-configurable graphical construct with the user of device 3330.

In order to share these data, device 3300 transmits data 3320, which represents the user-configurable graphical construct. Data 3320 includes metadata or information 3322 representing each graphical element. For example, metadata 3322 contains data indicating each graphical asset of clock 3304 (e.g., a style of clock, a density of the clock, and a color scheme of the clock) as well as data indicating the arrangement of the graphical assets in the user-configurable graphical construct (e.g., display the clock in the middle of screen 3302). Metadata 3322 further contains data for each of the two complications, indicating which graphical assets to use (e.g., which application data to display, and which icon, image or text element to display) and how they are arranged (e.g., which corner of screen 3302).

As shown on screen 3332 of device 3330, data 3320 includes all of the information necessary to compile the graphical assets required for the user-configurable graphical construct. Data 3320 does not include the graphical assets themselves; it merely contains metadata or information 3322 that device 3330 then uses to select the relevant graphical assets from the discrete set stored in memory and display them in the indicated arrangement.

Upon receiving data 3320, device 3330 displays screen 3332, which includes complications 3336 and 3338, which are based on complications 3306 and 3308. In some embodiments, graphical elements 3306 and 3336, and/or graphical elements 3308 and 3338, may be the same as those sent by device 3300. In some embodiments, the complications as displayed on the sender and recipient devices may differ, since they may obtain and display local application data. For example, a sender in Alaska may send to a friend in Hawaii data representing a user-configurable graphical construct with a complication showing data from a weather application (e.g., 3306). As viewed from on the sender's device, complication 3306 shows Alaskan weather data, but when displayed by the recipient device 3330, complication 3336 shows local weather data from Hawaii.

As described above, the user-configurable graphical constructs of the present disclosure may include non-local graphical elements, which may include non-local graphical assets. A user may wish to share a user-configurable graphical construct with non-local graphical elements. For example, the user may configure a graphical construct with a complication representing a new application that the user has just downloaded and wants to share with a friend. It is advantageous to allow a user to send or receive a user-configurable graphical construct with non-local graphical elements, e.g., to introduce friends to new applications that they may or may not already have downloaded, to expand the functionality of a friend's electronic device, or to invite a friend to a game, social networking application, or other social experience through an application they have both downloaded.

However, in order to share the non-local graphical element, the recipient device must receive data representing the non-local graphical element, as it may not necessarily have the non-local graphical element or its assets stored in memory. Sending the entire non-local graphical element, its assets, and even its associated application would impose large bandwidth and authentication requirements. Advantageously, the methods disclosed herein allow a user to send or receive information representing a non-local graphical element, even if it and its assets are not already stored in both the sender and recipient device memories.

Figure 33B:
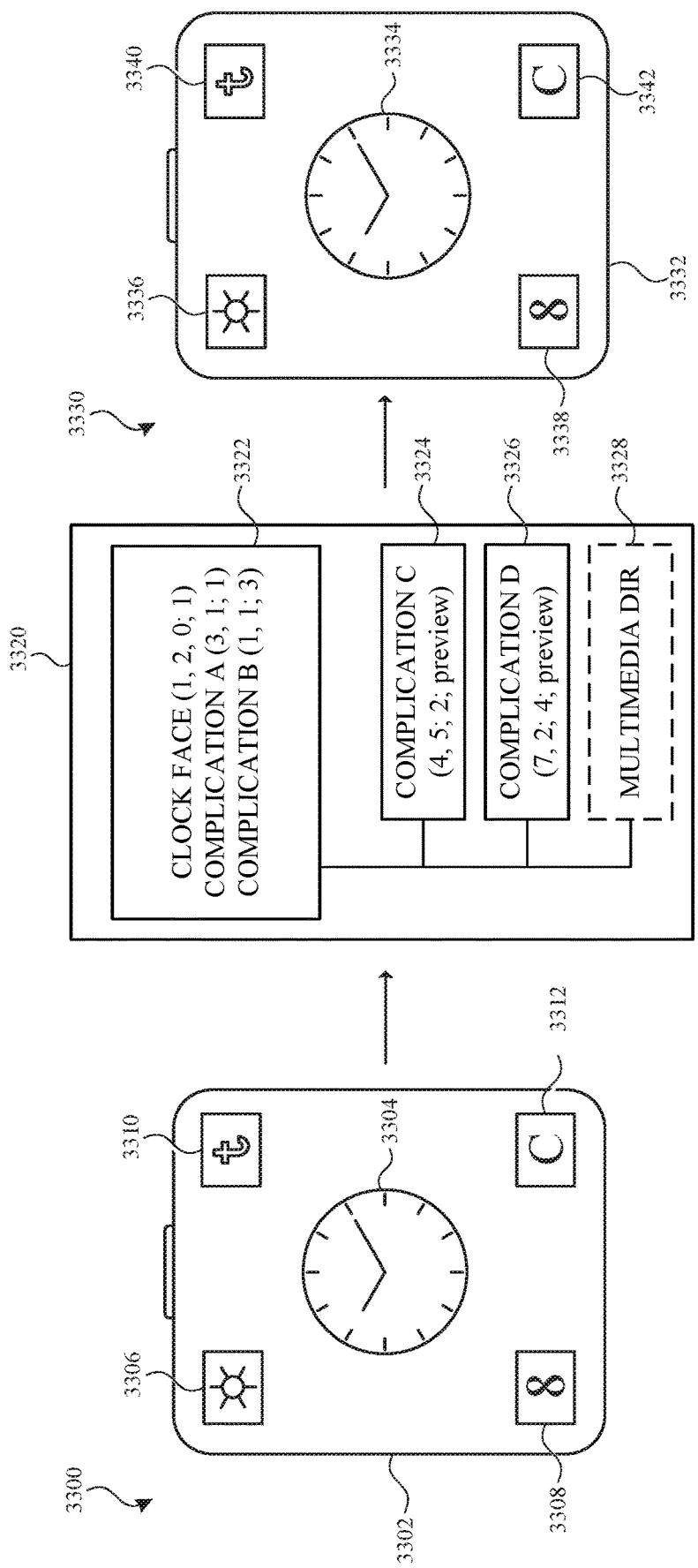

The concept of sharing data representing a user-configurable graphical construct with local and non-local graphical assets and elements is illustrated in FIG. 33B. This exemplary user-configurable graphical construct is optionally operated on device 3300 or 3330, which may optionally be devices 100, 300, 500, or 3200, in accordance with some embodiments. The electronic devices have a display (e.g., 504).

Compared to FIG. 33A, the user-configurable graphical construct displayed on screen 3302 now has two additional complications, 3310 and 3312, which represent non-local graphical elements with non-local graphical assets. The user of device 3300 wishes to share this user-configurable construct with the user of device 3330; however, device 3330 does not necessarily have these non-local graphical assets in memory.

As such, data 3320 now contains additional elements. It still comprises metadata 3322, which contains data indicating each graphical asset of clock 3304, data indicating the arrangement of the graphical assets of the clock in the user-configurable graphical construct, data indicating which graphical assets to use for each of the two complications, and data indicating how they are arranged. In some embodiments, the received transmitted data further includes information representing a non-local graphical element of a user-configurable graphical construct. As illustrated in FIG. 33B, data 3320 includes data 3324 for complication 3310. Data 3324 identifies non-local graphical asset(s) used to generate complication 3310, the arrangement of the non-local graphical asset(s) in the user-configurable graphical construct, and a preview image representing the non-local graphical asset(s). Data 3320 also includes data 3326 for complication 3312, which like data 3324 identifies non-local graphical asset(s) used to generate complication 3312, the arrangement of the non-local graphical asset(s) in the user-configurable graphical construct, and a preview image representing the non-local graphical asset(s).

In some embodiments, the preview images each represent a non-local graphical asset without requiring transmission/receipt of the non-local graphical asset. They may be used as placeholders to represent non-local graphical elements, e.g., when displayed to a recipient user, such that the recipient user can decide whether or not to accept the user-configurable graphical construct without requiring the recipient device to receive, or already have stored in memory, the non-local graphical elements and non-local graphical assets. In some embodiments, a preview image is a static image. In some embodiments, a preview image is generated (e.g., by the sender device) based on application data, e.g., obtained from a non-local application on the sender device.

Additionally, data 3320 may optionally include a multimedia object or multimedia object directory 3328. Data 3320 may include one or more multimedia objects that are part of the user-configurable graphical construct. In this case data 3320 comprises the multimedia object(s) as asset(s). Data 3320 may further include information identifying the arrangement of the multimedia object on the user-configurable graphical construct. Examples of multimedia objects may include, for example, photo or image files, an album of photo or image files, and/or audio files. These multimedia object(s) are sent with data 3320 to supply them without requiring them to be present in device 3330's memory. This concept is further described below in references to FIGS. 34B and 41.

In response to receiving data 3320, device 3330 displays screen 3332, which now includes complications 3340 and 3342 that are based on complications 3310 and 3312, respectively. In this example, device 3330 happens to have the non-local graphical assets of these non-local graphical elements stored in memory, e.g., the user of device 3330 has downloaded the represented non-local applications. The scenario in which the recipient device does not have these non-local graphical assets in memory is described infra.

Figure 34A:
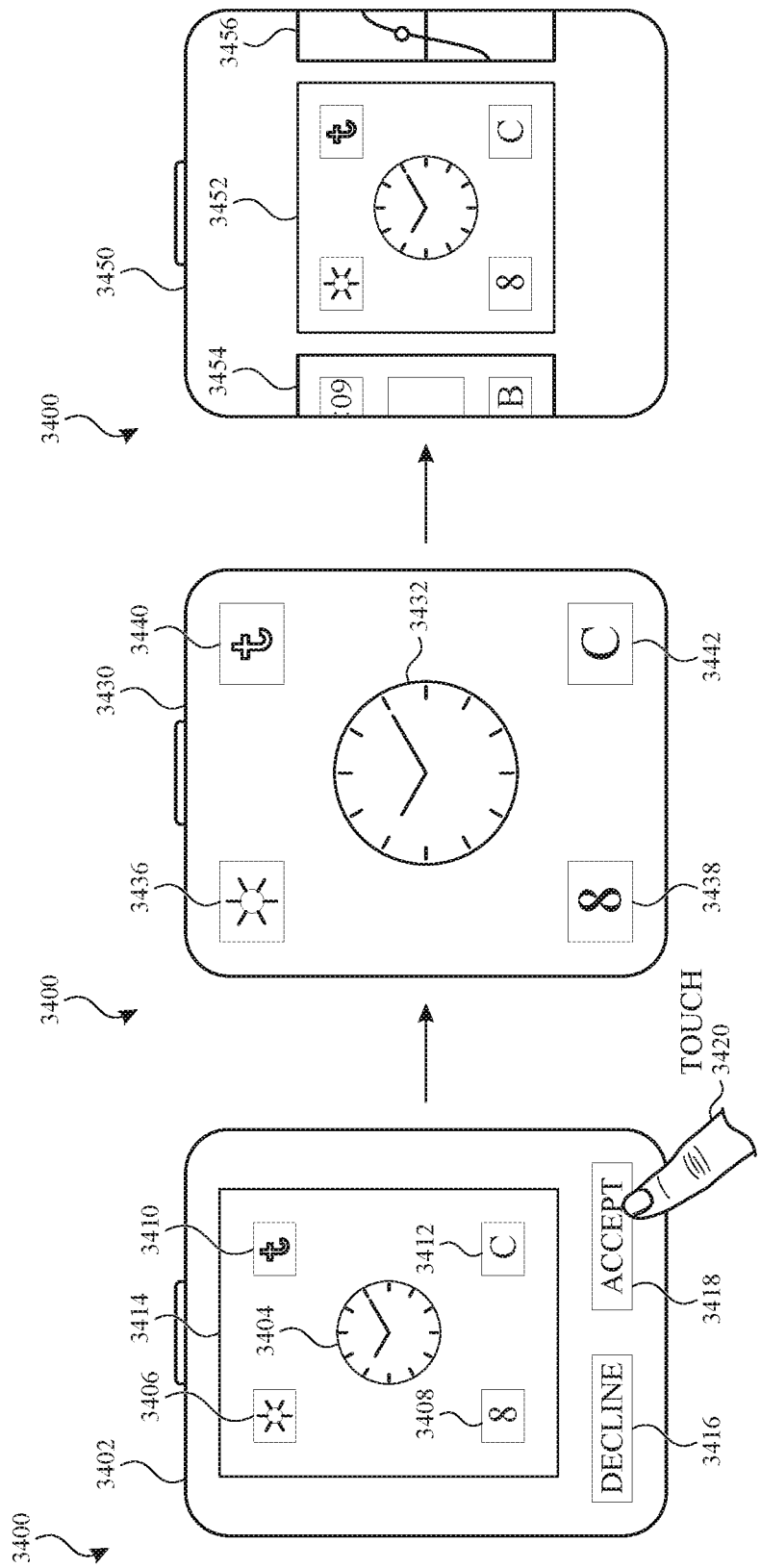
FIGS. 34A and 34B illustrate exemplary user interfaces for receiving data representing user-configurable graphical constructs in accordance with some embodiments.

Turning now to FIG. 34A, in some embodiments, subsequent to receiving data representing a user-configurable graphical construct (e.g., as described above), the methods include generating the user-configurable graphical construct or a representation of the user-configurable graphical construct based on the received data and at least a subset of the discrete set of graphical assets stored in the memory. The exemplary user interfaces illustrated in FIG. 34A are operated on device 3400, which may optionally be devices 100, 300, 500, 3200, 3300, or 3330, in accordance with some embodiments. The electronic device has a display (e.g., 504).

FIG. 34A depicts device 3400, which displays user interface screen 3402. Screen 3402 includes a representation 3414 of a user-configurable graphical construct generated by device 3400. Representation 3414 includes representation of clock 3404 and representations 3406, 3408, 3410, and 3412, which represent graphical elements (e.g., complications similar to those illustrated in FIGS. 32A and 33B). As such, based on the received data and at least a subset of the discrete set of graphical assets stored in the memory, device 3400 is able to generate and display representation 3414 of the user-configurable graphical construct, for which representative data was received.

For example, the recipient device 3400 may use the received data (e.g., data 3320) identifying one or more graphical assets to locate and use these graphical assets from the discrete set of graphical assets stored on the recipient device in order to generate the user-configurable graphical construct or representation thereof (as opposed to using assets sent by the sending device). The recipient device 3400 may also use the data indicating the arrangement of the one or more graphical assets to generate the user-configurable graphical construct or representation thereof.

In some embodiments, the user-configurable graphical construct itself is generated, e.g., as it appears on the display of a transmitting device (as shown on screen 3332 in FIG. 33A), based on the received data (e.g., data 3320). In other embodiments, a representation of the user-configurable graphical construct is generated, as illustrated on screen 3402 by representation 3414. For example, the representation may depict the user-configurable graphical construct at a smaller size or displayed in a different format, as compared to how it would be displayed by the sender and/or recipient device. In some embodiments, the representation may use "placeholder" assets or preview images rather than the actual graphical assets that would be used in the user-configurable graphical construct. For example, if a graphical element obtains and displays live data from an application, the generated representation may simply present a preview image, rather than obtaining live data. This allows the recipient device to generate a representation for display to the user without the processor burden of obtaining application data, thus allowing the user to get an idea of what the user-configurable graphical construct looks like without requiring excessive processor/memory/bandwidth demands. For example, representations 3410 and/or 3412 may be preview images (e.g., as supplied in data 3324 and 3326 as part of received data 3320) that represent corresponding non-local graphical elements and non-local applications without requiring device 3400 to already have the corresponding non-local graphical assets stored in memory. Thus, generating a representation of a non-local graphical element does not require that the element itself be supplied by the sender device or rendered using code from the sender device (e.g., if the non-local graphical element displays live application data). Requiring the recipient device to run code obtained from a sender device before receiving an indication that the recipient user wishes to accept the user-configurable graphical construct would present potential security issues. Rather, the recipient device has everything necessary to generate a representation of non-local graphical element(s), e.g., by using the received data and an application programming interface (API) on the recipient device that is able to interpret the data and render a representation based on the data.

As illustrated on screen 3402, subsequent to generating the user-configurable graphical construct or the representation of the user-configurable graphical construct, the methods in some embodiments include displaying the generated user-configurable graphical construct or the generated representation of the user-configurable graphical construct.

In some embodiments, the methods further include, subsequent to generating the user-configurable graphical construct or the representation of the user-configurable graphical construct, displaying a user interface for accepting the user-configurable graphical construct. For example, user interface screen 3402 provides a user interface for accepting the user-configurable graphical construct. Also displayed on screen 3402 are affordances 3416 and 3418 for declining or accepting the user-configurable graphical construct, respectively. In some embodiments, the user may provide a user input via the user interface to indicate acceptance of the user-configurable graphical construct. As shown in FIG. 34A, the user contacts "accept" affordance 3418 indicating acceptance on the touch-sensitive display of device 3400 with touch 3420.

In some embodiments, the methods further include storing the received data in the memory of the electronic device, e.g., in response to receiving the user input indicating acceptance of the user-configurable graphical construct (e.g., touch 3420). In some embodiments, the received data are stored by the recipient device (e.g., device 3400). In some embodiments, the received data are stored in the memory of an external device (e.g., portable multifunction device 100 and/or multifunction device 300) coupled to device 3400 via wireless communication. In some embodiments, the user-configurable graphical construct is stored in memory. In some embodiments, data representative of the user-configurable graphical construct and/or its configuration are stored in memory (e.g., metadata indicating the particular graphical elements, graphical assets, and/or graphical asset arrangements of the user-configurable graphical construct).

In some embodiments, the methods further include, subsequent to storing the received data in the memory of the electronic device, displaying the user-configurable graphical construct on the display. This is illustrated in FIG. 34A. Subsequent to touch 3420, device 3400 displays user interface screen 3430, which displays the user-configurable graphical construct. Screen 3430 includes graphical elements: clock 3432 and complications 3436, 3438, 3440, and 3442. As described above, in some embodiments, these graphical elements may be the same as those sent by the sender device (on which representations 3406, 3406, and 3408 are based, and which are represented by preview images 3410 and 3412). In other embodiments, these graphical elements may be different from those sent by the sender device; for example, they may include analogous graphical assets or data that are instead based on the recipient device.

In some embodiments, device 3400 may store the received data in memory for later display and selection of the user-configurable graphical construct. For example, in some embodiments, the methods further include, subsequent to storing the received data in the memory of the electronic device, entering a user-configurable graphical construct selection mode of the electronic device. Exemplary user-configurable graphical construct selection modes are described herein, e.g., in reference to FIGS. 27A-27E. User inputs for entering a user-configurable graphical construct selection mode may include, e.g., a touch on a touch-sensitive display (e.g., a touch having a characteristic intensity above a threshold intensity, a press-and-hold input, a touch on a displayed affordance indicating the selection mode, and so forth). As shown in FIG. 34A, device 3400 may display user interface screen 3450, which depicts an exemplary user interface for a user-configurable graphical construct selection mode. Screen 3450 includes representation 3452, which is based on the user-configurable graphical construct for which representative data were received. In some embodiments, representation 3452 may be similar, identical to, or based on representation 3414. Screen 3450 further includes partial views of representations 3454 and 3456, which represent different user-configurable graphical construct. These user-configurable graphical constructs may have been configured by the user at device 3400 or received from another device, e.g., based on received data representing the information described above for these user-configurable graphical constructs. In some embodiments, subsequent to touch 3420, device 3400 displays screen 3450 without the intervening display of screen 3430.

In some embodiments, while in the user-configurable graphical construct selection mode, device 3400 receives a user input indicating selection of the user-configurable graphical construct. In some embodiments, the user input is a touch on a displayed representation of a user-configurable graphical construct (e.g., touch 2722 in FIG. 27A). In response to receiving the user input, device 3400 displays the user-configurable graphical construct (e.g., as shown on screen 3430; this is similar to screen 2730 in FIG. 27A). In some embodiments, before displaying the user-configurable graphical construct, device 3400 generates the user-configurable graphical construct based on the received data and at least a subset of the discrete set of graphical assets stored in the memory, e.g., as described above.

Figure 34B:
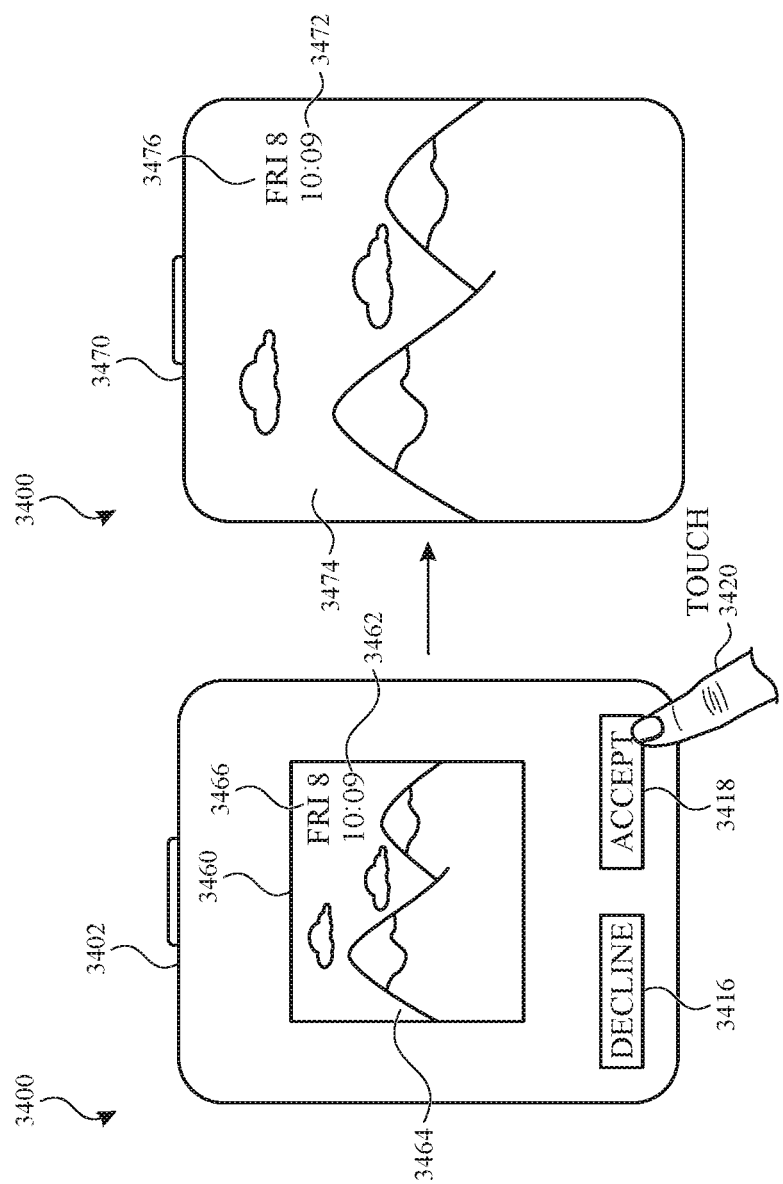

FIG. 34B illustrates generating a user-configurable graphical construct or a representation of a user-configurable graphical construct based on received data that includes a multimedia object and at least a subset of the discrete set of graphical assets stored in the memory. For example, a user may wish to share a user-configurable graphical construct that includes a multimedia object (e.g., photo or image file, an album of photo or image files, and/or an audio file). The recipient device may require the multimedia object itself to generate the user-configurable graphical construct and/or representation thereof. In this example, the user-configurable graphical construct includes a user photo as a background.

Subsequent to receiving data (e.g., data 3320) representing a user-configurable graphical construct, device 3400 displays on screen 3402 a user interface for accepting the user-configurable graphical construct. The user interface includes representation 3460 of the user-configurable graphical construct, which contains representation 3462 of a clock, representation 3464 of the user photo (e.g., displayed as a background graphical element), and representation 3466 of a date. In some embodiments, representation 3464 may include the multimedia object (e.g., at a smaller size). In some embodiments, representation 3464 is based on multimedia object or multimedia directory 3328. In some embodiments, representation 3464 may represent the multimedia object (e.g., with an indication of a photo, album, or audio file). The user interface also includes affordances 3416 and 3418, e.g., as shown in FIG. 34A.

In this example, the user indicates acceptance of the user-configurable graphical construct by touch 3420 on displayed "accept" affordance 3418. Subsequent to detecting touch 3420, device 3400 generates the user-configurable graphical construct from the received data (e.g., data 3320) and displays user interface screen 3470 containing the represented graphical elements. Screen 3470 includes the user-configurable graphical construct represented by 3460, with clock 3472, photo 3474 displayed as a background, and date 3476.

In some embodiments, non-local graphical elements may include text elements. A user may wish to share a user-configurable graphical construct with another user that uses a different language. For example, a French-speaking user may wish to share a user-configurable graphical construct with an English-speaking user, but it would be confusing to the English-speaking user to view a representation of a user-configurable construct with French text, rather than English. It is therefore advantageous to provide ways for users of different languages to share non-local graphical elements with text elements according to their preferred languages.

Figure 35:
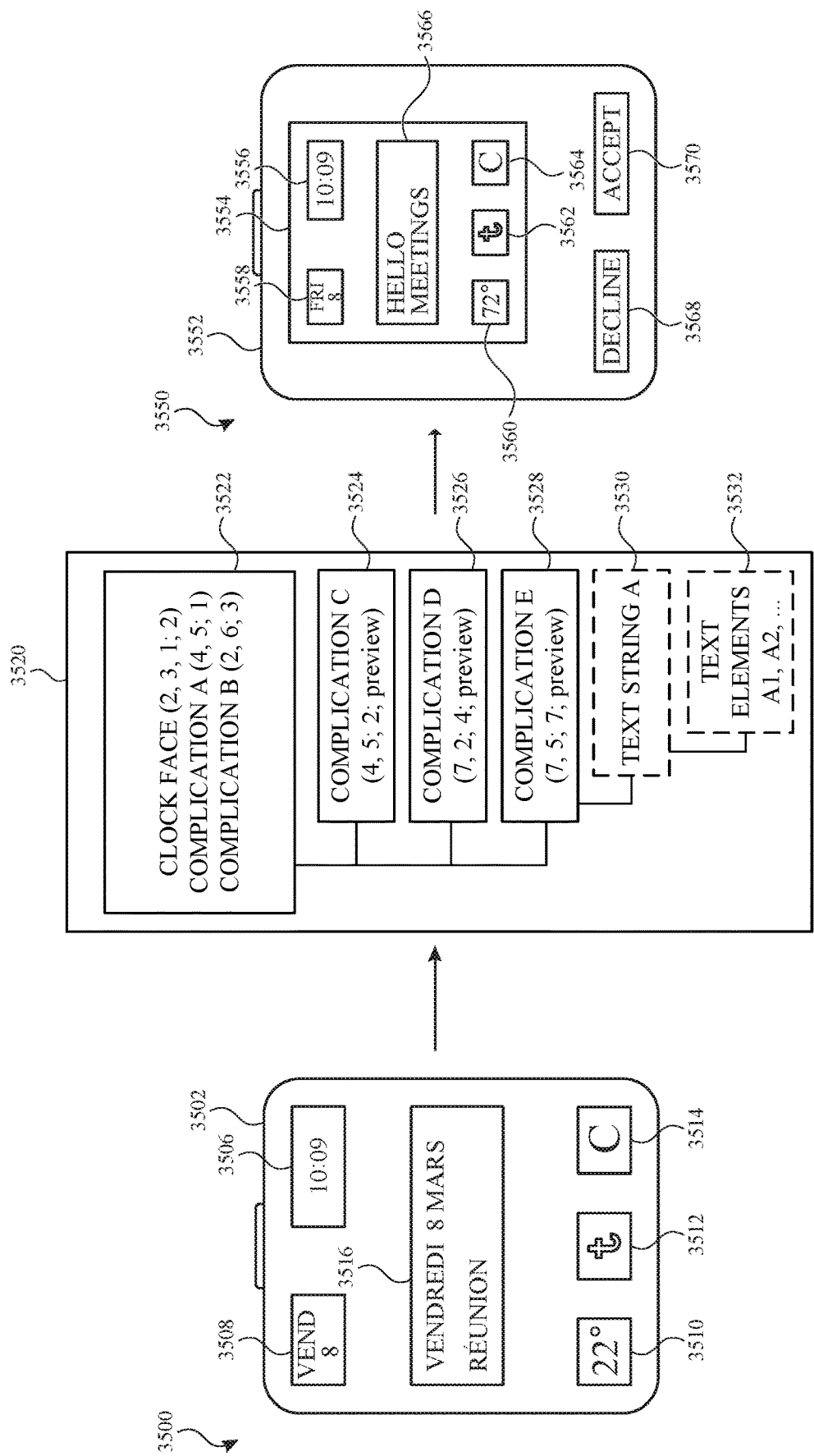
FIG. 35 illustrates exemplary user interfaces for receiving data representing user-configurable graphical constructs in accordance with some embodiments.

FIG. 35 illustrates an exemplary way for such users to share user-configurable graphical constructs. The exemplary user interfaces illustrated in FIG. 35 are optionally operated on device 3500, which may optionally be devices 100, 300, 500, 3200, 3300, 3330, or 3400, in accordance with some embodiments. The electronic device has a display (e.g., 504).

Device 3500 displays screen 3502, which includes clock 3506 and complications 3508, 3510, 3512, 3514, and 3516 (all graphical elements). Complications 3512, 3514, and 3516 represent non-local graphical elements. In particular, complication 3516 represents a scheduling application for meetings. Device 3500 is configured with French as the system language (e.g., the language in which text elements are displayed) for the French user. For example, complication 3516 displays meeting information in French.

The user of device 3500 wishes to share the user-configurable graphical construct on screen 3502 with an English-speaking user of device 3550, which is configured with English as the system language. In response to receiving a request to share the user-configurable graphical construct, device 3500 transmits data 3520 to device 3550. Data 3520 include metadata 3522, which contains data indicating each graphical asset of clock 3506 (e.g., a style of clock, a density of the clock, and a color scheme of the clock), which is a graphical element, as well as data indicating the arrangement of the graphical assets in the user-configurable graphical construct (e.g., display the clock in the upper right corner of screen 3502). Metadata 3522 further contains data for each of the two local complications 3508 and 3510 (each a graphical element), each respective data indicating which graphical assets to use and how they are arranged. In addition, data 3520 contains data 3524 for complication 3512 (a graphical element) that identifies non-local graphical asset(s) used to generate complication 3512, the arrangement of the non-local graphical asset(s) in the user-configurable graphical construct, and a preview image representing the non-local graphical asset(s); data 3526 for complication 3514 (a graphical element) that identifies non-local graphical asset(s) used to generate complication 3514, the arrangement of the non-local graphical asset(s) in the user-configurable graphical construct, and a preview image representing the non-local graphical asset(s); and data 3528 for complication 3516 (a graphical element) that identifies non-local graphical asset(s) used to generate complication 3516, the arrangement of the non-local graphical asset(s) in the user-configurable graphical construct, and a preview image representing the non-local graphical asset(s).

In this example, the preview image for complication 3516 includes text string 3530, which contains a greeting and a name for the application. Text string 3530 is included with data 3520 and is meant to be displayed in the system language of the recipient device. To allow users with different system languages to view a representation of text string 3530, data 3520 further includes a plurality of text elements 3532, each of which represents text string 3530 in a different language. In this example, data 3520 includes at least two text elements for displaying text string 3530 in at least French and English. By including text string 3530, which acts as a key for translating the meaning of the text string, and text elements 3532, which include translations of the text string in different languages, device 3550 is able to render and display the text string in different languages to allow users with different system languages to view comprehensible representations of the text element(s) of non-local graphical elements.

Subsequent to receiving data 3520, and based on at least a subset of a discrete set of graphical assets in memory and on received data 3520, device 3550 generates representation 3554 of the user-configurable graphical construct, which is displayed on screen 3502. Representation 3554 further includes representation 3556 of clock 3506, representation 3558 of complication 3508, representation 3560 of complication 3510, representation 3562 of complication 3512, representation 3564 of complication 3514, and representation 3566 of complication 3516. Importantly, based on received data 3520, representation 3566 displays text string 3530 in English using English text element 3532. This representation allows the user to understand what application is being represented in his or her own language (e.g., a system language of their device), regardless of the sender device's system language. In some embodiments, generating representation 3554 includes identifying that the system language of device 3550 (e.g., a language in which 3550 is configured to display text) corresponds to the language of one of text elements 3532. Subsequently, device 3550 is able to select the text element that matches the meaning of text string 3530 in the system language of the recipient device (in this case, English) and display it as part of representation 3566.

Figure 36:
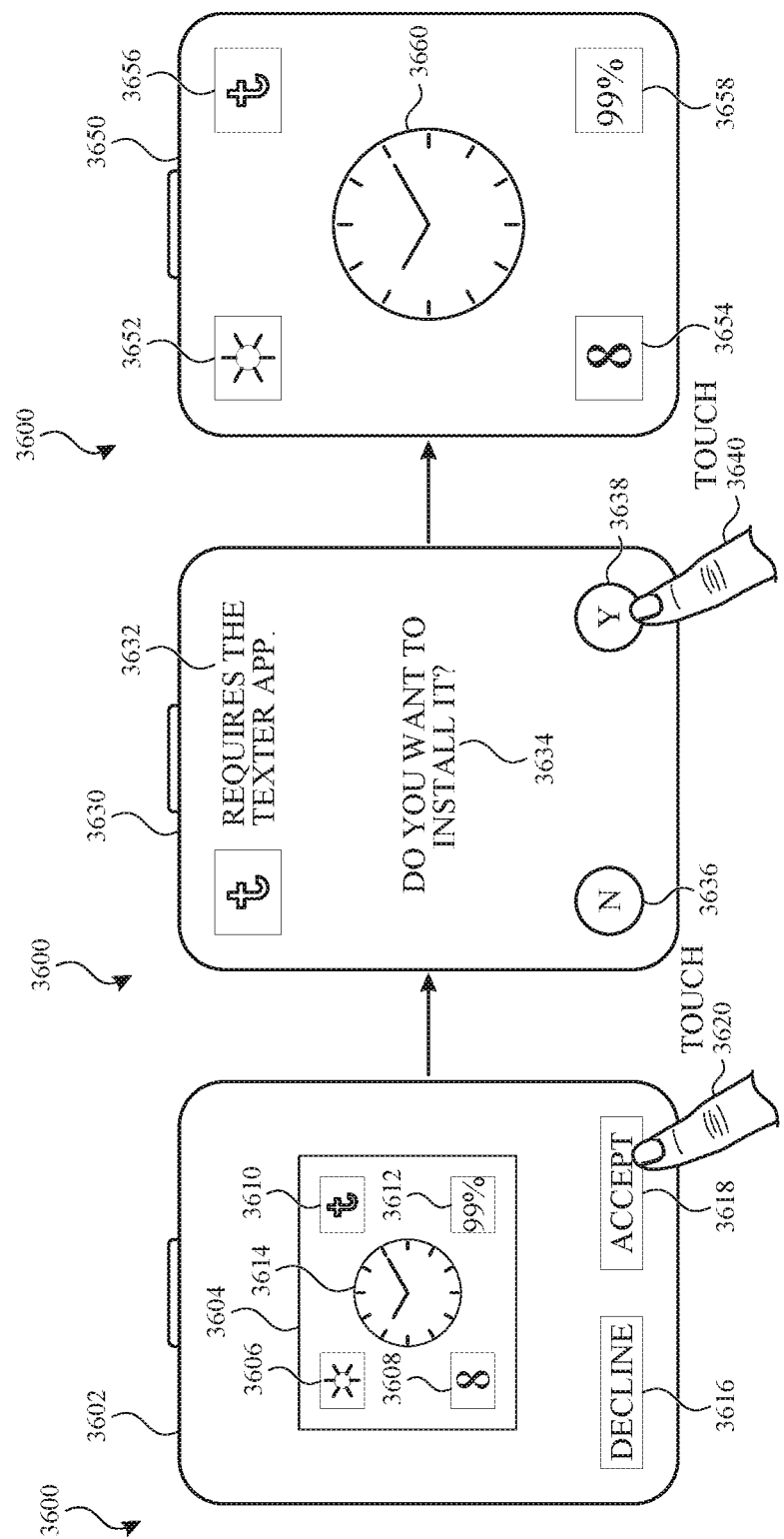
FIG. 36 illustrates exemplary user interfaces for receiving data representing user-configurable graphical constructs in accordance with some embodiments.
Figure 37:
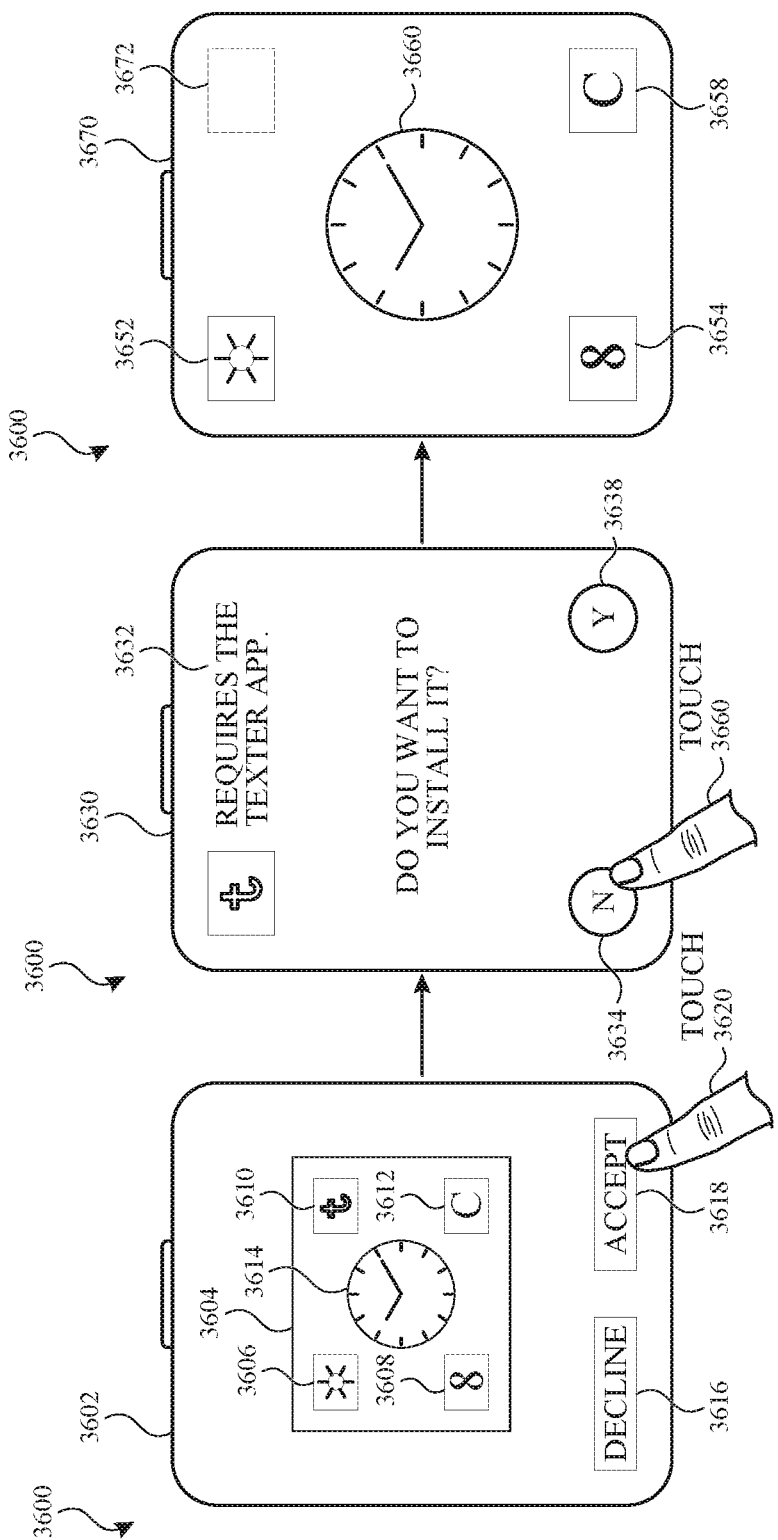
FIG. 37 illustrates exemplary user interfaces for receiving data representing user-configurable graphical constructs in accordance with some embodiments.

As mentioned above, since some user-configurable graphical constructs may contain non-local graphical elements, it is advantageous to enable the user to acquire these non-local graphical elements and their non-local graphical assets upon acceptance of a shared user-configurable graphical construct. This allows users to easily share non-local applications. Exemplary interfaces for this process are illustrated in FIGS. 36 and 37. The exemplary user interfaces illustrated in FIGS. 36 and 37 are optionally operated on device 3600, which may optionally be device 100, 300, 500, 3200, 3300, 3330, 3400, 3500, or 3550 in accordance with some embodiments. The electronic device has a display (e.g., 504).

Device 3600 has received data (e.g., data 3320) representing a user-configurable graphical construct and displays screen 3602. This screen includes representation 3604 of the user-configurable graphical construct, which includes representation 3614 of a clock and representations 3606, 3608, 3610, and 3612 of complications. Representation 3610 represents a non-local graphical element, which represents a social networking application. In some embodiments, representation 3610 includes a preview image obtained from the received data. Also displayed on screen 3602 are affordances 3616 and 3618 for declining or accepting the user-configurable graphical construct, respectively. The user of device 3600 indicates acceptance by touch 3620 on "accept" affordance 3618.

In response to receiving touch 3620, device 3600 determines whether the application represented by one or more of the displayed representations (e.g., representation 3610) is stored in memory (e.g., in the memory of device 3600, or the memory of an external device coupled to device 3600 via wireless communication). In accordance with a determination that the application is not stored in the memory, device 3600 displays screen 3630. Screen 3630 includes a user interface for acquiring the application. For example, screen 3630 includes text element 3632, which alerts the user that data representing a non-local graphical element has been received. In this case, it lets the user know that one of the complications represents a non-local application not stored in memory. Screen 3630 also includes prompt 3634 asking the user whether they would like to download the non-local application, and affordances 3636 and 3638 for declining or accepting to download the application, respectively. In some embodiments, the application may be downloaded from a website, online store for acquiring applications, or other external server. In some embodiments, the received data and/or user interface for acquiring the application contains a hyperlink to acquire or purchase the application from a website, online store, or other external server. In accordance with a determination that the application is stored in the memory, device 3600 foregoes displaying screen 3630 and, in some embodiments, proceeds directly to displaying screen 3650, as described below.

The user indicates that they would like to acquire the application by touch 3640 on "yes" affordance 3638. In some embodiments, in response, device 3600 downloads the application, which includes the non-local graphical element(s) and/or asset(s). In some embodiments, device 3600 provides the user with a link to download the application from a website or other external server. In some embodiments, device 3600 may further present the user with a prompt to purchase the application. In some embodiments, the user-configurable graphical construct may include more than one non-local graphical element based on more than one non-local application. In some embodiments, the user interface for acquiring may indicate more than one non-local application. In some embodiments, the user interface for acquiring lists more than one non-local application and presents a user prompt for acquiring each non-local application (e.g., a list of non-local applications with a check box for acquiring each). In some embodiments, the user interface for acquiring lists more than one non-local application and presents a user prompt for acquiring all of the non-local applications (e.g., a check box marked "get all").

After downloading the application, device 3600 displays screen 3650, which includes the user-configurable graphical construct represented by 3604. This construct includes complications 3652, 3654, 3656, and 3658 (all graphical elements), upon which representations 3606, 3608, 3610, and 3612 are based, as well as clock 3660, upon which representation 3614 is based. In some embodiments, graphical element 3656 is generated using non-local graphical assets downloaded with the application.

FIG. 37 depicts a different scenario in which the user of device 3600 does not indicate that they would like to acquire the application, e.g., by providing touch 3660 on "no" affordance 3634. In response to detecting touch 3660, device 3600 displays screen 3670. Like screen 3650, screen 3670 includes clock 3660 and complications 3652, 3654, and 3658, each representing a local application and made from graphical assets stored in the discrete set in memory. In other embodiments, the user of device 3600 may have downloaded, but then deleted, the represented application. If device 3600 generates the user-configurable graphical construct and does not have the necessary non-local graphical asset(s) to generate a non-local graphical element, it may display an indication that the non-local application is not stored in memory.

Screen 3670 includes indication 3672 in place of complication 3656 (e.g., based on arrangement information from the received data), thus indicating to the user that the represented non-local application has not been downloaded. This could be implemented, e.g., by displaying a box or other indication at and/or around the space where the complication would go, or by displaying the preview image or other icon representing the non-local graphical element in a manner that indicates the application is not present (e.g., grayed-out, marked-through, or otherwise distinguished from the non-local graphical element). Displayed indication 3672 reminds the user that the non-local application is not stored in memory. In some embodiments, if the user later acquires, downloads, or re-installs the non-local application, device 3600 may substitute the appropriate graphical element (e.g., complication 3656) for indication 3672. In some embodiments, if the user later customizes the user-configurable graphical construct to include a different graphical element in the location of indication 3672, device 3600 may cease to display indication 3672.

In any of the embodiments described herein, received data may be received by a recipient device itself (e.g., device 3330 or 3400). In other embodiments, the data are received by an external device (e.g., portable multifunction device 100 and/or multifunction device 300) coupled to the device via wireless communication.

Figure 38:
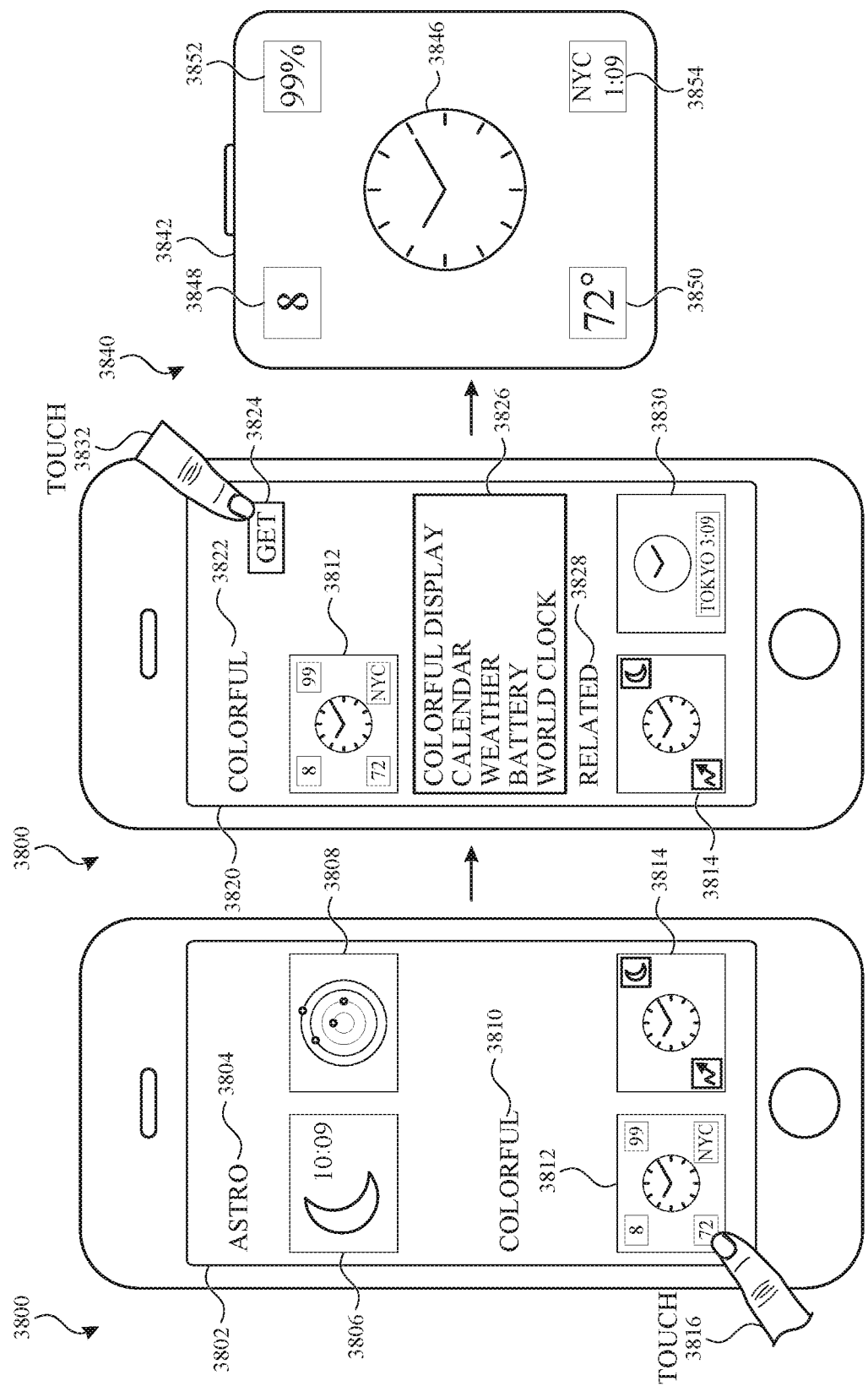
FIG. 38 illustrates exemplary user interfaces for receiving data representing user-configurable graphical constructs in accordance with some embodiments.

Turning now to FIG. 38, exemplary interfaces for receiving the data described above at an external device are depicted. Exemplary user interfaces for external device 3800 as illustrated in FIG. 38 are optionally operated on portable multifunction device 100 and/or multifunction device 300. The other exemplary user interfaces for device 3840 as illustrated in FIG. 38 are optionally operated on device 100, 300, 500, 3200, 3300, 3330, 3400, 3500, 3550, or 3600 in accordance with some embodiments. Devices 3800 and 3840 have a display (e.g., 112 or 340, and 504, respectively).

FIG. 38 illustrates an exemplary set of interfaces for receiving data at an external device (e.g., external device 3800) from an external server, such as a website or online store for downloading content including user-configurable graphical constructs. Device 3800 displays screen 3802, which displays content from the website/online store. Displayed on screen 3802 are headers 3804 and 3810, which indicate categories or types of user-configurable graphical constructs. Under each header are individual user-configurable graphical constructs from each category/type, which are available for download. For example, representations 3806 and 3808 represent user-configurable graphical constructs of the "Astro" category with astronomical data such as moon phase and planetary position, whereas representations 3812 and 3814 represent user-configurable graphical constructs of the "Colorful" category with particular color schemes. In some embodiments, the user may swipe on the representations to view additional user-configurable graphical constructs of the designated category/type.

In order to view additional information and/or download a particular user-configurable graphical construct, user touches the appropriate representation affordance (e.g., touch 3816 on affordance 3812). In response to detecting the touch, device 3800 displays screen 3820. Screen 3820 includes header 3822 indicating the category/type, representation 3812, and affordance 3824 for acquiring the user-configurable graphical construct of which representation 3812 is representative. Also provided are summary 3826, which includes additional information about the user-configurable graphical construct, header 3828 for related user-configurable graphical constructs, and representations 3814 and 3830, which represent additional user-configurable graphical constructs of the designated category/type.

In this example, the user touches "get" affordance 3824 (e.g., with touch 3832) to acquire the user-configurable graphical construct represented by 3812. In response, data (e.g., as described above) representing the user-configurable graphical construct are transmitted from the external server to device 3800 and/or device 3840, which is coupled to device 3800 via wireless communication.

Subsequent to receiving the data (e.g., at device 3800 and/or device 3840), device 3840 displays screen 3842, which includes the user-configurable graphical construct represented by 3812. Screen 3824 includes clock 3846 and complications 3848, 3850, 3852, and 3854, which are graphical elements represented by the representations within 3812.

Figure 39:
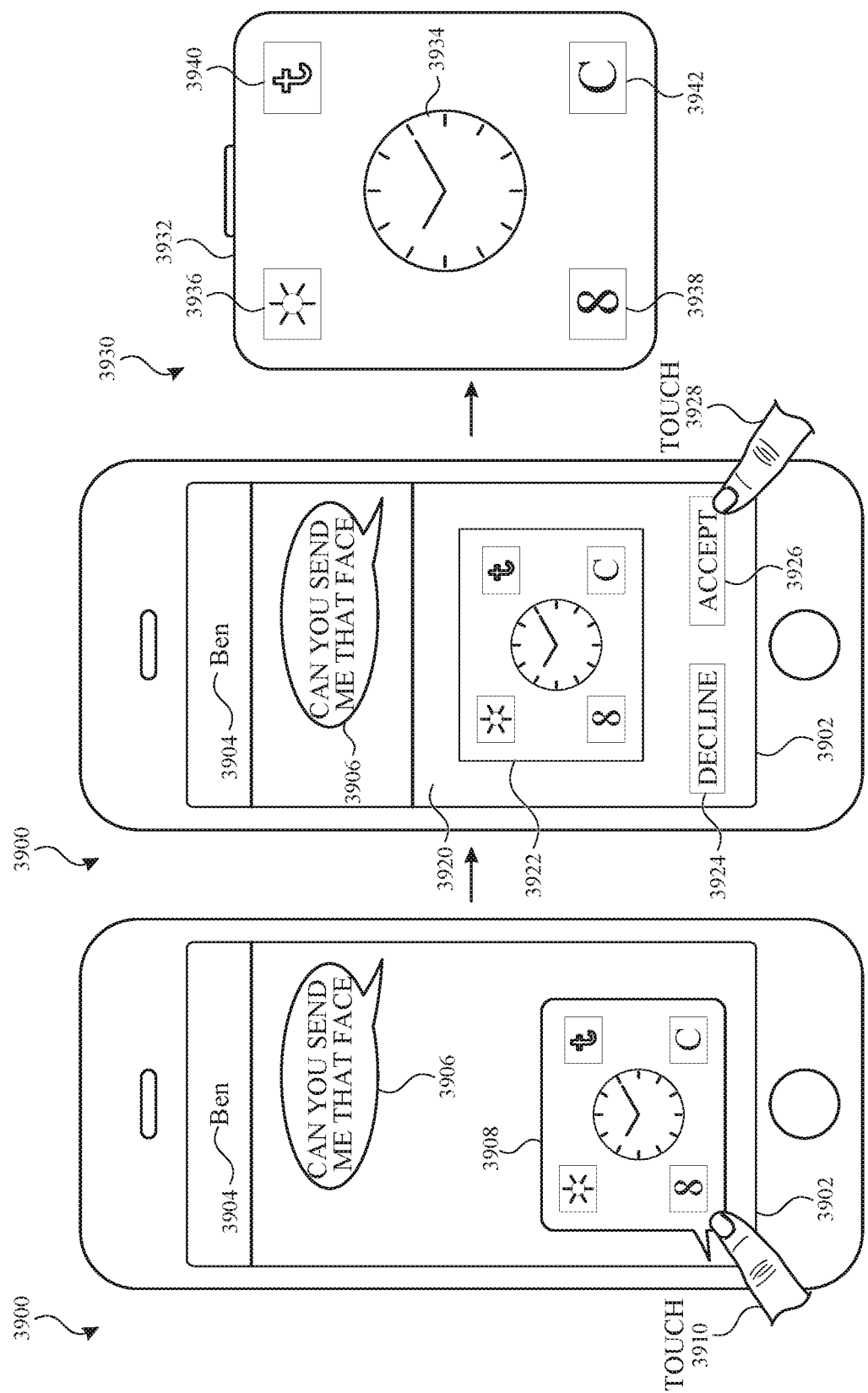
FIG. 39 illustrates exemplary user interfaces for receiving data representing user-configurable graphical constructs in accordance with some embodiments.

Turning now to FIG. 39, additional exemplary interfaces for receiving the data described above at an external device are depicted. Exemplary user interfaces for external device 3900 as illustrated in FIG. 39 are optionally operated on portable multifunction device 100, multifunction device 300, and/or device 3800. The other exemplary user interfaces for device 3930 as illustrated in FIG. 39 are optionally operated on device 100, 300, 500, 3200, 3300, 3330, 3400, 3500, 3550, 3600, or 3840 in accordance with some embodiments. Devices 3900 and 3930 have a display (e.g., 112 or 340, and 504, respectively).

In some embodiments, data representing a user-configurable graphical construct (e.g., as described above) may be received via email, text message, or embedded within an application. As illustrated in FIG. 39, device 3900 is displaying screen 3902, which includes an exemplary user interface for receiving data representing a user-configurable graphical construct via text message. Screen 3902 is displaying a user interface from a text-messaging application, including user interface object 3904 indicating a contact ("Ben") from whom a text message was received, text message 3906 indicating a request to share a user-configurable graphical construct (e.g., a "Face"), and representation 3908. Representation 3908 is displayed as an affordance in speech-balloon format, indicating that it has been sent by Ben, and it represents the requested user-configurable graphical construct. The user of device 3900 may provide an input (e.g., touch 3910 on representation 3908) to view the representation in greater detail.

In response to receiving the user input, device 3900 displays user interface 3920 for accepting the user-configurable graphical construct. In some embodiments, user interface 3920 is revealed on screen 3902 by translating on-screen (in this example, from bottom to top) and obscuring some, but not all, of the displayed contents. This allows the user to see a larger display of representation 3920 while still receiving an indication of remaining in the text-messaging application (e.g., through the portion of screen 3902 not obscured by interface 3920, which includes text message 3906).

Larger-size representation 3922 is displayed in user interface 3920, which also includes affordances 3924 and 3926 for declining or accepting the user-configurable graphical construct, respectively. The user indicates acceptance of the user-configurable graphical construct, e.g., by providing touch 3928 on "accept" affordance 3926.

In response, data (e.g., as described above) representing the user-configurable graphical construct are transmitted from the user's device or external server (or external device coupled to the user's device via wireless communication) to device 3900 and/or device 3930, which is coupled to device 3900 via wireless communication. Device 3930 subsequently displays screen 3932. Screen 3932 includes clock 3934 and complications 3936, 3938, 3940, and 3942, which are graphical elements represented by the representations within 3908 and 3922. In another embodiment (not shown), the data representing the user-configurable graphical construct are transmitted from the user's device or external server (or external device coupled to the user's device via wireless communication) to device 3900 and/or device 3930 directly in response to an input (e.g., touch 3910 on representation 3908), without display of the intervening user interface 3920.

It will be appreciated that the techniques and data described above as being "received" may also be transmitted by a device of the present disclosure. In some embodiments, a device described herein with memory storing a discrete set of graphical assets displays a user-configurable graphical construct or a representation of the user-configurable graphical construct, receives a user input corresponding to a request to share data representing the user-configurable graphical construct, and in response to receiving the user input, transmits the data. Similar to the received data described above, transmitted data representing a user-configurable graphical construct, may include any or all of the optional information, assets, objects, and/or features of the received data described herein. For example, the transmitted data may include first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct. In some embodiments, the transmitted data further include second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct. Advantageously, such methods, devices, systems, and computer-readable storage media described herein may reduce bandwidth requirements for transmission, thus conserving processor, memory, and/or battery usage, which are particularly relevant for portable multifunction devices.

As described herein, transmitted data may be transmitted to a portable multifunction device of the present disclosure (e.g., device 100, 300, 500, 3200, 3300, 3330, 3400, 3500, 3550, 3600, 3840, or 3930 in accordance with some embodiments), or it may be transmitted to an external device coupled to a portable multifunction device of the present disclosure (e.g., device 100, 300, 500, 3200, 3300, 3330, 3400, 3500, 3550, 3600, 3840, or 3930 in accordance with some embodiments) via wireless communication. In some embodiments, transmitted data may be transmitted by a portable multifunction device of the present disclosure (e.g., device 100, 300, 500, 3200, 3300, 3330, 3400, 3500, 3550, 3600, 3840, or 3930 in accordance with some embodiments), or it may be transmitted by an external device coupled to a portable multifunction device of the present disclosure (e.g., device 100, 300, 500, 3200, 3300, 3330, 3400, 3500, 3550, 3600, 3840, or 3930 in accordance with some embodiments) via wireless communication. In some embodiments, transmitted data may be transmitted directly to a recipient device (e.g., device to device), or it may be transmitted via upload to a website or other external server for download by one or more recipient devices. In some embodiments, transmitted data may be transmitted via text message, email, website, embedded within an application, or other external server.

Figure 40A:
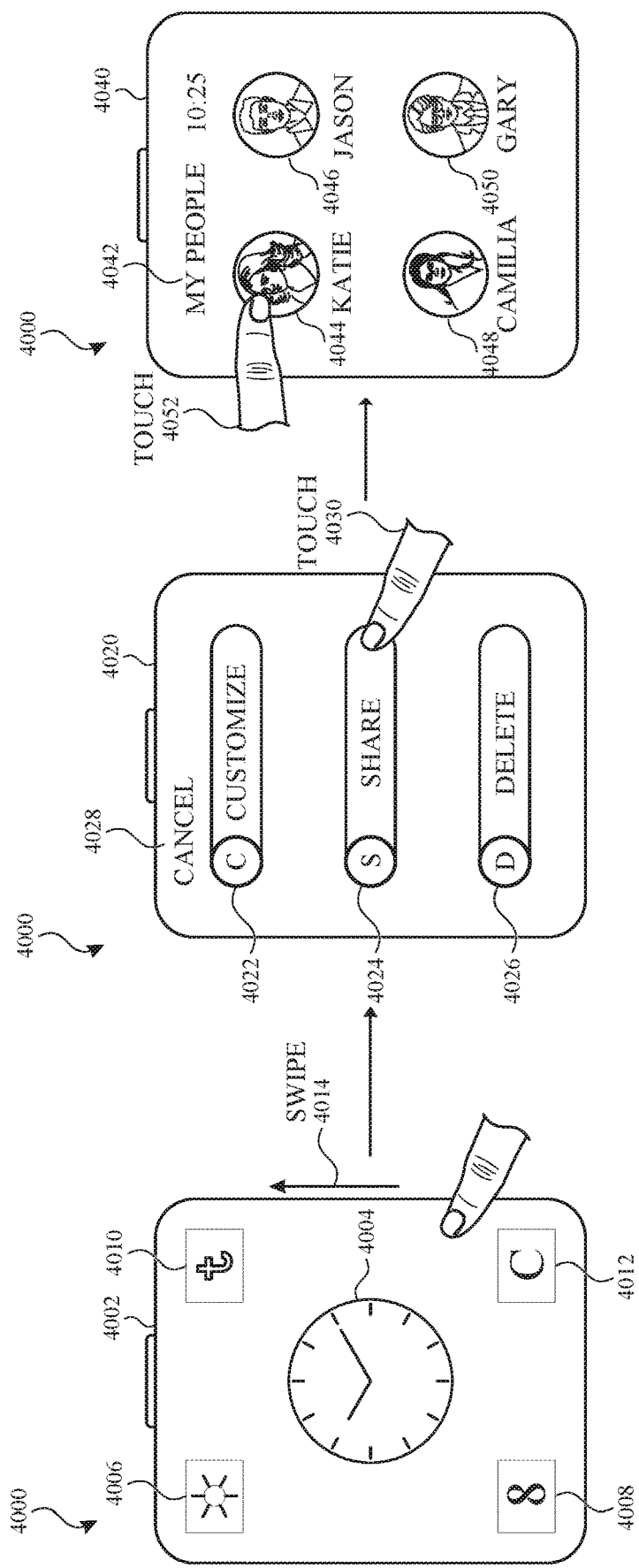
FIGS. 40A and 40B illustrate exemplary user interfaces for transmitting data representing user-configurable graphical constructs in accordance with some embodiments.

FIG. 40A illustrates exemplary user interfaces for sending data representing a user-configurable graphical construct at device 4000 in accordance with some embodiments. Exemplary user interfaces for device 4000 are optionally operated on device 100, 300, 500, 3200, 3300, 3330, 3400, 3500, 3550, 3600, 3840, or 3930 in accordance with some embodiments. Device 4000 has a display (e.g., 504).

Device 4000 displays screen 4002, which includes the graphical elements of clock 4004 and complications 4006, 4008, 4010, and 4012. Complications 4010 and 4012 are non-local graphical elements. In this example, the user-configurable graphical construct, rather than a representation, is displayed.

The user of device 4000 may provide a user input corresponding to a request to share data representing the user-configurable graphical construct. In FIG. 40A, the user swipes (e.g., upward swipe 4014, which in some embodiments may originate at the bezel or screen edge of device 4000) to share the data. It will be appreciated that other user inputs may be used to indicate a request to share data, including for example other touch inputs such as touches on a displayed share affordance, touches having a characteristic intensity above an intensity threshold, press-and-hold-type inputs; received audio requests; and so forth. In response to receiving the user input, device 4000 displays a user interface on user interface screen 4020 for customizing, sharing, or deleting the user-configurable graphical construct, as indicated by affordances 4022, 4024, and 4026. Screen 4020 also includes a "cancel" affordance 4028 to exit the user interface. In order to transmit data representing the user-configurable graphical construct shown on screen 4002, the user provides a user input to indicate sharing. In some embodiments, the user input may be a touch or swipe on affordance 4024 (e.g., touch 4030).

In some embodiments, device 4000 further provides a user interface for selecting a recipient device. An exemplary user interface is illustrated on screen 4040 of device 4000. Screen 4040 provides a list of recipient devices, in this case affordances 4044, 4046, 4048, and 4050, which indicate contacts with associated devices. Screen 4040 further includes an indication of the contact screen 4042. To transmit data representing the user-configurable graphical construct to the device associated with contact "Katie," the user provides touch 4052 on displayed affordance 4044. In some embodiments, device 4000 then provides a user prompt to select a method of transmitting the data to Katie, e.g., through text message, email, and the like. Data representing the user-configurable graphical construct on screen 4002, e.g., as described above, are then transmitted to Katie's device.

Figure 40B:
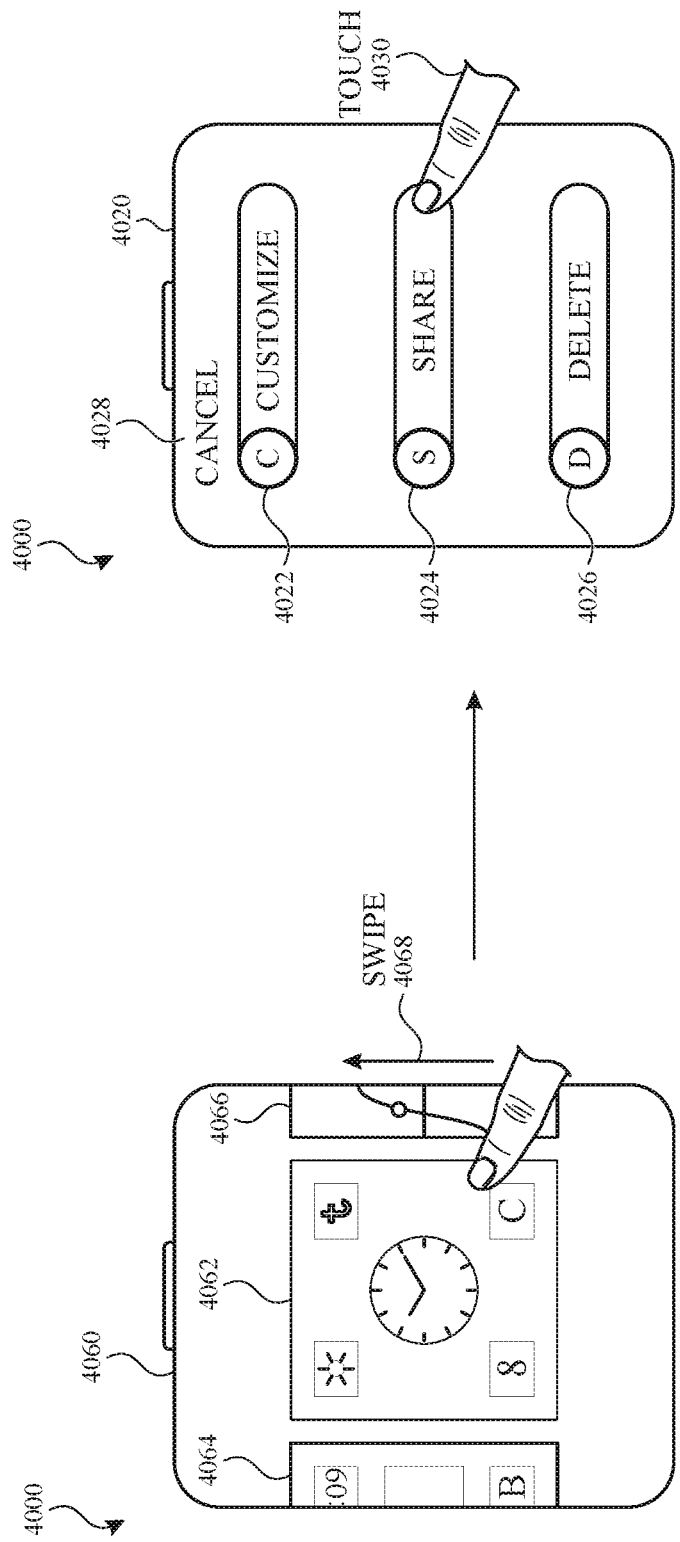

FIG. 40B illustrates another exemplary user interface for sharing data representing user-configurable graphical constructs that may be implemented with, or in place of, the user interface shown in FIG. 40A. In this example, on screen 4060, device 4000 displays a representation 4062 of a user-configurable graphical construct, rather than the user-configurable graphical construct itself. In some embodiments, screen 4060 may be a user interface within a user-configurable graphical construct selection mode of the electronic device, e.g., as described above in reference to FIGS. 27A-27E. Screen 4060 further includes partial views of representations 4064 and 4066 of other user-configurable graphical constructs. This allows the user to scroll through various user-configurable graphical constructs and select one or more for sharing.

To transmit data representing the user-configurable graphical construct of representation 4062, the user provides a swipe 4068 (e.g., an upward swipe) on or originating at representation 4062. In response to detecting swipe 4068, device 4000 displays screen 4020, as described above. It will be appreciated that other user inputs may be used to indicate a request to share data, including for example other touch inputs such as touches on a displayed share affordance, touches having a characteristic intensity above an intensity threshold, press-and-hold-type inputs; received audio requests; and so forth.

In some embodiments, the transmitted data further include information representing a non-local graphical element of the user-configurable construct (the non-local graphical asset not being selected from the discrete set of graphical assets stored in the memory of the electronic device). In some embodiments, the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset. In some embodiments, the transmitted data further include one or more text strings with a plurality of text elements (e.g., as illustrated in data 3520 in FIG. 35).

Figure 41:
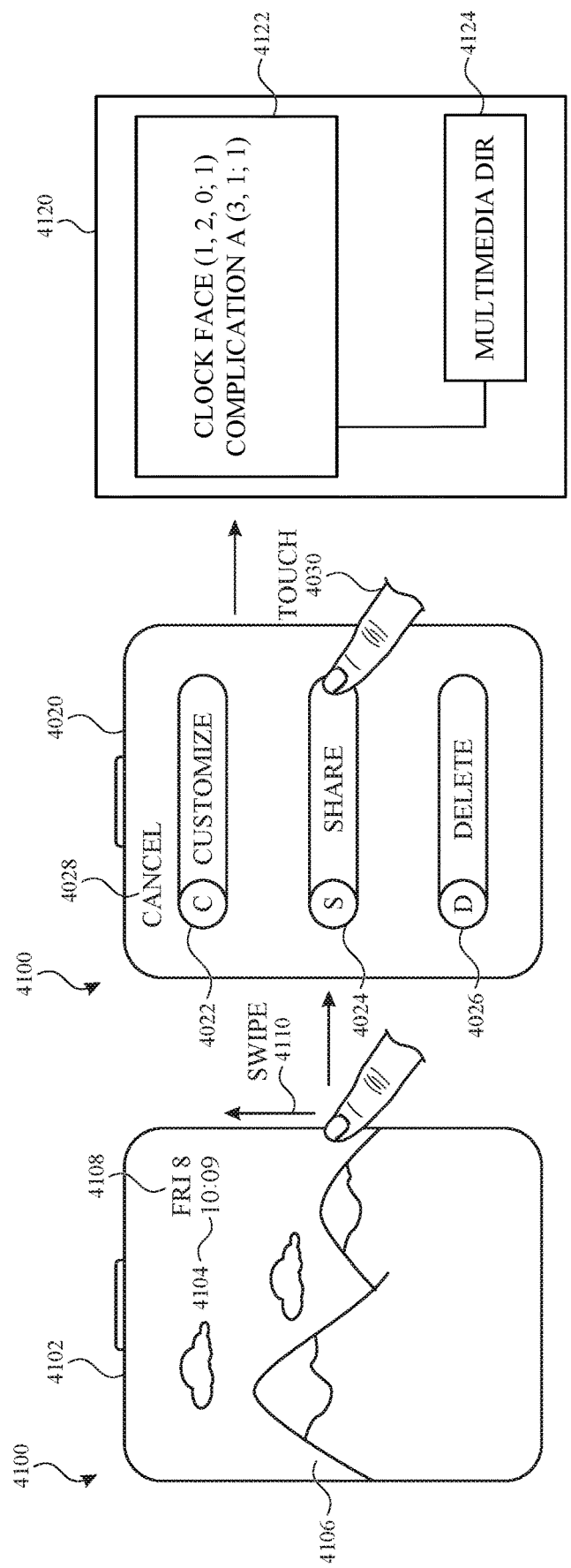
FIG. 41 illustrates exemplary user interfaces for transmitting data representing user-configurable graphical constructs in accordance with some embodiments.

In some embodiments, a user-configurable graphical construct further comprises a multimedia object, and the transmitted data further comprise the multimedia object. This is illustrated in FIG. 41. FIG. 41 illustrates exemplary user interfaces for sending data representing a user-configurable graphical construct with a multimedia object at device 4100 in accordance with some embodiments. Exemplary user interfaces for device 4100 are optionally operated on device 100, 300, 500, 3200, 3300, 3330, 3400, 3500, 3550, 3600, 3840, 3930, or 4000 in accordance with some embodiments. Device 4000 has a display (e.g., 504).

Device 4100 displays screen 4102, which includes clock 4104, background 4106 based on a user photo or image file, and date 4108. In order to request to share data representing the user-configurable graphical construct on screen 4102, the user provides swipe 4110. It will be appreciated that other user inputs may be used to indicate a request to share data, including for example other touch inputs such as touches on a displayed share affordance, touches having a characteristic intensity above an intensity threshold, press-and-hold-type inputs; received audio requests; and so forth. In response to detecting swipe 4110, device 4000 displays screen 4020, as described above. In response to detecting touch 4030 on sharing affordance 4024, device 4100 transmits data 4120 (e.g., to a device, external device, or external server).

Data 4120 includes metadata or information 4122 representing each local graphical element. For example, metadata 4122 contains data indicating each graphical asset of clock 4104 (e.g., a style of clock, a density of the clock, a color scheme of the clock, and the date complication) as well as data indicating the arrangement of the graphical assets in the user-configurable graphical construct (e.g., display the clock in the upper right corner of screen 4102; display the date above the clock). Data 4120 also includes multimedia object or object directory 4124, which includes an image file upon which background 4106 is based. Thus, the transmitted data includes all of the information representing the local graphical elements, as well as the asset(s) needed for the non-local graphical elements (e.g., image) of the user-configurable graphical construct.

In some embodiments, sending data representing a user-configurable graphical construct further includes determining whether one or more graphical elements meets one or more asset criteria for non-local graphical elements. In some embodiments, a non-local graphical element or asset is one that meets one or more of the following asset criteria: is provided by a certain party, is not preprogrammed or provided as default on the device, is downloaded by a user, is downloaded by a user subsequent to initiation of the device, and/or is not provided by the manufacturer as part of the standard or default-installed memory. In some embodiments, in accordance with a determination that the graphical element meets one or more of the asset criteria, a preview image for the non-local graphical element is generated. In some embodiments, in accordance with a determination that the graphical element meets one or more of the asset criteria, a preview image for the non-local graphical element is transmitted with the data.

A user may wish to acquire a non-local graphical element, asset, or application for another user. For example, a user may wish to share a user-configurable graphical construct with one or more non-local graphical elements and allow the recipient to use the construct without needed to acquire the non-local content, e.g., through purchase or other acquisition/download. In some embodiments, a non-local graphical element represents an application that has been acquired for a recipient. In some embodiments, transmitted data further includes information for the recipient to acquire the application. For example, the transmitted data may include a gift code or other authentication data indicating that the sender has acquired the application for the recipient. In some embodiments, the code or data may then be transmitted to a website or other external server for downloading/acquiring the application.

FIG. 42 is a flow diagram illustrating process 4200 for receiving data representing user-configurable graphical constructs. In some embodiments, process 4200 may be performed at an electronic device with a touch-sensitive display configured to detect intensity of contacts, such as 500 (FIG. 5), 2600 (FIG. 26), 2700 (FIGS. 27A-E), or 3200-3930 (FIGS. 32A-39). Some operations in process 4000 may be combined, the order of some operations may be changed, and some operations may be omitted. Process 4000 provides for receiving data representing user-configurable graphical constructs in a comprehensive yet easy-to-use manner, thus conserving power, increasing battery life, and reducing bandwidth requirements.

At block 4202, the device receives data representing a user-configurable graphical construct. The received data includes first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct. The received data further includes second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct. Optionally, the received data yet further includes third information representing a non-local graphical element of the user-configurable construct, the third information representing the non-local graphical element including i) data identifying a non-local graphical asset of the non-local graphical element, ii) data indicating the arrangement of the non-local graphical asset in the user-configurable graphical construct, and iii) a preview image representing the non-local graphical asset. In some embodiments, the non-local graphical asset is not selected from the discrete set of graphical assets stored in the memory of the electronic device. At block 4204, subsequent to receiving the data, the device generates the user-configurable graphical construct or a representation of the user-configurable graphical construct based on the received data and at least a subset of the discrete set of graphical assets stored in the memory. In some embodiments, the representation of the user-configurable graphical construct includes the optional preview image representing the non-local graphical asset. At block 4206, subsequent to generating the user-configurable graphical construct or the representation of the user-configurable graphical construct, the device displays the generated user-configurable graphical construct or the generated representation of the user-configurable graphical construct and a user interface for accepting the user-configurable graphical construct. At block 4008, the device receives a user input, via the user interface, indicating acceptance of the user-configurable graphical construct. At block 4210, responsive at least in part to receiving the user input, the device stores the received data in the memory of the device.

Note that details of the processes described above with respect to process 4200 (FIG. 42) are also applicable in an analogous manner to processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4300 (FIG. 43) described herein. For example, methods 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4300 (FIG. 43) may include one or more of the characteristics of the various methods described above with reference to process 4200. For example, the device could perform one or more of the editing and/or selection steps described in processes 2900, 3000, and/or 3100 (FIGS. 29-31) subsequent to storing the received data in memory at block 4210. For brevity, these details are not repeated below.

It should be understood that the particular order in which the operations in FIG. 42 have been described is exemplary and not intended to indicate that the described order is the only order in which the operations could be performed. One of ordinary skill in the art would recognize various ways to reorder the operations described herein, as well as excluding certain operations. In this case, the device may enter clock face edit mode to edit the first clock. For brevity, all of these details are not repeated here. Additionally, it should be noted that aspects of processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and 4300 (FIG. 43) may be incorporated with one another. Thus, the techniques described with respect to process 4200 may be relevant to processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4300 (FIG. 43).

FIG. 43 is a flow diagram illustrating process 4300 for receiving data representing user-configurable graphical constructs. In some embodiments, process 4300 may be performed at an electronic device with a touch-sensitive display configured to detect intensity of contacts, such as 500 (FIG. 5), 2600 (FIG. 26), 2700 (FIGS. 27A-E), 4000, or 4100 (FIGS. 40A-41). Some operations in process 4100 may be combined, the order of some operations may be changed, and some operations may be omitted. Process 4300 provides for receiving data representing user-configurable graphical constructs in a comprehensive yet easy-to-use manner, thus conserving power, increasing battery life, and reducing bandwidth requirements.

At block 4302, the device displays a user-configurable graphical construct or a representation of the user-configurable graphical construct. At block 4304, the device receives a first user input corresponding to a request to share data representing the user-configurable graphical construct. Optionally, at block 4306, responsive at least in part to receiving the first user input, the device displays a user interface for selecting a recipient device. Optionally, at block 4308, the device receives a second user input corresponding to a selection of the recipient device. At block 4310, responsive at least in part to receiving the first user input (and optionally further responsive at least in part to receiving the second user input), the device transmits data representing the user-configurable graphical construct. The transmitted data includes first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct. The transmitted data further includes second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct. Optionally, the transmitted data yet further includes third information representing a non-local graphical element of the user-configurable construct, the third information representing the non-local graphical element including i) data identifying a non-local graphical asset of the non-local graphical element, ii) data indicating the arrangement of the non-local graphical asset in the user-configurable graphical construct, and iii) a preview image representing the non-local graphical asset. In some embodiments, the non-local graphical asset is not selected from the discrete set of graphical assets stored in the memory of the electronic device.

Note that details of the processes described above with respect to process 4300 (FIG. 43) are also applicable in an analogous manner to processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4200 (FIG. 42) described herein. For example, methods 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4200 (FIG. 42) may include one or more of the characteristics of the various methods described above with reference to process 4300. For example, the device could perform one or more of the editing and/or selection steps described in processes 2900, 3000, and/or 3100 (FIGS. 29-31) prior to receiving the user input corresponding to a request to share the data representing the user-configurable graphical construct at block 4304. For brevity, these details are not repeated below.

It should be understood that the particular order in which the operations in FIG. 43 have been described is exemplary and not intended to indicate that the described order is the only order in which the operations could be performed. One of ordinary skill in the art would recognize various ways to reorder the operations described herein, as well as excluding certain operations. In this case, the device may enter clock face edit mode to edit the first clock. For brevity, all of these details are not repeated here. Additionally, it should be noted that aspects of processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and 4200 (FIG. 42) may be incorporated with one another. Thus, the techniques described with respect to process 4300 may be relevant to processes 1600 (FIG. 16A), 1800 (FIG. 18), 1900 (FIG. 19), 2000 (FIGS. 20A and 20B), 2100 (FIG. 21), 2900 (FIG. 29), 3000 (FIG. 30), 3100 (FIG. 31), and/or 4200 (FIG. 42).

Figure 44:
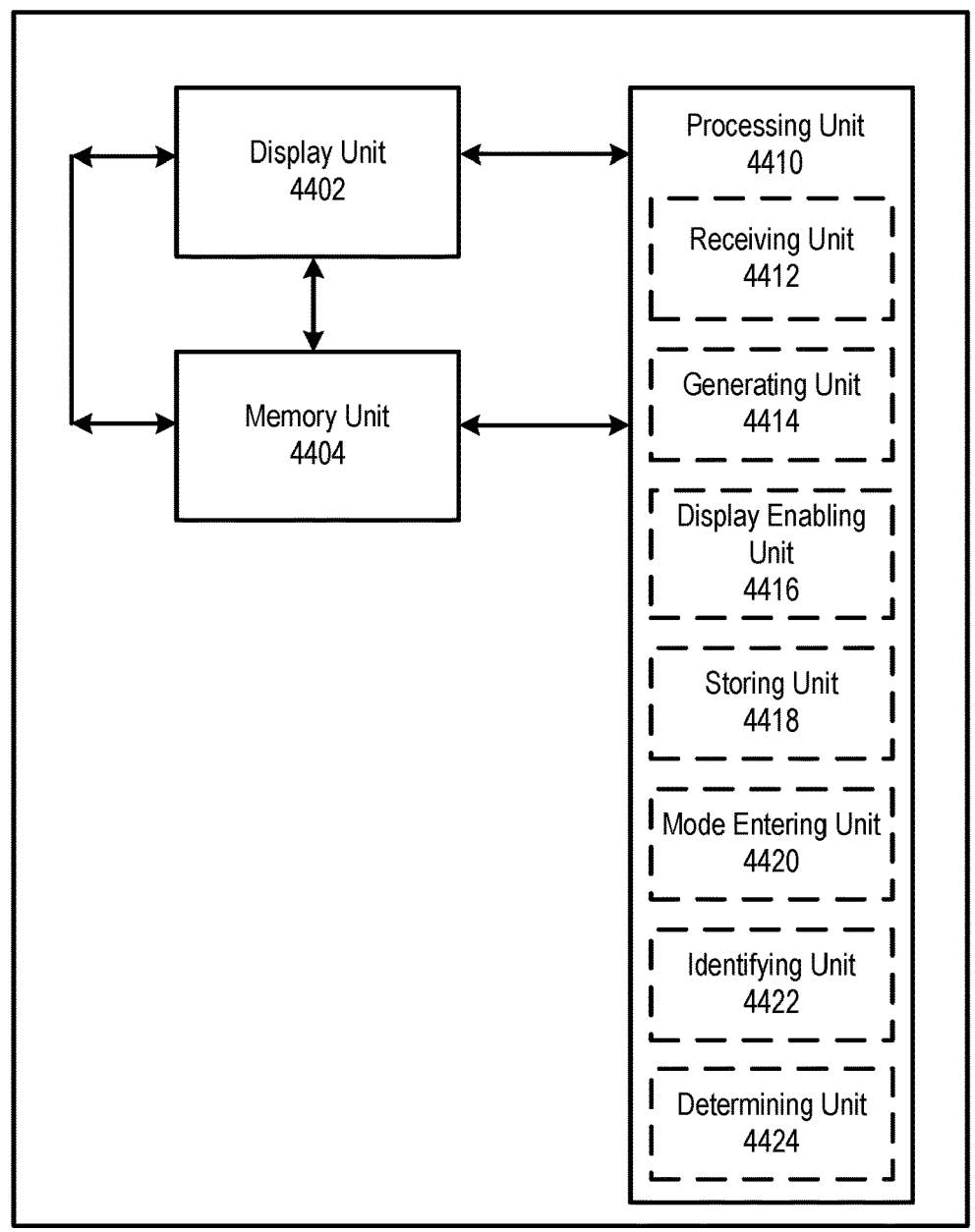
FIG. 44 is a functional block diagram of an electronic device in accordance with some embodiments.

In accordance with some embodiments, FIG. 44 shows an exemplary functional block diagram of an electronic device 4400 configured in accordance with the principles of the various described embodiments. In accordance with some embodiments, the functional blocks of electronic device 4400 are configured to perform the techniques described above. The functional blocks of the device 4400 are, optionally, implemented by hardware, software, or a combination of hardware and software to carry out the principles of the various described examples. It is understood by persons of skill in the art that the functional blocks described in FIG. 44 are, optionally, combined or separated into sub-blocks to implement the principles of the various described examples. Therefore, the description herein optionally supports any possible combination or separation or further definition of the functional blocks described herein.

As shown in FIG. 44, an electronic device 4400 includes a display unit 4402 configured to display a graphic user interface (optionally configured to receive contacts as a touch-sensitive display), a memory unit 4404 configured to store data, and a processing unit 4410 coupled to the display unit 4402 and the memory unit 4404. In some embodiments, memory unit 4404 stores a discrete set of graphical assets. In some embodiments, the processing unit 4410 includes a receiving unit 4412, a generating unit 4414, a display enabling unit 4416, a storing unit 4418, a mode-entering unit 4420, an identifying unit 4422, and a determining unit 4424.

The processing unit 4410 comprises a receiving unit (e.g., receiving unit 4412) configured to receive data representing a user-configurable graphical construct, wherein the received data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the received data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct; a generating unit (e.g., generating unit 4414) configured to, subsequent to receiving the data, generate the user-configurable graphical construct or a representation of the user-configurable graphical construct based on the received data and at least a subset of the discrete set of graphical assets stored in the memory unit; a display enabling unit (e.g., display enabling unit 4416) configured to, subsequent to generating the user-configurable graphical construct or the representation of the user-configurable graphical construct, enable display on the display unit of: the generated user-configurable graphical construct or the generated representation of the user-configurable graphical construct, and a user interface for accepting the user-configurable graphical construct; a second receiving unit (e.g., receiving unit 4412) configured to receive a user input, via the user interface, indicating acceptance of the user-configurable graphical construct; and a storing unit (e.g., storing unit 4418) configured to, in response to receiving the user input, store the received data in the memory unit.

In some embodiments, processing unit 4410 further comprises a mode entering unit (e.g., mode-entering unit 4420) configured to, after storing the received data, enter a user-configurable graphical construct selection mode of the electronic device; a third receiving unit (e.g., receiving unit 4412) configured to, while in the user-configurable graphical construct selection mode, receive a user input indicating selection of the user-configurable graphical construct; and a second display enabling unit (e.g., display enabling unit 4416) configured to, in response to receiving the user input: enable display of the user-configurable graphical construct on the display unit.

In some embodiments, processing unit 4410 further comprises a second generating unit (e.g., generating unit 4414) configured to, in response to receiving the user input and before displaying the user-configurable graphical construct, generate the user-configurable graphical construct based on the received data and at least a subset of the discrete set of graphical assets stored in the memory unit.

In some embodiments, generating the user-configurable graphical construct or the representation of the user-configurable graphical construct comprises generating the representation of the user-configurable graphical construct based on the received data and at least a subset of the discrete set of graphical assets stored in the memory and wherein displaying the generated user-configurable graphical construct or the generated representation of the user-configurable graphical construct comprises displaying the generated representation of the user-configurable graphical construct.

In some embodiments, the received data further includes: third information representing a non-local graphical element of the user-configurable construct, wherein the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset, and wherein the non-local graphical asset is not selected from the discrete set of graphical assets stored in the memory unit of the electronic device.

In some embodiments, the user-configurable graphical construct further comprises a multimedia object, and wherein the received data further comprise the multimedia object.

In some embodiments, the received data further includes i) a text string and ii) at least a first and a second text element, wherein the first and the second text elements both represent the text string, and wherein the first and the second text elements are in different languages.

In some embodiments, generating the user-configurable graphical construct or the representation of the user-configurable graphical construct comprises generating the representation of the user-configurable graphical construct based on the received data and at least a subset of the discrete set of graphical assets stored in the memory unit; processing unit 4410 further comprises an identifying unit (e.g., identifying unit 4422) configured to identify that a system language in which the electronic device is configured to display text corresponds to the language of the first text element; wherein displaying the generated user-configurable graphical construct or the generated representation of the user-configurable graphical construct comprises displaying the generated representation of the user-configurable graphical construct; and wherein displaying the generated representation of the user-configurable graphical construct comprises displaying the first text element.

In some embodiments, the user-configurable graphical construct comprises a clock face, and wherein the non-local graphical element represents a complication associated with the clock face.

In some embodiments, the non-local graphical element represents an application, and processing unit 4410 further comprises: a determining unit (e.g., determining unit 4424) configured to, in response to receiving the user input indicating acceptance of the user-configurable graphical construct, determine whether the application is stored in the memory unit of the electronic device; and a third display enabling unit (e.g., display enabling unit 4416) configured to: in accordance with a determination that the application is not stored in the memory unit of the electronic device, enable display of a user interface for acquiring the application on the display unit; and in accordance with a determination that the application is stored in the memory unit of the electronic device, forego display of the user interface for acquiring the application on the display unit.

In some embodiments, the data are received via email message, text message, or external server.

In some embodiments, the data are received by the electronic device.

In some embodiments, the data are received by an external device coupled to the electronic device via wireless communication.

The operations described above with reference to FIG. 44 are, optionally, implemented by components depicted in FIGS. 1A-1B or FIG. 42. For example, receiving operation 4202, generating operation 4204, and receiving operation 4208 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 45:
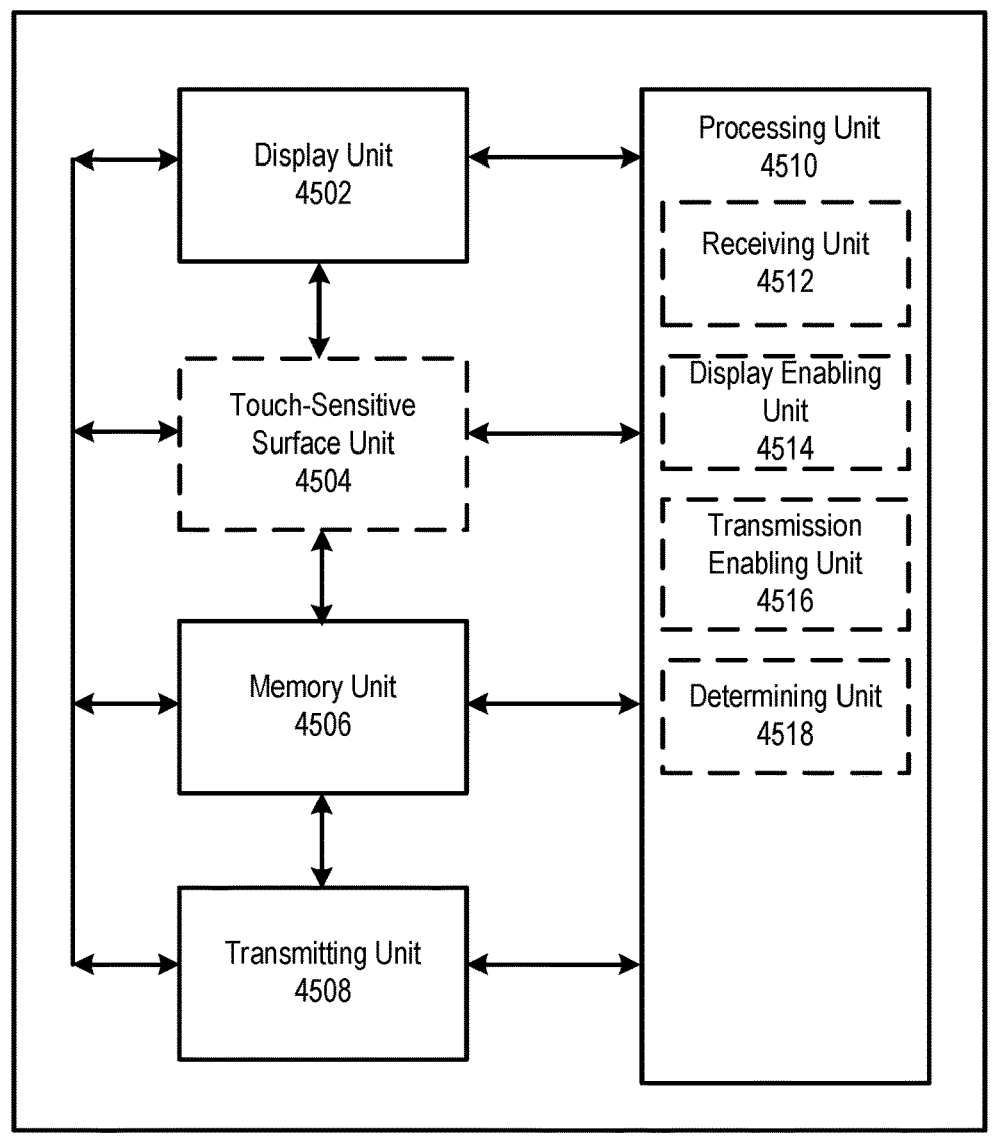
FIG. 45 is a functional block diagram of an electronic device in accordance with some embodiments.

In accordance with some embodiments, FIG. 45 shows an exemplary functional block diagram of an electronic device 4500 configured in accordance with the principles of the various described embodiments. In accordance with some embodiments, the functional blocks of electronic device 4500 are configured to perform the techniques described above. The functional blocks of the device 4500 are, optionally, implemented by hardware, software, or a combination of hardware and software to carry out the principles of the various described examples. It is understood by persons of skill in the art that the functional blocks described in FIG. 45 are, optionally, combined or separated into sub-blocks to implement the principles of the various described examples. Therefore, the description herein optionally supports any possible combination or separation or further definition of the functional blocks described herein.

As shown in FIG. 45, an electronic device 4500 includes a display unit 4502 configured to display a graphic user interface (optionally configured to receive contacts as a touch-sensitive display), optionally a touch-sensitive surface unit 4504 configured to receive contacts, a memory unit 4506 configured to store data, a transmitting unit 4508, and a processing unit 4510 coupled to the display unit 4502, the optional touch-sensitive display unit 4504, memory unit 4506 and the transmitting unit 4508. In some embodiments in which display unit 4502 is a touch-sensitive display unit configured to receive contacts, display unit 4502 and touch-sensitive surface unit 4504 may be the same unit. In some embodiments, memory unit 4504 stores a discrete set of graphical assets. In some embodiments, the processing unit 4510 includes a receiving unit 4512, a display enabling unit 4514, a transmission enabling unit 4516, and a determining unit 4518.

The processing unit 4510 comprises a first display enabling unit (e.g., display enabling unit 4514) configured to enable display of a user-configurable graphical construct or a representation of the user-configurable graphical construct on the display unit; a receiving unit (e.g., receiving unit 4512) configured to receive a first user input corresponding to a request to share data representing the user-configurable graphical construct; a transmission enabling unit (e.g., transmission enabling unit 4516) configured to transmit the data representing the user-configurable graphical construct via the transmitting unit in response to receiving the first user input, wherein the transmitted data includes: first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes: second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

In some embodiments, processing unit 4510 further comprises a second display enabling unit (e.g., display enabling unit 4514) configured to, in response to receiving the first user input, enable display of a user interface for selecting a recipient device on the display unit; and a second receiving unit (e.g., receiving unit 4512) configured to, before transmitting the data, receive a second user input corresponding to a selection of the recipient device, wherein the data are transmitted to the recipient device.

In some embodiments, the transmitted data further includes: third information representing a non-local graphical element of the user-configurable construct, wherein the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset, and wherein the non-local graphical asset is not selected from the discrete set of graphical assets stored in the memory unit of the electronic device.

In some embodiments, the user-configurable graphical construct further comprises a multimedia object, and wherein the transmitted data further comprise the multimedia object.

In some embodiments, the transmitted data further includes i) a text string and ii) at least a first and a second text element, wherein the first and the second text elements both represent the text string, and wherein the first and the second text elements are in different languages.

In some embodiments, the user-configurable graphical construct comprises a clock face, and wherein the non-local graphical element represents a complication associated with the clock face.

In some embodiments, the display unit (e.g., display unit 4502) is a touch-sensitive display unit, and wherein the first user input comprises a swipe on the displayed user-configurable graphical construct or the displayed representation of the user-configurable graphical construct.

In some embodiments, the user interface for selecting the recipient device comprises a sharing affordance, and wherein the second user input corresponds to a user selection of the sharing affordance.

In some embodiments, the display unit (e.g., display unit 4502) is a touch-sensitive display unit, and wherein the second user input comprises a contact on the touch-sensitive display at the sharing affordance.

In some embodiments, the representation of the user-configurable graphical construct is displayed before receiving the first user input, and the processing unit 4510 further comprises: a third display enabling unit (e.g., display enabling unit 4514) configured to enable display of, with the representation of the user-configurable graphical construct, at least a portion of a second representation of a second user-configurable graphical construct.

In some embodiments, the second representation is displayed in a partial view.

In some embodiments, the data are transmitted via email message, text message, website, or external server.

In some embodiments, the data are transmitted by the electronic device.

In some embodiments, the data are transmitted by an external device coupled to the electronic device via wireless communication.

In some embodiments, the non-local graphical element represents an application that has been acquired for a recipient, and wherein the transmitted data further comprise information for the recipient to acquire the application.

The operations described above with reference to FIG. 45 are, optionally, implemented by components depicted in FIGS. 1A-1B or FIG. 43. For example, displaying operation 4302, receiving operation 4304, and transmitting operation 4310 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A device, comprising:
a display;
one or more processors;
a memory, the memory storing a discrete set of graphical assets; and
one or more programs, wherein the one or more programs are stored in the memory and configured to be executed by the one or more processors, the one or more programs including instructions for:
displaying a user-configurable graphical construct or a representation of the user-configurable graphical construct;
receiving a first user input corresponding to a request to share data representing the user-configurable graphical construct;
in response to receiving the first user input, concurrently displaying a share affordance and a customize affordance for configuring the user-configurable graphical construct;
before transmitting data representing the user-configurable graphical construct:
displaying a user interface for selecting a recipient device; and
receiving a second user input corresponding to a selection of the recipient device;
receiving a third user input corresponding to the displayed share affordance; and
in response to receiving the third user input, transmitting the data representing the user-configurable graphical construct to the recipient device, wherein the transmitted data includes:
first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes:
second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

2. The device of claim 1, wherein the transmitted data further includes:
third information representing a non-local graphical element of the user-configurable construct, wherein the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset, wherein the non-local graphical asset is not selected from the discrete set of graphical assets stored in the memory of the device, and wherein the non-local graphical element is not programmed or provided as default on the device.

3. The device of claim 2, wherein the transmitted data further includes i) a text string and ii) at least a first and a second text element, wherein the first and the second text elements both represent the text string, and wherein the first and the second text elements are in different languages.

4. The device of claim 2, wherein the user-configurable graphical construct comprises a clock face, and wherein the non-local graphical element represents a complication, wherein the complication includes a graphical feature of the clock face that indicates information other than hours and minutes of time.

5. The device of claim 2, wherein the non-local graphical element represents an application that has been acquired for a recipient, and wherein the transmitted data further comprise information for the recipient to acquire the application.

6. The device of claim 1, wherein the user-configurable graphical construct further comprises a multimedia object, and wherein the transmitted data further comprise the multimedia object.

7. The device of claim 1, wherein the display is a touch-sensitive display, and wherein the first user input comprises a swipe on the displayed user-configurable graphical construct or the displayed representation of the user-configurable graphical construct.

8. The device of claim 1, wherein the user interface for selecting the recipient device includes the sharing affordance.

9. The device of claim 1, wherein the display is a touch-sensitive display, and wherein the third user input comprises a contact on the touch-sensitive display at the sharing affordance.

10. The device of claim 1, wherein the representation of the user-configurable graphical construct is displayed before receiving the first user input, and the one or more programs further include instructions for:
displaying, with the representation of the user-configurable graphical construct, at least a portion of a second representation of a second user-configurable graphical construct.

11. The device of claim 10, wherein the second representation is displayed in a partial view.

12. The device of claim 1, wherein the data are transmitted via email message, text message, website, or external server.

13. The device of claim 1, wherein the data are transmitted by the device.

14. The device of claim 1, wherein the data are transmitted by an external device coupled to the device via wireless communication.

15. A non-transitory computer-readable storage medium storing one or more programs configured to be executed by one or more processors of a device with a display and a memory, the memory storing a discrete set of graphical assets, and the one or more programs including instructions for:
displaying a user-configurable graphical construct or a representation of the user-configurable graphical construct;
receiving a first user input corresponding to a request to share data representing the user-configurable graphical construct;
in response to receiving the first user input, concurrently displaying a share affordance and a customize affordance for configuring the user-configurable graphical construct;
before transmitting data representing the user-configurable graphical construct:
displaying a user interface for selecting a recipient device; and
receiving the second user input corresponding to a selection of the recipient device;
receiving a third user input corresponding to the displayed share affordance; and
in response to receiving the third user input, transmitting the data representing the user-configurable graphical construct to the recipient device, wherein the transmitted data includes:
first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes:
second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

16. The computer-readable storage medium of claim 15, wherein the transmitted data further includes:
third information representing a non-local graphical element of the user-configurable construct, wherein the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset, wherein the non-local graphical asset is not selected from the discrete set of graphical assets stored in the memory of the device, and wherein the non-local graphical element is not programmed or provided as default on the device.

17. The computer-readable storage medium of claim 16, wherein the transmitted data further includes i) a text string and ii) at least a first and a second text element, wherein the first and the second text elements both represent the text string, and wherein the first and the second text elements are in different languages.

18. The computer-readable storage medium of claim 16, wherein the user-configurable graphical construct comprises a clock face, and wherein the non-local graphical element represents a complication, wherein the complication includes a graphical feature of the clock face that indicates information other than hours and minutes of time.

19. The computer-readable storage medium of claim 16, wherein the non-local graphical element represents an application that has been acquired for a recipient, and wherein the transmitted data further comprise information for the recipient to acquire the application.

20. The computer-readable storage medium of claim 15, wherein the user-configurable graphical construct further comprises a multimedia object, and wherein the transmitted data further comprise the multimedia object.

21. The computer-readable storage medium of claim 15, wherein the display is a touch-sensitive display, and wherein the first user input comprises a swipe on the displayed user-configurable graphical construct or the displayed representation of the user-configurable graphical construct.

22. The computer-readable storage medium of claim 15, wherein the user interface for selecting the recipient device includes the sharing affordance.

23. The computer-readable storage medium of claim 15, wherein the display is a touch-sensitive display, and wherein the third user input comprises a contact on the touch-sensitive display at the sharing affordance.

24. The computer-readable storage medium of claim 15, wherein the representation of the user-configurable graphical construct is displayed before receiving the first user input, and wherein the one or more programs further include instructions for:
displaying, with the representation of the user-configurable graphical construct, at least a portion of a second representation of a second user-configurable graphical construct.

25. The computer-readable storage medium of claim 24, wherein the second representation is displayed in a partial view.

26. The computer-readable storage medium of claim 15, wherein the data are transmitted via email message, text message, website, or external server.

27. The computer-readable storage medium of claim 15, wherein the data are transmitted by the device.

28. The computer-readable storage medium of claim 15, wherein the data are transmitted by an external device coupled to the device via wireless communication.

29. A method comprising:
at an electronic device with a display, one or more processors, and memory, the memory storing a discrete set of graphical assets:
displaying a user-configurable graphical construct or a representation of the user-configurable graphical construct;
receiving a first user input corresponding to a request to share data representing the user-configurable graphical construct;
in response to receiving the first user input, concurrently displaying a share affordance and a customize affordance for configuring the user-configurable graphical construct;
before transmitting data representing the user-configurable graphical construct:
displaying a user interface for selecting a recipient device; and
receiving the second user input corresponding to a selection of the recipient device;
receiving a third user input corresponding to the displayed share affordance; and
in response to receiving the third user input, transmitting the data representing the user-configurable graphical construct to the recipient device, wherein the transmitted data includes:
first information representing a first graphical element of the user-configurable construct, the first information representing the first graphical element including i) data identifying a first graphical asset of the discrete set of graphical assets, and ii) data indicating the arrangement of the first graphical asset in the user-configurable graphical construct, and wherein the transmitted data further includes:
second information representing a second graphical element of the user-configurable construct, the second information representing the second graphical element including i) data identifying a second graphical asset of the discrete set of graphical assets, and ii) data indicating the arrangement of the second graphical asset in the user-configurable graphical construct.

30. The method of claim 29, wherein the transmitted data further includes:
third information representing a non-local graphical element of the user-configurable construct, wherein the third information representing the non-local graphical element includes i) data identifying a non-local graphical asset of the non-local graphical element, ii) data indicating the arrangement of the non-local graphical asset in the user-configurable graphical construct, and iii) a preview image representing the non-local graphical asset, wherein the non-local graphical asset is not selected from the discrete set of graphical assets stored in the memory of the device, and wherein the non-local graphical element is not programmed or provided as default on the device.

31. The method of claim 30, wherein the transmitted data further includes i) a text string and ii) at least a first and a second text element, wherein the first and the second text elements both represent the text string, and wherein the first and the second text elements are in different languages.

32. The method of claim 30, wherein the user-configurable graphical construct comprises a clock face, and wherein the non-local graphical element represents a complication, wherein the complication includes a graphical feature of the clock face that indicates information other than hours and minutes of time.

33. The method of claim 30, wherein the non-local graphical element represents an application that has been acquired for a recipient, and wherein the transmitted data further comprise information for the recipient to acquire the application.

34. The method of claim 29, wherein the user-configurable graphical construct further comprises a multimedia object, and wherein the transmitted data further comprise the multimedia object.

35. The method of claim 29, wherein the display is a touch-sensitive display, and wherein the first user input comprises a swipe on the displayed user-configurable graphical construct or the displayed representation of the user-configurable graphical construct.

36. The method of claim 29, wherein the user interface for selecting the recipient device includes the sharing affordance.

37. The method of claim 29, wherein the display is a touch-sensitive display, and wherein the third user input comprises a contact on the touch-sensitive display at the sharing affordance.

38. The method of claim 29, wherein the representation of the user-configurable graphical construct is displayed before receiving the first user input, and wherein the method further comprises:
displaying, with the representation of the user-configurable graphical construct, at least a portion of a second representation of a second user-configurable graphical construct.

39. The method of claim 38, wherein the second representation is displayed in a partial view.

40. The method of claim 29, wherein the data are transmitted via email message, text message, website, or external server.

41. The method of claim 29, wherein the data are transmitted by the device.

42. The method of claim 29, wherein the data are transmitted by an external device coupled to the device via wireless communication.

* * * * *

UNITED STATES PATENT AND TRADEMARK OFFICE
CERTIFICATE OF CORRECTION

PATENT NO. : 10,802,703 B2
APPLICATION NO. : 15/554204
DATED : October 13, 2020
INVENTOR(S) : Eliza Block et al.

It is certified that error appears in the above-identified patent and that said Letters Patent is hereby corrected as shown below:

On the Title Page

At Item (56): OTHER PUBLICATIONS in Column 2, Line 1, delete "Availbale" and insert -- Available --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*